(12) United States Patent
Baker

(10) Patent No.: US 6,336,103 B1
(45) Date of Patent: Jan. 1, 2002

(54) RAPID METHOD OF ANALYSIS FOR CORRELATION OF ASSET RETURN TO FUTURE FINANCIAL LIABILITIES

(76) Inventor: Nardin L. Baker, 2410 E. Menlo Blvd., Shorewood, WI (US) 53211

( * ) Notice: Subject to any disclaimer, the term of this patent is extended or adjusted under 35 U.S.C. 154(b) by 0 days.

(21) Appl. No.: 07/389,382

(22) Filed: Aug. 2, 1989

(51) Int. Cl.⁷ .............................................. G06F 17/60
(52) U.S. Cl. .......................................... 705/36; 705/35
(58) Field of Search ............................ 364/408; 705/35, 705/36

(56) References Cited

U.S. PATENT DOCUMENTS

| | | | |
|---|---|---|---|
| 3,581,072 A | | 5/1971 | Nymeyer |
| 4,194,242 A | | 3/1980 | Robbins |
| 4,232,367 A | | 11/1980 | Youden et al. |
| 4,321,672 A | | 3/1982 | Braun et al. |
| 4,346,442 A | | 8/1982 | Musmanno |
| 4,376,978 A | | 3/1983 | Musmanno |
| 4,597,046 A | | 6/1986 | Musmanno et al. |
| 4,642,768 A | | 2/1987 | Roberts |
| 4,648,038 A | | 3/1987 | Roberts et al. |
| 4,722,055 A | | 1/1988 | Roberts |
| 4,736,294 A | | 4/1988 | Gill et al. |
| 4,739,478 A | | 4/1988 | Roberts et al. |
| 4,742,457 A | | 5/1988 | Leon et al. |
| 4,752,877 A | | 6/1988 | Roberts et al. |
| 5,761,442 A | * | 6/1998 | Barr et al. ............ 705/36 |
| 5,806,047 A | * | 9/1998 | Hackel et al. ........ 705/36 |
| 5,884,287 A | * | 3/1999 | Edesess ............... 705/36 |
| 5,946,667 A | * | 8/1999 | Tull, Jr. et al. ...... 705/36 |
| 6,003,018 A | * | 12/1999 | Michaud et al. ...... 705/36 |
| 6,078,904 A | * | 6/2000 | Rebane ................ 705/36 |

FOREIGN PATENT DOCUMENTS

| | | | |
|---|---|---|---|
| WO | WO-91/02326 A1 | * | 2/1991 |
| WO | WO-00/16225 A1 | * | 3/2000 |

OTHER PUBLICATIONS

Leibowitz et al: "Portfolio Optimization with Shortfall Constraints: A Confidence–Limit Approach to Managing Downside Risk"; Financial Analysis Journal, Mar./Apr. 1989, vol. 45, No. 2, pp. 34–41 (Abstract Only).*

"The Movements of Interest Rates, Bond Yields and Stock Prices in the United States Since 1956", F.R. Macaulay, Natl. Bureau of Economics Research, N.Y. 1938.

"The Interest Rate Assumption and the Maturity Structure of the Assets of a Life Insurance Company", I.T. Vanderhoof, Reprinted from the Transactions of the Society of Acturaries, vol. XXIV, Meetings No. 69A and 69B,May and Jun. 1972.

"Duration as a Practical Tool for Bond Management", R.W. McEnally, J. of Portfolio Management, Summer 1977.

"The Revolution in Techniques for Managing Bond Portfolios", The Institute of Chartered Financial Analysts, Copyright 1983 by the Institute of Chartered Financial Analysts, Feb. 3, 1984.

"Matched–Funding Techniques–The Dedicated Bond Portfolio in Pension Funds", M.L. Leibowitz, Salomon Brothers Inc., Bond Portfolio Analysis Group, Feb. 1985.

(List continued on next page.)

*Primary Examiner*—Edward R. Cosimano
(74) *Attorney, Agent, or Firm*—Reinhart, Boerner, Van Deuren, Norris & Rieselbach, s.c.

(57) ABSTRACT

A method and system for correlating an expected asset return of a portfolio to changes in future financial liabilities and also to other financial indices. Management of asset portfolios often requires precise matching of liability streams, such as is the insurance industry and for pension funds. The method selects the weight percentages of assets by achieving optimum statistical correlation between asset returns and liability returns.

11 Claims, 7 Drawing Sheets

OTHER PUBLICATIONS

"Understanding Duration and Volatility", R.W. Kopprasch, Ph.D., Salomon Brothers Inc, Sep. 1985, "Total Portfolio Duration—A New Perspective on Asset Allocation", M.L. Leibowitz, Salomon Brothers Inc., Bond Portfolio Analysis Group, Feb. 1986.

"Liability Returns—A New Perspective on Asset Allocation", M.L. Leibowitz, Salomon Brothers Inc., Bond Portfolio Analysis Group, May 1986.

"The Term Structure of Interst Rates and its use in Asset and Liability Management", A.L. Toeves, L. Dyer, Oct. 1986.

"Measuring the Effective Duration of Pension Liabilities", T.C. Langetieg, L.N. Bader, M.L. Leibowitz, A. Weinberger, Salomon Brothers Inc., Bond Portfolio Analysis Group, Nov. 1986.

Volatility of Pension Expense Under FASB Statement 87, L.N. Bader, M.L. Leibowitz, Salomon Brothers Inc., Bond Portfolio Analysis Group, Dec. 1986.

"Bond Dedication Within the New Asset Allocation Framework", M.L. Leibowitz, L.N. Bader, Salomon Brothers Inc., Bond Portfolio Analysis Group, Feb. 1987.

FASB Statement No. 87: Investment Management Implications, J.A. Corkran, First Boston, Apr. 1987.

"Portfolio Optimization Within a Surplus Framework—A New Perspective on Asset Allocation", M.L. Leibowitz, R.D. Henriksson, Salomon Brothers Inc., Bond Portfolio Analysis Group, Apr. 1987.

"Surplus Insurance: In Search of the Liability Asset", R. Bookstaber, J. Gold, Morgan Stanley, May 1987.

"The Financial Executive's Guide to Pension Plans", L.N. Bader, M.L. Leibowitz, Salomon Brothers Inc., Bond Portfolio Analysis Group, May 1987.

"The Right Way to Manage Your Pension Fund", R.D. Arnott, P.L. Bernstein, Reprinted from Harvard Business Review, Jan.–Feb. 1988.

"Reappraising the Asset Allocation Decison", M.L. Leibowitz, R.D. Arnott, L.N. Bader, R.D. Henriksson, Salomon Brothers Inc., Bond Portfolio Analysis Group, Nov. 1987.

"Modern Investment Theory", R.A. Haugen, Prentice Hall, Englewood Cliffs, N.J. 1986.

* cited by examiner

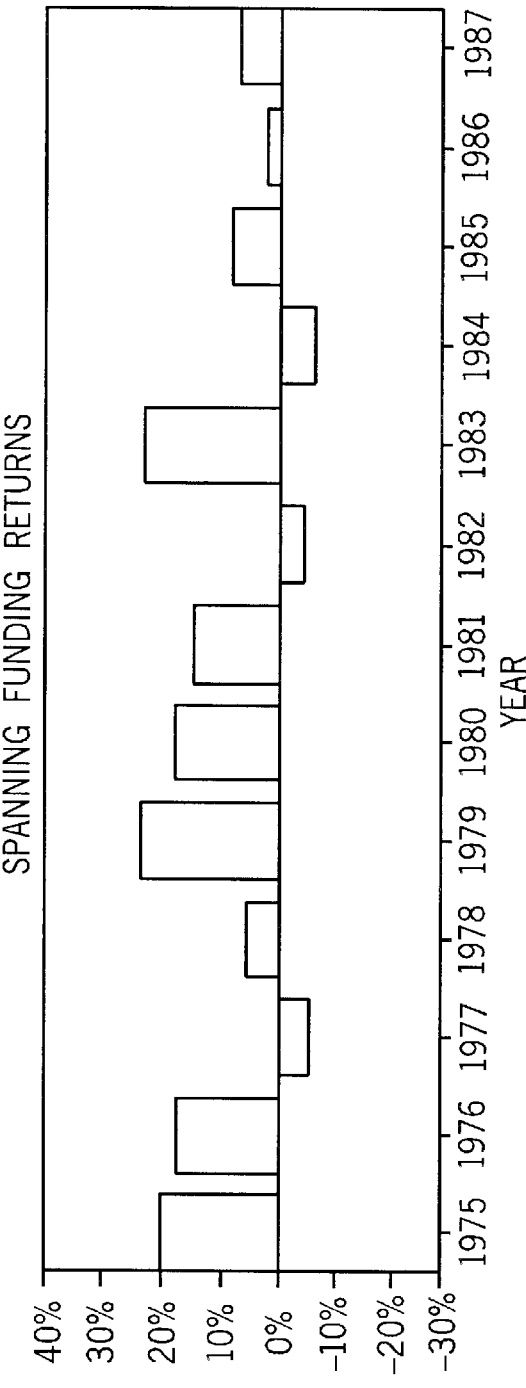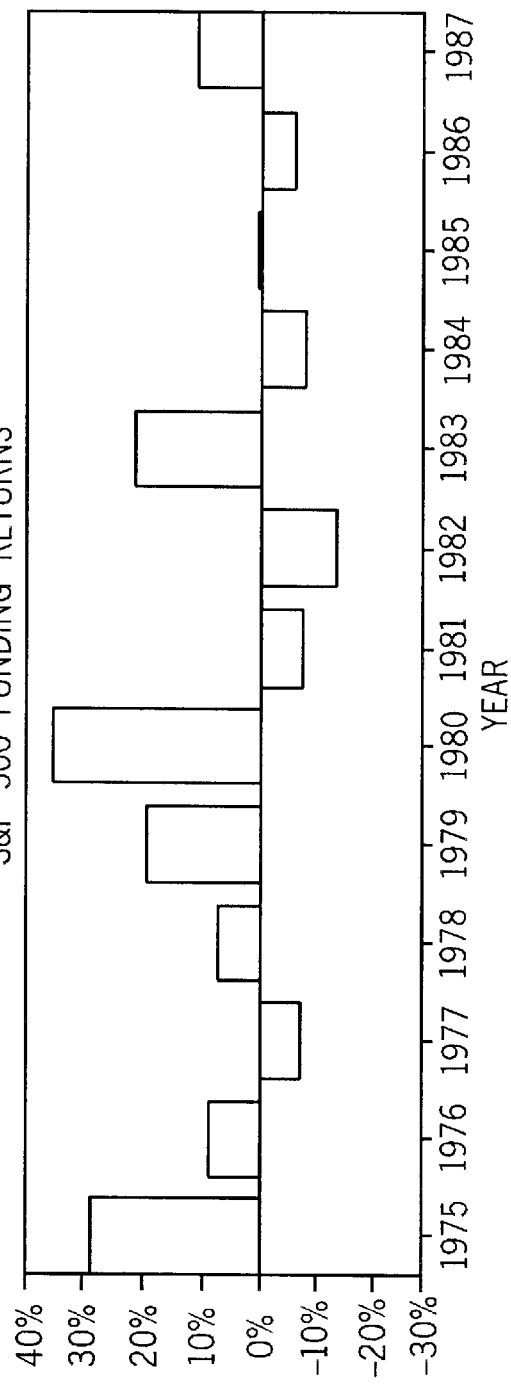

RAPID METHOD OF ANALYSIS FOR CORRELATION OF ASSET RETURN TO FUTURE FINANCIAL LIABILITIES

The present invention is related generally to a method and system for selecting a portfolio of assets for achieving optimum correlation of asset return to a selected standard financial index. More particularly, the invention is related to a highly efficient, rapid method and system for choosing an asset portfolio having the optimum correlation of the asset return to a time dependent financial index, such as a financial liability, at each of a number of selectable asset return levels.

Management of portfolios of assets has historically emphasized maximizing the return on assets with the objective of at least outperforming the market. However, in some financial industries the objective, or the figure of merit, is also related to meeting future liabilities rather than just achieving high return on assets. Frequently, an institution will have a future intended use of the assets which requires their availability at some future time. If assets are performing differently than liability requirements, substantial financial hardship can result. For example, insurance companies and corporate pension plans have well defined future financial liabilities which must be met. Consequently, although return on assets is one important objective, meeting future liabilities is also important and can be even more important in many instances. In fact, many pension plan managers are now required to meet the standards set forth in FASB Statement 87 (Financial Accounting Standards Board) on pension fund accounting. Under the FASB Statement a market interest rate return on pension funds is the standard index and is to be based on A-rated ten year corporate bonds. Under this FASB Statement any deficit in corporate pension funds are now reflected on the balance sheet. Any such deficit would therefore have substantial adverse effect on the apparent net worth of the subject corporation. Consequently, this FASB Statement standard strongly encourages maintenance of a surplus for a pension fund. As an example of the importance of matching the liability requirements under the FASB Statement, consider the percentage change possible for pension plan liabilities, as measured by the accumulated benefit obligation (ABO). If, for example, interest rates increase by 1% in one year over the present rates, the present value of the ABO would decline by 10% if the ABO has a duration of 10 years. Likewise, if interest rates were to drop by 1% in one year, the present value of the ABO would increase by 10%. The potential for such dramatic fluctuations in liabilities clearly deserves careful attention by parties obligated to meet future liability streams.

In order to timely meet future financial liabilities and maintain a proper surplus fund for a pension plan, a number of methodologies have arisen including "immunization", "cash matching"; and some preliminary efforts have even been directed to utilizing stock funds.

The "immunization" method of meeting future financial liabilities uses bonds having substantially the same duration as the liability stream. Duration is a measure of volatility expressed in years, which is similar to, but more precise than, average life. The duration is calculated as the weighted average amount of time to the receipt of the payout. There are however significant drawbacks to "immunization", with one primary disadvantage being the relatively low excess return on assets generally achieved by the method. Additional limitations are imposed by the two major assumptions made by the strategy: The yield curve (a plot of yield to maturity on bonds versus their time to maturity) will only make parallel shifts. Consequently, regardless of maturity, when market conditions change, all bonds allegedly move exactly the same amount in yield. This clearly is not the case since there have been substantial inconsistencies in the past for the difference in rates for short-term bonds and long-term bonds. Secondly, all cash flows in excess of required annual payments can allegedly be reinvested at the yield to maturity of the portfolio. This presumption is also clearly not true since sharply declining or rising interest rate environments will make it extremely difficult to carry out reinvestment. Furthermore, this strategy does require more ongoing management of the portfolio in order to sell or buy more securities to match the actuarial schedule and maintain a proper asset/liability match.

The "cash matching" method utilizes a bond portfolio having numerous component bonds with various maturity dates and payout rates to precisely match the liability requirements of the pension plan. Such an approach has the same primary disadvantage as the "immunization" method and further requires additional effort to assemble the portfolio. Frequently, the "cash matching" method demands payment of a premium to achieve the correct mix of bond rates and maturity. Both of the first strategies ("immunization" and "cash matching") must invest in fixed income securities to provide the assurance of receiving the necessary cash flows. In fact, they must primarily invest in U.S. treasury obligations since investments in corporate or mortgage securities increase the chance for default or for call risks which can have the effect of changing the projected cash flow.

Pension plan liabilities or other future liabilities, such as are present in the insurance industry, are long term in nature. Therefore, a future liability stream can greatly benefit from the compounding effect of investment in higher returning assets, such as common stocks. However, attempts to characterize stocks in terms of a time duration parameter or otherwise have not been successful. In the last few years many unsuccessful attempts have been made to develop a system whereby a portfolio of equities is linearly optimized relative to a liability stream. There have been attempts to parallel the "cash matching" techniques with the use of stocks, instead of bonds. This approach has involved matching the expected dividend flow of the portfolio to the liability stream. Unfortunately, stock dividend yields are unpredictable, particularly beyond 3 years in the future. Another major effort in equities has been directed to an "immunization" type treatment. In this effort an attempt was made to calculate the duration of stocks on an individual basis, as well as on a portfolio basis; but these attempts also have been unsuccessful, primarily due to the long term unpredictability of stock dividends.

In a related patent application, incorporated by reference herein and having U.S. Ser. No. 281,560 and filed Dec. 8, 1988, now abandoned an improved method and system were set forth directed to correlating return on assets to a financial objective over time. In performing the analysis to determine the optimum assets of a portfolio to track the financial objective, the machine time and efficiency of the evaluation process can limit the number of assets considered in constructing the portfolio. Such limitations on the number of assets which are considered for inclusion in the optimum portfolio can also limit the performance of the selected portfolio.

It is therefore an object of the invention to provide an improved method and system for determining the optimum portfolio of assets for tracking a financial index.

It is another object of the invention to provide a new method and system of efficiently selecting the optimum portfolio of assets for tracking a financial index.

It is an additional object of the invention to provide an improved method and system of rapidly analyzing a large number of potential assets to select the optimum portfolio of assets to track a financial index.

It is a further object to provide a new method and system of enlarging the number of potential assets under consideration for inclusion in a portfolio of assets, while reducing the time required to select the portfolio of assets which best track the behavior of a financial index.

It is another object of the invention to provide a rapid, more efficient method and system of selecting the weighted values for assets selected from a universe of possible assets for a portfolio designed to track a financial index.

It is an additional object of the invention to provide an improved method and system for reinvesting cash flow from a portfolio starting with that current portfolio of assets.

Further objects and advantages of the present invention, together with the organization and manner of operation thereof, will become apparent from the following description when taken in conjunction with the accompanying drawings described hereinbelow.

BRIEF DESCRIPTION OF THE DRAWINGS

FIG. 3A is a bar graph of simulation results for funded status returns over time for a preferred method of the invention and FIG. 3B is a bar graph of funded status returns over time for the Standard & Poors 500;

DETAILED DESCRIPTION OF PREFERRED EMBODIMENTS

Figure 1A:
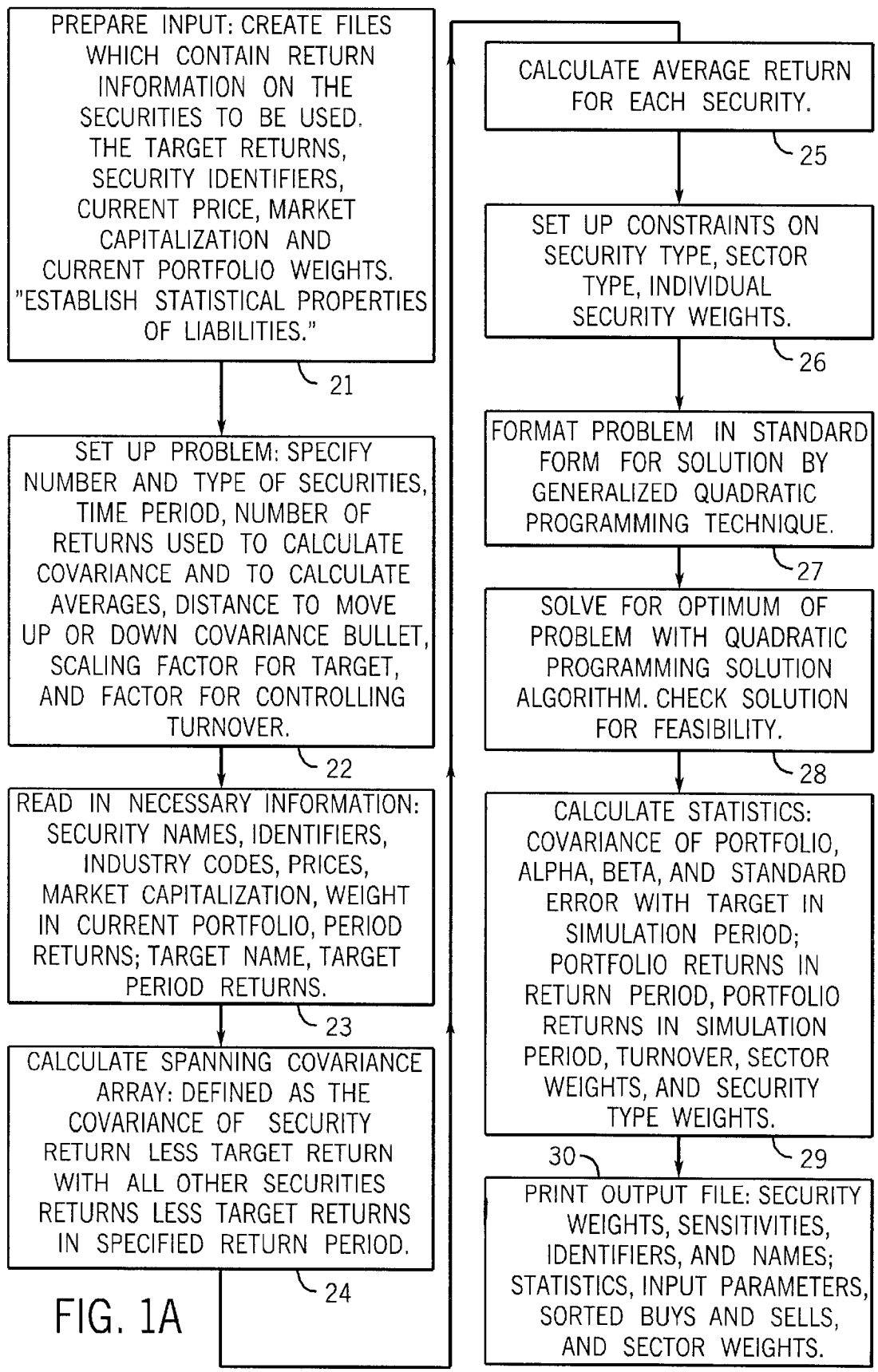
FIG. 1A is a functional flow chart illustrating operation of one method of portfolio construction and FIG. 1B is a flow chart illustrating operation of a particular method of the invention.

Broadly stated, a method and system are described for selecting a portfolio of assets and correlating a future asset return of the portfolio to a financial index, such as, a liability index, an inflation index, or any other accepted index and mixtures thereof. Specific examples of indices are liability indices, such as, individual corporate pension plan liabilities and insurance company liabilities. The consumer price index and wage growth index are examples of an inflation index, and other indices can include accepted stock price indices and futures markets indices. The method includes selecting asset portfolios which optimally correlate portfolio returns to the future desired payouts or payments needed over time to fulfill the desired financial objective. In the general case the user selects a standard index to which optimum correlation is desired for the selected portfolio having a future asset return over time. The process of selecting the standard index can involve obtaining input (such as actuarial) in terms of the characteristics of future cash payments discounted to present value based on a range of discount rate and wage (inflation) values. This information can be used to construct a functional behavior for the present value of the liability. A decision is then made, such as by a company pension fund manager, that certain discount rates and inflation assumptions should be made. On this basis the current liabilities are projected back in time using these assumptions and a plurality of assets are examined to determine their sensitivity to the past behavior of the liability returns. In the most general sense if one can determine an index to which a portfolio of assets has a strong correlation, this sensitivity can be used to select a set of assets which will match the behavior of the index as it changes over time. As a particular example an actuary can provide specific ranges of present value liability for a range of discount rates and inflation rates. The change over time of the liability from month to month over a twenty four month period can yield a liability return. The analysis to be described in more detail hereinafter determines which selected ones of a plurality of assets track the liability returns with best correlation. The resulting weighted set of assets form the portfolio to follow the future liability returns. An analysis using the selected standard index can be performed on a plurality of assets, such as, for example, at least one of the following categories of assets: stock securities, real estate investments, futures contracts, options, commodities, currencies and precious metals. The analysis allows the identification of the combination of weight percentages of selected ones of the plurality of assets yielding the optimum correlation of the future asset return to the standard index. Optimum correlation is thus achieved by calculating a minimum standard deviation or a variance for the difference between the return of the portfolio of assets and the selected standard index return. This method and system are particularly applicable for, but not limited to, the insurance industry and management of pension fund liabilities.

Figure 1B:
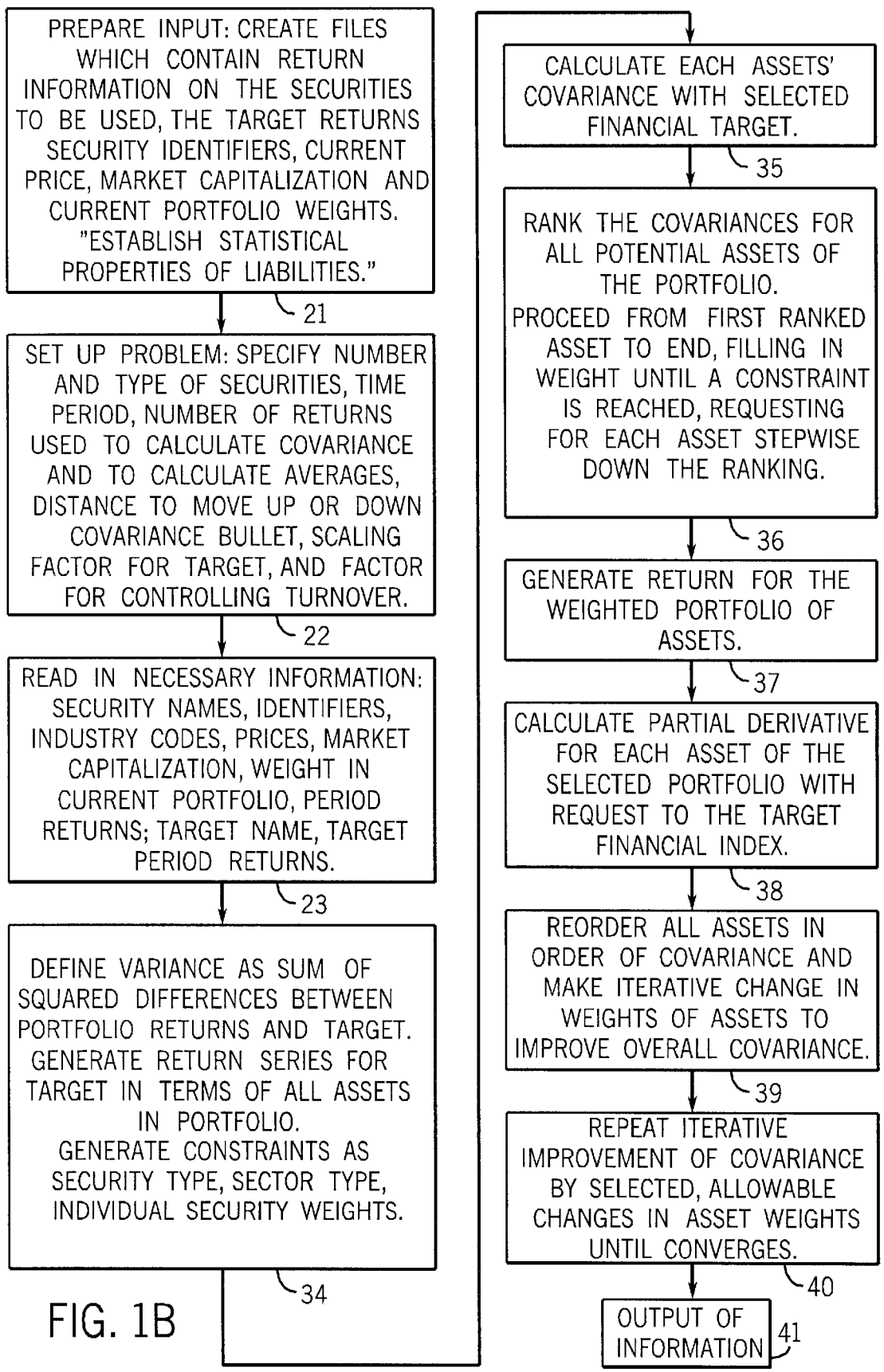
Figure 2A:
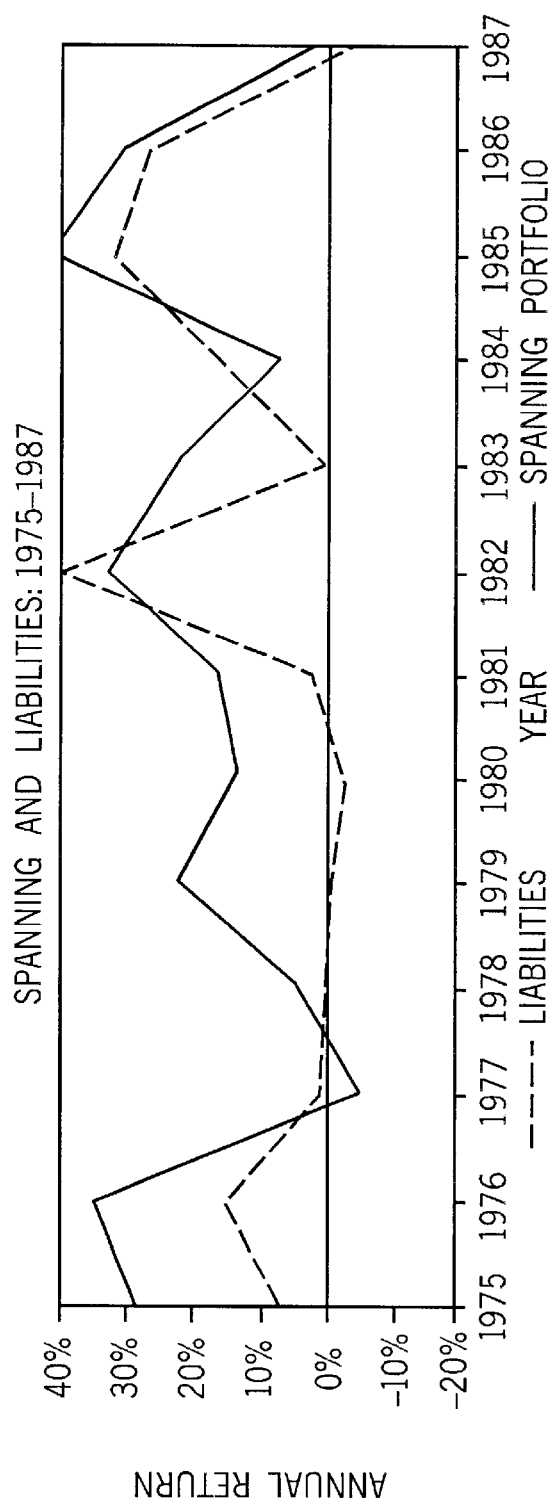
FIG. 2A illustrates simulation results of annual total liability returns of a pension plan (dashed) and annual total asset returns (solid line) for a preferred form of the invention and FIG. 2B shows annual total liability returns of the simulated pension plan (dashed) and annual total asset returns (solid line) for the Standard & Poors 500.
Figure 2B:
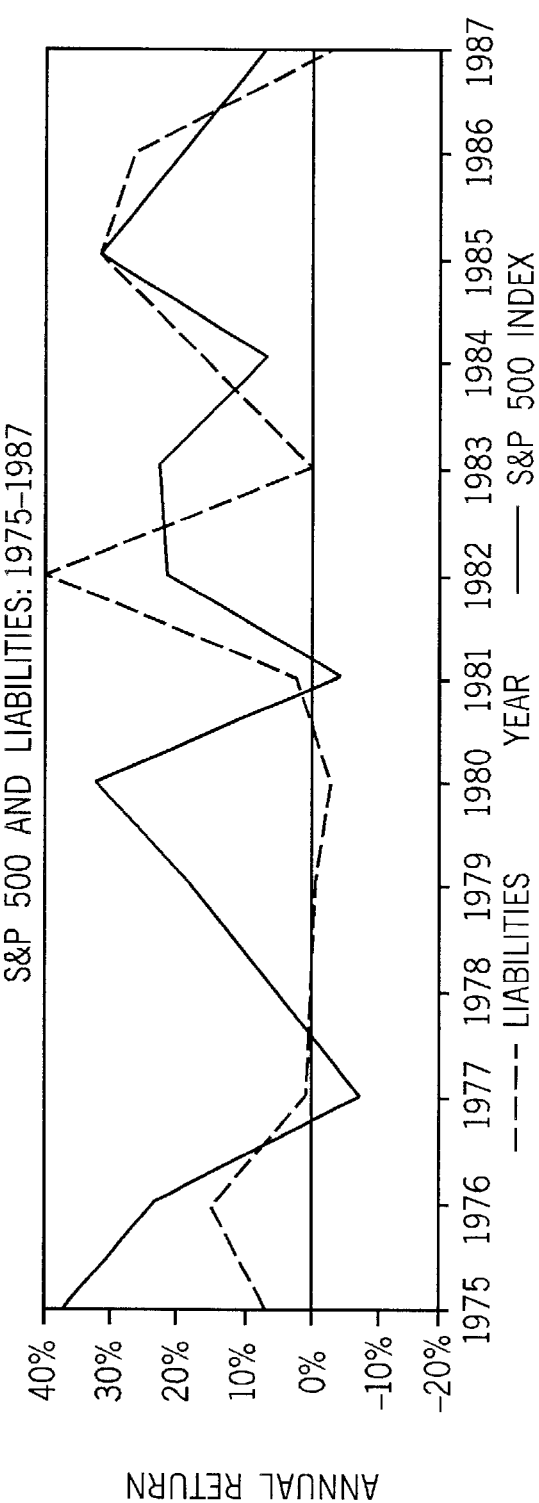
Figure 4:
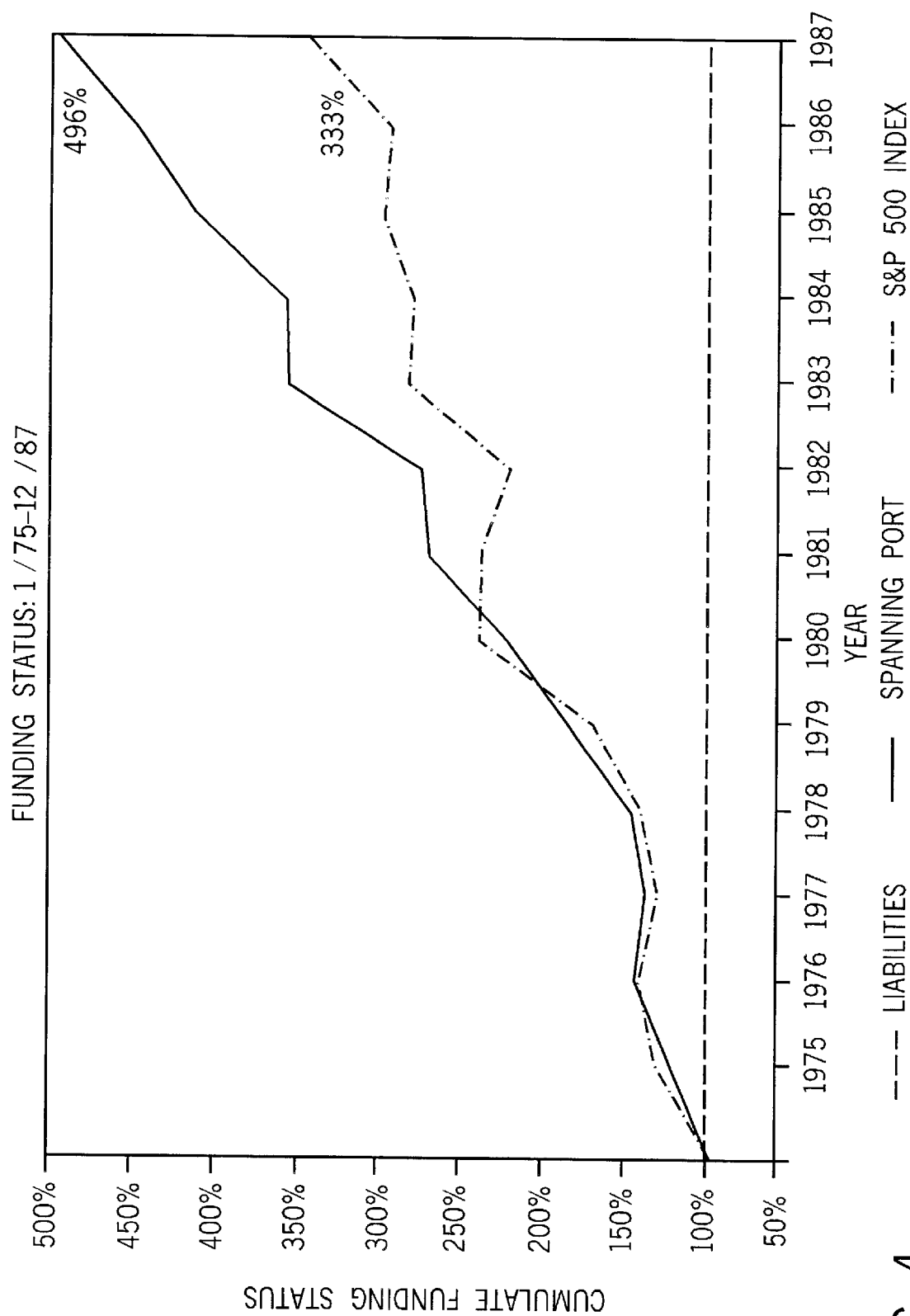
FIG. 4 a comparative plot of cumulative funding status for simulation results over time for a pension plan liabilities (dashed), a portfolio derived by a preferred method of the invention (solid line) and the Standard & Poors 500 index (dashed and dotted)

FIGS. 1A and 1B illustrate in functional flow charts the procedures followed in carrying out two forms of the invention. In the first method shown in FIG. 1A (and described previously in pending application having U.S. Ser. No. 281,560, now abandoned) the correlation of the expected asset return of a portfolio to a standard index one is initiated by input of various basic information. This information includes, for example, establishing the fundamental statistical characteristics of liability returns, and future payment schedules for matching a desired index, such as the future stream of financial liabilities of a pension plan. As described hereinbefore, the future payment schedule for a pension plan can be determined by using actuarial data. These future liabilities can be characterized in terms of an accumulated benefit obligation (ABO), that is, the price you would have to pay if the liabilities were sold at a selected time. The total outlay required to pay retirement wages for the pension plan are discounted back to the present value at the market rate interest (currently 10%). Other related characterizations can be used, such as a projected benefit obligation (PBO), by accounting for inflation in the growth of wages at retirement. This amount is converted to a percentage and an expected salary at retirement, discounted to present value. Therefore, although the ABO is affected primarily by interest rates, additional standard measures, such as the PBO, account for inflation. Therefore, the method is also generally effective for calculating the convolution of complex effects with one another. The method only requires optimizing correlation of the time behavioral performance of future asset return relative to the particular standard index, which includes any conceivable selected characteristic which assets are found to be sensitive to.

In the manner illustrated in step 1, box 21, of FIG. 1A, various input files are therefore created to begin the analysis. These input files can include, for example, asset return information for the universe or plurality of assets to be sampled in the analysis. Also established as data files are the data representative of the standard asset return over time, such as target returns for a future liability stream of a pension plan or an insurance company. The future liability stream can depend on interest rates and/or inflation rates and other variables which can affect the liability stream. For example, as described hereinbefore, a surface can be generated which describes the behavior of liability return as a function of both interest rates and inflation rates. Other information in the data files can be identification information for the plurality of assets, current price and market capitalization of the assets, as well as the characteristic weight percentages of assets in a previously selected portfolio. Weight percentages, for example, from a prior period would be used in the most preferred embodiment.

As illustrated in the second box 22 of FIG. 1A, the number and type of the plurality of assets should be specified, the time period for matching the standard, the number of returns used to calculate a statistical correlation and the number of asset returns used to calculate averages for the plurality of securities to be analyzed to select the optimum set of weighted assets.

The method in FIG. 1A then, in box 23, initializes information preparatory to analyzing the plurality of assets, such as, establishing names of securities, associated identifier information, industry codes, prices of securities, market capitalization, weight and percent of the previously calculated prior portfolio, the period for the asset return, the name of the target or standard for measuring a standard asset return and the time period for the standard returns.

In the next box 24 in FIG. 1A the correlation between the future asset return and the standard index is optimized by first generating a covariance array. While other nonlinear statistical analyses are possible, this method being described is a preferred method of carrying out the analysis. For example, another useful statistical method of analysis is correlation parameterization which is embodied in the computer software program Appendix III. As shown in the next step, box 25, in FIG. 1A, the average return of each security is calculated followed by imposing certain constraints on the calculation, box 26, such as setting a range of weight percentages to be tried. The calculation is then implemented to a solution by a standard computer program quadratic technique (see Appendix I), boxes 27 and 28. This step is then followed by determination, box 29, of various statistical parameters, such as a and B, standard error, portfolio returns over various time periods and for selected weights. The analysis is then completed, box 30, by printing output see attachment to Appendix I) such as asset weights, sensitivity factors for selected assets of the portfolio, statistical parameters, sorted buy and sell orders and sector weights.

A simple example of utilizing the preferred statistical method is illustrated for a portfolio containing three stocks (designated 1, 2, and 3). In order to find the optimum weight percent for each of the three stocks in the portfolio, the minimum standard deviation (square root of variance) is calculated for the differences between the assets of the portfolio and the future liabilities as represented by the standard asset return over time. The risk is therefore defined as the standard deviation of differences:

$$\text{Risk} = \frac{\left[\sum_{i=1}^{n}(R_{pi}R_{Ti}) - nR_pR_t\right]^{1/2}}{(n-i)^{1/2}} = \sigma[R_p - R_t] = \text{variance}^{1/2}$$

where:
$R_{pi}$=total return on the portfolio during period i;
$R_{Ti}$=total return on target or standard in period i,
$\sigma$=standard deviation;
$R_p$=average return on portfolio, i=1,n; and
$R_T$=average return on target or standard portfolio of assets,
i=1, . . . , n . . .

The portfolio return equals percentage weight for each stock times the return on that stock:

$$R_{pi} = \sum_{j=1}^{3} x_j R_{sj,i}$$

$x_j$=the weight in the portfolio of the stock j
$R_{sj,i}$=the return on stock j in periods i Now in the definition of risk, as set forth above, we can substitute the following:

$$R_{pi} = \sum_{j=1}^{3} x_j R_{sj,i}$$

Making this substitution, a determination of risk in the manner set forth above results in the calculation of the covariance of the stock with each of the other stocks in the portfolio after subtracting the return of the target, or standard index, from the future asset return of each stock.

The covariance of stock 1 with stock 2 is therefore:

$$(R_1, R_2) = \sum_{i=1}^{n}(R_{s1i} - R_{Ti})(R_{s2i} - R_{Ti}) - n(\hat{R}_1 - \hat{R}_T)(\hat{R}_2 - \hat{R}_T)$$

We calculate all the spanning covariances and put them in a matrix form:

$$\begin{bmatrix} \text{Cov }[(R_1 - R_T), (R_1 - R_T)] & \text{Cov }[(R_1 - R_T), (R_s - R_T)] \\ \text{Cov }[(R_3 - R_T), (R_1 - R_T)] & \text{Cov }[(R_3 - R_T), (R_3 - R_T)] \end{bmatrix}$$

In order to calculate the risk, we add up all the Cov terms times the weights in each stock:

$$\text{Risk} = \sigma(R_p - R_T) = \left\{\left[\sum_{i=1}^{3}\sum_{j=1}^{3} X_i X_j \text{Cov}[(R_i - R_T), (R_j - R_T)]\right]\right\}^{1/2}$$

In order to minimize this "risk" function, we determine the combination of weight percentages for stocks 1 thru 3 which produces the smallest statistical risk. The above described risk can readily be calculated by various means, such as, by a computer program (which is included in Appendix I). The output (see attachment to Appendix I) of the calculation includes the weight percent of each stock and the associated overall risk level. This calculation can be repeated for a range of expected asset return levels and results in generating a nonlinear type "bullet" shape defining the limits of minimum risk over a range of asset return levels for associated standard deviations of funding level (see FIG. 6). The method uses historical returns for the plurality of stocks analyzed in order to calculate the resulting covariance between the standard liability returns and the future returns of the potential portfolio of assets. Appendix II illustrates an example of a computer program for calculating typical liability return data. The method of analysis results in choosing a selected set of assets for the portfolio with a strong inclination of the selected set of assets to respond in a manner such as the standard asset returns over time, which alone can be valuable output. As mentioned hereinbefore, in other embodiments, the nonlinear analysis of a plurality of assets can involve other methods, such as, index correlation parametrization for matching the performance of a target index return (see Appendix III).

In one embodiment of the invention illustrated in FIG. 1B, the method is a simplification of the more formal procedure of FIG. 1A. The method of FIG. 1B accomplishes, however, the same result as in FIG. 1A but with much greater efficiency and speed.

The method of FIG. 1B is broken into eleven steps, and the first three steps, boxes 21, 22 and 23, are substantially the same as the method of FIG. 1A. The eleven steps and details of each each step are described below:

Read in Returns of Selected Securities.

Various input files are created to begin the analysis, box 21. Large numbers (thousands of securities) can be utilized in this procedure. An input file contains the returns for each security in the prior periods, such as the previous 24 months. Various data is included, such as, security name, industry groups code, market capitalization, trading volume, recent prices, specific identifiers and estimated bid/ask price spreads. The effect of transaction costs associated with the spread in the bid/ask price can be included in the performance analysis. In box 22 the number and type of the plurality of assets are specified. Then, in box 23, the method initializes information preparatory to analyzing the assets.

Read in Returns of Target Index to Track

If a portfolio is to be constructed for tracking a specific financial target index, the returns to that target for the relevant period are read into memory arrays. Additional identifying information is also read in from the target data file.

Set-up Constraints on Upper and Lower Bounds in Terms of Percent of Portfolio for each Security and each Sector or Industry.

In box 43, the method defines variance as the sum of squared difference between portfolio returns and the target and generate return series for the largest in terms of all assets in the portfolio. Constraints are generated as security type sector type individual security rights. A maximum and minimum percentage weight of the portfolio for each security can be specified to constrain the portfolio. This can be used to insure portfolio diversification and to control costs associated with trading. In addition, sectors of the universe, for example, utility stock, can be constrained by maximum and minimum boundaries. If one has a single target, one can "short" a stock and take a negative minimum position.

Calculate the Covariance of Each Security with the Target Index, box 35.

If a target is used, the covariance is calculated for each security and stored in an array. If no target index is used, a zero value for each security is stored in the array.

Create an Initial Portfolio by Selecting Highest Covariance Securities and Weighting Them at their Upper Limits as Defined by Selected Constraints.

This step, box 36, creates an initial feasible solution to the problem by filling the vector of portfolio weights according to the constraints and in order of highest covariance.

Calculate the Objective Function Value at Initial Portfolio Weightings, box 37.

The objective function can be defined in a number of ways. The computer program allows monthly or moving quarterly returns to be used for optimization. Transaction costs can be considered and their importance magnified or reduced relative to other objectives. With minor changes, other such goals can be incorporated into the objective function. The key is that once the objective function is specified, partial derivatives can be used to guide the search for an optimal portfolio. Any example of a preference that can be created is an increased weighting for a stock with a likely dividend versus one with no dividend.

Calculate Partial Derivatives For Each Security at Initial Portfolio Weightings.

A partial derivative is calculated, box 37, for each variable (in this case each security), and a direction can be determined in which to move the individual security weights in order to obtain an improved portfolio solution. The partial derivatives are also used to determine if the weights are optimal. In the prior art, the solution techniques require storage of a full covariance matrix array. This storage requirement has limited the practical number of securities which could be considered at one time in the past methodologies. Indeed, the storage requirements, and to a large degree the processing time, varies as the square of the number of securities in the portfolio under consideration. See the example discussed hereinafter in which the previous methodology is compared to the invention.

In addition, the methods of solution for these problems in the prior art were slow and cumbersome and subject to failure when the full covariance array was sensitive or a nonunique set of solutions were achievable. This current method requires much less storage, uses a rapid solution technique and allows control of the tolerance used for optimality. Consequently, the improved methods will select a portfolio when several combinations are equally desirable.

Not only is the amount of necessary memory reduced and the computer calculational time greatly reduced, there is substantial flexibility in defining the objective, assurance of the solution is enhanced and simultaneous considerations of large number of securities allows substantial improvement in optimizing the expected return of the portfolio compared to the target index.

Change of Portfolio Weightings by Moving in Direction of Improvement is Indicated by Partial Derivatives, box 39.

Adjustment of the portfolio weights is achieved by a search technique which moves along the constraints and changes in a proper direction of improvement of the objective function. The objective function is calculated at the new weights and a test of improvement is made.

Test for Convergence to an Optimal Solution Defined by the Kuhn-Tucker Conditions.

If the objective function is not improving or if the step size used to adjust the portfolio weights becomes extremely small, the search is terminated. This solution is normally a Kuhn-Tucker point (conventional method of establishing optimality conditions) or extremely close thereto within an acceptable epsilon to such a point.

Recycling Conditions.

If the termination conditions are not satisfied, then, in box 40, one re-calculates the objective function value, re-calculates the partial derivatives, makes changes in the portfolio weightings to achieve an improved solution and test for convergence.

The process is by nature iterative and continues cycling until a solution is reached in which diminishing returns are achieved by further cycling.

Output of Information.

Relevant portfolio information is output, box 41, with security weightings, objective function values, purchases and sales necessary to achieve the optimum portfolio and industry weightings.

The detailed output is written into a computer file which then can be examined for relevant information. Order to buy and sell securities can be developed from the information in the output file.

Included in Appendix IV is an exemplary computer software (source output) program illustrating critical steps of the method of FIG. 1B. Table XI shows exemplary results for a program simulation wherein the target index is the Standard and Poors 500 stock index. Appendix VI illustrates significant distinctions from the optimizer methodology used in the copending patent application having U.S. Ser. No. 281,560, now abandoned.

Quantifying Magnitude of Reduced Computation Time

A test was performed on an IBM compatible PC to compare the solution speeds of two portfolio optimization systems. In a prior system, the problem of handling large numbers of securities in a portfolio selection process increased in proportion to the number of securities squared. Thus, a problem involving one hundred securities would take approximately one hundred times as many calculations to solve as a problem with ten securities.

In the current system the solution difficulty increases by a factor of less than one times the number of securities. In addition, the computing memory required to solve the problem is proportional to the number of securities rather than, as in the prior system, that number squared.

Solution Time Comparison
 Hardware: IMB compatible PC, 386-20 Mhz CPU, 80387 co-processor
 Problem Size: 100 securities
  3% portfolio weight upper bound on each security
  0% portfolio weight lower bound on each security
 Time to solution:
  Prior system—9 minutes 34 seconds
  Current system—52 seconds
  Overall speed-up: 11.0×prior system This speed increase is actually of a larger magnitude since approximately 40% of the 52 seconds to solution with the current system is spent reading information from external files and writing information to other files. The solution time speed-up, allowing for reading and writing files, is approximately 17.3× prior system. This speed-up ratio increases in proporation to the number of securities considered squared.

The speed increase and the reduced computer memory requirements by the current system allow large problems to be solved in a short time, requires limited computer memory, and uses computer hardware which is relatively inexpensive.

Circumstances arise regularly in the investment field which rapidly change the prospects for securities. The impact of these sudden changes must be incorporated into the security valuation system so that rational alternations in the investment portfolios may be made.

Examples of sudden changes include: a company is presented with a buy-out offer by another firm; a disaster occurs, such as an oil spill, which may impact a firm's stock price; monetary or fiscal policy changes are implemented by the government. It is important for an investment system to be flexible and fast enough to evaluate the impact these changes may have on a security portfolio.

The current system allows for estimates of partial monthly returns to be calculated on any day of the month, for these returns to be used in the optimization process, and for the results of the analysis to be completed within a few minutes.

One advantage of the current system is that analysis of the current investment opportunities can be completed rapidly and recommendations for buying and selling securities can be quickly generated. This allows investment decisions to be made and implemented quickly with confidence.

Further illustrations of the invention are exemplified by various historical simulations shown in FIGS. 2A, 2B, 3A, 3B and 4 Tables I–III which are taken over the time period of 1975 to 1987. As listed in Table I and in FIGS. 2A, 2B, 3A and 3B the liability stream for a selected pension plan can undergo substantial variation with time. A portfolio of assets has been analyzed in accordance with the preferred statistical method described hereinbefore, and details of the selected portfolio are set forth in Tables IV–X. Over the 1975–1987 time period, the resulting portfolio of assets shows substantially better correlation to the liability stream as compared to the Standard & Poors 500 return. Moreover, as seen in Table II and FIG. 4, the overall cumulative return for the portfolio of assets selected by the preferred method is far better than the Standard & Poors 500. The greatly enhanced stability and good

TABLE I

Funding Return Analysis

| Year | Total Spanning Return (A) | Total S&P 500 Return (B) | Liability Return (C) | Spanning Funded Status Return (1 + A)/(1 + C) | S&P 500 Funded Status Return (1 + B)/(1 + C) |
|---|---|---|---|---|---|
| 1975 | 28.85% | 37.36% | 7.43% | 19.94% | 27.86% |
| 1976 | 34.96 | 23.94 | 15.53 | 16.83 | 7.28 |
| 1977 | -4.16 | -7.29 | 1.16 | -5.25 | -8.35 |
| 1978 | 4.76 | 6.42 | -0.27 | 5.05 | 6.71 |
| 1979 | 21.84 | 18.36 | -0.56 | 22.52 | 19.03 |
| 1980 | 13.68 | 32.34 | -2.64 | 16.76 | 35.92 |
| 1981 | 16.01 | -4.95 | 2.23 | 13.49 | -7.02 |
| 1982 | 32.60 | 21.49 | 39.64 | -5.04 | -13.00 |
| 1983 | 22.15 | 22.43 | 0.46 | 21.59 | 21.87 |
| 1984 | 6.86 | 6.18 | 14.97 | -7.05 | -7.65 |
| 1985 | 40.95 | 31.59 | 31.33 | 7.33 | 0.20 |
| 1986 | 30.04 | 18.64 | 26.07 | 3.15 | -5.89 |
| 1987 | 0.87 | 5.28 | -5.05 | 6.24 | 10.88 |

TABLE II

Spanning Technology
Historic Simulation
Cumulative Surplus Analysis

| | Spanning Portfolio | | S&P 500 Index | |
|---|---|---|---|---|
| Year | Cumulative Dollar Value | Cumulative Funded Position | Cumulative Dollar Value | Cumulative Funded Position |
| | $100.00 | 100.00% | $100.00 | 100.00% |
| 1975 | 118.78 | 119.65 | 127.12 | 128.05 |
| 1976 | 149.36 | 140.49 | 147.26 | 138.52 |
| 1977 | 133.59 | 133.82 | 126.88 | 127.10 |
| 1978 | 130.14 | 141.83 | 125.03 | 136.25 |
| 1979 | 148.14 | 177.42 | 137.62 | 164.83 |
| 1980 | 157.98 | 216.50 | 170.79 | 234.06 |
| 1981 | 173.32 | 263.84 | 152.84 | 232.66 |
| 1982 | 218.19 | 267.96 | 173.99 | 213.68 |
| 1983 | 256.52 | 348.87 | 202.88 | 275.93 |

TABLE II-continued

Spanning Technology
Historic Simulation
Cumulative Surplus Analysis

| | Spanning Portfolio | | S&P 500 Index | |
|---|---|---|---|---|
| Year | Cumulative Dollar Value | Cumulative Funded Position | Cumulative Dollar Value | Cumulative Funded Position |
| 1984 | 263.48 | 350.40 | 205.10 | 272.76 |
| 1985 | 359.74 | 403.26 | 258.85 | 290.17 |
| 1986 | 457.65 | 438.20 | 297.13 | 284.50 |
| 1987 | 453.01 | 496.15 | 304.26 | 333.22 |

Note: The above cumulative values reflect monthly payments to beneficiaries.

TABLE III

Spanning Technology
Historic Simulation

| Year | Spanning Portfolio Return | Beta | Alpha |
|---|---|---|---|
| 1975 | 28.85% | 0.778 | 0.04% |
| 1976 | 34.96 | 0.818 | 11.67 |
| 1977 | −4.16 | 0.940 | 2.59 |
| 1978 | 4.76 | 0.859 | −1.76 |
| 1979 | 21.84 | 0.956 | 3.31 |
| 1980 | 13.68 | 0.569 | −8.15 |
| 1981 | 16.01 | 0.876 | 17.80 |
| 1982 | 32.60 | 0.829 | 10.39 |
| 1983 | 22.15 | 1.168 | −2.03 |
| 1984 | 6.86 | 0.832 | 0.11 |
| 1985 | 40.95 | 1.052 | 6.09 |
| 1986 | 30.04 | 0.952 | 10.09 |
| 1987 | 0.87 | 0.887 | −4.64 |

Electric, Gas, and Sanitation Utilities
and Banking Restricted to 10% of Portfolio.

| *1975 to 1987 Results: | Spanning Portfolio | S&P 500 Index |
|---|---|---|
| Alpha - risk adjusted | 4.33% | 0.00% |
| Beta - risk adjusted | 0.77 | 1.00 |
| Average Return | 19.2% | 16.3% |
| Correlation to Liability | 69.6% | 33.3% |
| Return Volatility | 13.6% | 13.6% |
| Funding Return Volatility | 10.1% | 15.0% |
| Beginning Portfolio (1/75) | | |
| Dividend Yield | 5.53% | 3.41% |
| P/E | 7.2 | 7.7 |
| Ending Portfolio (1/87) | | |
| Dividend Yield | 5.23% | 4.00% |
| P/E | 16.8 | 16.0 |
| Duration of Liabilities at a 9% Interest Rate | 9.61 yrs | |

*Note: results are based on annual returns

TABLE IV

SPANNING PORTFOLIO COMPOSITION
1987 Portfolio

| Industry | % of Portfolio |
|---|---|
| Food Kindred Products | 12.10 |
| Textile Mill Products | 2.57 |
| App. & Oth. Fin. Prod. | .80 |
| Furniture and Fixtures | 2.39 |
| Printing Publishing and A.P. | 2.73 |
| Chemical and Allied Prod. | 8.85 |
| Primary Metal Industries | .81 |
| Fab. Metal Industries | 1.34 |
| Machinery Except Electrical | 8.42 |
| Ele. and Ele. Mach. | 2.50 |
| Meas. Anal. & Cont. Inst. Etc. | 6.76 |
| Transportation By Air | 5.16 |
| Communication | 2.89 |
| Electirc Gas And Sanit. Serv. | 10.00 |
| Wholesale Trade-Durable Goods | .46 |
| Wholesule Trade-Nondur. Goods | 1.56 |
| General Merch. Stores | 1.88 |
| Food Stores | 3.00 |
| Eating And Drinking Places | 2.40 |
| Banking | 7.17 |
| Cred. Agen. Oth. Than Banks | 3.00 |
| Insurance Carriers | 2.36 |
| Hold. and Other Inv. Comp. | 2.90 |
| Hotels Room. Houses Comp AOLP | .17 |
| Health Services | 1.76 |
| Miscellaneous Services | 3.00 |
| Nonclassifiable Establishments | 3.00 |

TABLE V

SIMULATION RESULTS
1975
HISTORIC SIMULATION:
LIABILITY STREAM USED LONG TERM STUDY ABO

| NUMBER | WEIGHT | SIC # | IDC | SECURITY NAME |
|---|---|---|---|---|
| 1 | 3.00 | 67 | BTC | BELL CANADA ENTERPRISES |
| 2 | 3.00 | 63 | CBB | CHUBB CORP |
| 3 | 3.00 | 33 | X | USX CORP |
| 4 | 3.00 | 35 | HR | NAVISTAR INTL CORP |
| 5 | 3.00 | 54 | WIN | WINN DIXIE STORES INC |
| 6 | 3.00 | 13 | CBI | CBI INDS INC |
| 7 | 3.00 | 49 | WWP | WASHINGTON WTR PWR CO |
| 8 | 3.00 | 29 | AHC9 | AMERADA HESS CORP |
| 9 | 3.00 | 35 | UT | UNITED TELECOMMUNICATIONS |
| 10 | 3.00 | 10 | AMX | AMAX INC |
| 11 | 3.00 | 67 | ASA | ASA LTD |
| 12 | 3.00 | 49 | PGN | PORTLAND GEN CORP |
| 13 | 3.00 | 64 | AXD | ALEXANDER & ALEXANDER SVCS |
| 14 | 3.00 | 13 | KMG | KERR MCGEE CORP |
| 15 | 3.00 | 48 | T | AMERICAN TEL & TELEG CO |
| 16 | 3.00 | 63 | CIC | CONTINENTAL CORP |
| 17 | 3.00 | 60 | FBG1 | BANC ONE CORP |
| 18 | 3.00 | 33 | NS | NATIONAL INTERGROUP INC |
| 19 | 3.00 | 26 | KMB | KIMBERLY CLARK CORP |
| 20 | 3.00 | 36 | MSU9 | MATSUSHITA ELEC INDL |
| 21 | 3.00 | 13 | GAS | NICOR INC |
| 22 | 3.00 | 49 | CPL | CAROLINA PWR & LT CO |
| 23 | 3.00 | 37 | UA | UNITED TECHNOLOGIES CORP |
| 24 | 3.00 | 64 | MMC | MARSH & MCLENNAN COS INC |
| 25 | 3.00 | 12 | BNI | BURLINGTON NORTHN INC |
| 26 | 3.00 | 20 | K | KELLOGG CO |
| 27 | 3.00 | 63 | UFY | USF&G CORP |
| 28 | 3.00 | 34 | AC | PRIMERICA CORP |
| 29 | 3.00 | 13 | SN | AMOCO CORP |
| 30 | 3.00 | 27 | DNY | DONNELLEY RR & SONS CO |
| 31 | 2.23 | 10 | AL | ALCAN ALUM LTD |

TABLE V-continued

SIMULATION RESULTS
1975
HISTORIC SIMULATION:
LIABILITY STREAM USED LONG TERM STUDY ABO

| NUMBER | WEIGHT | SIC # | IDC | SECURITY NAME |
|---|---|---|---|---|
| 32 | 1.92 | 33 | IAD | INLAND STL INDS INC |
| 33 | 1.63 | 32 | PPG | PPG INDS INC |
| 34 | 1.41 | 60 | FML | FIRST BK SYS INC |
| 35 | 1.00 | 49 | PLT | PACIFIC LTG CORP |
| 36 | 0.83 | 67 | LEM | LEHMAN CORP |
| 37 | 0.51 | 30 | UNP | UNION PAC CORP |
| 38 | 0.48 | 33 | OXY | OCCIDENTAL PETE CGPCR |

TABLE VI

SIMULATION RESULTS
1980
HISTORIC SIMULATION:
LIABILITY STREAM USED LONG TERM ABO

| NUMBER | WEIGHT | SIC # | IDC | SECURITY NAME |
|---|---|---|---|---|
| 1 | 3.00 | 49 | NMK | NIAGARA MOHAWK PWR CORP |
| 2 | 3.00 | 28 | IFF | INTERNATIONAL FLAVORS & FR |
| 3 | 3.00 | 60 | MNK | MELLON BANK CORPORATION |
| 4 | 3.00 | 36 | WHR | WHIRLPOOL CORP |
| 5 | 3.00 | 60 | NOB | NORWEST CORP |
| 6 | 3.00 | 26 | KMB | KIMBERLY CLARK CORP |
| 7 | 3.00 | 28 | WLA | WARNER LAMBERT CO |
| 8 | 3.00 | 20 | RAL | RALSTON PURINA CO |
| 9 | 3.00 | 49 | KGE | KANSAS GAS & ELEC CO |
| 10 | 3.00 | 28 | BOR | BORG WARNER CORP |
| 11 | 3.00 | 26 | UCC | UNION CAMP CORP |
| 12 | 3.00 | 60 | CHL | CHEMICAL NEWYORK CORP |
| 13 | 3.00 | 20 | K | KELLOGG CO |
| 14 | 3.00 | 30 | GT | GOODYEAR TIRE & RUBR CO |
| 15 | 3.00 | 49 | POM | POTOMAC ELEC PWR CO |
| 16 | 3.00 | 13 | LLX | LOUISIANA LD & EXPL CO |
| 17 | 3.00 | 28 | PG | PROCTER & GAMBLE CO |
| 18 | 3.00 | 53 | FDS | FEDERATED DEPT STORES INC |
| 19 | 3.00 | 33 | NS | NATIONAL INTERGROUP INC |
| 20 | 3.00 | 26 | FHP | FORT HOWARD CORP |
| 21 | 3.00 | 20 | BN | BORDEN INC |
| 22 | 3.00 | 20 | GIS | GENERAL MLS INC |
| 23 | 3.00 | 34 | AC | PRIMERICA CORP |
| 24 | 3.00 | 28 | GLXO | GLAXO HLDGS PLC |
| 25 | 3.00 | 34 | GS | GILLETTE CO |
| 26 | 3.00 | 37 | GM | GENERAL MTRS CORP |
| 27 | 3.00 | 23 | ISS | INTERCO INC |
| 28 | 3.00 | 48 | T | AMERICAN TEL & TELEG CO |
| 29 | 3.00 | 20 | CPB | CAMPBELL SOUP CO |
| 30 | 3.00 | 36 | GNB | GOULD INC |
| 31 | 2.33 | 37 | ML | MARTIN MARIETTA CORP |
| 32 | 2.06 | 37 | F | FORD MTR CO DEL |
| 33 | 2.05 | 36 | C | CHRYSLER HLDG CO |
| 34 | 1.00 | 49 | PPL | PENNSYLVANIA PWR & LT CO |
| 35 | 1.00 | 60 | AXP | AMERICAN EXPRESS CO |
| 36 | 0.95 | 32 | OCF | OWENS CORNING FIBERGLAS CO |
| 37 | 0.62 | 20 | PSY | PILLSBURY CO |

TABLE VII

1975 INDUSTRY WEIGHTINGS
Electric, Gas and Sanitation Utilities, and
Banking Restricted to 10% of Portfolio.

| Code | Industry | % of Portfolio |
|---|---|---|
| 10 | Metal Mining | 5.74% |
| 32 | Bituminous Coal & Lignite Min. | 3.00 |
| 13 | Oil & Gas Extraction | 12.48 |
| 20 | Food Kindred Products | 3.00 |
| 26 | Paper and Allied Products | 3.00 |
| 27 | Printing Publishing and A.P. | 3.00 |
| 29 | Petroleum Refin. & Rel. Prod. | 3.00 |
| 32 | Stone Clay Glass & Conc. Prod. | 1.63 |
| 33 | Primary Metal Industries | 7.92 |
| 34 | Fab. Metal Prod. Ex. M.&T.E. | 3.00 |
| 35 | Machinery Except Electrical | 6.00 |
| 36 | Ele. and Ele. Mach. | 3.00 |
| 37 | Transportations Equipment | 3.00 |
| 48 | Communication | 3.00 |
| 49 | Electric Gas and Sanit. Serv. | 10.00 |
| 54 | Food Stores | 3.00 |
| 60 | Banking | 4.41 |
| 63 | Insurance Carriers | 9.00 |
| 64 | Ins. Agents Brok. Serv. | 6.00 |
| 67 | Hold. and Other Inv. Comp. | 6.83 |

SPANNING PORTFOLIO
1/1/75

| | |
|---|---|
| Market Capitalization | (000,000) |
| Average | $1,203 |
| High | $8,393 |
| Low | $137 |
| Shares Outstanding | (000) |
| Average | 74,840 shares |
| Dividend Yield | 5.1% |
| Price Earning Ratio | 13.1x |
| Number of Stocks | 38 |
| Turnover 1975–1976 | 21.3% |

TABLE VIII

1980 INDUSTRY WEIGHTINGS
Electric, Gas and Sanitation Utilities, and
Banking Restricted to 10% of Portfolio.

| Code | Industry | % of Portfolio |
|---|---|---|
| 13 | Oil | 3.00% |
| 20 | Food Kindred Products | 15.62 |
| 23 | App. & Oth. Fin. Prod. | 3.00 |
| 26 | Paper and Allied Products | 9.00 |
| 28 | Chemical and Allied Prod. | 15.00 |
| 30 | Rubber and Misc. Plast. Prod. | 3.00 |
| 32 | Stone Clay Glass & Conc. Prod. | 0.95 |
| 33 | Primary Metal Industries | 3.00 |
| 34 | Fab. Metal Prod. Ex. M.&T.E. | 6.00 |
| 36 | Ele. and Ele. Mach. | 8.05 |
| 37 | Transportations Equipment | 7.38 |
| 48 | Communication | 3.00 |
| 49 | Electric Gas and Sanit. Serv. | 10.00 |
| 53 | General Merch. Stores | 3.00 |
| 60 | Banking | 10.00 |

SPANNING PORTFOLIO
1/1/80

| | |
|---|---|
| Market Capitalization | (000,000) |
| Average | $1,790 |
| High | S13,311 |
| Low | $247 |
| Shares Outstanding | (000) |
| Average | 130,229 shares |

TABLE VIII-continued

1980 INDUSTRY WEIGHTINGS
Electric, Gas and Sanitation Utilities, and
Banking Restricted to 10% of Portfolio.

| | |
|---|---|
| Dividend Yield | 6.9% |
| Price Earning Ratio | 6.6x |
| Number of Stocks | 37 |
| Turnover 1980–1981 | 30.4% |

TABLE IX

SIMULATION RESULTS
1985
HISTORIC SIMULATION:
LIABILITY STREAM USED LONG TERM STUDY ABO

| NUMBER | WEIGHT | SIC # | IDC | SECURITY NAME |
|---|---|---|---|---|
| 1 | 3.00 | 53 | JCP | PENNEY J C INC |
| 2 | 3.00 | 49 | HE | HAWAIIAN ELEC I |
| 3 | 3.00 | 58 | MCD | MCDONALDS CORP |
| 4 | 3.00 | 60 | SEK | SOUTHEAST BKG C |
| 5 | 3.00 | 23 | RML | RUSSELL CORP |
| 6 | 3.00 | 28 | AVP | AVON PRODS INC |
| 7 | 3.00 | 60 | MFT | MANUFACTURERS HAN |
| 8 | 3.00 | 99 | TBILL | CASH: TBILLS 0.0 |
| 9 | 3.00 | 49 | DPL | DPL INC |
| 10 | 3.00 | 35 | MFL | MILLIPORE CORP |
| 11 | 3.00 | 20 | UL | UNILVER PLC |
| 12 | 3.00 | 38 | EK | EASTMAN KODAK C |
| 13 | 3.00 | 27 | CKH | COMMERCE CLEARI |
| 14 | 3.00 | 28 | SQB | SQUIBB CORP |
| 15 | 3.00 | 28 | PFE | PFIZER IND |
| 16 | 3.00 | 20 | KO | COCA COLA CO |
| 17 | 3.00 | 45 | DAL | DELTA AIR LINES |
| 18 | 3.00 | 67 | NES | NEW ENGLAND ELE |
| 19 | 3.00 | 89 | SW | STONE & WEBSTER |
| 20 | 3.00 | 61 | GWF | GREAT WESTN FIN |
| 21 | 3.00 | 28 | SKL | SMITHKLINE BECKMAN |
| 22 | 3.00 | 28 | SRG | SCHERING PLOUGH |
| 23 | 3.00 | 51 | SYY | SYSCO CORP |
| 24 | 3.00 | 38 | MMM | MINNESOTA MNG & |
| 25 | 2.93 | 78 | DIS | DISNEY WALT CO |
| 26 | 2.68 | 25 | HB | HILLENBRAND IND |
| 27 | 2.66 | 49 | BGE | BALTIMORE GAS & ELE |
| 28 | 2.53 | 38 | MDO | MEDTRONIC INC |
| 29 | 2.30 | 73 | KGS | KELLY SVCS INC |
| 30 | 2.05 | 35 | PRME | PRIME COMPUTER |
| 31 | 1.77 | 28 | SYN | SYNTEX CORP |
| 32 | 1.76 | 16 | FLR | FLUOR CORP |
| 33 | 1.70 | 60 | FBG1 | BANC ONE CORP |
| 34 | 1.54 | 63 | AHN | AHMANSON H F & |
| 35 | 1.35 | 49 | AYP | ALLEGHENY PWR SYS |
| 36 | 1.22 | 48 | CTX | CENTEL CORP |
| 37 | 1.09 | 20 | CFG | CPC INTL INC |
| 38 | 0.77 | 28 | PG | PROCTER & GAMBLE |
| 39 | 0.59 | 28 | AHP | AMERICAN HOME PRODS |
| 40 | 0.54 | 34 | GS | GILLETTE CO |
| 41 | 0.41 | 53 | DNC | DAYTON HUDSON C |
| 42 | 0.13 | 41 | FEDX | FEDERAL EXPRESS |

TABLE X

1985 INDUSTRY WEIGHTINGS
Electric, Gas and Sanitation Utilities, and
Banking Restricted to 10% of Portfolio.

| Code | Industry | % of Portfolio |
|---|---|---|
| 16 | Const. Oth Than B.C.-G.C. | 1.76 |
| 20 | Food Kindred Products | 7.09 |
| 23 | App. & Oth. Fin. Prod. | 3.00 |
| 25 | Furniture and Fixtures | 2.68 |
| 27 | Printing Publishing and A.P. | 3.00 |
| 28 | Chemical and Allied Prod. | 18.13 |
| 34 | Fab. Metal Prod. Ex. M.&T.E. | 0.54 |
| 35 | Machinery Except Electrical | 5.05 |
| 38 | Meas. Anal. & Cont. Inst. Etc. | 8.53 |
| 45 | Transportation By Air | 3.00 |
| 47 | Transportation Services | 0.13 |
| 48 | Communication | 1.22 |
| 49 | Electric Gas and Sanit. Serv. | 10.00 |
| 51 | Wholesale Trade-Nondur. Goods | 3.00 |
| 53 | General Merch. Stores | 3.41 |
| 58 | Eating and Drinking Places | 3.00 |
| 60 | Banking | 7.70 |
| 61 | Cred. Agen. Oth. Than Banks | 3.00 |
| 63 | Insurance Carriers | 1.54 |
| 67 | Hold. And Other Inv. Comp. | 3.00 |
| 73 | Business Services | 2.30 |
| 78 | Motion Pictures | 2.93 |
| 89 | Miscellaneous Services | 3.00 |
| 99 | Nonclassifiable Establishments | 3.00 |

SPANNING PORTFOLIO
1/1/85

| | |
|---|---|
| Market Capitalization | (000,000) |
| Average | $3,045 |
| High | $11,689 |
| Low | $373 |
| Shares Outstanding | (000) |
| Average | 97,120 shares |
| Dividend Yield | 4.0% |
| Price Earning Ratio | 11.0x |
| Number of Stocks | 41 |
| Turnover 1985–1986 | 15.0% |

TABLE XI

ANALYSIS OF PROGRAM SIMULATION
Target & Index represent the Standard & Poors 500 Stock Index
portfolio represent optimizer chosen portfolio.
One example of the benefits of the technique are seen in the
monthly statistics, where the annualized standard deviation of
returns is 14.6% for the optimized portfolio vs. 16.04 for the
S&P 500.

Figure 5A:
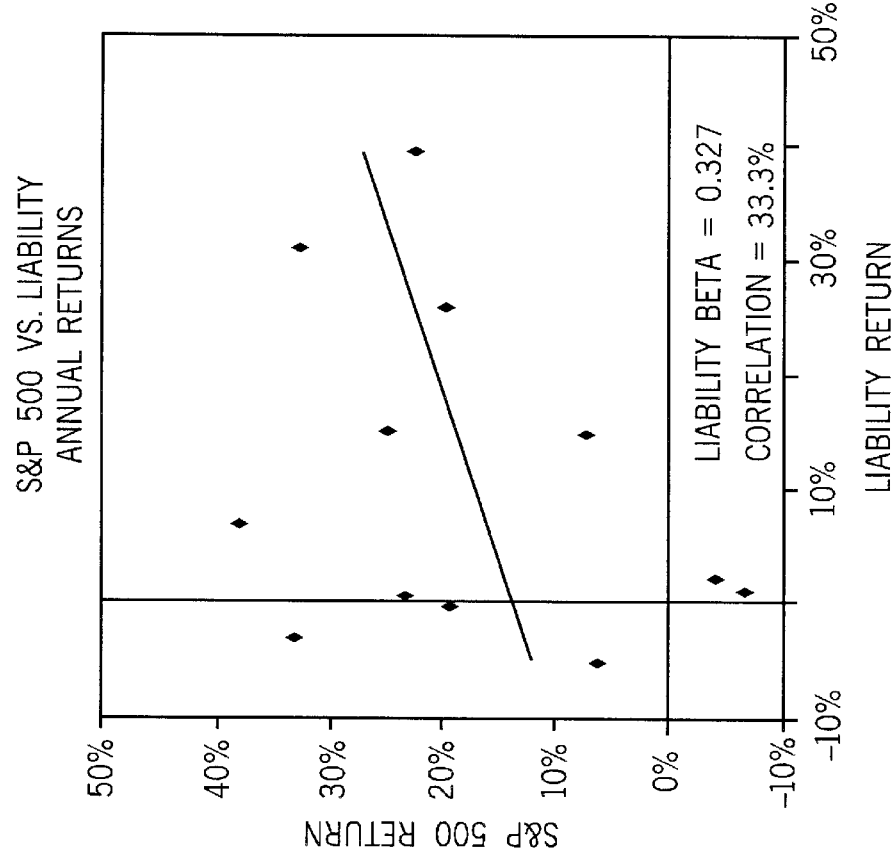
FIG. 5A shows the correlation between asset return and liability return for a preferred method of the invention and FIG. 5B illustrates correlation between asset return and liability return for the Standard & Poors 500 index.
Figure 5B:
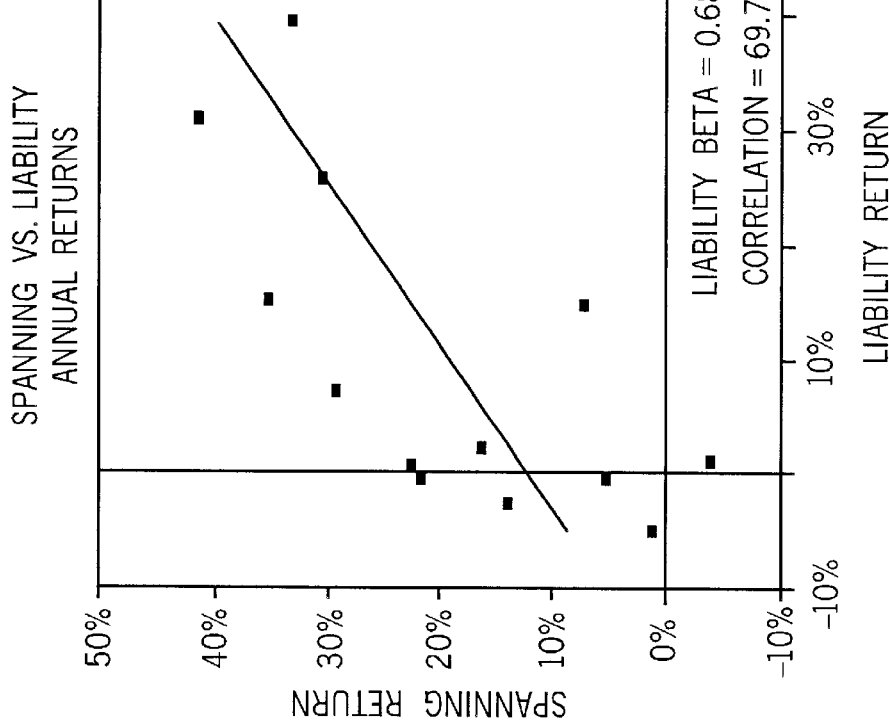

| | MEAN | STD DEV | SKEW * 10^6 |
|---|---|---|---|
| ANNUALIZED MONTHLY STATISTICS | | | |
| Target | 15.88% | 16.04% | −50.00 |
| Portfolio | 17.97% | 14.60% | −19.72 |
| Portfolio Diff | 2.09% | 4.40% | .01 |
| Index | 15.88% | 16.04% | −50.00 |
| Index Diff | .00% | .00% | .00 |
| ANNUALIZED QUARTERLY STATISTICS | | | |
| Target | 16.18% | 17.04% | −172.12 |
| Portfolio | 18.40% | 16.19% | −41.29 |
| Portfolio Diff | 2.23% | 3.99% | 1.58 |
| Index | 16.18% | 17.04% | −172.12 |
| Index Diff | .00% | .00% | .00 |
| ANNUAL STATISTICS | | | |
| Target | 16.38% | 13.63% | −670.98 |
| Portfolio | 19.01% | 13.43% | −61.67 |
| Portfolio Diff | 2.63% | 4.43% | −23.31 |
| Index | 16.38% | 13.63% | −670.98 |
| Index Diff | .00% | .00% | .00 | statistical correlation with the liability return is further evident in Table III and FIGS. 5A and 5B, wherein detailed comparisons are made between the selected portfolio of assets and the standard liability return.

Figure 6:
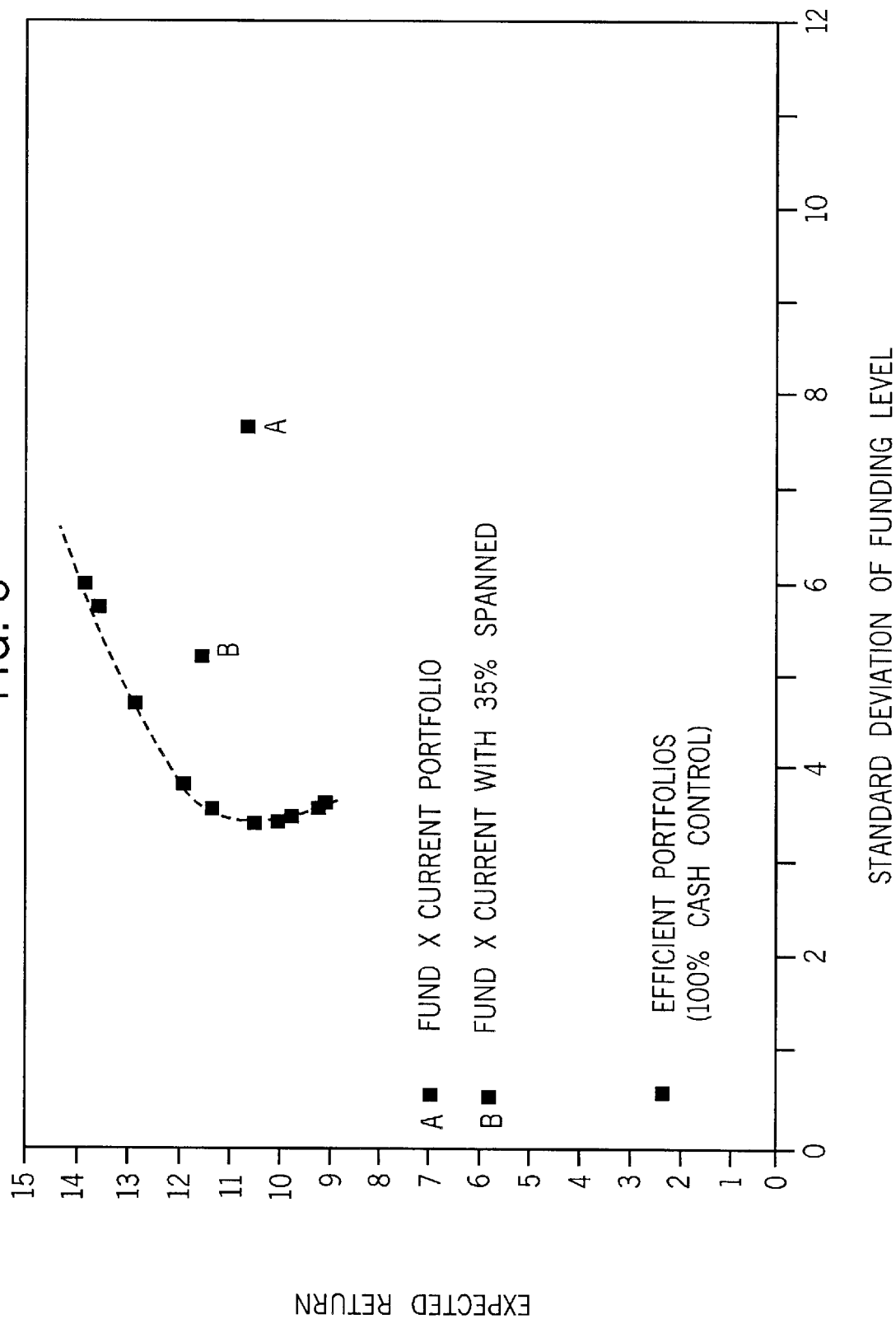
FIG. 6 illustrates the boundary line of minimum risk for various future asset return levels.

In FIG. 6 a range of simulation funding returns for the portfolio of assets are compared with a typical pension fund a mixture of stocks, bonds, real estate and treasury bills. Clearly, the risk is much higher for the typical pension fund; and dramatic improvement in the return, or reduction of risk, results when only 35% of the standard pension fund is modified using the method of the invention.

In another embodiment, a portfolio of assets can be constructed by selecting a portion of a total portfolio with assets having optimal correlation of asset return to a liability or financial index. The remainder of the portfolio comprises futures contracts which are combined with the correlated portfolio portion to achieve in effect an optimum correlation for the entire portfolio of assets. Further details are set forth in Appendix IV.

In another aspect of one embodiment, control can be exerted over pension plan surplus by adjusting the level of risk selected for a portfolio of assets. As illustrated in FIG. 6, the expected return can be selected at various levels with the degree of risk, or standard deviation of the funding level, generally increasing as one moves from a position of minimum risk at the top of the "bullet" to higher future returns. Control over a pension plan surplus, or for that matter any plan for which you wish to respond dynamically to control risk/return in concert, can be accomplished over a wide range of risk and return values. Such an approach can be used to manage return under variable risk positions and minimize insurance costs for protecting against underfunding of a plan, such as falling below a predetermined minimum floor. Consequently, as the funding level approaches 100% a minimum risk portfolio of assets should be constructed using the methods described hereinbefore. As the surplus accumulates, the acceptable risk level can be increased for the portfolio of assets by dynamic modification of the portfolio asset components. One can utilize futures contracts as an overlay for an underlying portfolio of assets, having been selected by the basic invention described previously, to create in effect an optimum statistical correlation for the entire portfolio, including the futures contracts. As the surplus approaches 10%–20% excess, a portfolio of assets can be constructed resulting in a much higher level of future return. For example, in FIG. 6, the change in future return from minimum risk to the highest return data point is about a 35% greater return but with an accompanying 70%–80% increase in standard deviation compared to the minimum risk point.

In a further embodiment of the invention one can overcome problems associated with an indefinite covariant matrix. The current system and method does not use the full covariance matrix to extract a partial derivative to guide the search process, and thus it is not subject to one of the failures that results using standard quadratic programming.

To us standard quadratic programming algorithums the covariance matrix must be positive semi-definite, or positive definite. This means technically that no row of the matrix can be replicated by a linear combination of other rows.

However, this condition occurs when there are fewer returns than the number of securities under consideration. This is a significant shortcoming of the standard methodlogy. For example, to consider five hundred securities simultaneously, the user must supply at least five hundred and one returns for each security being considered. If monthly data is being used for the return series, at least forty-one years of data must be available for each security under consideration. Most securities have not been in existence for this period of time.

If not enough returns are available or if the matrix is indefinite, the standard quadratic solution techniques will fail to find a solution point that is optimal.

The current system allows a solution, which is at least as good as any other feasible solution, to be achieved without regard to the sensitivity of the covariance matrix.

Problems that otherwise could not be solved by standard technologies are solved by the current system. This allows practical portfolios to be selected even though there is limited available return information.

In another aspect of the invention involving practical applications of the current methodology to managing security portfolios, the ability to invest dividend income and other cash flows efficiently is also an important element in effective management. The current system allows a portfolio manager to invest available cash in the most efficient securities while considering the current portfolio holdings. Effectively this allows the manager to invest in securities which best enhance the current portfolio position without selling any of the current holdings. In a practical portfolio management system the ability to reinvest cash flows efficiently is always an important consideration. The current system provides this ability. An illustration of a reinvestment solution is provided in Appendix V which lists data used and results obtained in performing the reinvestment method.

In addition to finding optimal portfolios for tracking financial targets, the current system allows other objectives to be considered and incorporated in the solution. Examples include supplementing the basic objective function with an income objective, tax impact objective, or a company cash flow objective. The system is flexible enough to allow the objective function to be customized for particular applications.

As an example, an investor who has a preference for securities with high dividend yields will specify an objective function which explicitly states the trade off between portfolio tracking and dividend income. The computer routine to optimize a portfolio (the optimizer) will extract the partial derivatives of this objective function and proceed to select an optimal portfolio which exactly incorporates the specified trade-off between dividend income and tracking. This investor then has a custom solution which addresses his particular concerns and requirements.

The consideration of transaction costs associated with buying and selling securities is incorporated into the portfolio optimization system to control expenses due to trading. The trade off between tracking accuracy and transaction costs can be specified by the investor. This allows for a customized objective function, with regard to expected transaction costs, for each client.

Investors may also have tax effects to consider when trading from one security to another. The taxable gains and losses and their impact on expected return can be specified by the investor so as to control these costs.

Another preference which can be incorporated into the objective function and handled explicitly by the optimization system is the consideration of cash flows. An investor may have a preference for investing in companies which have large and positive cash flows. This objective can be incorporated into the system and resulting portfolios will reflect this investment goal.

While preferred embodiments of the present invention have been illustrated and described, it will be understood that changes and modifications can be made therein without departing from the invention to its broader aspects. Various features of the invention are defined in the following claims.

APPENDICES TO SPECIFICATION

APPENDIX I – Spanning Program for creating an optimal target tracking portfolio of securities (Appendix I pp. 1-54). Also includes 4 pages of Output.

APPENDIX II – Liability Return Program for creating a return series for a liability stream from yields (Appendix II pp. 1-4).

APPENDIX III – Correlation Portfolio Program for creating an optimal index correlation portfolio with securities (Appendix III pp. 1-57).

APPENDIX IV – "Fasttrack" Program for analyzing large numbers of securities in a rapid, efficient manner to provide optimum correlation of asset return to a time dependent financial index. Substantial computer memory storage reduction is also achieved.

APPENDIX V – Data listing of method for reinvestment of available cash flow beginning from a current portfolio.

APPENDIX VI – Example illustrating distinctions between current system and prior art.

APPENDIX I

SPANNING PROGRAM

To create an optimal target tracking portfolio of securities.

(Appendix I pp. 1-54)

```
C UPDATE  December 6, 1988
C **************************************************************
      PROGRAM SPAN
C **************************************************************

INCLUDE 'COMMON.F'
      CHARACTER*30 HOLD
      LOGICAL ICOUNT
      LOGICAL HOLDEX

C ************   WRITE COPYRIGHT TO SCREEN    ***************

INCLUDE 'COPYRIGHT.F'

C **************************************************************

C ************         DATA INPUT SECTION      **********************

5     CONTINUE

C     DEFAULT READ IN OF 24 MONTHS PRIOR  = NSTAT, NRESTS FOR B( ) ****

NSTAT = 24
      NRETS = 24
      BULLET = 0.0
      TARGET = 1.
      TURN = 100.
      ITYPE = 1
      ICHANGE = 0
      XBLOWER = .0D0
      XBUPPER = 3.0D0
      SMAX = XBUPPER

C     ********************        CALL FLASH TO INTRODUCE   S P A N  ****
C     CALL FLASH

C     ************ IF 'COUNTS' EXISTS THIS IS A MULTIPLE RUN       ****
      INQUIRE (FILE = 'COUNTS', EXIST = ICOUNT)

IF (ICOUNT .EQV. .FALSE.)  THEN
C     ********************        CALL INTRO TO INPUT PARAMETERS      ****
          CALL INTRO
C     ********************        CALL MODIFY TO CHANGE PARAMETERS    ****
          CALL MODIFY
C     ********************        READ IN THE HOLDINGS FILE          ****
      IF(IHOLD .NE. 0) THEN
11    WRITE(*,*)'INPUT PORTFOLIO #, AND NAME OF HOLDINGS FILE'
      READ(*,*)IPORT,HOLD
      INQUIRE (FILE = HOLD,EXIST = HOLDEX)
```

1

```
         IF (HOLDEX .EQV. .FALSE.) THEN
            WRITE(*,*)'FILE NOT FOUND ',HOLD
            GO TO 11
         END IF
      END IF
C ***************** ICOUNT  IS TRUE  --> CALL MULTRUN   *********
      ELSE
          WRITE(*,101)'CALLING MULTRUN .......  ,
          CALL MULTRUN(ISKIP)
      END IF

C ******************      CALL SAVDAT TO SAVE    PAST.DAT      ****
      CALL SAVDAT
C ****************************************************************

NM = NMSAVE
      NM = (INT(NM/100)-80)*12+(NM-INT(NM/100)*100)
      IREAD = NSTAT+NSIMS

IF(NSTOCKS.GT.0)THEN
        XBUPPER = SMAX
      END IF

C*********  SET UP CONSTANTS *******************

NUM = NSTOCKS+NBONDS
      IF(NUM.GT.ND)THEN
          WRITE(*,*)' WARNING NUM >',ND,' TOO BIG FOR PROGRAM'
          STOP
      ENDIF

ICOL = ID
      KE = KEQ
      KKK = KE
      IA = ND
      ICC = ND
      IH = N2D

IFIRST = NM-NSTAT
      ILAST = NM+NSIMS-1

BULL1 = BULLET
      TARG1 = TARGET
      TURN1 = TURN

BULLET = BULLET*ABS(BULLET)/1000.
      IF (TURN1.EQ.100.)THEN
         TURN = 0.0
      ELSE
C        WRITE(*,*)'INPUT NUMERATOR'
C        READ(*,*)XNUM
         XNUM = 0.10
```

```
      TURN = XNUM*(100./(TURN1+.01)-100.0/100.01)
      END IF
C ********************* CALL COVIN TO READ IN RETURNS    ******
      CALL COVIN (NUM,IREAD,IFIRST,ILAST)

C ********************* CALL HOLDING TO FOR CURRENT WEIGHTS ****
      CALL HOLDING (NUM,HOLD,IPORT)

C ********************* CALL MATRIX TO CALCULATE  INPUT ARRAYS *
      WRITE(*,101)'CALLING MATRIX ........        ,
      CALL MATRIX (NUM,IREAD)

C **************************************************************
      WRITE(*,101)'CALLING BOUNDS .......         ,
      CALL BOUNDS (NUM,ICOL,MMM)

C **************************************************************

C ******************* CALL TO OPTIMIZER       *******************

WRITE(*,101)'CALLING OPTIMIZER ......       ,
      IF (ICOUNT.EQV. .TRUE.) THEN
          WRITE(*,102)'WORKING ON RUN NUMBER    ',ISKIP
      END IF

MAXWS = 2*(2*NUM+ID)*(2*NUM+ID)+8*(2*NUM+ID)+6
      ITURN = 0
      CALL QSET ( NUM, MAXWS,ITURN )
C ********   IF TURNOVER IS CONSIDERED, CALL TURNOV

IF(TURN .GT. 0.0) THEN
          ITURN = 1
          CALL QSET (NUM, MAXWS, ITURN)
      END IF

C ******************* CALL TO PORTFOLIO OUTPUT   **************
      WRITE(*,*)
      WRITE(*,101)'CALLING PORT ..........        ,
      CALL PORT (NUM)
      IF (IDUMMY .EQ. 1) GO TO 100

C ******************* CALL TO STATISTICAL TRACKING    ********
      WRITE(*,101)'CALLING TRACKER .......        ,
      CALL TRACKER (NUM,IREAD)

C ******************* CALL TO TURNOVER ROUTINE        ********
      WRITE(*,101)'CALLING BAL ...........        ,
      CALL BAL (NUM)
C **************************************************************

100   WRITE(*,101)'SPANNING SIMULATION COMPLETE'
```

3

```
      IF (ICOUNT.EQV. .TRUE.) THEN
         WRITE(*,102)'DONE WITH RUN NUMBER      ',ISKIP
         GO TO 5
      END IF

101   FORMAT('+',A50)
102   FORMAT('+',A50,I7)

END
C                 END OF MAIN PROGRAM SPAN1
C ****************************************************************
*******************************************************************
      SUBROUTINE MULTRUN (ISKIP)
*******************************************************************

INCLUDE 'COMMON.F'
      CHARACTER*30 XTITL,XFLOUT,XLIBIN,XSTKIN,XBNDIN

OPEN (13,FILE ='MULTIN',STATUS = 'OLD')

IF (ISKIP.EQ.0) GO TO 30

DO 10 I = 1, ISKIP
         DO 20 J = 1,18
         READ(13,'(A1)',END = 99)GARB
20       CONTINUE
10    CONTINUE

30    CONTINUE
      READ(13,101,END = 99)TITLE
      READ(13,101, END = 99) FILEOUT
      READ(13,101, END = 99) LIABIN
      READ(13,101, END = 99) STOCKIN
      READ(13,101, END = 99) BONDIN
      READ(13,*, END = 99) NMSAVE
      READ(13,*, END = 99) NSIMS
      READ(13,*, END = 99) NSTOCKS
      READ(13,*, END = 99) NBONDS
      READ(13,*, END = 99) IDUMMY
      READ(13,*, END = 99) STOCKMIN
      READ(13,*, END = 99) YIMAX
      READ(13,*, END = 99) SMAX
      READ(13,*, END = 99) NSTAT
      READ(13,*, END = 99) NRETS
      READ(13,*, END = 99) BULLET
      READ(13,*, END = 99) TARGET
      READ(13,*, END = 99) TURN

101   FORMAT (A20)

ISKIP = ISKIP+1
```

```
        CLOSE(13)
        RETURN

C *****    STOP   DONE WITH MULTI RUN      **********
99      CLOSE(13)
        WRITE(*,*)'DONE WITH MULTIPLE RUN ******************'
        STOP
        END
****************     END OF SUBROUTINE  MULTRUN     *****************
*********************************************************************
        SUBROUTINE HOLDING (NUM,HOLD,IPORT)
*********************************************************************
        INCLUDE 'COMMON.F'

DIMENSION VAL(ND)
        CHARACTER*9 SYMBL,IDCSYM(ND)
        CHARACTER*30 HOLD

C ****  IHOLD IS READ FROM FIRST SCREEN RESPONSE: OLD OR HOLDINGS RUN **
        IF (IHOLD .EQ. 0) GO TO 999

OPEN (25,FILE = HOLD,STATUS = 'OLD')

11      XPORT = REAL(IPORT)
        I = 0
22      READ(25,*, END = 44)SYMBL,VALUE
        IF (SYMBL .EQ. 'IDCSYMBL') THEN
            IF (VALUE .EQ. XPORT) THEN
                READ(25,*,END = 44)GARB
33              READ(25,*, END = 44)SYMBL,VALUE
                    IF (SYMBL .EQ. 'IDCSYMBL') GO TO 44
                        I = I + 1
                        IDCSYM(I) = SYMBL
                        VAL(I) = VALUE
                        GO TO 33
            END IF
        READ(25,*,END = 44) GARB
        END IF
        GO TO 22

44      CONTINUE
        NIDC = I
        IF (NIDC .EQ. 0)THEN
            WRITE(*,*)'PORTFOLIO NUMBER NOT FOUND ', IPORT
            WRITE(*,*)'ENTER PORTFOLIO NUMBER AGAIN'
            READ(*,*)IPORT
            REWIND(25)
            GO TO 11
        END IF
```

```
          ICASH = 0
          PORTVAL = 0.0
          DO 10 I=1,NIDC
             PORTVAL = PORTVAL + VAL(I)
             IF (IDCSYM(I) .EQ. 'CASH')THEN
                ICASH = 1
                TEMP = VAL(I)
                VAL(I) = VAL(1)
                VAL(1) = TEMP
                GARB = IDCSYM(I)
                IDCSYM(I) = IDCSYM(1)
                IDCSYM(1) = GARB
             END IF
10        CONTINUE
          IF (ICASH .EQ. 0) THEN
             WRITE(*,*)'NO CASH INCLUDED....PROGRAM STOPPING'
             STOP
          END IF

IDCTEST = 0
          NCOUNT = 0
          DO 20 I = 2,NIDC
             ITEST = 0
             DO 30 J = 1,NUM
                IF(IDC(J)(1:4) .EQ. IDCSYM(I)) THEN
                   ITEST = 1
                   NCOUNT = NCOUNT+1
                   OLDWT(J) = VAL(I) / PORTVAL
                END IF
30           CONTINUE
             IF (ITEST .EQ. 0) THEN
                IDCTEST = 1
                WRITE(*,*)IDCSYM(I),': SYMBOL NOT INCLUDED IN RETURN FILE'
             END IF
20        CONTINUE

IF (IDCTEST.EQ.1) THEN
             WRITE(*,*)NIDC-NCOUNT-1,'SYMBOLS NOT FOUND..PROGRAM STOPPING'
             STOP
          END IF
          RETURN

999       OPEN(21,FILE = 'OLD',STATUS = 'OLD')
          DO 90 I = 1,NUM
             READ(21,*)OLDWT(I)
             IF (TURN.EQ. 0.0)OLDWT(I)=0.0
             OLDWT(I) = OLDWT(I)/100.
90        CONTINUE
          CLOSE(21)
          RETURN
```

```
      END
C ****************  END OF SUBROUTINE  HOLDING      **************
C  UPDATE December 6, 1988
C  **********  THIS SUBROUTINE READS IN STOCK, BOND & LIA DATA ******

SUBROUTINE COVIN (NUM,IREAD,IFIRST,ILAST)

C  *****************************************************************

C           IFIRST IS FIRST MONTH OF DATA NEEDED FOR MATRIX
C           ILAST IS LAST MONTH OF SIMULATION
C
      INCLUDE 'COMMON.F'

C *****************   READ IN LIABILITY RETURNS  *********************

OPEN (9,FILE = LIABIN, STATUS = 'OLD')

READ (9,111) LIANAME
      WRITE(*,*)LIANAME
      DO 200 I = 1,5
          READ (9,111) GARB
 200  CONTINUE

READ (9,*) ISTART
      READ (9,*) ISTOP

DO 300 I = 1,IFIRST-ISTART
          READ (9,111) GARB
 300  CONTINUE

DO 400 I = 1,IREAD
          READ (9,*) ANIM(I)
 400  CONTINUE

CLOSE(9)

C                                        READ IN STOCK DATA
      IF (NSTOCKS.GT.0) THEN
          OPEN (4,FILE = STOCKIN, STATUS = 'OLD')

DO 600 I = 1,IDUMMY
              READ (4,111) (GARB,L = 1,6)
              READ (4,*) ISTART
              READ (4,*) ISTOP
              DO 610 K = 1,ISTOP-ISTART+1
              READ (4,*) XGARB
 610          CONTINUE
 600      CONTINUE
 111  FORMAT (A40)

DO 700 I = 1,NSTOCKS
```

```
783         READ (4,111,END = 785) NAME(I)
C ****  CUT OFF LEADING BLANKS OF NAME(I)
            ILEN = 1
            GARB = '                                        '
790         IF (NAME(I)(ILEN:ILEN) .EQ. ' ')THEN
               ILEN = ILEN+1
               GO TO 790
            ELSE
               GARB(1:LENGTH) = NAME(I)(ILEN:LENGTH)
            END IF
            NAME(I) = GARB

WRITE (*,112) I,NAME(I)
112         FORMAT('+','STOCK # ',I5,' IS ',A40)
            READ (4,111) GARB

C ****  CUT OUT BLANKS FROM GARB TO GET AN IDC AND TICKER
            READ (4,111) GARB
            ILEN = 1
            IDC(I) = '         '
791         IF (GARB(ILEN:ILEN).EQ.' ') THEN
               ILEN = ILEN + 1
               IF ((ILEN+3).GT.LENGTH) GOTO 793
               GOTO 791
            ENDIF

IDC(I)(1:4) = GARB(ILEN:ILEN+3)
            ILEN = ILEN + 4

792         IF (GARB(ILEN:ILEN).EQ.' ') THEN
               ILEN = ILEN + 1
               IF ((ILEN+3).GT.LENGTH) GOTO 793
               GOTO 792
            ENDIF
            IDC(I)(6:9) = GARB(ILEN:ILEN+3)

793         CONTINUE

READ (4,*) ISIC(I)
            IF(ISIC(I).GT.99) ISIC(I) = INT (ISIC(I)/100)
            READ (4,111) (GARB,L = 4,5)
            READ (4,*) ISTART
            READ (4,*) ISTOP

C *****    TEST FOR ENOUGH RETURNS TO SATISFY NRETS  *****************

ICHECK = NM-NRETS-ISTART
            IF(ICHECK.LT.0) NRETS = NM - ISTART
            IF(NRETS.LT.NSTAT) ICHECK = IFIRST-ISTART

DO 800 J = 1,ICHECK
```

```
                READ (4,111) GARB
800        CONTINUE

DO 801 J = 1,NRETS-NSTAT
              READ(4,*)GARB
801        CONTINUE

JJ = NRETS-NSTAT

DO 810 K = 1,IREAD
             READ (4,*) RET(K,I)

C ****  ADJUST OCTOBER 1987 ********************
      IF(K+NM-NSTAT-1.EQ. 94)THEN
        IF(K.LE.NSTAT)RET(K,I)=RET(K,I)/2.97
      END IF
              J = JJ+K
810        CONTINUE

DO 1200 J = 1,ISTOP-ILAST
              READ (4,111) GARB
1200       CONTINUE

700     CONTINUE
      ENDIF
1400  CONTINUE
      CLOSE(4)
C                              READ IN BOND DATA

IF (NBONDS.GT.0) THEN
      OPEN (7,FILE = BONDIN, STATUS = 'OLD')

DO 900 I = NSTOCKS+1,NSTOCKS+NBONDS
          READ (7,111) NAME(I)
          WRITE (*,113) I,NAME(I)
          READ (7,111) (GARB,L = 1,5)
          READ (7,*) ISTART
          READ (7,*) ISTOP
113       FORMAT('+','BOND # ',I5,' IS ',A40)

C *****   TEST ICHECK FOR ENOUGH RETURNS FOR BRET   ******************

ICHECK = NM-NRETS-ISTART
             IF(ICHECK.LT.0) THEN
          WRITE(*,*)'BOND ',I,' DOES NOT HAVE ENOUGH RETURNS FOR NRETS'
              STOP
             END IF
             IF(NRETS.LT.NSTAT) ICHECK = IFIRST-ISTART

DO 1000 J = 1,ICHECK
             READ (7,111) GARB
1000      CONTINUE
```

```
              DO 1001 J = 1,NRETS-NSTAT
                 READ(7,*)GARB
1001          CONTINUE

JJ = NRETS-NSTAT

DO 1010 K =1,IREAD
              READ (7,*) RET(K,I)
                 J = JJ + K
1010          CONTINUE

DO 1300 J = 1,ISTOP-ILAST
                 READ (7,111) GARB
1300          CONTINUE

900     CONTINUE

ENDIF
         CLOSE(7)
         RETURN

C ***    IF END OF FILE WAS HIT ON STOCKS - RESET NUM AND CONTINUE ***
 785     NSTOCKS = I-1
         NUM = NSTOCKS+NBONDS
           GOTO 1400

END
C                                                  END OF SUBROUTINE COVIN
C        *******************************************************************

C ***************** MATRIX CALCULATION SUBROUTINE ******************
         SUBROUTINE MATRIX (NUM,IREAD)
C        *******************************************************************
         INCLUDE 'COMMON.F'

C                     IREAD = NSTAT+NSIMS
C                     NUM = NSTOCKS+NBONDS

DO 233 I = 1,NUM
            DO 244 J = 1,NSTAT
               RET(J,I) = RET(J,I)-ANIM(J)*TARGET
 244        CONTINUE
 233     CONTINUE

DO 213 I = 1,NUM
            AVE(I) = 0.0
            B(I) = 0.0
            DO 214 J = 1,NRETS
               AVE(I) = AVE(I)+RET(J,I)/DBLE(NRETS)
 214        CONTINUE
```

```
         B(I) =  AVE(I)*BULLET
213   CONTINUE

C *******       CALCULATE COVARIANCE MATRIX **********
      DO 215 I = 1,NUM
         DO 215 J = I,NUM
            A(I,J) = 0
            DO 215 K = 1,NSTAT

XXX = DBLE (NSTAT-1)

A(I,J) = A(I,J)+(RET(K,I)-AVE(I))*(RET(K,J)-AVE(J)) / XXX
      A(J,I) = A(I,J)

IF(A(I,J).GT.50)WRITE(*,*)'COV TOO BIG',A(I,J),I,J
215   CONTINUE

RETURN

END
C                                               END OF SUBROUTINE MATRIX
C ****************************************************************
C
C ************************ SUBROUTINE BOUNDS *******************
      SUBROUTINE BOUNDS (NUM,ICOL,MMM)
C ****************************************************************

INCLUDE 'COMMON.F'

SCAL = 1.25
      SIC49 = 0.0
      SIC60 = 0.0
      SIC63 = 0.0
      SIC67 = 0.0

DO 80 I = 1,NUM
         BDL(I) = XBLOWER/100.0
         BDU(I) = XBUPPER/100.0
         IF(OLDWT(I).GT.BDU(I))THEN
           IF(OLDWT(I).GT.SCAL*BDU(I)) THEN
             BDU(I) = SCAL*BDU(I)
           ELSE
             BDU(I) = OLDWT(I)
           END IF
         END IF
         IF (I.GT.NSTOCKS) BDU(I) = 1.

IF(ISIC(I).EQ.48) SIC49 = SIC49+OLDWT(I)
         IF(ISIC(I).EQ.49) SIC49 = SIC49+OLDWT(I)
         IF(ISIC(I).EQ.60) SIC60 = SIC60+OLDWT(I)
         IF(ISIC(I).EQ.63) SIC63 = SIC63+OLDWT(I)
```

```
        IF(ISIC(I).EQ.67) SIC67 = SIC67+OLDWT(I)
80   CONTINUE

D(1) =  STOCKMIN/100.0
        D(2) =  100.0/100.0
        D(3) = -100.01/100.0
        D(4) = -YIMAX/100.0
        D(5) = -YIMAX/100.0
        D(6) = -YIMAX/100.0

SIC60S = SIC60+SIC63+SIC67
     IF(SIC49*100.GT.YIMAX.AND.SIC49*100.LT.SCAL*YIMAX)D(4) = -SIC49
     IF(SIC60S*100.GT.YIMAX.AND.SIC60S*100.LT.SCAL*YIMAX)D(5)=-SIC60S
     IF(SIC67*100.GT.YIMAX.AND.SIC67*100.LT.SCAL*YIMAX)D(6) = -SIC67

IF( SIC49*100.GT.SCAL*YIMAX)  D(4) = D(4)*SCAL
     IF( SIC60S*100.GT.SCAL*YIMAX) D(5) = D(5)*SCAL
     IF( SIC67*100.GT.SCAL*YIMAX)  D(6) = D(6)*SCAL

DO 51 J = 1,ICOL
          DO 52 I = 1,NUM
            C(I,J) = 0.0
            IF (J.EQ.1.AND.I.LE.NSTOCKS)  C(I,J) = 1.0
            IF (J.EQ.2) C(I,J) = 1.0
            IF (J.EQ.3) C(I,J) = -1.0
            IF (J.EQ.4.AND.ISIC(I).EQ.49)    C(I,J) = -1.0
            IF (J.EQ.4.AND.ISIC(I).EQ.48)    C(I,J) = -1.0
            IF (J.EQ.5.AND.ISIC(I).EQ.60)    C(I,J) = -1.0
            IF (J.EQ.5.AND.ISIC(I).EQ.63)    C(I,J) = -1.0
            IF (J.EQ.5.AND.ISIC(I).EQ.67)    C(I,J) = -1.0
            IF (J.EQ.6.AND.ISIC(I).EQ.67)    C(I,J) = -1.0

52        CONTINUE
51     CONTINUE

C    CLOSE (6)

MMM = 2*NUM+ICOL

RETURN

END
C                         END OF SUBROUTINE BOUNDS
C *******************************************************************

C *******************************************************************
     SUBROUTINE PORT (NUM)
C *******************************************************************

INCLUDE 'COMMON.F'

C *******   RESET THE RETURNS TO ORIGINAL STATE  ******************
```

```
      DO 1300 J=1,NUM
         DO 1300 I=1,NSTAT
            RET(I,J)=RET(I,J)+ANIM(I)*TARGET
            IF(I+NM-NSTAT-1.EQ.94)RET(I,J)=RET(I,J)*2.97
 1300 CONTINUE

C     ****************** BEGIN OUTPUT PROCEDURES **************
      UANIM = 0.0
      DO 129 I = 1,NRETS
      UANIM = UANIM + ANIM(I)/DBLE(NRETS)
  129 CONTINUE
      UANIM = UANIM*TARGET
      IDUMMY = 0
      XTOT=0.
      DO 130 I=1,NUM
         XTOT=XTOT+X(I)
         CUM(I) = X(I)
         IF(X(I).LT. -0.001) THEN
      WRITE(*,*)' '
      WRITE(*,*)'************  SPANNING RUN ABORTED   ************'
      WRITE(*,*)'  WEIGHT NUMBER ',I,' = %',X(I)*100.
      WRITE(*,*)'***************************************************'
      IDUMMY = 1
      RETURN
      END IF

130 CONTINUE

IF (ABS(XTOT-1.0) .GT. 0.005) THEN
      WRITE(*,*)' '
      WRITE(*,*)'************  SPANNING RUN ABORTED   ************'
      WRITE(*,*)'  TOTAL WEIGHT IN PORTFOLIO = %',XTOT*100.
      WRITE(*,*)'***************************************************'
      IDUMMY = 1
      RETURN
      END IF

C     ****************** PRINT SPANNING SIMULATION RESULTS ***

OPEN(10,FILE=FILEOUT,STATUS='UNKNOWN')
      REWIND(10)

WRITE(10,*)' NATIONAL INVESTMENT SERVICES SPANNING TECHNOLOGY'
      WRITE(10,*)'                SIMULATION RESULTS'
      WRITE(10,*)
      WRITE(10,*)'                 ',TITLE
      WRITE(10,*)
      WRITE(10,*)' LIABILITY STREAM USED   ',LIANAME
      WRITE(10,*)
      WRITE(10,*)'        START END  SPAN'
      WRITE(10,*)'NUMBER WGHT  WGHT SENSIT SIC IDC  TICK',
     &           'SECURITY NAME'
```

```
      WRITE(10,*)
C ******    CALCULATE THE PORTFOLIO RETURNS    *********************
C ******     FIRST CALCULATE RETURNS FOR NSTAT PERIOD ***************
      DO 800 I = 1,NSTAT
         PRET(I) = 0.0
         DO 900 J = 1,NUM
            PRET(I) = PRET(I) + RET(I,J)*X(J)
 900     CONTINUE
 800  CONTINUE
C ******    NOW CALCULATE RETURNS AND WEIGHTS IN SIMULATION PERIOD *
      DO 801 I=1,NSIMS
         PRET(I+NSTAT)=0.0
         DO 901 J=1,NUM
            PRET(I+NSTAT) = PRET(I+NSTAT)+CUM(J)*RET(I+NSTAT,J)
 901     CONTINUE
         DO 1001 K = 1,NUM
            CUM(K) = CUM(K)*(1.+RET(I+NSTAT,K))/(1.+PRET(I+NSTAT))
1001     CONTINUE
 801  CONTINUE

C ***  WRITE OUT THE NEW WEIGHTS TO A FILE CALLED 'OLD'********
      OPEN(15,FILE = 'OLD', STATUS = 'OLD')
      REWIND(15)
      DO 140 I = 1,NUM
         WRITE(15,940) CUM(I)*100
 140  CONTINUE
 940  FORMAT(1X,F15.8)
      CLOSE(15)

C ******    CALCULATE PARTIALS AND WRITE OUTPUT    *****************
      XVAR=0.0
      XRET = 0.0
      ICOUNT=0

DO 131 I=1,NUM
         C(I,1)=-B(I)
         DO 132 J=1,NUM
            C(I,1)=C(I,1)+X(J)*A(I,J)*2
            XVAR=XVAR+X(I)*X(J)*A(I,J)
 132     CONTINUE

ICOUNT=ICOUNT+1
         IF(I.GT.NSTOCKS)ICOUNT=I

WRITE(10,16)ICOUNT,X(I)*100,CUM(I)*100,C(I,1)*100,
     &               ISIC(I),IDC(I),NAME(I)

XRETI = AVE(I) + UANIM
         XRET = XRET + X(I)*XRETI
 131  CONTINUE
 16   FORMAT(1X,I4,1X,2F6.3,F7.3,I4,1X,A9,1X,A36)
```

```
      WRITE(10,*)

STD=(XVAR*12)**(0.5)*100
      XRET = XRET*12.0*100.0

WRITE(10,649) STD, XRET
 649  FORMAT(1X,' MINIMUM STD DEV =',F10.4,'  EXPECTED RETURN =',F10.4)
      WRITE(10,*)
C     IF(ITYPE.EQ.1.AND.XTOT.LT..995)WRITE(10,*)' ERROR ****** ',
C    .' SUM OF X S = %',XTOT*100.
C     IF(ITYPE.EQ.1.AND.XTOT.GT.1.005)WRITE(10,*)' ERROR ****** ',
C    .' SUM OF X S = %',XTOT*100.

RETURN

END
C                     END OF SUBROUTINE PORT
C     ****************************************************************

C     ****************************************************************
      SUBROUTINE TRACKER (NUM,IREAD)
C     ****************************************************************
      INCLUDE 'COMMON.F'

C ******    SET AVERAGES AND COVARIANCES TO ZERO   *****************
      DO 400 I=1,3
         AVE(I)=0.0
         DO 400 J=1,3
            COV(I,J)=0.0
 400  CONTINUE

C ***  SET STAT ARRAY  1 = LIABILITY, 2 = PORTFOLIO, 3 = DIFFERENCES **
      DO 250 I=1,IREAD
         STAT(I,1)=ANIM(I)
         STAT(I,2)=PRET(I)
         STAT(I,3)=(PRET(I)-ANIM(I))
 250  CONTINUE

C *****      GO AROUND STATISTICS IF NSIM < 3
      IF(NSIMS.LT.3)GOTO 318

C *****      CALCULATE AVERAGES           *******************************
C *****      SET NSIM TO 2 FOR  STATISTICS IF NSIMS.LT.1    *********
      NSIM = NSIMS
      IF(NSIMS.LT.1) NSIM = 2
      DO 260 I=NSTAT+1,IREAD
         AVE(1)=AVE(1)+ANIM(I)/DBLE(NSIM)
```

```
              AVE(2)=AVE(2)+PRET(I)/DBLE(NSIM)
              AVE(3)=AVE(3)+(PRET(I)-ANIM(I))/DBLE(NSIM)
 260     CONTINUE

C *****      CALCULATE COVARIANCES    *********************************

DO 950 I=1,3
            VAR(I)=0.0
            DO 950 K=NSTAT+1,IREAD
               VAR(I)=VAR(I)+(STAT(K,I)-AVE(I))**2/DBLE(NSIM-1)
 950     CONTINUE

C ******     CALCULATE THE COVARIANCE MATRIX'S UPPER OFF DIAGONAL ****

DO 960 I=1,3
            DO 960 J=I,3
               DO 828 K=NSTAT+1,IREAD
                  COV(I,J)=COV(I,J)+((STAT(K,I)-AVE(I))*(STAT(K,J)-AVE(J)))
 828           CONTINUE
               COV(I,J)=COV(I,J)/DBLE(NSIM-1)
               COV(J,I) = COV(I,J)
 960     CONTINUE

C *****      CALCULATE CORRELATIONS     ***************************
         DO 951 I=1,3
            DO 951 J=1,I
               IF(VAR(I).LE. 0.0 .OR. VAR(J).LE. 0.0) GO TO 951
               COREL(I,J)=COV(I,J)/(VAR(I)**.5*VAR(J)**.5)
 951     CONTINUE
C *****      CALCULATE CUMULATIVE RETURNS       **********************
         PRET(NSTAT)=100
         ANIM(NSTAT)=100
         DO 569 I=NSTAT+1,IREAD
            XX=PRET(I)
            YY=ANIM(I)
            PRET(I)=PRET(I-1)*(1+XX)
            ANIM(I)=ANIM(I-1)*(1+YY)
 569     CONTINUE

IF(VAR(1).NE. 0.0)    BETA = COV(1,2)/VAR(1)
         ALPHA = AVE(2) - BETA*AVE(1)

SST =    0.0
         SSE =    0.0
         DO 952 I = NSTAT+1,IREAD
            SSE = SSE + (ALPHA+BETA*STAT(I,1)-STAT(I,2))**2
            SST = SST + (STAT(I,2)-AVE(2))**2
 952     CONTINUE
```

```
      IF(NSIMS.GT.2) STDERR = (SSE/DBLE(NSIMS-2))**.5
      IF(SST.NE.0.0) RSQ = 1 - SSE/SST
C***********************************************************************
C *****     BEGIN WRITING THE TRACKER OUTPUT     **********************

318  WRITE(10,*)' TRACKER OUTPUT FILE '
      WRITE(10,*)
      WRITE(10,*)'   MONTH        LIA         PORT        DIF'
      WRITE(10,*)

C *****     WRITE MONTH, LIABILITY RET, PORTFOLIO RET, DIFFERENCE ****
      DO 700 I=NSTAT+1,IREAD
          ISTAT = I-(NSTAT+1)
          WRITE(10,612)ISTAT+NM,(STAT(I,J),J=1,3)
 612      FORMAT(1X,3X,I4,3F13.10)
 700  CONTINUE

C *****     WRITE CUMULATIVE RETURNS     ***************************

WRITE(10,*)
      WRITE(10,886)
 886  FORMAT(1X,'CUMMULATIVE VALUES OF LIABILITIES AND ASSETS'/,
     ./,' MONTH     LIABILTIES       PORTFOLIO',/)

DO 847 I=NSTAT,IREAD
          ISTAT = I-NSTAT-1
          WRITE(10,328)ISTAT+NM,ANIM(I),PRET(I)
 328      FORMAT(1X,I5,7X,F7.3,10X,F7.3)
 847  CONTINUE
 837  CONTINUE

C *****     WRITE STATISTICS  BASED ON SIMULATIONS MONTHS  **********

WRITE(10,*)
      WRITE(10,*)'**********     STATISTICAL SUMMARY     **********'
      WRITE(10,985)NM,NM+NSIMS-1
 985  FORMAT(/,'    STATISTICS BASED ON MONTHS ',I4,' THROUGH',I4)

C *****     WRITE ALPHA,BETA,STDERR,CORREL,AND R-SQUARED   **********

WRITE(10,*)
      WRITE(10,987)'ALPHA',ALPHA,'ANNUAL',ALPHA*1200
      WRITE(10,989)'BETA',BETA
      WRITE(10,988)'STD ERR',STDERR,STDERR*100
      WRITE(10,989)'CORRELATION',COREL(2,1)
      WRITE(10,988)'R-SQUARED',RSQ,RSQ*100
 987  FORMAT(1X,A12,10X,F10.6,A8,F10.2,' %')
 988  FORMAT(1X,A12,10X,F10.6,8X,F10.2,' %')
 989  FORMAT(1X,A12,10X,F10.6)
```

```
C *****     WRITE AVERAGES AND VARIANCES OF 1-LIAB, 2-PORT, 3-DIFFS **

WRITE(10,*)
      WRITE(10,*)
      WRITE(10,*)'ANNUAL RETURNS:         MEAN          STD DEV'
      WRITE(10,*)

DO 990 I = 1,3
         AVE(I) = (AVE(I)*12)*100
         VAR(I) = ((VAR(I)*12)**.5)*100
990   CONTINUE

WRITE(10,916) 'LIABILITY',AVE(1),VAR(1)
      WRITE(10,916) 'PORTFOLIO',AVE(2),VAR(2)
      WRITE(10,916) 'DIFFERENCE',AVE(3),VAR(3)
916   FORMAT(1X,3X,A11,9X,F9.2,' %',10X,F9.2,' %')

C *****     WRITE PARAMETERS FOR THE RUN     **************************

WRITE(10,*)
      WRITE(10,*)
      WRITE(10,*)'      PARAMETERS FOR THIS RUN WERE: '
      WRITE(10,*)
      WRITE(10,101) TITLE
      WRITE(10,102) FILEOUT
      WRITE(10,103) LIABIN
      WRITE(10,104) STOCKIN
      WRITE(10,105) BONDIN
      WRITE(10,106) NMSAVE
      WRITE(10,107) NSIMS
      WRITE(10,108) NSTOCKS
      WRITE(10,109) NBONDS
      WRITE(10,110) IDUMMY
      WRITE(10,111) STOCKMIN
      WRITE(10,112) YIMAX
      WRITE(10,113) SMAX
      WRITE(10,114) NSTAT
      WRITE(10,115) NRETS
      WRITE(10,116) BULL1
      WRITE(10,117) TARG1
      WRITE(10,118) TURN1

101   FORMAT(1X,' 1) SPANNING RUN TITLE        ', A30)
102   FORMAT(1X,' 2) OUTPUT FILENAME           ', A30)
103   FORMAT(1X,' 3) LIABILITY STREAM FILE     ', A30)
104   FORMAT(1X,' 4) STOCK RETURN FILE         ', A30)
105   FORMAT(1X,' 5) BOND RETURN FILE          ', A30)
106   FORMAT(1X,' 6) MONTH SIMULATION BEGINS   ', I6)
107   FORMAT(1X,' 7) NUMBER OF MONTHS SIMULATED ', I6)
108   FORMAT(1X,' 8) NUMBER OF STOCKS          ', I6)
109   FORMAT(1X,' 9) NUMBER OF BONDS           ', I6)
110   FORMAT(1X,'10) STOCKS TO READ PAST       ', I6)
```

```
111   FORMAT(1X,'11) MINIMUM STOCK HOLDING   % ',F6.2)
112   FORMAT(1X,'12) MAXIMUM INDUSTRY HOLDING % ',F6.2)
113   FORMAT(1X,'13) MAXIMUM STOCK HOLDING   % ',F6.2)
114   FORMAT(1X,'14) NSTAT                    ',  I6)
115   FORMAT(1X,'15) NRETS                    ',  I6)
116   FORMAT(1X,'16) BULLET                   ',F6.2)
117   FORMAT(1X,'17) TARGET                   ',F6.2)
118   FORMAT(1X,'18) TURNOVER FACTOR          ',F6.2)

C *****     WRITE HISTORICAL DATA USED TO MAKE RUN   ****************
      WRITE(10,*)
      WRITE(10,*)' PORTFOLIO CONSTRUCTED UPON THE FOLLOWING DATA:'
      WRITE(10,*)
      WRITE(10,*)'   MONTH      LIA       PORT       DIF'
      WRITE(10,*)
      DO 300 I=1,NSTAT
          WRITE(10,612)I+NM-(NSTAT+1),(STAT(I,J),J=1,3)
300   CONTINUE

RETURN

END
C                          END OF SUBROUTINE TRACKER
C *****************************************************************
C *****************************************************************
      SUBROUTINE BAL (NUM)
C *****************************************************************
      INCLUDE 'COMMON.F'
      DIMENSION CC(ND,2)
      INTEGER BUY(ND),SELL(ND)

VNEW = 0.0
      VOLD = 0.0

DO 10 I=1,NUM
          CC(I,1) = 0.0
          CC(I,2) = 0.0
          DO 20 J=1,NUM
              CC(I,1) = CC(I,1)+X(J)*A(I,J)*2.
              VNEW = VNEW+X(I)*X(J)*A(I,J)
              CC(I,2) = CC(I,2)+OLDWT(J)*A(I,J)*2.
              VOLD = VOLD+OLDWT(I)*OLDWT(J)*A(I,J)
20        CONTINUE
10    CONTINUE
C *******     DELTA IS THE PERCENTAGE IMPROVEMENT IN VARIANCE *******
      DELTA = (VOLD - VNEW)/VNEW
      DELTA = DELTA * 10000.
C ******* IF THE OLD VARIANCE IS ZERO USE THE NEW PARTIALS TO SORT **
      KVAR = 2
      IF (VOLD.EQ.0) KVAR = 1

IBUY = 0
```

```
      ISELL = 0
      TURNOV = 0.0

DO 30 I = 1,NUM
        IF((X(I)-OLDWT(I)).GT.0.001) THEN
          IBUY = IBUY + 1
          BUY(IBUY) = I
        ELSE IF((X(I)-OLDWT(I)).LT.-0.001) THEN
          ISELL = ISELL +1
          SELL(ISELL) = I
        END IF
      TURNOV = TURNOV + ABS(X(I)-OLDWT(I))
30    CONTINUE

C ******  SORT BASED ON PARTIALS **************************************
C ******    SORT THE BUYS        **************************************
      DO 40 I = 1,IBUY-1
        DO 50 J = I+1,IBUY
          IF( CC(BUY(J),KVAR).LT.CC(BUY(I),KVAR)) THEN
            ITEMP = BUY(I)
            BUY(I) = BUY(J)
            BUY(J) = ITEMP
          END IF
50      CONTINUE
40    CONTINUE
C ******    SORT THE SELLS       **************************************
      DO 60 I = 1,ISELL-1
        DO 70 J = I+1,ISELL
        TEST = CC(SELL(J),KVAR) - CC(SELL(I),KVAR)
          IF (TEST .GT. 0) THEN
            ITEMP = SELL(I)
            SELL(I) = SELL(J)
            SELL(J) = ITEMP
          END IF
70      CONTINUE

60    CONTINUE

WRITE(10,*)
      WRITE(10,*)'                   TURNOVER = ',TURNOV*50,' %'
      WRITE(10,*)
      WRITE(10,*)'VARIANCE AT  OLD  WEIGHTS = ',VOLD*10000
      WRITE(10,*)'VARIANCE AT  NEW  WEIGHTS = ',VNEW*10000
      WRITE(10,*)'                      DELTA = ',DELTA/100,' %'
      WRITE(10,*)
      WRITE(10,*)

C ***********        WRITE THE BUYS       *******************

WRITE(10,*)'                    ***   BUY   ***'
      WRITE(10,102)('*',i=1,78)
      WRITE(10,*)'   *** WEIGHTS ***  SPAN   SIC',
```

```
      &              '     SYMBOL    SECURITY'
      WRITE(10,*)'    OLD   NEW   DELTA   SENSIT CODE',
      &              '  IDC TICK    NAME'
      WRITE(10,102)('*',i=1,78)

DO 80 I = 1,IBUY
      XOLD = OLDWT(BUY(I))*100
      XNEW = X(BUY(I))*100
      WRITE(10,101) XOLD,XNEW,XNEW-XOLD,CC(BUY(I),KVAR)*1000,
      &             ISIC(BUY(I)),IDC(BUY(I)),NAME(BUY(I))
80    CONTINUE

WRITE(10,*)
      WRITE(10,*)
      WRITE(10,*)
C ************        WRITE THE SELLS      *********************
      WRITE(10,*)'                         ***   SELL   ***'
      WRITE(10,102)('*',i=1,78)
      WRITE(10,*)'   *** WEIGHTS ***   SPAN   SIC',
      &              '     SYMBOL    SECURITY'
      WRITE(10,*)'    OLD   NEW   DELTA   SENSIT CODE',
      &              '  IDC TICK    NAME'
      WRITE(10,102)('*',i=1,78)

DO 90 I = 1,ISELL
      XOLD = OLDWT(SELL(I))*100
      XNEW = X(SELL(I))*100
      WRITE(10,101) XOLD,XNEW,XNEW-XOLD,CC(SELL(I),KVAR)*1000,
      &             ISIC(SELL(I)),IDC(SELL(I)),NAME(SELL(I))
90    CONTINUE

101   FORMAT(1X,4F7.3,I4,4X,A9,2X,A30)
102   FORMAT(1X,80A1)

C ******   WRITE OUT THE INDUSTRY WEIGHTS   ************************
      CALL INDUST
      WRITE(10,*)
      WRITE(10,*)
      WRITE(10,*)'         *** INDUSTRY WEIGHTINGS ***'
      WRITE(10,102)('*',i=1,78)
      WRITE(10,*)' CODE            INDUSTRY              WEIGHT'
      WRITE(10,102)('*',i=1,78)

DO 133 I = 1,99
         CUM(I) = 0.0
         DO 134 J = 1,NUM
         IF (ISIC(J).EQ.I) CUM(I) = CUM(I) + X(J)
134      CONTINUE
         IF (CUM(I).GT. 0.001) THEN
            WRITE(10,135) I,SIC(I),CUM(I)*100.
         END IF
133   CONTINUE
```

```
135   FORMAT(1X,I5,3X,A30,F10.2,' %')

SUMWGHT = 0.0
      DO 136 I = 1,NUM
        SUMWGHT = SUMWGHT + X(I)
136   CONTINUE
      WRITE(10,137)'                      TOTAL   =    ',SUMWGHT*100
137   FORMAT(1X,A38,F10.2,' %')

ENDFILE(10)
      CLOSE(10)
      RETURN
      END
C***************    END OF SUBROUTINE  BAL      *****************
C     ****************************************************************
      SUBROUTINE INDUST
C     ****************************************************************
      INCLUDE 'COMMON.F'

SIC(1)  = 'AGRICULTURAL PRODUCTION-CROPS'
      SIC(2)  = 'AGRICULTURAL PROD.-LIVESTOCK'
      SIC(7)  = 'AGRICULTURAL SERVICES'
      SIC(8)  = 'FORESTRY'
      SIC(9)  = 'FISHING HUNTING AND TRAPPING'
      SIC(10) = 'METAL MINING'
      SIC(11) = 'ANTHRACITE MINING'
      SIC(12) = 'BITUMINOUS COAL & LIGNITE MIN.'
      SIC(13) = 'OIL & GAS EXTRACTION'
      SIC(14) = 'MIN. & QUARRY. OF NONMET. MIN.'
      SIC(15) = 'BUILD. CONST.-G. C. & O. B.'
      SIC(16) = 'CONST. OTH THAN B.C.-G.C.'
      SIC(17) = 'CONST.-SPEC. TRADE CONT.'
      SIC(20) = 'FOOD KINDRED PRODUCTS'
      SIC(21) = 'TOBACCO MANUFACTURERS'
      SIC(22) = 'TEXTILE MILL PRODUCTS'
      SIC(23) = 'APP. & OTH. FIN. PROD. MFFAOSM'
      SIC(24) = 'LUMBER & WOOD PROD. EX. FURN.'
      SIC(25) = 'FURNITURE AND FIXTURES'
      SIC(26) = 'PAPER AND ALLIED PRODUCTS'
      SIC(27) = 'PRINTING PUBLISHING AND A.P.'
      SIC(28) = 'CHEMICAL AND ALLIED PROD.'
      SIC(29) = 'PETROLEUM REFIN. & REL. PROD.'
      SIC(30) = 'RUBBER AND MISC. PLAST. PROD.'
      SIC(31) = 'LEATHER & LEATHER PRODUCTS'
      SIC(32) = 'STONE CLAY GLASS & CONC. PROD.'
      SIC(33) = 'PRIMARY METAL INDUSTRIES'
      SIC(34) = 'FAB. METAL PROD. EX. M.&T.E.'
      SIC(35) = 'MACHINERY EXCEPT ELECTRICAL'
      SIC(36) = 'ELE. AND ELE. MACH.'
      SIC(37) = 'TRANSPORTATIONS EQUIPMENT'
```

22

```
SIC(38) = 'MEAS. ANAL. & CONT. INST. ETC.'
SIC(39) = 'MISC. MANUFACTURING IND.'
SIC(40) = 'RAILROAD TRANS.'
SIC(41) = 'LOC. AND SUB. TRANS. & HPT'
SIC(42) = 'MOTOR FREIGHT TRANS. AND WARE.'
SIC(43) = 'U.S. POSTAL SERVICE'
SIC(44) = 'WATER TRANSPORTATION'
SIC(45) = 'TRANSPORTATION BY AIR'
SIC(46) = 'PIPE LINES EX. NATURAL GAS'
SIC(47) = 'TRANSPORTATION SERVICES'
SIC(48) = 'COMMUNICATION'
SIC(49) = 'ELECTRIC GAS AND SANIT. SERV.'
SIC(50) = 'WHOLESALE TRADE-DURABLE GOODS'
SIC(51) = 'WHOLESALE TRADE-NONDUR. GOODS'
SIC(52) = 'BUILDING MAT. HARD. GAR. SUPP.'
SIC(53) = 'GENERAL MERCH. STORES'
SIC(54) = 'FOOD STORES'
SIC(55) = 'AUTOMOTIVE DEAL AND GAS. SS'
SIC(56) = 'APPAREL AND ACCESS. STORES'
SIC(57) = 'HOME FURN. AND EQUIP. STORES'
SIC(58) = 'EATING AND DRINKING PLACES'
SIC(59) = 'MISCELLANEOUS RETAIL'
SIC(60) = 'BANKING'
SIC(61) = 'CRED. AGEN. OTH. THAN BANKS.'
SIC(62) = 'SEC. AND COMM. BROK. DEEXSE'
SIC(63) = 'INSURANCE CARRIERS'
SIC(64) = 'INS. AGENTS BROK. SERV.'
SIC(65) = 'REAL ESTATE'
SIC(66) = 'COMB. RE INS. LOANS & LAW OFF.'
SIC(67) = 'HOLD. AND OTHER INV. COMP.'
SIC(70) = 'HOTELS ROOM. HOUSES CAMP AOLP'
SIC(72) = 'PERSONAL SERVICES'
SIC(73) = 'BUSINESS SERVICES'
SIC(75) = 'AUTO. REPAIR SERV. AND GAR.'
SIC(76) = 'MISC. REPAIR SERVICES'
SIC(78) = 'MOTION PICTURES'
SIC(79) = 'AMUSE. AND REC. SERV. EX. MP'
SIC(80) = 'HEALTH SERVICES'
SIC(81) = 'LEGAL SERVICES'
SIC(82) = 'EDUCATIONAL SERVICES'
SIC(83) = 'SOCIAL SERVICES'
SIC(84) = 'MUSEUM ART GALL. BOT. Z.G.'
SIC(86) = 'NONPROFIT MEM. ORGAN.'
SIC(89) = 'MISCELLANEOUS SERVICES'
SIC(91) = 'EXEC. LEG. & GOVT EX. FIN.'
SIC(92) = 'JUSTICE PUBLIC SAFETY'
SIC(93) = 'PUB. FIN. TAX. & MON. POLICY'
SIC(94) = 'ADMIN. OF HUMAN RES. PROGRAMS'
SIC(95) = 'ADMIN. OF QUAL. & HOUS. PROG.'
SIC(96) = 'ADMIN. OF ECONOMIC PROGRAMS'
SIC(97) = 'NATIONAL SEC. & INTL AFFAIRS'
SIC(99) = 'NONCLASSIFIABLE ESTABLISHMENTS'
```

23

```
      RETURN
      END
C***************   END OF SUBROUTINE  INDUST    *****************
C  UPDATED December 6, 1988
****************************************************************
      SUBROUTINE INTRO
****************************************************************
* **
* **   THIS ROUTINE INTRODUCES THE SPANNING PROGRAM AND
* **   ASKS FOR SCREEN OR FILE INPUT OPTION
* **
      INCLUDE 'COMMON.F'

INTEGER RESPON

PARAMETER (MAXTXT = 50,LINES = 24)
      CHARACTER HEAD*(MAXTXT),LAST*(MAXTXT),OPTION(LINES)*(MAXTXT)

HEAD = '    WELCOME  TO  THE  NISA  SPANNING  OPTIMIZER'

NBROPT = 2
      OPTION (1) = 'SINGLE RUN WITH WEIGHTS IN FILE: OLD'
      OPTION (2) = 'UPDATE RUN WITH WEIGHTS CALCUATED FROM HOLDINGS'

LAST = ' '

10    CALL MENU(LINES,HEAD,LAST,NBROPT,OPTION,RESPON)

IF (RESPON.EQ.1) THEN
         IHOLD = 0
         CALL REDPAST

ELSE IF (RESPON.EQ.2) THEN
         IHOLD = 1
         CALL REDPAST

ELSE
         WRITE(*,*)'NO OPTION SELECTED - PLEASE TRY AGAIN'
         GO TO 10

END IF

C     RETURN
      END
*****************   END OF SUBROUTINE  INTRO    *****************
****************************************************************
      SUBROUTINE REDPAST
****************************************************************
C     TITLE         = TITLE FOR THIS RUN
C     FILEOUT       = OUTPUT FILE
C     LIABIN        = LIABILITY RETURNS FILE
C     STOCKIN       = STOCK RETURNS FILE
```

```
C       BONDIN          = BOND RETURNS FILE
C       NMSAVE          = FIRST MONTH OF SIMULATION
C       NSIMS           = NUMBER OF MONTHS TO SIMULATE
C       NSTOCKS         = NUMBER OF STOCK TO SEND TO OPTIMIZER
C       NBONDS          = NUMBER OF BONDS TO SEND TO OPTIMIZER
C       IDUMMY          = NUMBER OF STOCKS TO READ PAST IN STOCKIN
C       STOCKMIN        = MINIMUM HOLDING IN STOCKS
C       YIMAX           = INDUSTRY MAXIMUM HOLDING
C       SMAX            = SECURITY MAXIMUM HOLDING
C       BULLET          = CLIMBING FACTOR
C       TARGET          = ADJUSTMENT FACTOR FOR TARGET
C       TURN            = TURNOVER FACTOR
        INCLUDE 'COMMON.F'

PARAMETER (MAXTXT = 50,LINES = 24)

CHARACTER HEAD*(MAXTXT),LAST*(MAXTXT),OPTIONS(LINES)*(MAXTXT)
        CHARACTER*30 PAST
* **
* **       INITIALIZE READ IN FILE: PAST  =  'PAST.DAT'
* **
        PAST = 'PAST.DAT'
        WRITE(*,100)(' ',I = 1,5)
        WRITE(*,*)'   READING PAST DATA........'
        WRITE(*,100)(' ',I = 1,5)

5       OPEN (8,FILE = PAST, STATUS = 'OLD', ERR  =  10)
        READ(8,101)TITLE
        READ(8,101)FILEOUT
        READ(8,101)LIABIN
        READ(8,101)STOCKIN
        READ(8,101)BONDIN
        READ(8,102)NMSAVE
        READ(8,102)NSIMS
        READ(8,102)NSTOCKS
        READ(8,102)NBONDS
        READ(8,102)IDUMMY
        READ(8,103)STOCKMIN
        READ(8,103)YIMAX
        CLOSE (8)
        RETURN

10      CONTINUE

* **       GIVE OPTION TO READ FROM SCREEN WITHOUT DUMPING OUT OF
* **       PROGRAM OR TO READ FROM DIFFERENT FILE NAME

HEAD = '... WARNING: THE PAST DATA FILE DOES NOT EXIST'
        LAST = '                          ( CTRL-C TO ABORT )'
        NBROPT = 2
        OPTIONS(1) = 'INPUT NEW NAME FOR PAST DATA FILE'
        OPTIONS(2) = 'READ IN NEW DATA FROM SCREEN '
```

```
20      CALL MENU (LINES,HEAD,LAST,NBROPT,OPTIONS,IRESPON)

IF ( IRESPON.EQ.1) THEN
           WRITE(*,100)(' ',I = 1,5)
           WRITE(*,104)
           READ(*,'(A30)',END = 20,ERR = 20) PAST
           GO TO 5

ELSE IF (IRESPON.EQ.2) THEN
           CALL REDSCRN
           RETURN

END IF

RETURN

100     FORMAT('0',A1)
101     FORMAT(A35)
102     FORMAT(I4)
103     FORMAT(F7.2)
104     FORMAT(' NAME FOR PAST DATA FILE --- ',$)

END

*****************    END OF SUBROUTINE  REDPAST    *****************

*****************************************************************
        SUBROUTINE REDSCRN
*****************************************************************

C       TITLE          = TITLE FOR THIS RUN
C       FILEOUT        = OUTPUT FILE
C       LIABIN         = LIABILITY RETURNS FILE
C       STOCKIN        = STOCK RETURNS FILE
C       BONDIN         = BOND RETURNS FILE
C       NMSAVE         = FIRST MONTH OF SIMULATION
C       NSIMS          = NUMBER OF MONTHS TO SIMULATE
C       NSTOCKS        = NUMBER OF STOCK TO SEND TO OPTIMIZER
C       NBONDS         = NUMBER OF BONDS TO SEND TO OPTIMIZER
C       IDUMMY         = NUMBER OF STOCKS TO READ PAST IN STOCKIN
C       STOCKMIN       = MINIMUM HOLDING IN STOCKS
C       YIMAX          = INDUSTRY MAXIMUM HOLDING

INCLUDE 'COMMON.F'

* **    DEFAULT NAMES FOR STOCK AND BOND FILES
* **       STOCKS.PRN    &   BONDS.PRN

WRITE(*,113)(' ',I = 1,12)
```

```
113     FORMAT('0',A1)

1       WRITE(*,101)
101     FORMAT(' 1) ENTER TITLE FOR SPANNING RUN       -  ',$)
        READ(*,'(A30)',END = 1,ERR = 1) TITLE
        WRITE(*,*)

2       WRITE(*,102)
102     FORMAT(' 2) ENTER OUTPUT FILE NAME             -  ',$)
        READ(*,'(A30)',END = 2,ERR = 2) FILEOUT
        WRITE(*,*)

3       WRITE(*,103)
103     FORMAT(' 3) ENTER LIABILITY RETURNS FILE NAME  -  ',$)
        READ(*,'(A30)',END = 3,ERR = 3) LIABIN
        WRITE(*,*)

4       WRITE(*,104)
104     FORMAT(' 4) ENTER STOCK RETURNS FILE NAME      -  ',$)
        READ(*,'(A30)',END = 4,ERR = 4) STOCKIN
        IF (STOCKIN.EQ.' ')STOCKIN = 'STOCKS.PRN'
        WRITE(*,*)

5       WRITE(*,105)
105     FORMAT(' 5) ENTER BOND RETURNS FILE NAME       -  ',$)
        READ(*,'(A30)',END = 5,ERR = 5) BONDIN
        IF (BONDIN.EQ.' ')BONDIN = 'BONDS.PRN'
        WRITE(*,*)

6       WRITE(*,*)' 6) ENTER YEAR AND MONTH TO BEGIN         '
        WRITE(*,106)
106     FORMAT('    SIMULATION (e.g. FEB 1987 = 8702) -  ',$)
        READ(*,*,END = 6,ERR = 6) NMSAVE
        WRITE(*,*)

7       WRITE(*,107)
107     FORMAT(' 7) ENTER NUMBER OF MONTHS TO SIMULATE -  ',$)
        READ(*,*,END = 7,ERR = 7) NSIMS
        WRITE(*,*)

8       WRITE(*,108)
108     FORMAT(' 8) ENTER NUMBER OF  STOCKS  TO USE    -  ',$)
        READ(*,*,END = 8,ERR = 8) NSTOCKS
        WRITE(*,*)

9       WRITE(*,109)
109     FORMAT(' 9) ENTER NUMBER OF  BONDS  TO USE     -  ',$)
        READ(*,*,END = 9,ERR = 9) NBONDS
        WRITE(*,*)

10      WRITE(*,110)
110     FORMAT('10) ENTER NUMBER OF STOCKS READ PAST   -  ',$)
```

```
        READ(*,*,END =10,ERR = 10) IDUMMY
        WRITE(*,*)

11      WRITE(*,111)
111     FORMAT('11) ENTER MINIMUM STOCK HOLDING      - % ',$)
        READ(*,*,END = 11,ERR = 11) STOCKMIN
        WRITE(*,*)

12      WRITE(*,112)
112     FORMAT('12) ENTER MAXIMUM INDUSTRY HOLDING   - % ' ,$)
        READ(*,*,END = 12,ERR = 12) YIMAX
        WRITE(*,*)

RETURN

100     FORMAT(A35)

END
******************    END OF SUBROUTINE  REDSCRN    *****************

***********************************************************************
        SUBROUTINE MODIFY
***********************************************************************
* **
* **   THIS ROUTINE MODIFIES THE INPUT DATA IF NECESSARY
* **

INCLUDE 'COMMON.F'

10      WRITE(*,100)(' ',I = 1,5)

WRITE(*,*)'********   CURRENTLY SELECTED PARAMETERS   ********'
******************    DISPLAY SELECTED PARAMETERS   *******************
        CALL DISPLAY
        IRESPON = 0
        WRITE(*,120)
        READ(*,'(I2)',END = 20,ERR = 10) IRESPON

IF(IRESPON.EQ.0) THEN
           RETURN

ELSE IF (IRESPON .EQ. 1 ) THEN
201        WRITE(*,121)
           READ(*,'(A30)',END = 201, ERR = 201) TITLE

ELSE IF (IRESPON.EQ.2) THEN
202        WRITE(*,122)
           READ(*,'(A30)',END = 202, ERR = 202) FILEOUT

ELSE IF (IRESPON.EQ.3) THEN
203        WRITE(*,123)
           READ(*,'(A30)',END = 203, ERR = 203) LIABIN
```

```
      ELSE IF (IRESPON.EQ.4) THEN
204      WRITE(*,124)
         READ(*,'(A30)',END = 204, ERR = 204) STOCKIN

ELSE IF (IRESPON.EQ.5) THEN
205      WRITE(*,125)
         READ(*,'(A30)',END = 205, ERR = 205) BONDIN

ELSE IF (IRESPON.EQ.6) THEN
206      WRITE(*,126)
         READ(*,*,END = 206, ERR = 206) NMSAVE

ELSE IF (IRESPON.EQ.7) THEN
207      WRITE(*,127)
         READ(*,*,END = 207, ERR = 207) NSIMS

ELSE IF (IRESPON.EQ.8) THEN
208      WRITE(*,128)
         READ(*,*,END = 208, ERR = 208) NSTOCKS

ELSE IF (IRESPON.EQ.9) THEN
209      WRITE(*,129)
         READ(*,*,END = 209, ERR = 209) NBONDS

ELSE IF (IRESPON.EQ.10) THEN
210      WRITE(*,130)
         READ(*,*,END = 210, ERR = 210) IDUMMY

ELSE IF (IRESPON.EQ.11) THEN
211      WRITE(*,131)
         READ(*,*,END = 211, ERR = 211) STOCKMIN

ELSE IF (IRESPON.EQ.12) THEN
212      WRITE(*,132)
         READ(*,*,END = 212, ERR = 212) YIMAX

ELSE IF (IRESPON.EQ.13) THEN
213      WRITE(*,133)
         READ(*,*,END = 213, ERR = 213) SMAX

ELSE IF (IRESPON.EQ.14) THEN
214      WRITE(*,134)
         READ(*,*,END = 214, ERR = 214) NSTAT

ELSE IF (IRESPON.EQ.15) THEN
215      WRITE(*,135)
         READ(*,*,END = 215, ERR = 215) NRETS

ELSE IF (IRESPON.EQ.16) THEN
216      WRITE(*,136)
         READ(*,*,END = 216, ERR = 216) BULLET
```

```
          ELSE IF (IRESPON.EQ.17) THEN
217          WRITE(*,137)
             READ(*,*,END = 217, ERR = 217) TARGET

ELSE IF (IRESPON.EQ.18) THEN
218          WRITE(*,138)
             READ(*,*,END = 218, ERR = 218) TURN

END IF

GO TO 10

20        RETURN

100       FORMAT('0',A1)
120       FORMAT('0',' ENTER NUMBER TO MODIFY   <ENTER> TO CONTINUE: ',$)
121       FORMAT('0',' ENTER SPANNING RUN TITLE              ',$)
122       FORMAT('0',' ENTER FILENAME FOR OUTPUT             ',$)
123       FORMAT('0',' ENTER LIABILITY STREAM FILE           ',$)
124       FORMAT('0',' ENTER STOCK RETURN FILE               ',$)
125       FORMAT('0',' ENTER BOND RETURN FILE                ',$)
126       FORMAT('0',' ENTER MONTH TO BEGIN SIMULATION       ',$)
127       FORMAT('0',' ENTER NUMBER OF MONTHS TO SIMULATE    ',$)
128       FORMAT('0',' ENTER NUMBER OF STOCKS                ',$)
129       FORMAT('0',' ENTER NUMBER OF BONDS                 ',$)
130       FORMAT('0',' ENTER STOCKS TO READ PAST             ',$)
131       FORMAT('0',' ENTER MINIMUM TOTAL STOCK HOLDING    % ',$)
132       FORMAT('0',' ENTER MAXIMUM INDUSTRY HOLDING       % ',$)
133       FORMAT('0',' ENTER MAXIMUM SINGLE STOCK HOLDING   % ',$)
134       FORMAT('0',' ENTER NSTAT                           ',$)
135       FORMAT('0',' ENTER NRETS                           ',$)
136       FORMAT('0',' ENTER BULLET                          ',$)
137       FORMAT('0',' ENTER TARGET                          ',$)
138       FORMAT('0',' ENTER TURNOVER FACTOR                 ',$)
          END

*****************   END OF SUBROUTINE  MODIFY    *****************
**********************************************************************
          SUBROUTINE DISPLAY
**********************************************************************
* **
* **   THIS ROUTINE DISPLAYS SELECTED PARAMETERS FOR SPANNING RUN
* **

INCLUDE 'COMMON.F'

WRITE(*,100)
          WRITE(*,101) TITLE
          WRITE(*,102) FILEOUT
          WRITE(*,103) LIABIN
          WRITE(*,104) STOCKIN
```

```
      WRITE(*,105) BONDIN
      WRITE(*,106) NMSAVE
      WRITE(*,107) NSIMS
      WRITE(*,108) NSTOCKS
      WRITE(*,109) NBONDS
      WRITE(*,110) IDUMMY
      WRITE(*,111) STOCKMIN
      WRITE(*,112) YIMAX
      WRITE(*,113) SMAX
      WRITE(*,114) NSTAT
      WRITE(*,115) NRETS
      WRITE(*,116) BULLET
      WRITE(*,117) TARGET
      WRITE(*,118) TURN

RETURN

100   FORMAT('0',A1)
101   FORMAT(1X,' 1) SPANNING RUN TITLE              ', A30)
102   FORMAT(1X,' 2) OUTPUT FILENAME                 ', A30)
103   FORMAT(1X,' 3) LIABILITY STREAM FILE           ', A30)
104   FORMAT(1X,' 4) STOCK RETURN FILE               ', A30)
105   FORMAT(1X,' 5) BOND RETURN FILE                ', A30)
106   FORMAT(1X,' 6) MONTH TO BEGIN SIMULATION       ',  I6)
107   FORMAT(1X,' 7) NUMBER OF MONTHS TO SIMULATE    ',  I6)
108   FORMAT(1X,' 8) NUMBER OF STOCKS                ',  I6)
109   FORMAT(1X,' 9) NUMBER OF BONDS                 ',  I6)
110   FORMAT(1X,'10) STOCKS TO READ PAST             ',  I6)
111   FORMAT(1X,'11) MINIMUM STOCK HOLDING         % ',F6.2)
112   FORMAT(1X,'12) MAXIMUM INDUSTRY HOLDING      % ',F6.2)
113   FORMAT(1X,'13) MAXIMUM SINGLE STOCK HOLDING  % ',F6.2)
114   FORMAT(1X,'14) NSTAT                           ',  I6)
115   FORMAT(1X,'15) NRETS                           ',  I6)
116   FORMAT(1X,'16) BULLET                         ',F6.2)
117   FORMAT(1X,'17) TARGET                         ',F6.2)
118   FORMAT(1X,'18) TURNOVER FACTOR                ',F6.2)
      END
***************   END OF SUBROUTINE  DISPLAY   *****************

**********************************************************************
      SUBROUTINE SAVDAT
**********************************************************************
* **
* **   THIS ROUTINE SAVE THE FILE FOR LATER USE
* **
      INCLUDE 'COMMON.F'

C     WRITE(*,100)(' ',I = 1,7)
      WRITE(*,104)'   SAVING DATA TO FILE:   PAST.DAT  .......'
C     WRITE(*,100)(' ',I = 1,5)
```

```
      OPEN(8,FILE = 'PAST.DAT',STATUS = 'OLD')
      WRITE(8,101)TITLE
      WRITE(8,101)FILEOUT
      WRITE(8,101)LIABIN
      WRITE(8,101)STOCKIN
      WRITE(8,101)BONDIN
      WRITE(8,102)NMSAVE
      WRITE(8,102)NSIMS
      WRITE(8,102)NSTOCKS
      WRITE(8,102)NBONDS
      WRITE(8,102)IDUMMY
      WRITE(8,103)STOCKMIN
      WRITE(8,103)YIMAX
      CLOSE (8)

RETURN

100   FORMAT('0',A1)
101   FORMAT(A35)
102   FORMAT(I4)
103   FORMAT(F7.2)
104   FORMAT('+',A50)

END

***************** END OF SUBROUTINE SAVDAT *****************

C***********************************************************************
      SUBROUTINE MENU (LINES,HEADER,LAST,NBROPT,OPTION,RESPON)
C***********************************************************************

* **
* **  PURPOSE: TO PRINT A MENU AND READ RESPONSE
* **
* **
* **
* **  VARIABLE DEFINITIONS
* **  LINES        LINESIZE OF SCREEN
* **  HEADER       TITLE LINE FOR MENU
* **  LAST         LAST LINE OF MENU
* **  NBROPT       NUMBER OF OPTIONS
* **  OPTION       LIST OF OPTIONS
* **               DIMENSIONED OPTION(*)*(*) SO LENGTH
* **               OF CHARACTER STRINGS AND ARRAY SENT BY
* **               CALLING PROGRAM
* **  RESPON       NUMERIC RESPONSE
* **  I            MISCELLANEOUS INDEX
* **  IMAX         NUMBER OF BLANK LINES, TOP AND BOTTOM
* **
* **
* **  OVERALL SPECIFICATIONS
      IMPLICIT REAL (A-Z)
```

```
      INTEGER MAXTXT
      PARAMETER (MAXTXT = 50)
* **
* **  CALL SPECIFICATIONS
      CHARACTER OPTION(*)*(MAXTXT),HEADER*(MAXTXT),LAST*(MAXTXT)
      INTEGER NBROPT,RESPON,LINES
* **
* **  LOCAL SPECIFICATIONS
      INTEGER I,IMAX
* **
* **
* **  PRINT BLANK UPPER SCREEN
      IMAX = (LINES-NBROPT-7)/2+1
      IF (IMAX.LT.0) THEN
         WRITE(*,*)'TOO MANY OPTIONS TO FIT SCREEN SIZE'
         STOP
      END IF
5     DO 10 I = 1,IMAX
10    WRITE(*,*)' '
* **
* **  PRINT MENU
      WRITE(*,*)HEADER
      WRITE(*,*)' '

DO 20 I = 1,NBROPT
      WRITE(*,'(1X,I2,2H ),$)') I
      WRITE(*,*)OPTION(I)
20    CONTINUE

WRITE(*,*) LAST
* **
* **  BLANK OUT REST OF SCREEN
      DO 25 I = 1,IMAX
25    WRITE(*,*)' '
* **
* **  REQUEST RESPONSE
      WRITE(*,*)' '
      WRITE(*,*)' '
30    WRITE(*,999)
999   FORMAT(' SELECT NUMBER OF OPTION ---> ',$)
* **  RESPONSE SET TO ZERO IN CASE OF CARRIAGE RETURN
      RESPON = 0
      READ (*,'(I2)',END = 40,ERR = 5) RESPON
      IF (RESPON.LT.0.OR.RESPON.GT.NBROPT) THEN
         WRITE(*,*)' OPTION OUT OF RANGE'
         GO TO 30
      END IF
40    RETURN
      END
C****************    END OF SUBROUTINE  MENU     *****************
C ****************************************************************
      SUBROUTINE QUAD1 (A,KT,RHS,COST,QUAD,INPUT,TOL,TITLE,PFILE,
```

```
*    OBJ,X,RC,DUAL,SLK,IOUT,WS)
C
C          SUBROUTINE QUADPR FOR QUADRATIC PROGRAMMING PROGRAMS
C
C          QUADPR MINIMIZES OR MAXIMIZES   COST*X + X*QUAD*X
C                  SUBJECT TO     A*X + KT*'SLACK' = RHS
C                                         X .GE. 0.
C                  (KT(I)=-1,0,+1 IF I-TH CONSTRAINT IS .GE.,.EQ.,.LE.)
C                  THE OBJECTIVE FUNCTION SHOULD BE CONVEX (CONCAVE)
C                  FOR MINIMIZATION (MAXIMIZATION) PROBLEMS.
C                  THIS MEANS THE SYMMETRIC MATRIX QUAD+QUAD(TRANSPOSE)
C                  SHOULD BE NONNEGATIVE (NONPOSITIVE) DEFINITE
C                  FOR MINIMIZATION (MAXIMIZATION) PROBLEMS.
C
C    CALLING SEQUENCE ...
C    CALL QUADPR (A,KT,RHS,COST,QUAD,INPUT,TOL,TITLE,PFILE,
C    *    OBJ,X,RC,DUAL,SLK,IOUT,WS)
C
C    IN WHAT FOLLOWS, MO = NO. OF CONSTRAINTS, NO = NO. OF VARIABLES,
C    DIMENSION SIZES GIVEN ARE THE MINIMUM REQUIRED.
C
C A      --- MO X NO - CONSTRAINT MATRIX
C KT     --- MO-VECTOR OF CONSTRAINT TYPES,  -1,0,+1 MEAN .GE.,.EQ.,.LE.
C              RESPECTIVELY
C RHS    --- MO-VECTOR OF RIGHT-HAND-SIDE VALUES
C COST   --- NO-VECTOR OF LINEAR COSTS
C QUAD   --- NO X NO MATRIX OF QUADRATIC COSTS
C INPUT  --- FIXED CONSTANTS VECTOR OF LENGTH 21 CONTAINING ...
C ML       1 ROW DIMENSION OF A IN CALLING PROGRAM. MINIMUM IS MO.
C NL       2 ROW DIMENSION OF QUAD IN CALLING PROGRAM. MINIMUM IS NO.
C MO       3 NUMBER OF CONSTRAINTS.
C NO       4 NUMBER OF VARIABLES .
C MINMAX   5 =0 IF OBJECTIVE IS TO BE MINIMIZED,
C            =1 IF OBJECTIVE IS TO BE MAXIMIZED.
C LENWS    6 DIMENSION OF WS IN CALLING PROGRAM.  MINIMUM IS
C            2*(MO+NO)**2 + 12*(MO+NO) + 16 IF ANY EQUALITY CONSTRAINTS
C            ARE PRESENT OR  2*(MO+NO)**2 +  8*(MO+NO) + 6
C            IF ALL CONSTRAINTS ARE INEQUALITIES.
C MAXIT    7 PIVOT LIMIT.
C KOBJ     8 COMPUTE OBJECTIVE AT SOLUTION OPTION.  =0 NO, =1 YES.
C JIT      9 OUTPUT PROBLEM PARAMETERS OPTION.   =0 NO, =1 YES.
C JDATA   10 OUTPUT PROBLEM DATA OPTION.  =0 NO,
C            =1 OUTPUT WITH A AND QUAD MATRICES IN DENSE FORM,
C            =2 OUTPUT WITH A AND QUAD MATRIX IN SPARSE FORM.
C JPIVOT  11 OUTPUT PIVOT INFORMATION.  =0 NO, =1 YES.
C JSOL    12 OUTPUT SOLUTION REPORT OPTION.  =0 NO,
C            =1 OUTPUT BRIEF REPORT,  =2 OUTPUT FULL REPORT.
C JOUT    13 OPTION TO PRINT OR FILE OUTPUT.
C            =0 PRINT ALL OUTPUT,  =1 PRINT PROBLEM PARAMETERS AND FINAL
C            OUTPUT AND FILE OTHER OUTPUT, =2 FILE ALL OUTPUT.
C JWIDTH  14 MAXIMUM WIDTH OF OUTPUT LINES.  A MINIMUM OF 72 AND A
C            MAXIMUM OF 132 WILL BE USED.
```

```
C
C TOL     --- TOLERANCE VECTOR OF SIZE 2 CONTAINING...
C TZERO   1 ROUND-OFF OR ZERO TOLERANCE. IF .LE. 0 RESET TO 1.E-7
C TPIV    2 PIVOT TOLERANCE. IF .LE. 0 RESET TO 1.E-6
C
C TITLE   --- TITLE PRINTED IN OUTPUT. TYPE CHARACTER.
C             MAY CONTAIN UP TO 64 CHARACTERS.
C             TRUNCATED TO 64 CHARACTERS IF LONGER.
C PFILE   --- FILE NAME QUADPR WRITES OUTPUT ONTO IF REQUESTED.
C             TYPE CHARACTER. MAY CONTAIN UP TO 64 CHARACTERS.
C             IF FILE CANNOT BE OPENED, A FILE WILL BE CREATED
C             AND A MESSAGE PRINTED. IF THE NAME IS ALL BLANKS,
C             OUTPUT TO BE FILED WILL BE DISCARDED.
C OBJ     --- OBJECTIVE VALUE.
C X       --- NO-VECTOR THAT WILL CONTAIN THE SOLUTION.
C RC      --- NO-VECTOR THAT WILL CONTAIN THE REDUCED COSTS.
C DUAL    --- MO-VECTOR THAT WILL CONTAIN THE DUAL SOLUTION.
C SLK     --- MO-VECTOR THAT WILL CONTAIN THE SLACK VALUES.
C IOUT    --- VECTOR OF SIZE 2, THAT WILL CONTAIN...
C IERR    1 STATUS CODE FROM 1 TO 6.
C             1 - SOLUTION IS OPTIMAL.
C             2 - NO SOLUTION.
C             3 - PIVOT LIMIT REACHED.
C             4 - INVALID QUAD MATRIX.
C             5 - PROBLEM DATA ERROR.
C             6 - ALGORITHM ERROR.
C ITCNT   2 NUMBER OF PIVOTS.
C
C WS      --- WORK SPACE ARRAY OF SIZE AT LEAST
C             2*(MO+NO)**2 + 12*(MO+NO) + 16 IF ANY EQUALITY CONSTRAINTS
C             ARE PRESENT OR 2*(MO+NO)**2 + 8*(MO+NO) + 6
C             IF ALL CONSTRAINTS ARE INEQUALITIES.
C
      IMPLICIT REAL (A-H,O-Z)

DIMENSION A(1),KT(1),RHS(1),COST(1),QUAD(1),INPUT(1),
     1   TOL(1),X(1),RC(1),DUAL(1),SLK(1),IOUT(1),WS(1)
      CHARACTER*64 TITLE,PFILE
C
      INTEGER ROW,COL,INDX,MORE,P,P1,PSQ
      COMMON /QPRCBI/ INPUTS(14),IOUTS(2),ROW,COL,INDX,MORE,P,P1,PSQ,
     1   NCALL,LENREQ,IO1,IO2,IO3
      EQUIVALENCE (INPUTS(1),ML), (INPUTS(2),NL), (INPUTS(3),MO),
     1   (INPUTS(4),NO), (INPUTS(5),MINMAX), (INPUTS(6),LENWS),
     2   (INPUTS(7),MAXIT), (INPUTS(8),KOBJ), (INPUTS(9),JIT),
     3   (INPUTS(10),JDATA), (INPUTS(11),JPIVOT), (INPUTS(12),JSOL),
     4   (INPUTS(13),JOUT), (INPUTS(14),JWIDTH),
     5   (IOUTS(1),IERR), (IOUTS(2),ITCNT)
C
      COMMON /QPRCBR/ TOLS(2)
      EQUIVALENCE (TOLS(1),TZERO), (TOLS(2),TPIV)
C
```

```
      DOUBLE PRECISION  PIVOT
      COMMON /QPRCBD/ PIVOT
C
      CHARACTER*64  TITLES, PFILES
      COMMON /QPRCBC/ TITLES, PFILES
C
C     DATA NCALL / 0 /

NCALL = 0
C
C     OUTPUT UNITS FOR LINE PRINTER (TERMINAL) AND OUTPUT FILE
      DATA   LUPRNT, LUFILE  / 6, 92 /
C
C
C     INITIALIZATIONS
C
      IO1 = LUPRNT
      IERR = 0
      ITCNT = 0
      TZERO = TOL(1)
      TPIV = TOL(2)
      NCALL = NCALL + 1
      DO 10 I = 1, 14
         INPUTS(I) = INPUT(I)
   10 CONTINUE
      TITLES =
     *'                                                              ',
C     L1 = LEN(TITLE)
      L1 = 30

TITLES(1:L1) = TITLE(1:L1)
C
C     INTERNAL TABLEAU IS (MO+NO)*(MO+NO+1) IF ALL INEQUALITIES AND
C     (MO+NO+1)*(MO+NO+2) IF ANY EQUALITIES SINCE 1 MORE ROW IS ADDED.
      IF (MO .LE. 0) GO TO 22
      DO 20 I = 1, MO
         IF (KT(I) .EQ. 0) GO TO 24
   20 CONTINUE
   22 CONTINUE
      MORE = 0
      GO TO 26
   24 CONTINUE
      MORE = 1
   26 CONTINUE
      P = MO + NO + MORE
      P1 = P + 1
      PSQ = P**2
C
C     SET OUTPUT UNITS AND OPEN PRINT FILE IF REQUIRED.
      IF (JOUT .NE. 1 .AND. JOUT .NE. 2) GO TO 80
      PFILES =
     *'                                                              ',
```

```
C       L1 = LEN(PFILE)
        L1 = 30

L2 = 0
        L3 = 0
        DO 30 I = 1, L1
           IF (PFILE(I:I) .EQ. ' ') GO TO 30
           L2 = L2 + 1
           PFILES(L2:L2) = PFILE(I:I)
     30 CONTINUE
        IF (L2 .GT. 0) GO TO 40
C       BLANK FILE NAME, DISCARD OUTPUT TO BE FILED.
        JDATA = 0
        JPIVOT = 0
        IF (JOUT .EQ. 2) GO TO 90
        JIT = 0
        JSOL = 0
        GO TO 50
C       OPEN PRINT FILE
     40 CONTINUE
C       OPEN (LUFILE,FILE=PFILES,STATUS='UNKNOWN',ERR=60)
        OPEN (LUFILE,FILE=PFILES)
        IO3 = LUFILE
        IF (JOUT .EQ. 1) GO TO 50
        IO2 = LUFILE
        GO TO 90
     50 CONTINUE
        IO2 = LUPRNT
        GO TO 90
C       CANNOT OPEN FILE. MAKE ONE UP.
     60 CONTINUE
        IF (L3 .EQ. 1) GO TO 76
        L3 = 1
        WRITE (IO1,70) NCALL,PFILES(1:L2)
     70 FORMAT ( ///// 5X,'QUADPR  CALL',I4
       1          // 1X,'*** UNABLE TO OPEN THE FILE ', A)
        WRITE (PFILES,72) NCALL
C       FORM FILE NAME.
     72 FORMAT ('QDPR',I4.4,'.LIS',52X)
        WRITE (IO1,74) PFILES(1:12)
     74 FORMAT ( / 5X,'OUTPUT WILL BE FILED ON ',A12)
        GO TO 40
C       CANNOT OPEN THIS FILE EITHER.
     76 CONTINUE
        WRITE (IO1,78) LUFILE
     78 FORMAT ( / 5X,'CANNOT OPEN THIS FILE EITHER.  CHECK YOUR FILES ',
       1  'FOR THE ABOVE NAME' / 5X,'AND MAKE SURE LOGICAL UNIT',I4,
       2  ' IS CLOSED.' / )
        IERR = 5
        GO TO 200
     80 CONTINUE
        IO2 = LUPRNT
```

```
      I03 = LUPRNT
   90 CONTINUE
C
C     PARTITION WORKSPACE ARRAY.
      L1 = 1 + 2*(PSQ+P)
      L2 = L1 + 2*P1
      L3 = L2 + 2*P1
      L4 = L3 + P1
      LENREQ = L4 + P1 - 1
C
C     CHECK INPUT DATA PARAMETERS FOR CONSISTENCY
      CALL QDRVER (KT)
C
      IF (IERR .EQ. 5) GO TO 200
C     QUIT IF BAD VALUES (IERR = 5)
C
C     OUTPUT PROBLEM PARAMETERS AND PROBLEM DATA IF REQUESTED.
      IF (JIT .NE. 0) CALL QRPRT1
      IF (JDATA .NE. 0) CALL QRPRT2 (A,ML,KT,RHS,COST,QUAD,NL)
C
C     OUTPUT HEADER FOR INTERMEDIATE OUTPUT, IF ANY EXPECTED
      IF (JPIVOT .NE. 0) CALL QRPRT3
C
C     CONSTRUCT INITIAL TABLEAU FOR QUADRATIC PROGRAMMING.
      CALL QDPREP (A,ML,KT,RHS,COST,QUAD,NL,WS,P)
C
C     PERFORM PRINCIPAL PIVOTING TO FINAL TABLEAU.
      CALL QDCOMP (WS,WS(L1),WS(L2),WS(L3),WS(L4))
C
C     GET SOLUTION AND OBJECTIVE VALUE IF REQUESTED.
      CALL QDSOLN (KT,COST,QUAD,NL,WS,P,WS(L4),X,RC,DUAL,SLK,
     1   WS(L1),OBJ)
C
C     OUTPUT SOLUTION REPORT IF REQUESTED.
      IF (JSOL .NE. 0) CALL QRPRT6 (X,RC,DUAL,SLK,OBJ)
C
C     SET EXIT VALUES, IOUT.
  200 CONTINUE
      IOUT(1) = IERR
      IOUT(2) = ITCNT
C
C     CLOSE PRINT FILE IF REQUIRED.
      IF (JOUT .GT. 0) CLOSE (LUFILE,STATUS='KEEP')
C
      RETURN
C
      END
***********************************************************************

SUBROUTINE QDRVER (KT)
C
C     CHECK INPUT DATA FOR QUADPR
```

```
C
      IMPLICIT REAL (A-H,O-Z)
      DIMENSION KT(1)
C
      INTEGER ROW,COL,INDX,P,P1,PSQ
      COMMON /QPRCBI/ INPUTS(14),IOUTS(2),ROW,COL,INDX,MORE,P,P1,PSQ,
     1   NCALL,LENREQ,IO1,IO2,IO3
      EQUIVALENCE (INPUTS(1),ML), (INPUTS(2),NL), (INPUTS(3),MO),
     1   (INPUTS(4),NO), (INPUTS(5),MINMAX), (INPUTS(6),LENWS),
     2   (INPUTS(7),MAXIT), (INPUTS(8),KOBJ), (INPUTS(9),JIT),
     3   (INPUTS(10),JDATA), (INPUTS(11),JPIVOT), (INPUTS(12),JSOL),
     4   (INPUTS(13),JOUT), (INPUTS(14),JWIDTH),
     5   (IOUTS(1),IERR), (IOUTS(2),ITCNT)
C
      COMMON /QPRCBR/ TOLS(2)
      EQUIVALENCE (TOLS(1),TZERO), (TOLS(2),TPIV)
C
      INTEGER ZERONE(4),ZERO12(3)
      LOGICAL ERROR(10)
      DATA ZERONE  / 5,8,9,11 /
      DATA ZERO12  / 10,12,13 /
C
C
      ITITLE = 0
C
C     DEFAULT VALUES
      IF (MAXIT .LE. 0) MAXIT = 1000
      IF (TZERO .LE. 0.0) TZERO = 1.0E-7
      IF (TPIV .LE. 0.0) TPIV = 1.0E-6
      IF (JWIDTH .LT. 72) JWIDTH = 72
      IF (JWIDTH .GT. 132) JWIDTH = 132
C
      ITITLE = 0
C
C     CHECK KT
      DO 10 I = 1, MO
         IF (IABS(KT(I)) .GT. 1) GO TO 20
   10 CONTINUE
      GO TO 30
   20 CONTINUE
      WRITE (IO1,22) NCALL
   22 FORMAT ( /// 5X,'QUADPR   CALL',I4)
      WRITE (IO1,24) (KT(I),I=1,MO)
   24 FORMAT ( / 1X,'*** ERROR, ILLEGAL VALUES IN KT.  KT CONTAINS'
     1   / (6I12) )
      IERR = 5
      ITITLE = 1
C
C     CHECK INPUT
   30 CONTINUE
      ERROR(1) = (MO .LT. 0 .OR. MO .GT. ML)
      ERROR(2) = (NO .LT. 1 .OR. NO .GT. NL)
```

```
      ERROR(3) = (LENWS .LT. LENREQ)
      DO 33 I = 1, 4
         J = ZERONE(I)
         ERROR(I+3) = (INPUTS(J) .NE. 0 .AND. INPUTS(J) .NE. 1)
   33 CONTINUE
      DO 34 I = 1, 3
         J = ZERO12(I)
         ERROR(I+7) = (INPUTS(J) .LT. 0 .OR. INPUTS(J) .GT. 2)
   34 CONTINUE
      DO 35 I = 1, 10
         IF (ERROR(I)) GO TO 38
   35 CONTINUE
      GO TO 50
C
   38 CONTINUE
      IERR = 5
      IF (ITITLE .EQ. 0) WRITE (IO1,22) NCALL
      WRITE (IO1,40) (INPUTS(I),I=1,14)
   40 FORMAT ( / 1X,'*** ERROR, INCONSISTENT DATA IN INPUT.'
     1    '    INPUT CONTAINS' / 5I12 / 5I12 / 4I12 /
     2    / 5X,'THE FOLLOWING ERRORS OCCURRED.' / )
      IF (ERROR(1)) WRITE (IO1,41)
   41 FORMAT (5X,'INPUT(3) NEGATIVE OR EXCEEDS INPUT(1)')
      IF (ERROR(2)) WRITE (IO1,42)
   42 FORMAT (5X,'INPUT(4) NON-POISTIVE OR EXCEEDS INPUT(2)')
      IF (ERROR(3)) WRITE (IO1,43) LENREQ
   43 FORMAT (5X,'INPUT(6) TOO SMALL.  FOR THIS PROBLEM,',
     1    ' MUST BE AT LEAST',I8)
      DO 45 I = 1, 4
         J = ZERONE(I)
         IF (ERROR(I+3)) WRITE (IO1,46) J
   45 CONTINUE
   46 FORMAT (5X,'INPUT(',I2,') NOT 0 OR 1')
      DO 47 I = 1, 3
         J = ZERO12(I)
         IF (ERROR(I+7)) WRITE (IO1,48) J
   47 CONTINUE
   48 FORMAT (5X,'INPUT(',I2,') NOT 0, 1, OR 2')
C
   50 CONTINUE
      RETURN
      END
***********************************************************************
      SUBROUTINE QDPREP (A,LDA,KT,RHS,COST,QUAD,LDQ,B,LDB)
C
C     CONSTRUCT THE INITIAL TABLEAU FOR QUADRATIC PROGRAMMING.
C     IT HAS THE FORM
C
C         ...........................................
C         .              (T)    .      (T)    .     .
C         . QUAD'+QUAD'         .    -A'      . COST'.
C         .       [1]           .     [2]     . [3] .
```

```
C     B   =  ..............................
C              .   A'      .    0    . -RHS' .
C              .  [4]      .   [5]   .  [6]  .
C              ..............................
C
C     WHERE A',RHS',COST',QUAD' ARE OBTAINED FROM A,RHS,COST,QUAD BY
C     CONVERTING THE PROBLEM TO MINIMIZATION WITH ALL .GE. CONSTRAINTS.
C
      IMPLICIT REAL (A-H,O-Z)

DOUBLE PRECISION  B
      DIMENSION  A(LDA,1),KT(1),RHS(1),COST(1),QUAD(LDQ,1),B(LDB,1)
C
      INTEGER  ROW,COL,INDX,MORE,P,P1,PSQ
      COMMON /QPRCBI/ INPUTS(14),IOUTS(2),ROW,COL,INDX,MORE,P,P1,PSQ,
     1    NCALL,LENREQ,IO1,IO2,IO3
      EQUIVALENCE (INPUTS(1),ML),  (INPUTS(2),NL),  (INPUTS(3),MO),
     1    (INPUTS(4),NO),   (INPUTS(5),MINMAX), (INPUTS(6),LENWS),
     2    (INPUTS(7),MAXIT), (INPUTS(8),KOBJ),  (INPUTS(9),JIT),
     3    (INPUTS(10),JDATA), (INPUTS(11),JPIVOT), (INPUTS(12),JSOL),
     4    (INPUTS(13),JOUT),  (INPUTS(14),JWIDTH),
     5    (IOUTS(1),IERR),  (IOUTS(2),ITCNT)
C
C
C     FILL LOWER TRIANGLE OF [1] AND [3].
      N1 = NO - 1
      IF (MINMAX .EQ. 1) GO TO 40
C     MIN. PROBLEM
      B(1,1) = 2.0*QUAD(1,1)
      B(1,P1) = COST(1)
      IF (NO .EQ. 1) GO TO 110
      DO 10 K = 2, NO
         B(K,K) = 2.0*QUAD(K,K)
         B(K,P1) = COST(K)
   10 CONTINUE
      DO 30 L = 1, N1
         L1 = L + 1
         DO 20 K = L1, NO
            B(K,L) = QUAD(K,L) + QUAD(L,K)
   20    CONTINUE
   30 CONTINUE
      GO TO 80
C     MAX. PROBLEM
   40 CONTINUE
      B(1,1) = - 2.0*QUAD(1,1)
      B(1,P1) = - COST(1)
      IF (NO .EQ. 1) GO TO 110
      DO 50 K = 2, NO
         B(K,K) = - 2.0*QUAD(K,K)
         B(K,P1) = - COST(K)
   50 CONTINUE
      DO 70 L = 1, N1
```

```
            L1 = L + 1
            DO 60 K = L1, NO
                B(K,L) = - QUAD(K,L) - QUAD(L,K)
     60     CONTINUE
     70 CONTINUE
C
C      FILL UPPER TRAINGLE OF [1].
     80 CONTINUE
        DO 100 L = 2, NO
            L1 = L - 1
            DO 90 K = 1, L1
                B(K,L) = B(L,K)
     90     CONTINUE
    100 CONTINUE
C
C      CHECK FOR CASE OF NO CONSTRAINTS.
    110 CONTINUE
        IF (MO .EQ. 0) GO TO 240
C
C      FILL [5].
        N1 = NO + 1
        DO 130 L = N1, P
            DO 120 K = N1, P
                B(K,L) = 0.0
    120     CONTINUE
    130 CONTINUE
C
C      IF THERE ARE R .EQ. CONSTRAINTS, EXPRESS AS R+1 .GE. CONSTRAINTS,
C      THE LATTER BEING MINUS THE SUM OF THE OTHERS.
        IF (MORE .EQ. 0) GO TO 150
        DO 140 L = 1, NO
            B(P,L) = 0.0
    140 CONTINUE
        B(P,P1) = 0.0
C
C      FILL [4] AND [6].
    150 CONTINUE
        DO 210 I = 1, MO
            K = NO + I
            IF (KT(I) .LT. 0) GO TO 170
            IF (KT(I) .GT. 0) GO TO 190
C           .EQ. CONSTRAINT
            DO 160 L = 1, NO
                B(K,L) = A(I,L)
                B(P,L) = B(P,L) - B(K,L)
    160     CONTINUE
            B(K,P1) = - RHS(I)
            B(P,P1) = B(P,P1) - B(K,P1)
            GO TO 210
C           .GE. CONSTRAINT
    170     CONTINUE
            DO 180 L = 1, NO
```

```
              B(K,L) = A(I,L)
   180    CONTINUE
          B(K,P1) = - RHS(I)
          GO TO 210
C         .LE. CONSTRAINT
   190    CONTINUE
          DO 200 L = 1, NO
              B(K,L) = - A(I,L)
   200    CONTINUE
          B(K,P1) = RHS(I)
   210 CONTINUE
C
C      FILL [2].
       DO 230 L = 1, NO
          DO 220 K = N1, P
              B(L,K) = - B(K,L)
   220    CONTINUE
   230 CONTINUE
C
C      FINISHED
   240 CONTINUE
       RETURN
       END
***********************************************************************
       SUBROUTINE QDCOMP (B,TEMP,U,JZ,JW)
C
C      COMPUTE THE FINAL TABLEAU FOR QUADRATIC PROGRAMMING GIVEN
C      THE INITIAL TABLEAU USING THE METHOD OF PRINCIPAL PIVOTING.
C
       IMPLICIT REAL (A-H,O-Z)

DOUBLE PRECISION  B,TEMP,U
       INTEGER  JZ,JW
       DIMENSION  B(1),TEMP(1),U(1),JZ(1),JW(1)
C
       INTEGER  ROW,COL,INDX,P,P1,PSQ
       COMMON /QPRCBI/ INPUTS(14),IOUTS(2),ROW,COL,INDX,MORE,P,P1,PSQ,
     1    NCALL,LENREQ,IO1,IO2,IO3
       EQUIVALENCE (INPUTS(1),ML),  (INPUTS(2),NL),  (INPUTS(3),MO),
     1    (INPUTS(4),NO),  (INPUTS(5),MINMAX),  (INPUTS(6),LENWS),
     2    (INPUTS(7),MAXIT),  (INPUTS(8),KOBJ),  (INPUTS(9),JIT),
     3    (INPUTS(10),JDATA),  (INPUTS(11),JPIVOT), (INPUTS(12),JSOL),
     4    (INPUTS(13),JOUT),  (INPUTS(14),JWIDTH),
     5    (IOUTS(1),IERR),  (IOUTS(2),ITCNT)
C
       COMMON /QPRCBR/ TOLS(2)
       EQUIVALENCE (TOLS(1),TZERO), (TOLS(2),TPIV)
C
       DOUBLE PRECISION  PIVOT
       COMMON /QPRCBD/ PIVOT
C
```

```
      DOUBLE PRECISION Z,BS,BST
      CHARACTER*48 MSG(4)
C
      DATA MSG / 'ALGORITHM ERROR, INDEX VALUE NON-DECREASING.  ',
     2            'NO SOLUTION, INVALID QUADRATIC COSTS MATRIX.  ',
     3            'NO SOLUTION, INFEASIBLE OR UNBOUNDED PROBLEM. ',
     4            'ERROR, ITERATION LIMIT REACHED.               ' /
C
C
C*****INITIALIZATIONS
      ITCNT = 0
      JFLAG = 0
      INDX = P1
C*****BASIC VARIABLES GET NEGATIVE VALUES.
C*****NONBASIC VARIABLES(JZ) GET POSITIVE VALUES.
      DO 30 I = 1, P
         JW(I) = -I
         JZ(I) = I
   30 CONTINUE
   40 ITEMP = 0
C*****CHECK FOR NONDECREASING INDEX (ALLOW UP TO 5 EQUAL INDEXES FOR
C*****TOLERANCE PURPOSES).
      IJ = PSQ
      DO 50 I = 1, P
         IJ = IJ + 1
         IF (B(IJ) .LT. (-TZERO)) ITEMP = ITEMP + 1
   50 CONTINUE
      IF (ITEMP .NE. INDX) ICT = 0
      IF (ITEMP .EQ. INDX) ICT = ICT + 1
      IF (ITEMP .GT. INDX .OR. ICT .EQ. 5) GO TO 400
C*****IF THE INDEX IS ZERO YOU ARE DONE.
      IF (ITEMP .EQ. 0) GO TO 300
      INDX = ITEMP
      IJ = PSQ
      DO 60 I = 1, P
         IJ = IJ + 1
         IF (B(IJ) .LT. (-TZERO)) GO TO 70
   60 CONTINUE
   70 IJ = P*(I-1) + I
C*****CHECK FOR NEGATIVE DIAGONAL ELEMENT (NOT ALLOWED IF POS. SEMIDEF.)
      IF (B(IJ) .LT. (-TPIV)) GO TO 410
      IF (B(IJ) .GT. TPIV) GO TO 100
C*****IF POTENTIAL PIVOT ELEMENT IS NEAR ZERO, USE CODE BELOW
C*****TO DETERMINE THE BLOCKING VARIABLE.
      II = I
   80 ROW = 0
      TMMP = 1000000.
      IJ = PSQ
      KJ = P*(II-1)
      DO 90 J = 1, P
         IJ = IJ + 1
         KJ = KJ + 1
```

```
        IF (B(IJ) .LT. (-TZERO)) GO TO 90
C********IF ALL COL. ELEMENTS ARE NONNEGATIVE, THEN THE DRIVING VARIABLE
C********IS UNBLOCKED AND THERE IS NO SOLUTION.
        IF (B(KJ) .GE. (-TPIV)) GO TO 90
        Z = -B(IJ) / B(KJ)
        IF (Z .GE. TMMP) GO TO 90
        TMMP = Z
        ROW = J
  90 CONTINUE
     IF (ROW. EQ. 0) GO TO 420
     COL = II
     GO TO 150
C*****COMPUTE Z = -Q(R)/B(R,R), THE INCREASE IN THE DRIVING VARIABLE.
 100 IJ = PSQ + I
     KJ = P*(I-1) + I
     Z = -B(IJ) / B(KJ)
     COL = I
 110 BS = 0.
     ROW = 0
C*****FIND THE NEW BLOCKING VARIABLE, BASED ON WHICH BASIC VARIABLE IS
C*****MOST AFFECTED BY THE CHANGE IN THE DRIVING VARIABLE.
     IJ = (COL-1)*P
     KJ = PSQ
     DO 140 J = 1, P
        IJ = IJ + 1
        KJ = KJ + 1
        BST = B(IJ)*Z + B(KJ)
        IF (B(KJ) .LT. (-TZERO) .OR. BST .GE. (-TPIV)) GO TO 140
        IF (DABS(B(KJ)) .LT. TZERO .AND. B(IJ) .LT. (-TZERO)) GO TO 120

IF (B(KJ)) 130, 140, 130
 120    ROW = J
        GO TO 150
 130    BST = -BST / B(KJ)
        IF (BST .LE. BS) GO TO 140
        BS = BST
        ROW = J
 140 CONTINUE
     IF (ROW .EQ. 0) GO TO 210
C*****NONPRINCIPAL PIVOT ON B(S,R).
C*****AT THIS POINT THE BLOCKING VARIABLE IS B(NS,I).
 150 III = -JW(ROW)
     NFLAG = 1
     GO TO 500
 160 CONTINUE
     IF (ITCNT .GE. MAXIT) GO TO 440
     ITCNT = ITCNT + 1
C*****ATTEMPT TO PROGRESSIVELY RELAX THE CONVERGENCE PARAMETER

C    TPIV = TPIV + TOLS(2)/50.
C*****INDICATE THE NUMBER OF ITERATIONS
     WRITE(*,101)'OPTIMIZATION ITERATION     ',ITCNT
```

```
  101 FORMAT('+',A50,I5)
      JFLAG = 0
C*****PUT TOLERANCE ON B(I,P1) AFTER A NONPRINCIPAL PIVOT.
      IJ = PSQ + I
      IF (B(IJ) .LT. (-TZERO)) GO TO 170
      GO TO 40
C*****THE NEW DRIVING VARIABLE IS THE COMPLEMENT OF THE OLD BLOCKING
C*****VARIABLE
  170 DO 180 JJ = 1, P
      IF (JZ(JJ) .EQ. III) GO TO 190
  180 CONTINUE
C*****NO COMPLEMENT VARIABLE (NOT ALLOWED IF POS. SEMIDEF.)
      GO TO 410
  190 COL = JJ
C*****THE DISTINGUISHED VARIABLE IS STILL THE I-TH ROW.
      IJ = P*(COL-1) + I
      IF (B(IJ) .GT. TPIV) GO TO 200
      II = COL
      GO TO 80
  200 KJ = PSQ + I
      Z = -B(KJ) / B(IJ)
      GO TO 110
C*****PRINCIPAL PIVOT ON B(I,I).
  210 LL = ROW
      ROW = I
      NFLAG = 2
      GO TO 500
  220 CONTINUE
      IF (JFLAG .EQ. 1) GO TO 290
      JFLAG = 1
C*****MUST REARRANGE THE ROWS AND COLUMNS FOR COMPLEMENTARITY
C*****EXCHANGE ROWS
  230 LLL = 0
      DO 250 I = 1, P
      K = IABS(JW(I))
      IF (K .EQ. I) GO TO 250
      IJ = K
      KJ = I
      DO 240 J = 1, P1
         Z = B(IJ)
         B(IJ) = B(KJ)
         B(KJ) = Z
         IJ = IJ + P
         KJ = KJ + P
  240 CONTINUE
      II = JW(I)
      JW(I) = JW(K)
      JW(K) = II
      LLL = LLL + 1
  250 CONTINUE
      IF (LLL .GE. 2) GO TO 230
```

```
C*****EXCHANGE COLUMNS
  260 LLL = 0
      DO 280 J = 1, P
         K = IABS(JZ(J))
         IF (K .EQ. J) GO TO 280
         IJ = P*(K-1)
         KJ = P*(J-1)
         DO 270 I = 1, P
            IJ = IJ + 1
            KJ = KJ + 1
            Z = B(IJ)
            B(IJ) = B(KJ)
            B(KJ) = Z
  270    CONTINUE
         II = JZ(J)
         JZ(J) = JZ(K)
         JZ(K) = II
         LLL = LLL + 1
  280 CONTINUE
      IF (LLL .GE. 2) GO TO 260
  290 ROW = LL
      ITCNT = ITCNT + 1
C*****ATTEMPT TO PROGRESSIVELY RELAX THE CONVERGENCE PARAMETER

C     TPIV = TPIV + TOLS(2)/50.
C*****INDICATE THE NUMBER OF ITERATIONS
      WRITE(*,101)'OPTIMIZATION ITERATION      ',ITCNT

C     IF (JPIVOT .EQ. 1) CALL QRPRT5
      IF (INDX .GT. 1) GO TO 40
C
C*****NORMAL TERMINATION
  300 IERR = 1
      GO TO 600
C
C*****ERROR TERMINATION
  400 K = 1
      IERR = 6
      GO TO 460
  410 K = 2
      IERR = 4
      GO TO 460
  420 K = 3
      IERR = 2
      GO TO 460
  440 K = 4
      IERR = 3
  460 WRITE (IO1,470) MSG(K),ITCNT
      IF (JOUT .NE. 0) WRITE (IO3,470) MSG(K),ITCNT
  470 FORMAT( / 1X,A48,I6,' PIVOTS PERFORMED.' / )
      GO TO 600
C
```

```
C*****PIVOT CODE.
C*****QUADPP USES A NORMAL JORDAN PIVOT.
C*****HOWEVER, WE CAN SAVE MEMORY BY USING THE ELEMENTARY MATRIX.
C*****STORE PIVOT ELEMENT
  500 CONTINUE
      KC = P*(COL-1)
      KJ = KC + ROW
      PIVOT = B(KJ)
      Z = 1.0D0 / PIVOT
C*****STORE ELEMENTARY-VECTOR AND U-VECTOR.
      IJ = ROW
      ISAVE = I
      DO 510 I = 1, P1
         U(I) = B(IJ)
         IJ = IJ + P
  510 CONTINUE
      IJ = KC
      DO 520 I = 1, P
      IJ = IJ + 1
         TEMP(I) = -B(IJ) * Z
  520 CONTINUE
      TEMP(ROW) = -Z - 1.0D0
C*****COMPUTE ALL COLUMNS EXCEPT PIVOT COLUMN.
      IJ = 0
      DO 550 J = 1, P1
         IF (J .NE. COL) GO TO 530
         IJ = IJ + P
         GO TO 550
  530    DO 540 I = 1, P
            IJ = IJ + 1
            B(IJ) = B(IJ) + U(J)*TEMP(I)
  540    CONTINUE
  550 CONTINUE
C*****COMPUTE PIVOT COLUMN.
      IJ = KC
      DO 560 I = 1, P
         IJ = IJ + 1
         B(IJ) = -TEMP(I)
  560 CONTINUE
C*****COMPUTE NEW PIVOT ELEMENT.
      B(KJ) = Z
C*****KEEP TRACK OF BASIC AND NONBASIC VARIABLES
      K = JW(ROW)
      JW(ROW) = JZ(COL)
      JZ(COL) = K
C     IF (JPIVOT .EQ. 1) CALL QRPRT4
      I = ISAVE
      GO TO (160, 220), NFLAG
C
C*****FINISHED
  600 RETURN
      END
```

```
C***********************************************************************
      SUBROUTINE QDSOLN (KT,COST,QUAD,LDQ,B,LDB,JW,X,RC,DUAL,SLK,
     1   TEMP,OBJ)
C
C     RETURN SOLUTION TO QUADRATIC PROGRAMMING PROBLEM FROM FINAL
C     TABLEAU AND COMPUTE OBJECTIVE VALUE IF REQUESTED.
C     CONVERTING THE PROBLEM TO MINIMIZATION WITH ALL .GE. CONSTRAINTS.
C
      IMPLICIT REAL (A-H,O-Z)

DOUBLE PRECISION  B,TEMP
      DIMENSION  KT(1),COST(1),QUAD(LDQ,1),B(LDB,1),JW(1),X(1),RC(1),
     1   DUAL(1),SLK(1),TEMP(1)
C
      INTEGER  ROW,COL,INDX,MORE,P,P1,PSQ
      COMMON /QPRCBI/ INPUTS(14),IOUTS(2),ROW,COL,INDX,MORE,P,P1,PSQ,
     1   NCALL,LENREQ,IO1,IO2,IO3
      EQUIVALENCE (INPUTS(1),ML), (INPUTS(2),NL), (INPUTS(3),MO),
     1   (INPUTS(4),NO), (INPUTS(5),MINMAX), (INPUTS(6),LENWS),
     2   (INPUTS(7),MAXIT), (INPUTS(8),KOBJ), (INPUTS(9),JIT),
     3   (INPUTS(10),JDATA), (INPUTS(11),JPIVOT), (INPUTS(12),JSOL),
     4   (INPUTS(13),JOUT), (INPUTS(14),JWIDTH),
     5   (IOUTS(1),IERR), (IOUTS(2),ITCNT)
C
      COMMON /QPRCBR/ TOLS(2)
      EQUIVALENCE (TOLS(1),TZERO), (TOLS(2),TPIV)
C
      DOUBLE PRECISION DART, BB
C
C
C     GET X, RC, DUAL, SLK
  100 CONTINUE
      KART = MO + 1
      DO 110 J = 1, NO
         X(J) = 0.0
         RC(J) = 0.0
  110 CONTINUE
      DO 120 I = 1, MO
         DUAL(I) = 0.0
         SLK(I) = 0.0
  120 CONTINUE
      DART = 0.0D0
      DO 170 I = 1, P
         BB = B(I,P1)
         IF (DABS(BB) .LT. TZERO) BB = 0.0D0
         J = JW(I)
         IF (J .LT. 0) GO TO 150
         IF (J .GT. NO) GO TO 130
         X(J) = BB
         GO TO 170
  130    CONTINUE
```

```
              K = J - NO
              IF (K .EQ. KART) GO TO 140
              DUAL(K) = BB
              GO TO 170
       140    CONTINUE
              DART = BB
              GO TO 170
       150    CONTINUE
              J = -J
              IF (J .GT. NO) GO TO 160
              RC(J) = BB
              GO TO 170
       160    CONTINUE
              K = J - NO
              IF (K .EQ. KART) GO TO 170
              SLK(K) = BB
       170 CONTINUE
C
C      ADJUST DUALS IF ANY EQUALITIES
           IF (MORE .EQ. 0) GO TO 200
           DO 190 I = 1, MO
              IF (KT(I) .NE. 0) GO TO 190
              IF (MINMAX .EQ. 1) GO TO 180
              DUAL(I) = DUAL(I) - DART
              GO TO 190
       180    CONTINUE
              DUAL(I) = DART - DUAL(I)
       190 CONTINUE
C
C      COMPUTE OBJECTIVE VALUE ONLY IF REQUESTED.
       200 CONTINUE
           IF (KOBJ .EQ. 0) GO TO 250
           OBJ = 0.
           DO 220 I = 1, NO
              TEMP(I) = 0.0D0
              DO 210 J = 1, NO
                 TEMP(I) = TEMP(I) + X(J)*QUAD(I,J)
       210    CONTINUE
       220 CONTINUE
           DO 230 J = 1, NO
              OBJ = OBJ + TEMP(J)*X(J)
       230 CONTINUE
           DO 240 J = 1, NO
              OBJ = OBJ + COST(J)*X(J)
       240 CONTINUE
C
C      FINISHED
       250 CONTINUE
           RETURN
           END
C**********************************************************************
***********************************************************************
```

```
      SUBROUTINE QSET(NUM,MAXWS,ITURN)
*********************************************************************
      INCLUDE 'COMMON.F'
      REAL QC(NDID,ND),QRHS(NDID),QTOL(2),QRC(ND),D2X(ND),XOLD(ND),
     &           QDUAL(NDID),QSLK(NDID),QWS(ISIZEQ)

INTEGER QKT(NDID),INPUT(14),QIOUT(2),NUM,MAXWS
      CHARACTER*30 PFILE

DO 10 I = 1,ID
      DO 10 J = 1,NUM
         QC(I+NUM,J)=C(J,I)
10    CONTINUE

DO 20 I = 1,NUM
      DO 20 J = 1,NUM
         IF(I.EQ.J) THEN
            QC(I,J) = -1.0
         ELSE
            QC(I,J) = 0.0
         END IF
20    CONTINUE

DO 30 I = 1,NUM+ID
         IF(I.LE.NUM) THEN
            QRHS(I) = -BDU(I)
         ELSE
            QRHS(I) = D(I-NUM)
         END IF
         QKT(I) = -1
30    CONTINUE

INPUT(1)  = ND+ID
      INPUT(2)  = ND
      INPUT(3)  = NUM+ID
      INPUT(4)  = NUM
      INPUT(5)  = 0
      INPUT(6)  = MAXWS
      INPUT(7)  = 0
      INPUT(8)  = 0
      INPUT(9)  = 0
      INPUT(10) = 0
      INPUT(11) = 0
      INPUT(12) = 0
      INPUT(13) = 0
      INPUT(14) = 0

QTOL(1) = 0.0
C E-6
C     QTOL(2) = 0.000001
C E-4
      QTOL(2) = 0.0001
```

```
        PFILE = 'TEMP.Q'
        DO 40 I = 1,NUM
           B(I) = 0.0
           D2X(I) = 0.0
           XOLD(I) = 0.0
40      CONTINUE

DXLAST = 1.0
        C0 = 0.1E-3
        C1 = 0.90
        C2 = 1.0
        TURN = TURN * 0.001
        GO TO 501
500     WRITE(*,150)ITURN
150     FORMAT(1X,T60,I4)

CALL QUAD1 (QC,QKT,QRHS,B,A,INPUT,QTOL,TITLE,
     &              PFILE,OBJ,X,QRC,QDUAL,QSLK,QIOUT,QWS)

501     DXTOTAL = 0.0

DO 45 I = 1,NUM
           IF (ITURN .EQ. 0) THEN
              X(I) = OLDWT(I)
           ELSE
              X(I) = XOLD(I) + C1*(X(I)-XOLD(I))
           END IF
45      CONTINUE

DO 50 I = 1,NUM
           A(I,I) = A(I,I) - D2X(I)
           DX = X(I) - OLDWT(I)
           DXTOTAL = DXTOTAL + ABS(DX)
           D2X(I) = 0.5*TURN*(1.0/SQRT(DX*DX+C0)-DX*DX/(DX*DX+C0)**1.5)
           A(I,I) = A(I,I) + D2X(I)
           B(I) = TURN*DX/SQRT(DX*DX + C0) - 2.0*X(I)*D2X(I)
           XOLD(I) = X(I)
50      CONTINUE

WRITE(*,'(1X,A12,F9.3)')'TURN OVER = ',DXTOTAL*50.

IF (ABS(DXTOTAL-DXLAST).GT. 0.01 .OR. ITURN .LT. 1) THEN
           ITURN = ITURN + 1
           DXLAST = DXTOTAL
           GO TO 500
        END IF

TURN = 0.0
        DO 60 I = 1,NUM
           A(I,I) = A(I,I) - D2X(I)
```

```
          B(I) = TURN*ABS(X(I)-OLDWT(I))
60     CONTINUE
       RETURN
       END
C ********************************************************************
```

```
C *********************************************************************
C ***  PARAMETERS ARE USED TO DIMENSION THE COMMON ARRAYS             *
C ***  IN EACH SUBROUTINE.                                            *
C ***                                                                 *
C ***   ND  =  TOTAL NUMBER OF STOCK WEIGHTS BEING COMPUTED.          *
C ***   ID  =  THE MAXIMUM NUMBER OF CONSTRAINT EQUATIONS.            *
C ***   N2D =  THE DIMENSION ON WORKING AREAS ( 2 * ND )              *
C ***   KEQ =  NUMBER OF CONSTRAINTS WHICH WILL BE EQUALITIES         *

C ***   NRT =  NUMBER OF RETURNS                                      *
C ***   NST =  USED FOR STATISTICS                                    *

C ***   ISIZEQ = 2 * ( ND*2 + ID )**2 + 8*(ND*2+ID) +6                *
C ***   NDID = ND + ID                                                *

C *********      FOR CASH RUNS (AT LEAST 1 EQ CONST. )
C ***   ISIZEQ = 2 * ( ND*2 + ID )**2 + 12*(ND*2+ID) +16              *
C ***   NDID = ND + ID                                                *

C *********************************************************************
C       LAST UPDATED: November 19, 1988
        IMPLICIT REAL (A-H,O-Z)
        IMPLICIT INTEGER (I-N)
        PARAMETER (KEQ = 0)
C 280
C       PARAMETER (ND =  280, ID = 6 , N2D = 560)
C       PARAMETER (NDID = 286, ISIZEQ = 645246)
C 250
C       PARAMETER (ND =  250, ID = 6 , N2D = 500)
C       PARAMETER (NDID = 256, ISIZEQ = 516126)
C 100
C       PARAMETER (ND =  100, ID = 6 , N2D = 200)
C       PARAMETER (NDID = 106, ISIZEQ = 86526)

PARAMETER (NRT = 48, NST = 3)
        PARAMETER (LENGTH = 40)
        CHARACTER*(LENGTH) FILEOUT,TITLE,NAME(ND),PORTRETS,GARB,ANSWER,
     &             OLD,LIANAME,LIABIN,STOCKIN,BONDIN,IDC(ND),SIC(99)

COMMON /ARRY/ A(ND,ND),C(ND,ID)
        COMMON /VECT/ B(ND),D(ID),BDL(ND),BDU(ND),X(ND),OLDWT(ND)
        COMMON /RETS/ RET(NRT,ND),ANIM(NRT),PRET(NRT),ISIC(ND),AVE(ND)
        COMMON /TRAC/ COV(NST,NST),STAT(NRT,NST),COREL(NRT,NST)
        COMMON /TRA2/ PRICE(ND),VOL(ND),CUM(ND),VAR(3),LIANAME,TITLE
        COMMON /RTNIN/FILEOUT,LIABIN,STOCKIN,BONDIN,IDC,NAME,SIC
        COMMON /DAT/  NMSAVE,NM,NSIMS,NSTOCKS,NBONDS,NSTAT,NRETS,IDUMMY,
     &                IHOLD
         COMMON /MAX/  STOCKMIN,YIMAX,SMAX,SCALE,BRET,XFACTOR,XBUPPER,
     &         XBLOWER,BULLET,TARGET,TURN,BULL1,TARG1,TURN1,PORTVAL
C END OF COMMON.F
```

OUTPUT FROM PROGRAM

NATIONAL INVESTMENT SERVICES SPANNING TECHNOLOGY
SIMULATION RESULTS

EXAPMLE UPDATE WITH CONTROLLED TURNOVER

LIABILITY STREAM USED

| NUMBER | START WGHT | END WGHT | SPAN SENSIT | SIC | IDC | TICK | SECURITY NAME | |
|---|---|---|---|---|---|---|---|---|
| 1 | 3.365 | 3.365 | 0.000 | 35 | LANS | COMS | 3COM CORP | NASD INDL |
| 2 | 0.992 | 0.992 | 0.001 | 75 | AGNC | AGNC | AGENCY RENT A CAR | NASD INDL |
| 3 | 1.414 | 1.414 | 00.000 | 60 | AHN | AHM | AHMANSON H F & CO | |
| 4 | 1.353 | 1.353 | 0.001 | 48 | T | T | AMERICAN TEL & TELEG CO | |
| 5 | 0.583 | 0.583 | 0.002 | 29 | ASH | ASH | ASHLAND OIL INC | |
| 6 | 1.007 | 1.007 | 0.001 | 49 | ATA | ATG | ATLANTA GAS LT CO | NASD INDL |
| 7 | 1.217 | 1.217 | 0.002 | 32 | BALL | BLL | BALL CORP | |
| 8 | 1.418 | 1.418 | 0.001 | 49 | BGE | BGE | BALTIMORE GAS & ELEC CO | |
| 9 | 1.199 | 1.199 | 0.001 | 60 | FBG1 | ONE | BANC ONE CORP | |
| 10 | 3.023 | 3.023 | 0.002 | 30 | BDG | BDG | BANDAG INC | |
| 11 | 2.154 | 2.154 | 0.001 | 37 | BA | BA | BOEING CO | |
| 12 | 3.120 | 3.120 | 0.001 | 49 | BSE | BSE | BOSTON EDISON CO | |
| 13 | 1.397 | 1.397 | 0.001 | 35 | BGG | BGG | BRIGGS & STRATTON CORP | |
| 14 | 1.276 | 1.276 | 00.000 | 67 | CALH | CAL | CALFED INC | |
| 15 | 0.344 | 0.344 | 0.001 | 20 | CKE | CKE | CASTLE & COOKE INC | |
| 16 | 0.616 | 0.616 | 0.001 | 73 | CMCS | CMCS | COMCAST CORP | NASD INDL |
| 17 | 0.414 | 0.414 | -0.001 | 35 | CBU1 | CBU | COMMODORE INTL LTD | |
| 18 | 0.181 | 0.181 | 0.002 | 51 | COSV | COST | COSTCO WHSL CORP NASD INDL | |
| 19 | 1.486 | 1.486 | 0.003 | 51 | DEK1 | DKLB | DEKALB CORP NASD INDL | |
| 20 | 2.015 | 2.015 | 0.002 | 60 | FPA | FPA | FIRST PA CORP | |
| 21 | 2.628 | 2.628 | 0.001 | 61 | FUN | FUNC | FIRST UN CORP | NASD BK INS |
| 22 | 3.294 | 3.294 | 0.001 | 27 | GEN | GTE | GTE CORP | |
| 23 | 3.000 | 3.000 | 0.001 | 67 | HCP | HCP | HEALTH CARE PPTY INVS INC | |
| 24 | 2.811 | 2.811 | 0.002 | 8 | IPT | IPT | IP TIMBERLAND LTD | |
| 25 | 0.211 | 0.211 | 0.001 | 49 | KAN | KAN | KANSAS PWR & LT CO | |
| 26 | 3.002 | 3.002 | 0.001 | 20 | K | K | KELLOGG CO | |
| 27 | 3.000 | 3.000 | 0.002 | 65 | KOG | KOG | KOGER PPTYS INC | |
| 28 | 0.251 | 0.251 | 0.002 | 20 | LNE | LNCE | LANCE INC | NASD INDL |
| 29 | 1.827 | 1.827 | 0.001 | 52 | LCI | LOW | LOWES COS INC | |
| 30 | 2.944 | 2.944 | 0.002 | 67 | MTRV | MT | MEDITRUST SH BEN INT | |
| 31 | 1.280 | 1.280 | 0.001 | 49 | MFR5 | MCN | MICHIGAN CONS GAS CO | COM |
| 32 | 1.438 | 1.438 | 0.001 | 49 | IPS | MWE | MIDWEST ENERGY CO | |
| 33 | 3.045 | 3.045 | 0.001 | 36 | NPK | NPK | NATIONAL PRESTO INDS INC | |
| 34 | 3.100 | 3.100 | 00.000 | 67 | NES | NES | NEW ENGLAND ELEC SYS | |
| 35 | 1.098 | 1.098 | 0.001 | 25 | OSM | OMT | OHIO MATTRESS CO DEL | |
| 36 | 1.445 | 1.445 | 0.001 | 48 | PACB | PAC | PACIFIC TELESIS GROUP | |
| 37 | 2.879 | 2.879 | 0.001 | 12 | PEL | PEL | PANHANDLE EASTN CORP | |
| 38 | 2.955 | 2.955 | 0.003 | 29 | PZL | PZL | PENNZOIL CO | |
| 39 | 0.496 | 0.496 | 0.002 | 13 | PRMK | PMK | PRIMARK CORP | |
| 40 | 3.010 | 3.010 | 0.001 | 38 | MFS | STR | QUESTAR CORP | |
| 41 | 3.025 | 3.025 | 0.001 | 67 | RCPA | RCP | ROCKEFELLER CTR PPTYS INC | |
| 42 | 0.175 | 0.175 | 0.002 | 37 | RHR | RHR | ROHR INDS INC | |

```
43  0.570 0.570  0.001  23 RML  RML  RUSSELL CORP
44  3.155 3.155 00.000  73 SMED SMED SHARED MED SYS CORP     NASD INDL
45  1.377 1.377  0.001  49 SIG  SIG  SOUTHERN IND GAS & ELEC CO
46  2.632 2.632  0.000  45 SAR1 LUV  SOUTHWEST AIRLS CO
47  1.569 1.569  0.001  48 SBCA SBC  SOUTHWESTERN BELL CORP
48  2.201 2.201  0.001   1 TEJN TRC  TEJON RANCH CO
49  1.291 1.291  0.001  49 TSG  TEP  TUCSON ELEC PWR CO
50  2.246 2.246  0.001  80 USHC USHC U S HEALTHCARE INC      NASD INDL
51  2.118 2.118 00.000  49 UIL  UIL  UNITED ILLUM CO
52  3.073 3.073  0.002  38 USSC USS  UNITED STATES SURGICAL CORP    NAS
53  1.488 1.488  0.001  49 WGL  WGL  WASHINGTON GAS LT CO
54  1.582 1.582  0.001  49 WPC  WEC  WISCONSIN ENERGY CORP
55  0.983 0.983  0.002  51 SEFC SEED DEKALB GENETICS CORP
56  0.229 0.229  0.002  51 PTVZ DKLB PRIDE PETE SVCS INC
```

MINIMUM STD DEV =   13.0185  EXPECTED RETURN =   9.0049

TRACKER OUTPUT FILE

MONTH      LIA       PORT       DIF

CUMMULATIVE VALUES OF LIABILITIES AND ASSETS

MONTH     LIABILTIES     PORTFOLIO 107       0.022          -0.005

********     STATISTICAL SUMMARY     ********

STATISTICS BASED ON MONTHS  108 THROUGH 107

```
     ALPHA         0.000000  ANNUAL    0.00 %
      BETA         0.000000
     STD ERR       0.000000            0.00 %
  CORRELATION      0.000000
    R-SQUARED      0.000000            0.00 %
```

ANNUAL RETURNS:         MEAN              STD DEV

LIABILITY           0.00 %             0.00 %
   PORTFOLIO           0.00 %             0.00 %
   DIFFERENCE          0.00 %             0.00 %

PARAMETERS FOR THIS RUN WERE:

1) SPANNING RUN TITLE     UPDATE A.O.STEEL 12 5 88
2) OUTPUT FILENAME        TEMP.SPN
3) LIABILITY STREAM FILE  \LIR\AOSTEEL.LIR
4) STOCK RETURN FILE      \RET\AOSNOV.RET

```
 5) BOND RETURN FILE            \RET\BONDS.PRN
 6) MONTH SIMULATION BEGINS        8812
 7) NUMBER OF MONTHS SIMULATED        0
 8) NUMBER OF STOCKS                 56
 9) NUMBER OF BONDS                   0
10) STOCKS TO READ PAST               0
11) MINIMUM STOCK HOLDING    %  100.00
12) MAXIMUM INDUSTRY HOLDING %   20.00
13) MAXIMUM STOCK HOLDING    %    3.00
14) NSTAT                            24
15) NRETS                            24
16) BULLET                         0.00
17) TARGET                         1.00
18) TURNOVER FACTOR              100.00

PORTFOLIO CONSTRUCTED UPON THE FOLLOWING DATA:

MONTH      LIA         PORT          DIF 84-0.0049200002-0.0091439467-0.0042239465
    85 0.0073779998 0.0500006266 0.0426226258
    86 0.0064139999 0.0290627852 0.0226487853
    87-0.0369299985-0.0087748254 0.0281551741
    88-0.0717199966-0.0408916809 0.0308283158
    89-0.0172600001-0.0077189291 0.0095410710
    90 0.0247970000 0.0432149470 0.0184179470
    91-0.0405899994-0.0093635768 0.0312264226
    92-0.0243800003 0.0198711567 0.0442511588
    93-0.0573999994-0.0359051302 0.0214948691
    94 0.0968960002-0.1454212815-0.2423172891
    95-0.0000500000-0.0123835430-0.0123335430
    96 0.0181620009 0.0374896154 0.0193276145
    97 0.0774770007 0.0865747333 0.0090977326
    98 0.0179789998 0.0243982524 0.0064192526
    99-0.0464700013-0.0064554564 0.0400145464
   100-0.0297400001-0.0108487122 0.0188912880
   101-0.0134399999 0.0099289045 0.0233689044
   102 0.0576109998 0.0509947352-0.0066162646
   103-0.0356100015-0.0211411919 0.0144688096
   104-0.0013400000-0.0009915107 0.0003484893
   105 0.0458530001 0.0319963023-0.0138566978
   106 0.0231340006 0.0141323283-0.0090016723
   107 0.0217243396-0.0049838545-0.0267081931

TURNOVER =     0.2540976        %

VARIANCE AT  OLD  WEIGHTS =     14.01026
VARIANCE AT  NEW  WEIGHTS =     14.12339
                    DELTA =    -0.8010368         %

***       BUY       ***
```

```
***************************************************************************
  *** WEIGHTS ***     SPAN    SIC     SYMBOL    SECURITY
  OLD   NEW   DELTA   SENSIT  CODE    IDC TICK  NAME
***************************************************************************
  2.847 3.000 0.153   2.124   65      KOG KOG   KOGER PPTYS INC
  2.680 2.944 0.265   2.508   67      MTRV MT   MEDITRUST SH BEN INT

***   SELL   ***
***************************************************************************
  *** WEIGHTS ***     SPAN    SIC     SYMBOL    SECURITY
  OLD   NEW   DELTA   SENSIT  CODE    IDC TICK  NAME
***************************************************************************

*** INDUSTRY WEIGHTINGS ***
***************************************************************************
  CODE        INDUSTRY                   WEIGHT
***************************************************************************
    1     AGRICULTURAL PRODUCTION-CROPS   2.20 %
    8     FORESTRY                        2.81 %
   12     BITUMINOUS COAL & LIGNITE MIN.  2.88 %
   13     OIL & GAS EXTRACTION            0.50 %
   20     FOOD KINDRED PRODUCTS           3.60 %
   23     APP. & OTH. FIN. PROD. MFFAOSM  0.57 %
   25     FURNITURE AND FIXTURES          1.10 %
   27     PRINTING PUBLISHING AND A.P.    3.29 %
   29     PETROLEUM REFIN. & REL. PROD.   3.54 %
   30     RUBBER AND MISC. PLAST. PROD.   3.02 %
   32     STONE CLAY GLASS & CONC. PROD.  1.22 %
   35     MACHINERY EXCEPT ELECTRICAL     5.18 %
   36     ELE. AND ELE. MACH.             3.05 %
   37     TRANSPORTATIONS EQUIPMENT       2.33 %
   38     MEAS. ANAL. & CONT. INST. ETC.  6.08 %
   45     TRANSPORTATION BY AIR           2.63 %
   48     COMMUNICATION                   4.37 %
   49     ELECTRIC GAS AND SANIT. SERV.  16.33 %
   51     WHOLESALE TRADE-NONDUR. GOODS   2.88 %
   52     BUILDING MAT. HARD. GAR. SUPP.  1.83 %
   60     BANKING                         4.63 %
   61     CRED. AGEN. OTH. THAN BANKS.    2.63 %
   65     REAL ESTATE                     3.00 %
   67     HOLD. AND OTHER INV. COMP.     13.35 %
   73     BUSINESS SERVICES               3.77 %
   75     AUTO. REPAIR SERV. AND GAR.     0.99 %
   80     HEALTH SERVICES                 2.25 %
                          TOTAL    =    100.00 %
```

APPENDIX II

LIABILITY RETURN PROGRAM

To create a return series for a liability stream from yields.

(Appendix II pp. 1-4)

```
$LARGE
$DEBUG
C       LIABILITY RETURN PROGRAM
C       AUTHOR JOE DADA III
C       LAST UPDATE 3-21-88
C       COPYWRITE 1988 NATIONAL INVESTMENT SERVICES OF AMERICA INC.

PROGRAM SPANRATE $INCLUDE: 'RATE.FOR'

C                       CALL SUBS TO GET INPUT DATA
C       CALL INTRO

C                       ITYPE=1,ABO;=2,PBO

C               THIS SECTION TO BE REMOVED AND BY SUB INTRO
C       LIAIN='TEMP.LIA'
C       YIELDS='NYTM.PRN'
C       OLDFILE='TEMP.LIR'
C       RETOUT='TEMP2.LIR'
C       OLDOUT=1

WRITE(*,*)' DOES OLD OUTPUT FILE EXIST ? Y/N'
        READ(*,1500)GARB
        IF(GARB.EQ.'Y'.OR.GARB.EQ.'y')THEN
            OLDOUT=1
            WRITE(*,*)' ENTER NAME OF OLD RETURN FILE'
            READ(*,1500)OLDFILE
        ELSE
            OLDOUT=0
        ENDIF
        WRITE(*,*)' ENTER LIABILITY STREAM FILENAME'
        READ(*,1500)LIAIN
        WRITE(*,*)' ENTER NEW OUTPUT FILENAME'
        READ(*,1500)RETOUT
        WRITE(*,*)'RETOUT',RETOUT
        WRITE(*,*)' ENTER YIELD TO MATURITY FILENAME'
        READ(*,1500)YIELDS

OPEN (11,FILE=YIELDS)
        READ(11,1500)GARB
        READ(11,1500)GARB
        READ(11,1500)GARB
        READ(11,1500)GARB
```

```
        READ(11,1500)GARB
        READ(11,1500)GARB
        READ(11,*)IYLD1
        READ(11,*)IYLD2
        DO 333 I=IYLD1,IYLD2
            READ(11,*)YTM(I)
333     CONTINUE
        CLOSE (11)

OPEN (10,FILE=RETOUT,STATUS='NEW')

IF(OLDOUT.EQ.1)THEN
            OPEN (8,FILE=OLDFILE)
            READ(8,1500)TITLE
            READ(8,1500)GARB
            READ(8,1500)GARB
            READ(8,1500)GARB
            READ(8,1500)GARB
            READ(8,1500)GARB
            READ(8,*)IRET1
            READ(8,*)IRET2
            IF(IRET2.GE.IYLD2)THEN
                WRITE(*,*)'CAN T UPDATE RETURN FILE CHECK YIELDS FILE'
                STOP
            ENDIF
            WRITE(10,1500)TITLE
            WRITE(10,1500)GARB
            WRITE(10,1500)GARB
            WRITE(10,1500)GARB
            WRITE(10,1500)GARB
            WRITE(10,1500)GARB
            WRITE(10,*)IRET1
            WRITE(10,*)IYLD2

DO 600 I=IRET1,IRET2
                READ   (8,*)RS,PV1,PV2,MM,DUR
                WRITE  (10,2001)RS,PV1,PV2,MM,DUR
600         CONTINUE
            CLOSE(8)
        ELSE
            IRET1=IYLD1+1
            WRITE(*,*)' ENTER TITLE FOR RETURN FILE'
            READ(*,1500)TITLE
            WRITE(10,1500)TITLE
            WRITE(10,1500)GARB
            WRITE(10,1500)GARB
            WRITE(10,1500)GARB
            WRITE(10,1500)GARB
            WRITE(10,*)IRET1
            WRITE(10,*)IYLD2
        ENDIF
```

```
        OPEN (9,FILE=LIAIN)
        DO 448 I=1,1000
            READ(9,*,END = 449)XLIA(I)
448     CONTINUE
        CLOSE(9)

449     NYEARS=I-1
        NMONTHS=NYEARS*12
        IF(NYEARS.GT.90)THEN
            WRITE(*,*)' ERROR LIA STREAM HAS TOO MANY YRS 90 IS MAX'
            STOP
        ENDIF

C               CALCULATE MONTHLY YIELDS AND SLIDE
C               OLD YIELD BACK TO BEG OF MONTH

DO 222 I=1,NYEARS
            XLIA(I)=XLIA(I)/12
222     CONTINUE

IF(OLDOUT.EQ.1)THEN
            ISTART=IRET2-1
        ELSE
            ISTART=IYLD1
        ENDIF
        ICHECK=ISTART+1
        DO 100 I=ISTART,IYLD2
C           WRITE(*,*)'I',I,'YLD',YTM(1)
C       +       ,XLIA(1)
            FR1=FR
            FR=(1+YTM(I))**(0.083333)-1

C               SKIP TO END OF LOOP FIRST TIME THROUGH
            IF(FR1.EQ.0)GO TO 100
C               PROD IS DENOMINATOR TO CONV FUTURE TO PV
            PV1=0.0
            PV2=0.0
            PROD1=1.0
            PROD2=1.0
            DUR=0
            DO 300 J=1,NYEARS
                DO 300 L=1,12
                    PROD1=PROD1*(1+FR1)
                    PV1=PV1+XLIA(J)/PROD1
                    DUR=DUR+(J+L/12)*XLIA(J)/PROD1
                    IF(J.EQ.1.AND.L.EQ.1)GOTO 400
                    PROD2=PROD2*(1+FR)
400                 PV2=PV2+XLIA(J)/PROD2
300         CONTINUE
            RR=PV2/PV1-1.0
            DUR=DUR/PV1
```

```
C            IF OLDFILE EXIST CHECK LAST RETURN IN IT
C            VERSUS NEW CALC TO CHECK PARAMETERS
       IF(OLDOUT.EQ.1.AND.I.EQ.ICHECK)THEN
         IF(RS.GT.RR+.00001.OR.RS.LT.RR-.00001)THEN
            WRITE(*,*)' PARAMETERS NOT SAME AS OLD OUTPUT FILE'
            WRITE(*,*)' OLD RET',RS,' NEW RET',RR,' I',I
            STOP
         ELSE
            GOTO 100
         ENDIF
       ENDIF
110    WRITE (10,2001)RR,PV1,PV2,I,DUR
       WRITE(*,343)'RETURN DATA',I,PV1,PV2,RR,DUR
100    CONTINUE
       CLOSE(10)

343    FORMAT(A10,I4,4X,F17.0,4X,F13.0,4X,F10.6,3X,F5.2)
1500   FORMAT(A40)
2001   FORMAT(F13.10,2F15.0,I4,3X,F5.2)

STOP
       END
```

APPENDIX III

CORRELATION PORTFOLIO PROGRAM

To create an optimal index correlation portfolio with securities.

(Appendix III pp. 1-57)

```
C UPDATED December 6, 1988
C ****************************************************************
          PROGRAM SPAN
C ****************************************************************
       INCLUDE 'COMSUC.F'

LOGICAL ICOUNT
C ************          DATA INPUT SECTION       *************************
5      CONTINUE

C      DEFAULT READ IN OF 24 MONTHS PRIOR  = NSTAT, NRESTS FOR B( ) ****
       NSTAT = 24
       NRETS = 24
       BULLET = 0.0
       TARGET = 1.
       TURN = 100.
       ITYPE = 1
       ICHANGE = 0
       XBLOWER = .0D0
       XBUPPER = 3.0D0
       SMAX = XBUPPER

C ********************        CALL FLASH TO INTRODUCE   S P A N   ****
C      CALL FLASH

C ************  IF 'COUNTS' EXISTS THIS IS A MULTIPLE RUN      ****
       INQUIRE (FILE = 'COUNTS', EXIST = ICOUNT)

IF (ICOUNT .EQV. .FALSE.)  THEN
C ********************        CALL INTRO TO INPUT PARAMETERS    ****
          CALL INTRO
C ********************        CALL MODIFY TO CHANGE PARAMETERS  ****
          CALL MODIFY

C ********************  ICOUNT  IS TRUE  --> CALL MULTRUN    ********
       ELSE
          CALL MULTRUN(ISKIP)
       END IF

C ********************        CALL SAVDAT TO SAVE    PAST.DAT   ****
       CALL SAVDAT
C ****************************************************************
       NM = NMSAVE
       NM = (INT(NM/100)-80)*12+(NM-INT(NM/100)*100)
       IREAD = NSTAT+NSIMS

IF(NSTOCKS.GT.0)THEN
         XBUPPER = SMAX
```

```
          END IF
C********** SET UP CONSTANTS ********************

NUM = NSTOCKS+NBONDS
      IF(NUM.GT.ND)THEN
          WRITE(*,*)' WARNING NUM >',ND,' TOO BIG FOR PROGRAM'
          STOP
      ENDIF

ICOL = ID
      KE = KEQ
      KKK = KE
      IA = ND
      ICC = ND
      IH = N2D

IFIRST = NM-NSTAT
      ILAST = NM+NSIMS-1

BULL1 = BULLET
      TARG1 = TARGET
      TURN1 = TURN

BULLET = BULLET*ABS(BULLET)/1000.
      IF (TURN1.EQ.100.)THEN
          TURN = 0.0
      ELSE
          TURN = TURN1/50.
      END IF
C ********************** CALL COVIN TO READ IN RETURNS    ******
      CALL COVIN (NUM,IREAD,IFIRST,ILAST)

C ********************** CALL HOLDING TO FOR CURRENT WEIGHTS ****
      CALL HOLDING (NUM)

C ********************** CALL MATRIX TO CALCULATE  INPUT ARRAYS *
      WRITE(*,101)'CALLING MATRIX  ........        '
      CALL MATRIX (NUM,IREAD)

C ***************************************************************
      WRITE(*,101)'CALLING BOUNDS  .......        '
      CALL BOUNDS (NUM,ICOL,MMM)

C ***************************************************************

C ******************* CALL TO OPTIMIZER       *******************

WRITE(*,101)'CALLING OPTIMIZER  ......       '
      IF (ICOUNT.EQV. .TRUE.) THEN
          WRITE(*,102)'WORKING ON RUN NUMBER    ',ISKIP
      END IF
```

```
      MAXWS = 2*(2*NUM+ID)*(2*NUM+ID)+8*(2*NUM+ID)+6
      ITURN = 0
      CALL QSET ( NUM, MAXWS,ITURN )
C ********    IF TURNOVER IS CONSIDERED, CALL TURNOV

IF(TURN.GT.0) THEN
         ITURN = 1
         CALL QSET (NUM, MAXWS, ITURN)
      END IF

C ********************   CALL TO PORTFOLIO OUTPUT    ***************
      WRITE(*,*)
      WRITE(*,101)'CALLING PORT   ..........   '
      CALL PORT (NUM)
      IF (IDUMMY .EQ. 1) GO TO 100

C ********************   CALL TO STATISTICAL TRACKING    *********
      WRITE(*,101)'CALLING TRACKER  .......   '
      CALL TRACKER (NUM,IREAD)

C ********************   CALL TO TURNOVER ROUTINE    *********
      WRITE(*,101)'CALLING BAL   ...........   '
      CALL BAL (NUM)
C ******************************************************************
100   WRITE(*,101)'SPANNING SIMULATION COMPLETE'
      IF (ICOUNT.EQV. .TRUE.) THEN
         WRITE(*,102)'DONE WITH RUN NUMBER    ',ISKIP
         GO TO 5
      END IF

101   FORMAT('+',A50)
102   FORMAT('+',A50,I7)

END
C                  END OF MAIN PROGRAM SPAN1
C ******************************************************************
********************************************************************
      SUBROUTINE MULTRUN (ISKIP)
********************************************************************
      INCLUDE 'COMSUC.F'
      CHARACTER*30 XTITL,XFLOUT,XLIBIN,XSTKIN,XBNDIN

OPEN (13,FILE ='MULTIN',STATUS = 'OLD')

IF (ISKIP.EQ.0) GO TO 30

DO 10 I = 1, ISKIP
```

```
              DO 20 J = 1,18
              READ(13,'(A1)',END = 99)GARB
20            CONTINUE
10      CONTINUE

30      CONTINUE
        READ(13,101,END = 99)TITLE
        READ(13,101, END = 99) FILEOUT
        READ(13,101, END = 99) LIABIN
        READ(13,101, END = 99) STOCKIN
        READ(13,101, END = 99) BONDIN
        READ(13,*, END = 99) NMSAVE
        READ(13,*, END = 99) NSIMS
        READ(13,*, END = 99) NSTOCKS
        READ(13,*, END = 99) NBONDS
        READ(13,*, END = 99) IDUMMY
        READ(13,*, END = 99) STOCKMIN
        READ(13,*, END = 99) YIMAX
        READ(13,*, END = 99) SMAX
        READ(13,*, END = 99) NSTAT
        READ(13,*, END = 99) NRETS
        READ(13,*, END = 99) BULLET
        READ(13,*, END = 99) TARGET
        READ(13,*, END = 99) TURN

101     FORMAT (A20)

ISKIP = ISKIP+1

CLOSE(13)
        RETURN

C *****    STOP  DONE WITH MULTI RUN     **********
99      CLOSE(13)
        WRITE(*,*)'DONE WITH MULTIPLE RUN ******************'
        STOP
        END
*****************    END OF SUBROUTINE  MULTRUN    *****************
********************************************************************
        SUBROUTINE HOLDING (NUM)
********************************************************************
        INCLUDE 'COMSUC.F'

DIMENSION VAL(ND)
        CHARACTER*9 SYMBL,IDCSYM(ND)
        CHARACTER*12 HOLD
        LOGICAL HOLDEX

C ****  IHOLD IS READ FROM FIRST SCREEN RESPONSE: OLD OR HOLDINGS RUN **
        IF (IHOLD .EQ. 0) GO TO 999

11      WRITE(*,*)'INPUT PORTFOLIO #, AND NAME OF HOLDINGS FILE'
```

```
            READ(*,*)IPORT,HOLD
            INQUIRE (FILE = HOLD,EXIST = HOLDEX)
            IF (HOLDEX .EQV. .FALSE.) THEN
                WRITE(*,*)'FILE NOT FOUND ',HOLD
                GO TO 11
            END IF

OPEN (25,FILE = HOLD,STATUS = 'OLD')

XPORT = REAL(IPORT)
            I = 0
22          READ(25,*, END = 44)SYMBL,VALUE
            IF (SYMBL .EQ. 'IDCSYMBL') THEN
                IF (VALUE .EQ. XPORT) THEN
                    READ(25,*,END = 44)GARB
33                  READ(25,*, END = 44)SYMBL,VALUE
                        IF (SYMBL .EQ. 'IDCSYMBL') GO TO 44
                        I = I + 1
                        IDCSYM(I) = SYMBL
                        VAL(I) = VALUE
                        GO TO 33
                END IF
            READ(25,*,END = 44) GARB
            END IF
            GO TO 22

44          CONTINUE
            NIDC = I
            IF (NIDC .EQ. 0)THEN
                WRITE(*,*)'PORTFOLIO NUMBER NOT FOUND ', IPORT
                GO TO 11
            END IF

ICASH = 0
            PORTVAL = 0.0
            DO 10 I=1,NIDC
                PORTVAL = PORTVAL + VAL(I)
                IF (IDCSYM(I) .EQ. 'CASH')THEN
                    ICASH = 1
                    TEMP = VAL(I)
                    VAL(I) = VAL(1)
                    VAL(1) = TEMP
                    GARB = IDCSYM(I)
                    IDCSYM(I) = IDCSYM(1)
                    IDCSYM(1) = GARB
                END IF
10          CONTINUE
            IF (ICASH .EQ. 0) THEN
                WRITE(*,*)'NO CASH INCLUDED....PROGRAM STOPPING'
                STOP
            END IF
```

```
        IDCTEST = 0
        NCOUNT = 0
        DO 20 I = 2,NIDC
          ITEST = 0
          DO 30 J = 1,NUM
            IF(IDC(J)(1:4) .EQ. IDCSYM(I)) THEN
              ITEST = 1
              NCOUNT = NCOUNT+1
              OLDWT(J) = VAL(I) / PORTVAL
            END IF
30        CONTINUE
        IF (ITEST .EQ. 0) THEN
          IDCTEST = 1
          WRITE(*,*)IDCSYM(I),': SYMBOL NOT INCLUDED IN RETURN FILE'
        END IF
20      CONTINUE

IF (IDCTEST.EQ.1) THEN
          WRITE(*,*)NIDC-NCOUNT-1,'SYMBOLS NOT FOUND..PROGRAM STOPPING'
          STOP
        END IF
        RETURN

999     OPEN(21,FILE = 'OLD',STATUS = 'OLD')
        DO 90 I = 1,NUM
          READ(21,*)OLDWT(I)
          IF (TURN.EQ. 0.0)OLDWT(I) = 0.0
          OLDWT(I) = OLDWT(I)/100.
90      CONTINUE
        CLOSE(21)
        RETURN

END
C ****************   END OF SUBROUTINE  HOLDING     **************
C UPDATE 8/9/88
C **********  THIS SUBROUTINE READS IN STOCK, BOND & LIA DATA ******

SUBROUTINE COVIN (NUM,IREAD,IFIRST,ILAST)

C ******************************************************************

C          IFIRST IS FIRST MONTH OF DATA NEEDED FOR MATRIX
C          ILAST IS LAST MONTH OF SIMULATION
C
        INCLUDE 'COMSUC.F'

C *****************   READ IN LIABILITY RETURNS  *********************

OPEN (9,FILE = LIABIN, STATUS = 'OLD')

READ (9,111) LIANAME
```

```
        WRITE(*,*)LIANAME
        DO 200 I = 1,5
            READ (9,111) GARB
200     CONTINUE

READ (9,*) ISTART
        READ (9,*) ISTOP

DO 300 I = 1,IFIRST-ISTART
            READ (9,111) GARB
300     CONTINUE

DO 400 I = 1,IREAD
            READ (9,*) ANIM(I)
400     CONTINUE

CLOSE(9)

C                                               READ IN STOCK DATA
        IF (NSTOCKS.GT.0) THEN
            OPEN (4,FILE = STOCKIN, STATUS = 'OLD')

DO 600 I = 1,IDUMMY
                READ (4,111) (GARB,L = 1,6)
                READ (4,*) ISTART
                READ (4,*) ISTOP
                DO 610 K = 1,ISTOP-ISTART+1
                    READ (4,*) XGARB
610             CONTINUE
600         CONTINUE
111     FORMAT (A30)

DO 700 I = 1,NSTOCKS
783             READ (4,111,END = 785) NAME(I)

C ****  CUT OFF LEADING BLANKS OF NAME(I)
            ILEN = 1
            GARB = '                              '
790         IF (NAME(I)(ILEN:ILEN) .EQ. ' ')THEN
                ILEN = ILEN+1
                GO TO 790
            ELSE
                GARB(1:LENGTH) = NAME(I)(ILEN:LENGTH)
            END IF
            NAME(I) = GARB

WRITE (*,112) I,NAME(I)
112         FORMAT('+','STOCK # ',I5,' IS ',A30)
            READ (4,111) GARB

C ****  CUT OUT BLANKS FROM GARB TO GET AN IDC AND TICKER
            READ (4,111) GARB
```

```
              ILEN = 1
              IDC(I) = '        '
     791      IF (GARB(ILEN:ILEN).EQ.' ') THEN
                 ILEN = ILEN + 1
                 IF ((ILEN+3).GT.LENGTH) GOTO 793
                 GOTO 791
              ENDIF

IDC(I)(1:4) = GARB(ILEN:ILEN+3)
              ILEN = ILEN + 4

792      IF (GARB(ILEN:ILEN).EQ.' ') THEN
                 ILEN = ILEN + 1
                 IF ((ILEN+3).GT.LENGTH) GOTO 793
                 GOTO 792
              ENDIF
              IDC(I)(6:9) = GARB(ILEN:ILEN+3)

793      CONTINUE

READ (4,*) ISIC(I)
              IF(ISIC(I).GT.99) ISIC(I) = INT (ISIC(I)/100)
              READ (4,111) (GARB,L = 4,5)
              READ (4,*) ISTART
              READ (4,*) ISTOP

C *****   TEST FOR ENOUGH RETURNS TO SATISFY NRETS *****************

ICHECK = NM-NRETS-ISTART
              IF(ICHECK.LT.0) NRETS = NM - ISTART
              IF(NRETS.LT.NSTAT) ICHECK = IFIRST-ISTART

DO 800 J = 1,ICHECK
                 READ (4,111) GARB
     800      CONTINUE

DO 801 J = 1,NRETS-NSTAT
                 READ(4,*)GARB
     801      CONTINUE

JJ = NRETS-NSTAT

DO 810 K = 1,IREAD
                 READ (4,*) RET(K,I)

C ****  ADJUST OCTOBER 1987 ********************
        IF(K+NM-NSTAT-1.EQ.94.)THEN
           IF(K.LE.NSTAT)RET(K,I)=RET(K,I)/2.97
        END IF
                 J = JJ+K
     810      CONTINUE
```

```
              DO 1200 J = 1,ISTOP-ILAST
                  READ (4,111) GARB
1200          CONTINUE

700      CONTINUE
      ENDIF
1400  CONTINUE
      CLOSE(4)
C                             READ IN BOND DATA

IF (NBONDS.GT.0) THEN
      OPEN (7,FILE = BONDIN, STATUS = 'OLD')

DO 900 I = NSTOCKS+1,NSTOCKS+NBONDS
          READ (7,111) NAME(I)
          WRITE (*,113) I,NAME(I)
          READ (7,111) (GARB,L = 1,5)
          READ (7,*) ISTART
          READ (7,*) ISTOP
113       FORMAT('+','BOND  # ',I5,' IS ',A30)

C ****  TEST ICHECK FOR ENOUGH RETURNS FOR BRET    *******************

ICHECK = NM-NRETS-ISTART
          IF(ICHECK.LT.0) THEN
      WRITE(*,*)'BOND ',I,' DOES NOT HAVE ENOUGH RETURNS FOR NRETS'
              STOP
          END IF
          IF(NRETS.LT.NSTAT) ICHECK = IFIRST-ISTART

DO 1000 J = 1,ICHECK
              READ (7,111) GARB
1000      CONTINUE

DO 1001 J = 1,NRETS-NSTAT
              READ(7,*)GARB
1001      CONTINUE

JJ = NRETS-NSTAT

DO 1010 K =1,IREAD
          READ (7,*) RET(K,I)
              J = JJ + K
1010       CONTINUE

DO 1300 J = 1,ISTOP-ILAST
              READ (7,111) GARB
1300      CONTINUE

900  CONTINUE

ENDIF
```

```
        CLOSE(7)
        RETURN

C ***   IF END OF FILE WAS HIT ON STOCKS - RESET NUM AND CONTINUE ***
785     NSTOCKS = I-1
        NUM = NSTOCKS+NBONDS
          GOTO 1400

END
C                                                       END OF SUBROUTINE COVIN
C
C***********************************************************************

C ***************** MATRIX CALCULATION SUBROUTINE ******************
        SUBROUTINE MATRIX (NUM,IREAD)
C***********************************************************************
        INCLUDE 'COMSUC.F'

C                     IREAD = NSTAT+NSIMS
C                     NUM = NSTOCKS+NBONDS
        UANIM = 0.0
        DO 198 I = 1,NUM
          AVE(I) = 0.0
          DO 199 J = 1,NSTAT
                AVE(I) = AVE(I)+RET(J,I)/DBLE(NSTAT)
199       CONTINUE
198     CONTINUE

UANIM = 0.
        DO 129 I = 1,NSTAT
          UANIM = UANIM + ANIM(I)*TARGET/DBLE(NSTAT)
129     CONTINUE

XXX = DBLE(NSTAT-1)
        DO 130 I = 1,NUM
          B(I) = 0.0
          DO 131 J = 3,NSTAT

TEMPI = (1+RET(J,I))*(1+RET(J-1,I))*(1+RET(J-2,I))-1.0
        TEMPJ = (1+ANIM(J))*(1+ANIM(J-1))*(1+ANIM(J-2))-1.0
        B(I) = B(I)+(TEMPI-AVE(I)*3.)*(TEMPJ*TARGET-UANIM*3.) / XXX
131       CONTINUE
130     CONTINUE

C NOW CALCULATES COVAR AND SIGMA PURE
CCCCC REMOVE COMMENTS DOWN TO CCCCCC LINE TO USE SIGMA DIFF
C       BRET = 0.0
C       DO 233 I = 1,NUM
C       OLDWT(I) = OLDWT(I)/100.
C       BRET = BRET + OLDWT(I)*OLDWT(I)
C         DO 244 J = 1,NSTAT
C               RET(J,I) = RET(J,I)-ANIM(J)*TARGET
```

```
C244    CONTINUE
C233  CONTINUE
C
C ***    TURN IS USED TO ADJUST IMPORTANCE OF DELTA X    *********
C
C       DO 213 I = 1,NUM
C          AVE(I) = 0.0
C          DO 214 J = 1,NSTAT
C             AVE(I) = AVE(I)+RET(J,I)/DBLE(NSTAT)
C 214    CONTINUE
C
C 213   CONTINUE
CCCCCCCCCCCCCCCCCCCCCCCCCCCCCCCCCCCCCCCCCCCCCCCCCCCCCC

C ********       CALCULATE COVARIANCE MATRIX    **********
      XXX = DBLE(NSTAT-1)
      DO 215 I = 1,NUM
         DO 215 J = I,NUM
            A(I,J) = 0
            DO 215 K = 3,NSTAT

TEMPI = (1+RET(K,I))*(1+RET(K-1,I))*(1+RET(K-2,I))-1.0
      TEMPJ = (1+RET(K,J))*(1+RET(K-1,J))*(1+RET(K-2,J))-1.0

A(I,J) = A(I,J)+(TEMPI-AVE(I)*3.)*(TEMPJ-AVE(J)*3.) / XXX

A(J,I) = A(I,J)

IF(A(I,J).GT.50)WRITE(*,*)'COV TOO BIG',A(I,J),I,J
 215  CONTINUE

C TEST TO SEE IF RETURNS HAVE BEEN RESET FOR OCTOBER 1987 ***
      IF(94.GE.NM-NSTAT.AND.94.LE.NM-1)ITRUE = 1
      DO 387 I = 1,NUM
C ****     FOR ADDING K*IDENTITY TO  [A]    *****************
C         A(I,I) = A(I,I)+TURN
      IF(ITRUE.EQ.1)RET(94-NM+NSTAT+1,I)=RET(94-NM+NSTAT+1,I)*2.97
         B(I) = B(I)*BULLET
 387  CONTINUE

RETURN

END
C                                                END OF SUBROUTINE MATRIX
C  ****************************************************************
C  ************************* SUBROUTINE BOUNDS ********************
      SUBROUTINE BOUNDS (NUM,ICOL,MMM)
C  ****************************************************************

INCLUDE 'COMSUC.F'
```

```
      SCAL  = 1.25
      SIC49 = 0.0
      SIC60 = 0.0
      SIC63 = 0.0
      SIC67 = 0.0

DO 80 I = 1,NUM
         BDL(I) = XBLOWER/100.0
         BDU(I) = XBUPPER/100.0
         IF(OLDWT(I).GT.BDU(I))THEN
           IF(OLDWT(I).GT.SCAL*BDU(I)) THEN
             BDU(I) = SCAL*BDU(I)
           ELSE
             BDU(I) = OLDWT(I)
           END IF
         END IF
         IF (I.GT.NSTOCKS) BDU(I) = 1.

IF(ISIC(I).EQ.48) SIC49 = SIC49+OLDWT(I)
         IF(ISIC(I).EQ.49) SIC49 = SIC49+OLDWT(I)
         IF(ISIC(I).EQ.60) SIC60 = SIC60+OLDWT(I)
         IF(ISIC(I).EQ.63) SIC63 = SIC63+OLDWT(I)
         IF(ISIC(I).EQ.67) SIC67 = SIC67+OLDWT(I)
80    CONTINUE

D(1) =  STOCKMIN/100.0
         D(2) =  100.0/100.0
         D(3) = -100.01/100.0
         D(4) = -YIMAX/100.0
         D(5) = -YIMAX/100.0
         D(6) = -YIMAX/100.0

SIC60S = SIC60+SIC63+SIC67
      IF(SIC49*100.GT.YIMAX.AND.SIC49*100.LT.SCAL*YIMAX)D(4) = -SIC49
      IF(SIC60S*100.GT.YIMAX.AND.SIC60S*100.LT.SCAL*YIMAX)D(5)=-SIC60S
      IF(SIC67*100.GT.YIMAX.AND.SIC67*100.LT.SCAL*YIMAX)D(6) = -SIC67

IF( SIC49*100.GT.SCAL*YIMAX)  D(4) = D(4)*SCAL
      IF( SIC60S*100.GT.SCAL*YIMAX) D(5) = D(5)*SCAL
      IF( SIC67*100.GT.SCAL*YIMAX)  D(6) = D(6)*SCAL

DO 51 J = 1,ICOL
        DO 52 I = 1,NUM
          C(I,J) = 0.0
          IF (J.EQ.1.AND.I.LE.NSTOCKS)  C(I,J) = 1.0
          IF (J.EQ.2) C(I,J) = 1.0
          IF (J.EQ.3) C(I,J) = -1.0
          IF (J.EQ.4.AND.ISIC(I).EQ.49)    C(I,J) = -1.0
          IF (J.EQ.4.AND.ISIC(I).EQ.48)    C(I,J) = -1.0
          IF (J.EQ.5.AND.ISIC(I).EQ.60)    C(I,J) = -1.0
          IF (J.EQ.5.AND.ISIC(I).EQ.63)    C(I,J) = -1.0
```

```
              IF (J.EQ.5.AND.ISIC(I).EQ.67)   C(I,J) = -1.0
              IF (J.EQ.6.AND.ISIC(I).EQ.67)   C(I,J) = -1.0
52        CONTINUE
51        CONTINUE
C      CLOSE (6)

MMM = 2*NUM+ICOL

RETURN

END
C                           END OF SUBROUTINE BOUNDS
C ******************************************************************

C ******************************************************************
       SUBROUTINE PORT (NUM)
C ******************************************************************

INCLUDE 'COMSUC.F'

C      ****************** BEGIN OUTPUT PROCEDURES **************
       UANIM = 0.0
       DO 129 I = 1,NRETS
       UANIM = UANIM + ANIM(I)/DBLE(NRETS)
129    CONTINUE
       UANIM = UANIM*TARGET

XTOT=0.
       IDUMMY = 0

DO 130 I=1,NUM
          XTOT=XTOT+X(I)
          CUM(I) = X(I)
          IF(X(I).LT. -0.001) THEN
       WRITE(*,*)' '
       WRITE(*,*)'*************   SPANNING RUN ABORTED   *************'
       WRITE(*,*)' WEIGHT NUMBER ',I,' = %',X(I)*100.
       WRITE(*,*)'****************************************************'
       IDUMMY = 1
       RETURN
       END IF

130    CONTINUE
       IF (ABS(XTOT-1.0) .GT. 0.005) THEN
       WRITE(*,*)' '
       WRITE(*,*)'*************   SPANNING RUN ABORTED   *************'
       WRITE(*,*)' TOTAL WEIGHT IN PORTFOLIO = %',XTOT*100.
       WRITE(*,*)'****************************************************'
       IDUMMY = 1
```

```
      RETURN
      END IF

C     ******************* PRINT SPANNING SIMULATION RESULTS ***

OPEN(10,FILE=FILEOUT,STATUS='UNKNOWN')
      REWIND(10)

WRITE(10,*)' NATIONAL INVESTMENT SERVICES SPANNING TECHNOLOGY'
      WRITE(10,*)'              SIMULATION RESULTS'
      WRITE(10,*)
      WRITE(10,*)'                  ',TITLE
      WRITE(10,*)
      WRITE(10,*)' LIABILITY STREAM USED  ',LIANAME
      WRITE(10,*)
      WRITE(10,*)'        START    END    SPANNING'
      WRITE(10,*)'NUMBER WEIGHT  WEIGHT SENSITIVITY SIC #  IDC   ',
     &           'SECURITY NAME'
      WRITE(10,*)

C  ******   CALCULATE THE PORTFOLIO RETURNS   *********************
C  ******   FIRST CALCULATE RETURNS FOR NSTAT PERIOD ***************
      DO 800 I = 1,NSTAT
         PRET(I) = 0.0
         DO 900 J = 1,NUM
            PRET(I) = PRET(I) + RET(I,J)*X(J)
 900     CONTINUE
 800  CONTINUE
C  ******   NOW CALCULATE RETURNS AND WEIGHTS IN SIMULATION PERIOD *
      DO 801 I=1,NSIMS
         PRET(I+NSTAT)=0.0
         DO 901 J=1,NUM
            PRET(I+NSTAT) = PRET(I+NSTAT)+CUM(J)*RET(I+NSTAT,J)
 901     CONTINUE
         DO 1001 K = 1,NUM
            CUM(K) = CUM(K)*(1.+RET(I+NSTAT,K))/(1.+PRET(I+NSTAT))
 1001    CONTINUE
 801  CONTINUE

C ***  WRITE OUT THE NEW WEIGHTS TO A FILE CALLED 'OLD'********
      OPEN(15,FILE = 'OLD', STATUS = 'OLD')
      REWIND(15)
      DO 140 I = 1,NUM
      WRITE(15,940) CUM(I)*100
 140  CONTINUE
 940  FORMAT(1X,F15.8)
      CLOSE(15)

C  ******   CALCULATE PARTIALS AND WRITE OUTPUT  *****************
      XVAR = 0.0
      XCOVAR = 0.0
      XRET = 0.0
```

```
      ICOUNT=0

DO 131 I=1,NUM
         IF(BULLET.NE.0.0)B(I) = B(I)/BULLET
         C(I,1)= 0.0
         DO 132 J=1,NUM
            C(I,1)=C(I,1)+X(J)*2.0*A(I,J)
            XVAR=XVAR+X(I)*X(J)*A(I,J)
132      CONTINUE
         XRETI = AVE(I) + UANIM
         XRET = XRET + X(I)*XRETI
         XCOVAR = XCOVAR + X(I)*B(I)
131   CONTINUE

DO 150 I = 1,NUM
         C(I,1) = B(I)*XVAR**(-0.5)-0.5*XCOVAR*C(I,1)*XVAR**(-1.5)

ICOUNT=ICOUNT+1
         WRITE(10,16)ICOUNT,X(I)*100,CUM(I)*100,C(I,1)*100,
     &               ISIC(I),IDC(I),NAME(I)
150   CONTINUE
16    FORMAT(1X,I4,1X,2F8.3,F10.6,I4,2X,A9,2X,A30)
      WRITE(10,*)

STD=(XVAR*12)**(.5)*100
      XRET = XRET*12.0*100.0
      XCOVAR = XCOVAR*1200

WRITE(10,649) STD, XRET, XCOVAR
649   FORMAT(1X,' MINIMUM STD DEV =',F10.4,'  EXPECTED RETURN =',F10.4,
     & ' COVARIANCE = ',F10.4)
      WRITE(10,*)

C     IF(ITYPE.EQ.1.AND.XTOT.LT..995)WRITE(10,*)' ERROR ****** ',
C    .' SUM OF X S = %',XTOT*100.
C     IF(ITYPE.EQ.1.AND.XTOT.GT.1.005)WRITE(10,*)' ERROR ****** ',
C    .' SUM OF X S = %',XTOT*100.

RETURN

END
C                     END OF SUBROUTINE PORT
C     ****************************************************************

C     ****************************************************************
      SUBROUTINE TRACKER (NUM,IREAD)
C     ****************************************************************
      INCLUDE 'COMSUC.F'

C     *******  RESET THE RETURNS TO ORIGINAL STATE  ******************
C       DO 1300 J=1,NUM
```

```
C         DO 1300 I=1,NSTAT
C              RET(I,J)=RET(I,J)+ANIM(I)*TARGET
C              IF(I+NM-NSTAT-1.EQ.94)RET(I,J)=RET(I,J)*2.97
C 1300  CONTINUE

C ******     SET AVERAGES AND COVARIANCES TO ZERO  ******************
      DO 400 I=1,3
         AVE(I)=0.0
         DO 400 J=1,3
            COV(I,J)=0.0
 400  CONTINUE

C ***  SET STAT ARRAY  1 = LIABILITY, 2 = PORTFOLIO, 3 = DIFFERENCES **
      DO 250 I=1,IREAD
         STAT(I,1)=ANIM(I)
         STAT(I,2)=PRET(I)
         STAT(I,3)=(PRET(I)-ANIM(I))
 250  CONTINUE

C *****       CALCULATE AVERAGES     *******************************
C *****       SET NSIM TO 2 FOR  STATISTICS IF NSIMS.LT.1   *********
      NSIM = NSIMS
      IF(NSIMS.LT.1) NSIM = 2
      DO 260 I=NSTAT+1,IREAD
         AVE(1)=AVE(1)+ANIM(I)/DBLE(NSIM)
         AVE(2)=AVE(2)+PRET(I)/DBLE(NSIM)
         AVE(3)=AVE(3)+(PRET(I)-ANIM(I))/DBLE(NSIM)
 260  CONTINUE

C *****       CALCULATE COVARIANCES  *******************************

DO 950 I=1,3
         VAR(I)=0.0
         DO 950 K=NSTAT+1,IREAD
            VAR(I)=VAR(I)+(STAT(K,I)-AVE(I))**2/DBLE(NSIM-1)
 950  CONTINUE

C ******   CALCULATE THE COVARIANCE MATRIX'S UPPER OFF DIAGONAL ****

DO 960 I=1,3
        DO 960 J=I,3
           DO 828 K=NSTAT+1,IREAD
              COV(I,J)=COV(I,J)+((STAT(K,I)-AVE(I))*(STAT(K,J)-AVE(J)))
 828       CONTINUE
           COV(I,J)=COV(I,J)/DBLE(NSIM-1)
           COV(J,I) = COV(I,J)
 960    CONTINUE

C *****       CALCULATE CORRELATIONS        ****************************
```

```
      DO 951 I=1,3
         DO 951 J=1,I
         IF(VAR(I).LE. 0.0 .OR. VAR(J).LE. 0.0) GO TO 951
            COREL(I,J)=COV(I,J)/(VAR(I)**.5*VAR(J)**.5)
 951  CONTINUE
C ****      CALCULATE CUMULATIVE RETURNS        ************************
      PRET(NSTAT)=100
      ANIM(NSTAT)=100
      DO 569 I=NSTAT+1,IREAD
         XX=PRET(I)
         YY=ANIM(I)
         PRET(I)=PRET(I-1)*(1+XX)
         ANIM(I)=ANIM(I-1)*(1+YY)
 569  CONTINUE

IF(VAR(1).NE. 0.0)   BETA = COV(1,2)/VAR(1)
      ALPHA = AVE(2) - BETA*AVE(1)

SST =   0.0
      SSE =   0.0
      DO 952 I = NSTAT+1,IREAD
         SSE = SSE + (ALPHA+BETA*STAT(I,1)-STAT(I,2))**2
         SST = SST + (STAT(I,2)-AVE(2))**2
 952  CONTINUE

IF(NSIMS.GT.2) STDERR = (SSE/DBLE(NSIMS-2))**.5
      IF(SST.NE.0.0) RSQ = 1 - SSE/SST

C********************************************************************
C *****     BEGIN WRITING THE TRACKER OUTPUT    *********************

318  WRITE(10,*)' TRACKER OUTPUT FILE '
      WRITE(10,*)
      WRITE(10,*)'  MONTH        LIA        PORT        DIF'
      WRITE(10,*)

C *****     WRITE MONTH, LIABILITY RET, PORTFOLIO RET, DIFFERENCE ****
      DO 700 I=NSTAT+1,IREAD
         ISTAT = I-(NSTAT+1)
         WRITE(10,612)ISTAT+NM,(STAT(I,J),J=1,3)
 612     FORMAT(1X,3X,I4,3F13.10)
 700  CONTINUE

C *****      WRITE CUMULATIVE RETURNS       ***************************

WRITE(10,*)
      WRITE(10,886)
 886  FORMAT(1X,'CUMMULATIVE VALUES OF LIABILITIES AND ASSETS'/,
     ./,' MONTH    LIABILTIES     PORTFOLIO',/)
```

```
      DO 847 I=NSTAT,IREAD
          ISTAT = I-NSTAT-1
          WRITE(10,328)ISTAT+NM,ANIM(I),PRET(I)
328       FORMAT(1X,I5,7X,F7.3,10X,F7.3)
847   CONTINUE
837   CONTINUE

C *****    WRITE STATISTICS BASED ON SIMULATIONS MONTHS  **********

WRITE(10,*)
      WRITE(10,*)'**********     STATISTICAL SUMMARY     **********'
      WRITE(10,985)NM,NM+NSIMS-1
985   FORMAT(/,'     STATISTICS BASED ON MONTHS ',I4,' THROUGH',I4)

C *****    WRITE ALPHA,BETA,STDERR,CORREL,AND R-SQUARED   **********

WRITE(10,*)
      WRITE(10,987)'ALPHA',ALPHA,'ANNUAL',ALPHA*1200
      WRITE(10,989)'BETA',BETA
      WRITE(10,988)'STD ERR',STDERR,STDERR*100
      WRITE(10,989)'CORRELATION',COREL(2,1)
      WRITE(10,988)'R-SQUARED',RSQ,RSQ*100
987   FORMAT(1X,A12,10X,F10.6,A8,F10.2,' %')
988   FORMAT(1X,A12,10X,F10.6,8X,F10.2,' %')
989   FORMAT(1X,A12,10X,F10.6)

C *****    WRITE AVERAGES AND VARIANCES OF 1-LIAB, 2-PORT, 3-DIFFS **

WRITE(10,*)
      WRITE(10,*)
      WRITE(10,*)'ANNUAL RETURNS:         MEAN            STD DEV'
      WRITE(10,*)

DO 990 I = 1,3
         AVE(I) = (AVE(I)*12)*100
         VAR(I) = ((VAR(I)*12)**.5)*100
990   CONTINUE

WRITE(10,916) 'LIABILITY',AVE(1),VAR(1)
      WRITE(10,916) 'PORTFOLIO',AVE(2),VAR(2)
      WRITE(10,916) 'DIFFERENCE',AVE(3),VAR(3)
916   FORMAT(1X,3X,A11,9X,F9.2,' %',10X,F9.2,' %')

C *****    WRITE PARAMETERS FOR THE RUN   **************************

WRITE(10,*)
      WRITE(10,*)
      WRITE(10,*)'     PARAMETERS FOR THIS RUN WERE: '
      WRITE(10,*)
      WRITE(10,101) TITLE
      WRITE(10,102) FILEOUT
```

```
      WRITE(10,103) LIABIN
      WRITE(10,104) STOCKIN
      WRITE(10,105) BONDIN
      WRITE(10,106) NMSAVE
      WRITE(10,107) NSIMS
      WRITE(10,108) NSTOCKS
      WRITE(10,109) NBONDS
      WRITE(10,110) IDUMMY
      WRITE(10,111) STOCKMIN
      WRITE(10,112) YIMAX
      WRITE(10,113) SMAX
      WRITE(10,114) NSTAT
      WRITE(10,115) NRETS
      WRITE(10,116) BULL1
      WRITE(10,117) TARG1
      WRITE(10,118) TURN1

101   FORMAT(1X,' 1) SPANNING RUN TITLE         ', A30)
102   FORMAT(1X,' 2) OUTPUT FILENAME            ', A30)
103   FORMAT(1X,' 3) LIABILITY STREAM FILE      ', A30)
104   FORMAT(1X,' 4) STOCK RETURN FILE          ', A30)
105   FORMAT(1X,' 5) BOND RETURN FILE           ', A30)
106   FORMAT(1X,' 6) MONTH SIMULATION BEGINS    ', I6)
107   FORMAT(1X,' 7) NUMBER OF MONTHS SIMULATED ', I6)
108   FORMAT(1X,' 8) NUMBER OF STOCKS           ', I6)
109   FORMAT(1X,' 9) NUMBER OF BONDS            ', I6)
110   FORMAT(1X,'10) STOCKS TO READ PAST        ', I6)
111   FORMAT(1X,'11) MINIMUM STOCK HOLDING    % ',F6.2)
112   FORMAT(1X,'12) MAXIMUM INDUSTRY HOLDING % ',F6.2)
113   FORMAT(1X,'13) MAXIMUM STOCK HOLDING    % ',F6.2)
114   FORMAT(1X,'14) NSTAT                      ', I6)
115   FORMAT(1X,'15) NRETS                      ', I6)
116   FORMAT(1X,'16) BULLET                     ',F6.2)
117   FORMAT(1X,'17) TARGET                     ',F6.2)
118   FORMAT(1X,'18) TURNOVER FACTOR            ',F6.2)

C *****      WRITE HISTORICAL DATA USED TO MAKE RUN    ****************
      WRITE(10,*)
      WRITE(10,*)' PORTFOLIO CONSTRUCTED UPON THE FOLLOWING DATA:'
      WRITE(10,*)
      WRITE(10,*)'    MONTH       LIA        PORT       DIF'
      WRITE(10,*)
      DO 300 I=1,NSTAT
         WRITE(10,612)I+NM-(NSTAT+1),(STAT(I,J),J=1,3)
300   CONTINUE

RETURN

END
C                        END OF SUBROUTINE TRACKER
C ********************************************************************
C ********************************************************************
```

```
      SUBROUTINE BAL (NUM)
C ****************************************************************
      INCLUDE 'COMSUC.F'
      DIMENSION CC(ND,2)
      INTEGER BUY(ND),SELL(ND)

VNEW = 0.0
      VOLD = 0.0

DO 10 I=1,NUM
         CC(I,1) = 0.0
         CC(I,2) = 0.0
         DO 20 J=1,NUM
            CC(I,1) = CC(I,1)+X(J)*2.0*A(I,J)
            VNEW = VNEW+X(I)*X(J)*A(I,J)
            CC(I,2) = CC(I,2)+OLDWT(J)*2.0*A(I,J)
            VOLD = VOLD+OLDWT(I)*OLDWT(J)*A(I,J)
20       CONTINUE
10    CONTINUE
C ********   DELTA IS THE PERCENTAGE IMPROVEMENT IN VARIANCE *******
      DELTA = (VOLD - VNEW)/VNEW
      DELTA = DELTA * 10000.
C ********  IF THE OLD VARIANCE IS ZERO USE THE NEW PARTIALS TO SORT **
      KVAR = 2
      IF (VOLD.EQ.0) KVAR = 1

IBUY = 0
      ISELL = 0
      TURNOV = 0.0

DO 30 I = 1,NUM
         IF((X(I)-OLDWT(I)).GT.0.001) THEN
            IBUY = IBUY + 1
            BUY(IBUY) = I
         ELSE IF((X(I)-OLDWT(I)).LT.-0.001) THEN
            ISELL = ISELL +1
            SELL(ISELL) = I
         END IF
         TURNOV = TURNOV + ABS(X(I)-OLDWT(I))
30    CONTINUE

C ******  SORT BASED ON PARTIALS ***************************************
C ******    SORT THE BUYS       ***************************************
      DO 40 I = 1,IBUY-1
         DO 50 J = I+1,IBUY
            IF( CC(BUY(J),KVAR).GT.CC(BUY(I),KVAR)) THEN
               ITEMP = BUY(I)
               BUY(I) = BUY(J)
               BUY(J) = ITEMP
            END IF
50       CONTINUE
40    CONTINUE
```

```
C ******    SORT THE SELLS    ******************************************
      DO 60 I = 1,ISELL-1
        DO 70 J = I+1,ISELL
      TEST = CC(SELL(J),KVAR) - CC(SELL(I),KVAR)
        IF (TEST .LT. 0) THEN
          ITEMP = SELL(I)
          SELL(I) = SELL(J)
          SELL(J) = ITEMP
        END IF
70      CONTINUE

60    CONTINUE

WRITE(10,*)
      WRITE(10,*)'             TURNOVER = ',TURNOV*50,' %'
      WRITE(10,*)
      WRITE(10,*)'VARIANCE AT OLD WEIGHTS = ',VOLD*10000
      WRITE(10,*)'VARIANCE AT NEW WEIGHTS = ',VNEW*10000
      WRITE(10,*)'                  DELTA = ',DELTA/100,' %'
      WRITE(10,*)
      WRITE(10,*)

C ***********      WRITE THE BUYS      *********************
      WRITE(10,*)'                        ***   BUY    ***'
      WRITE(10,102)('*',i=1,78)
      WRITE(10,*)'    *** WEIGHTS ***  SPAN   SIC',
     &          '     SYMBOL    SECURITY'
      WRITE(10,*)'    OLD  NEW  DELTA SENSIT CODE',
     &          '     IDC TICK   NAME'
      WRITE(10,102)('*',i=1,78)

DO 80 I = 1,IBUY
      XOLD = OLDWT(BUY(I))*100
      XNEW = X(BUY(I))*100
      WRITE(10,101) XOLD,XNEW,XNEW-XOLD,CC(BUY(I),KVAR)*1000,
     &              ISIC(BUY(I)),IDC(BUY(I)),NAME(BUY(I))
80    CONTINUE

WRITE(10,*)
      WRITE(10,*)
      WRITE(10,*)
C ************      WRITE THE SELLS     *********************
      WRITE(10,*)'                        ***   SELL   ***'
      WRITE(10,102)('*',i=1,78)
      WRITE(10,*)'    *** WEIGHTS ***  SPAN   SIC',
     &          '     SYMBOL    SECURITY'
      WRITE(10,*)'    OLD  NEW  DELTA SENSIT CODE',
     &          '     IDC TICK   NAME'
      WRITE(10,102)('*',i=1,78)

DO 90 I = 1,ISELL
```

```
      XOLD = OLDWT(SELL(I))*100
      XNEW = X(SELL(I))*100
      WRITE(10,101) XOLD,XNEW,XNEW-XOLD,CC(SELL(I),KVAR)*1000,
     &              ISIC(SELL(I)),IDC(SELL(I)),NAME(SELL(I))
90    CONTINUE

101   FORMAT(1X,4F7.3,I4,4X,A9,2X,A30)
102   FORMAT(1X,80A1)

C ******   WRITE OUT THE INDUSTRY WEIGHTS     *************************
      CALL INDUST
      WRITE(10,*)
      WRITE(10,*)
      WRITE(10,*)'            *** INDUSTRY WEIGHTINGS ***'
      WRITE(10,102)('*',i=1,78)
      WRITE(10,*)'  CODE           INDUSTRY                WEIGHT'
      WRITE(10,102)('*',i=1,78)

DO 133 I = 1,99
         CUM(I) = 0.0
         DO 134 J = 1,NUM
            IF (ISIC(J).EQ.I) CUM(I) = CUM(I) + X(J)
134      CONTINUE
         IF (CUM(I).GT. 0.001) WRITE(10,135) I,SIC(I),CUM(I)*100.
135      FORMAT(1X,I5,3X,A30,F10.2,' %')
133   CONTINUE

SUMWGHT = 0.0
      DO 136 I = 1,NUM
         SUMWGHT = SUMWGHT + X(I)
136   CONTINUE
      WRITE(10,137)'                     TOTAL   =   ',SUMWGHT*100
137   FORMAT(1X,A38,F10.2,' %')

DO 138 I = 1,4
         WRITE(10,102)(' ',I=1,78)
138   CONTINUE
      CLOSE(10)

RETURN
      END
C****************  END OF SUBROUTINE  BAL    *****************
C ****************************************************************
      SUBROUTINE INDUST
C ****************************************************************

INCLUDE 'COMSUC.F'

SIC(1) = 'AGRICULTURAL PRODUCTION-CROPS'
      SIC(2) = 'AGRICULTURAL PROD.-LIVESTOCK'
      SIC(7) = 'AGRICULTURAL SERVICES'
```

```
SIC(8)  = 'FORESTRY'
SIC(9)  = 'FISHING HUNTING AND TRAPPING'
SIC(10) = 'METAL MINING'
SIC(11) = 'ANTHRACITE MINING'
SIC(12) = 'BITUMINOUS COAL & LIGNITE MIN.'
SIC(13) = 'OIL & GAS EXTRACTION'
SIC(14) = 'MIN. & QUARRY. OF NONMET. MIN.'
SIC(15) = 'BUILD. CONST.-G. C. & O. B.'
SIC(16) = 'CONST. OTH THAN B.C.-G.C.'
SIC(17) = 'CONST.-SPEC. TRADE CONT.'
SIC(20) = 'FOOD KINDRED PRODUCTS'
SIC(21) = 'TOBACCO MANUFACTURERS'
SIC(22) = 'TEXTILE MILL PRODUCTS'
SIC(23) = 'APP. & OTH. FIN. PROD. MFFAOSM'
SIC(24) = 'LUMBER & WOOD PROD. EX. FURN.'
SIC(25) = 'FURNITURE AND FIXTURES'
SIC(26) = 'PAPER AND ALLIED PRODUCTS'
SIC(27) = 'PRINTING PUBLISHING AND A.P.'
SIC(28) = 'CHEMICAL AND ALLIED PROD.'
SIC(29) = 'PETROLEUM REFIN. & REL. PROD.'
SIC(30) = 'RUBBER AND MISC. PLAST. PROD.'
SIC(31) = 'LEATHER & LEATHER PRODUCTS'
SIC(32) = 'STONE CLAY GLASS & CONC. PROD.'
SIC(33) = 'PRIMARY METAL INDUSTRIES'
SIC(34) = 'FAB. METAL PROD. EX. M.&T.E.'
SIC(35) = 'MACHINERY EXCEPT ELECTRICAL'
SIC(36) = 'ELE. AND ELE. MACH.'
SIC(37) = 'TRANSPORTATIONS EQUIPMENT'
SIC(38) = 'MEAS. ANAL. & CONT. INST. ETC.'
SIC(39) = 'MISC. MANUFACTURING IND.'
SIC(40) = 'RAILROAD TRANS.'
SIC(41) = 'LOC. AND SUB. TRANS. & HPT'
SIC(42) = 'MOTOR FREIGHT TRANS. AND WARE.'
SIC(43) = 'U.S. POSTAL SERVICE'
SIC(44) = 'WATER TRANSPORTATION'
SIC(45) = 'TRANSPORTATION BY AIR'
SIC(46) = 'PIPE LINES EX. NATURAL GAS'
SIC(47) = 'TRANSPORTATION SERVICES'
SIC(48) = 'COMMUNICATION'
SIC(49) = 'ELECTRIC GAS AND SANIT. SERV.'
SIC(50) = 'WHOLESALE TRADE-DURABLE GOODS'
SIC(51) = 'WHOLESALE TRADE-NONDUR. GOODS'
SIC(52) = 'BUILDING MAT. HARD. GAR. SUPP.'
SIC(53) = 'GENERAL MERCH. STORES'
SIC(54) = 'FOOD STORES'
SIC(55) = 'AUTOMOTIVE DEAL AND GAS. SS'
SIC(56) = 'APPAREL AND ACCESS. STORES'
SIC(57) = 'HOME FURN. AND EQUIP. STORES'
SIC(58) = 'EATING AND DRINKING PLACES'
SIC(59) = 'MISCELLANEOUS RETAIL'
SIC(60) = 'BANKING'
SIC(61) = 'CRED. AGEN. OTH. THAN BANKS.'
```

```
      SIC(62) = 'SEC. AND COMM. BROK. DEEXSE'
      SIC(63) = 'INSURANCE CARRIERS'
      SIC(64) = 'INS. AGENTS BROK. SERV.'
      SIC(65) = 'REAL ESTATE'
      SIC(66) = 'COMB. RE INS. LOANS & LAW OFF.'
      SIC(67) = 'HOLD. AND OTHER INV. COMP.'
      SIC(70) = 'HOTELS ROOM. HOUSES CAMP AOLP'
      SIC(72) = 'PERSONAL SERVICES'
      SIC(73) = 'BUSINESS SERVICES'
      SIC(75) = 'AUTO. REPAIR SERV. AND GAR.'
      SIC(76) = 'MISC. REPAIR SERVICES'
      SIC(78) = 'MOTION PICTURES'
      SIC(79) = 'AMUSE. AND REC. SERV. EX. MP'
      SIC(80) = 'HEALTH SERVICES'
      SIC(81) = 'LEGAL SERVICES'
      SIC(82) = 'EDUCATIONAL SERVICES'
      SIC(83) = 'SOCIAL SERVICES'
      SIC(84) = 'MUSEUM ART GALL. BOT. Z.G.'
      SIC(86) = 'NONPROFIT MEM. ORGAN.'
      SIC(89) = 'MISCELLANEOUS SERVICES'
      SIC(91) = 'EXEC. LEG. & GOVT EX. FIN.'
      SIC(92) = 'JUSTICE PUBLIC SAFETY'
      SIC(93) = 'PUB. FIN. TAX. & MON. POLICY'
      SIC(94) = 'ADMIN. OF HUMAN RES. PROGRAMS'
      SIC(95) = 'ADMIN. OF QUAL. & HOUS. PROG.'
      SIC(96) = 'ADMIN. OF ECONOMIC PROGRAMS'
      SIC(97) = 'NATIONAL SEC. & INTL AFFAIRS'
      SIC(99) = 'NONCLASSIFIABLE ESTABLISHMENTS'
      RETURN
      END
C****************   END OF SUBROUTINE  INDUST    *****************
C  UPDATED December 6, 1988
**********************************************************************
      SUBROUTINE INTRO
**********************************************************************
* **
* **   THIS ROUTINE INTRODUCES THE SPANNING PROGRAM AND
* **   ASKS FOR SCREEN OR FILE INPUT OPTION
* **
      INCLUDE 'COMSUC.F'

INTEGER RESPON

PARAMETER (MAXTXT = 50,LINES = 24)
      CHARACTER HEAD*(MAXTXT),LAST*(MAXTXT),OPTION(LINES)*(MAXTXT)

HEAD = '    WELCOME TO THE NISA  SPANNING  OPTIMIZER'

NBROPT = 2
      OPTION (1) = 'SINGLE RUN WITH WEIGHTS IN FILE: OLD'
      OPTION (2) = 'UPDATE RUN WITH WEIGHTS CALCUATED FROM HOLDINGS'
```

```
        LAST = ' '

10      CALL MENU(LINES,HEAD,LAST,NBROPT,OPTION,RESPON)

IF (RESPON.EQ.1) THEN
            IHOLD = 0
            CALL REDPAST

ELSE IF (RESPON.EQ.2) THEN
            IHOLD = 1
            CALL REDPAST

ELSE
            WRITE(*,*)'NO OPTION SELECTED - PLEASE TRY AGAIN'
            GO TO 10

END IF

C       RETURN
        END
****************    END OF SUBROUTINE  INTRO       *****************
***************************************************************
        SUBROUTINE REDPAST
***************************************************************
C       TITLE         = TITLE FOR THIS RUN
C       FILEOUT       = OUTPUT FILE
C       LIABIN        = LIABILITY RETURNS FILE
C       STOCKIN       = STOCK RETURNS FILE
C       BONDIN        = BOND RETURNS FILE
C       NMSAVE        = FIRST MONTH OF SIMULATION
C       NSIMS         = NUMBER OF MONTHS TO SIMULATE
C       NSTOCKS       = NUMBER OF STOCK TO SEND TO OPTIMIZER
C       NBONDS        = NUMBER OF BONDS TO SEND TO OPTIMIZER
C       IDUMMY        = NUMBER OF STOCKS TO READ PAST IN STOCKIN
C       STOCKMIN      = MINIMUM HOLDING IN STOCKS
C       YIMAX         = INDUSTRY MAXIMUM HOLDING
C       SMAX          = SECURITY MAXIMUM HOLDING
C       BULLET        = CLIMBING FACTOR
C       TARGET        = ADJUSTMENT FACTOR FOR TARGET
C       TURN          = TURNOVER FACTOR
        INCLUDE 'COMSUC.F'

PARAMETER (MAXTXT = 50,LINES = 24)

CHARACTER HEAD*(MAXTXT),LAST*(MAXTXT),OPTIONS(LINES)*(MAXTXT)
        CHARACTER*30 PAST
* **
* **        INITIALIZE READ IN FILE: PAST = 'PAST.DAT'
* **
        PAST = 'PAST.DAT'
        WRITE(*,100)(' ',I = 1,5)
        WRITE(*,*)'   READING PAST DATA........'
```

```
        WRITE(*,100)(' ',I = 1,5)

5       OPEN (8,FILE = PAST, STATUS = 'OLD', ERR = 10)
        READ(8,101)TITLE
        READ(8,101)FILEOUT
        READ(8,101)LIABIN
        READ(8,101)STOCKIN
        READ(8,101)BONDIN
        READ(8,102)NMSAVE
        READ(8,102)NSIMS
        READ(8,102)NSTOCKS
        READ(8,102)NBONDS
        READ(8,102)IDUMMY
        READ(8,103)STOCKMIN
        READ(8,103)YIMAX
        CLOSE (8)
        RETURN

10      CONTINUE

* **     GIVE OPTION TO READ FROM SCREEN WITHOUT DUMPING OUT OF
* **     PROGRAM OR TO READ FROM DIFFERENT FILE NAME

HEAD = '... WARNING: THE PAST DATA FILE DOES NOT EXIST'
        LAST = '                         ( CTRL-C TO ABORT )'
        NBROPT = 2
        OPTIONS(1) = 'INPUT NEW NAME FOR PAST DATA FILE'
        OPTIONS(2) = 'READ IN NEW DATA FROM SCREEN '

20      CALL MENU (LINES,HEAD,LAST,NBROPT,OPTIONS,IRESPON)

IF ( IRESPON.EQ.1) THEN
            WRITE(*,100)(' ',I = 1,5)
            WRITE(*,104)
            READ(*,'(A30)',END = 20,ERR = 20) PAST
            GO TO 5

ELSE IF (IRESPON.EQ.2) THEN
            CALL REDSCRN
            RETURN

END IF

RETURN

100     FORMAT('0',A1)
101     FORMAT(A35)
102     FORMAT(I4)
103     FORMAT(F7.2)
104     FORMAT(' NAME FOR PAST DATA FILE --- ',$)
```

```
        END

*****************   END OF SUBROUTINE  REDPAST   *****************

******************************************************************
        SUBROUTINE REDSCRN
******************************************************************

C       TITLE           = TITLE FOR THIS RUN
C       FILEOUT         = OUTPUT FILE
C       LIABIN          = LIABILITY RETURNS FILE
C       STOCKIN         = STOCK RETURNS FILE
C       BONDIN          = BOND RETURNS FILE
C       NMSAVE          = FIRST MONTH OF SIMULATION
C       NSIMS           = NUMBER OF MONTHS TO SIMULATE
C       NSTOCKS         = NUMBER OF STOCK TO SEND TO OPTIMIZER
C       NBONDS          = NUMBER OF BONDS TO SEND TO OPTIMIZER
C       IDUMMY          = NUMBER OF STOCKS TO READ PAST IN STOCKIN
C       STOCKMIN        = MINIMUM HOLDING IN STOCKS
C       YIMAX           = INDUSTRY MAXIMUM HOLDING

INCLUDE 'COMSUC.F'

* **    DEFAULT NAMES FOR STOCK AND BOND FILES
* **       STOCKS.PRN    &   BONDS.PRN

WRITE(*,113)(' ',I = 1,12)
113     FORMAT('0',A1)

1       WRITE(*,101)
101     FORMAT(' 1) ENTER TITLE FOR SPANNING RUN       - ',$)
        READ(*,'(A30)',END = 1,ERR = 1) TITLE
        WRITE(*,*)

2       WRITE(*,102)
102     FORMAT(' 2) ENTER OUTPUT FILE NAME             - ',$)
        READ(*,'(A30)',END = 2,ERR = 2) FILEOUT
        WRITE(*,*)

3       WRITE(*,103)
103     FORMAT(' 3) ENTER LIABILITY RETURNS FILE NAME  - ',$)
        READ(*,'(A30)',END = 3,ERR = 3) LIABIN
        WRITE(*,*)

4       WRITE(*,104)
104     FORMAT(' 4) ENTER STOCK RETURNS FILE NAME      - ',$)
        READ(*,'(A30)',END = 4,ERR = 4) STOCKIN
        IF (STOCKIN.EQ.' ')STOCKIN = 'STOCKS.PRN'
        WRITE(*,*)

5       WRITE(*,105)
```

```
105    FORMAT(' 5) ENTER BOND RETURNS FILE NAME    - ',$)
       READ(*,'(A30)',END = 5,ERR = 5) BONDIN
       IF (BONDIN.EQ.' ')BONDIN = 'BONDS.PRN'
       WRITE(*,*)

6      WRITE(*,*)' 6) ENTER YEAR AND MONTH TO BEGIN        '
       WRITE(*,106)
106    FORMAT('    SIMULATION (e.g. FEB 1987 = 8702)  - ',$)
       READ(*,*,END = 6,ERR = 6) NMSAVE
       WRITE(*,*)

7      WRITE(*,107)
107    FORMAT(' 7) ENTER NUMBER OF MONTHS TO SIMULATE - ',$)
       READ(*,*,END = 7,ERR = 7) NSIMS
       WRITE(*,*)

8      WRITE(*,108)
108    FORMAT(' 8) ENTER NUMBER OF  STOCKS  TO USE   - ',$)
       READ(*,*,END = 8,ERR = 8) NSTOCKS
       WRITE(*,*)

9      WRITE(*,109)
109    FORMAT(' 9) ENTER NUMBER OF  BONDS   TO USE   - ',$)
       READ(*,*,END = 9,ERR = 9) NBONDS
       WRITE(*,*)

10     WRITE(*,110)
110    FORMAT('10) ENTER NUMBER OF STOCKS READ PAST  - ',$)
       READ(*,*,END =10,ERR = 10) IDUMMY
       WRITE(*,*)

11     WRITE(*,111)
111    FORMAT('11) ENTER MINIMUM STOCK HOLDING       - % ',$)
       READ(*,*,END = 11,ERR = 11) STOCKMIN
       WRITE(*,*)

12     WRITE(*,112)
112    FORMAT('12) ENTER MAXIMUM INDUSTRY HOLDING    - % ' ,$)
       READ(*,*,END = 12,ERR = 12) YIMAX
       WRITE(*,*)

RETURN

100    FORMAT(A35)
       END
****************    END OF SUBROUTINE  REDSCRN    *****************

***********************************************************************
       SUBROUTINE MODIFY
***********************************************************************
* **
```

```
* **    THIS ROUTINE MODIFIES THE INPUT DATA IF NECESSARY
* **
       INCLUDE 'COMSUC.F'
10     WRITE(*,100)(' ',I = 1,5)

WRITE(*,*)'********   CURRENTLY SELECTED PARAMETERS   ********'
*****************   DISPLAY SELECTED PARAMETERS   ********************
       CALL DISPLAY
       IRESPON = 0
       WRITE(*,120)
       READ(*,'(I2)',END = 20,ERR = 10) IRESPON

IF(IRESPON.EQ.0) THEN
          RETURN

ELSE IF (IRESPON .EQ. 1 ) THEN
201       WRITE(*,121)
          READ(*,'(A30)',END = 201, ERR = 201) TITLE

ELSE IF (IRESPON.EQ.2) THEN
202       WRITE(*,122)
          READ(*,'(A30)',END = 202, ERR = 202) FILEOUT

ELSE IF (IRESPON.EQ.3) THEN
203       WRITE(*,123)
          READ(*,'(A30)',END = 203, ERR = 203) LIABIN

ELSE IF (IRESPON.EQ.4) THEN
204       WRITE(*,124)
          READ(*,'(A30)',END = 204, ERR = 204) STOCKIN

ELSE IF (IRESPON.EQ.5) THEN
205       WRITE(*,125)
          READ(*,'(A30)',END = 205, ERR = 205) BONDIN

ELSE IF (IRESPON.EQ.6) THEN
206       WRITE(*,126)
          READ(*,*,END = 206, ERR = 206) NMSAVE

ELSE IF (IRESPON.EQ.7) THEN
207       WRITE(*,127)
          READ(*,*,END = 207, ERR = 207) NSIMS

ELSE IF (IRESPON.EQ.8) THEN
208       WRITE(*,128)
          READ(*,*,END = 208, ERR = 208) NSTOCKS

ELSE IF (IRESPON.EQ.9) THEN
209       WRITE(*,129)
          READ(*,*,END = 209, ERR = 209) NBONDS
```

```
        ELSE IF (IRESPON.EQ.10) THEN
210        WRITE(*,130)
           READ(*,*,END = 210, ERR = 210) IDUMMY

ELSE IF (IRESPON.EQ.11) THEN
211        WRITE(*,131)
           READ(*,*,END = 211, ERR = 211) STOCKMIN

ELSE IF (IRESPON.EQ.12) THEN
212        WRITE(*,132)
           READ(*,*,END = 212, ERR = 212) YIMAX

ELSE IF (IRESPON.EQ.13) THEN
213        WRITE(*,133)
           READ(*,*,END = 213, ERR = 213) SMAX

ELSE IF (IRESPON.EQ.14) THEN
214        WRITE(*,134)
           READ(*,*,END = 214, ERR = 214) NSTAT

ELSE IF (IRESPON.EQ.15) THEN
215        WRITE(*,135)
           READ(*,*,END = 215, ERR = 215) NRETS

ELSE IF (IRESPON.EQ.16) THEN
216        WRITE(*,136)
           READ(*,*,END = 216, ERR = 216) BULLET

ELSE IF (IRESPON.EQ.17) THEN
217        WRITE(*,137)
           READ(*,*,END = 217, ERR = 217) TARGET

ELSE IF (IRESPON.EQ.18) THEN
218        WRITE(*,138)
           READ(*,*,END = 218, ERR = 218) TURN

END IF

GO TO 10

20      RETURN

100     FORMAT('0',A1)
120     FORMAT('0',' ENTER NUMBER TO MODIFY   <ENTER> TO CONTINUE: ',$)
121     FORMAT('0',' ENTER SPANNING RUN TITLE                      ',$)
122     FORMAT('0',' ENTER FILENAME FOR OUTPUT                     ',$)
123     FORMAT('0',' ENTER LIABILITY STREAM FILE                   ',$)
124     FORMAT('0',' ENTER STOCK RETURN FILE                       ',$)
125     FORMAT('0',' ENTER BOND RETURN FILE                        ',$)
126     FORMAT('0',' ENTER MONTH TO BEGIN SIMULATION               ',$)
127     FORMAT('0',' ENTER NUMBER OF MONTHS TO SIMULATE            ',$)
```

```
128   FORMAT('0',' ENTER NUMBER OF STOCKS              ',$)
129   FORMAT('0',' ENTER NUMBER OF BONDS               ',$)
130   FORMAT('0',' ENTER STOCKS TO READ PAST           ',$)
131   FORMAT('0',' ENTER MINIMUM TOTAL STOCK HOLDING  % ',$)
132   FORMAT('0',' ENTER MAXIMUM INDUSTRY HOLDING     % ',$)
133   FORMAT('0',' ENTER MAXIMUM SINGLE STOCK HOLDING % ',$)
134   FORMAT('0',' ENTER NSTAT                         ',$)
135   FORMAT('0',' ENTER NRETS                         ',$)
136   FORMAT('0',' ENTER BULLET                        ',$)
137   FORMAT('0',' ENTER TARGET                        ',$)
138   FORMAT('0',' ENTER TURNOVER FACTOR               ',$)
      END

****************   END OF SUBROUTINE MODIFY    *****************
****************************************************************
      SUBROUTINE DISPLAY
****************************************************************
* **
* **   THIS ROUTINE DISPLAYS SELECTED PARAMETERS FOR SPANNING RUN
* **
      INCLUDE 'COMSUC.F'

WRITE(*,100)
      WRITE(*,101) TITLE
      WRITE(*,102) FILEOUT
      WRITE(*,103) LIABIN
      WRITE(*,104) STOCKIN
      WRITE(*,105) BONDIN
      WRITE(*,106) NMSAVE
      WRITE(*,107) NSIMS
      WRITE(*,108) NSTOCKS
      WRITE(*,109) NBONDS
      WRITE(*,110) IDUMMY
      WRITE(*,111) STOCKMIN
      WRITE(*,112) YIMAX
      WRITE(*,113) SMAX
      WRITE(*,114) NSTAT
      WRITE(*,115) NRETS
      WRITE(*,116) BULLET
      WRITE(*,117) TARGET
      WRITE(*,118) TURN

RETURN

100   FORMAT('0',A1)
101   FORMAT(1X,' 1) SPANNING RUN TITLE              ', A30)
102   FORMAT(1X,' 2) OUTPUT FILENAME                 ', A30)
103   FORMAT(1X,' 3) LIABILITY STREAM FILE           ', A30)
104   FORMAT(1X,' 4) STOCK RETURN FILE               ', A30)
105   FORMAT(1X,' 5) BOND RETURN FILE                ', A30)
106   FORMAT(1X,' 6) MONTH TO BEGIN SIMULATION       ', I6)
```

```
107   FORMAT(1X,' 7) NUMBER OF MONTHS TO SIMULATE    ', I6)
108   FORMAT(1X,' 8) NUMBER OF STOCKS                ', I6)
109   FORMAT(1X,' 9) NUMBER OF BONDS                 ', I6)
110   FORMAT(1X,'10) STOCKS TO READ PAST             ', I6)
111   FORMAT(1X,'11) MINIMUM STOCK HOLDING         % ',F6.2)
112   FORMAT(1X,'12) MAXIMUM INDUSTRY HOLDING      % ',F6.2)
113   FORMAT(1X,'13) MAXIMUM SINGLE STOCK HOLDING  % ',F6.2)
114   FORMAT(1X,'14) NSTAT                           ', I6)
115   FORMAT(1X,'15) NRETS                           ', I6)
116   FORMAT(1X,'16) BULLET                          ',F6.2)
117   FORMAT(1X,'17) TARGET                          ',F6.2)
118   FORMAT(1X,'18) TURNOVER FACTOR                 ',F6.2)
      END
***************   END OF SUBROUTINE  DISPLAY   *****************

***********************************************************************
      SUBROUTINE SAVDAT
***********************************************************************
*  **
*  **   THIS ROUTINE SAVE THE FILE FOR LATER USE
*  **

INCLUDE 'COMSUC.F'

OPEN(8,FILE = 'PAST.DAT',STATUS = 'OLD')
      WRITE(8,101)TITLE
      WRITE(8,101)FILEOUT
      WRITE(8,101)LIABIN
      WRITE(8,101)STOCKIN
      WRITE(8,101)BONDIN
      WRITE(8,102)NMSAVE
      WRITE(8,102)NSIMS
      WRITE(8,102)NSTOCKS
      WRITE(8,102)NBONDS
      WRITE(8,102)IDUMMY
      WRITE(8,103)STOCKMIN
      WRITE(8,103)YIMAX
      CLOSE (8)

RETURN

100   FORMAT('0',A1)
101   FORMAT(A35)
102   FORMAT(I4)
103   FORMAT(F7.2)
104   FORMAT('+',A50)

END

***************   END OF SUBROUTINE  SAVDAT   *****************

C***********************************************************************
```

```
      SUBROUTINE MENU (LINES,HEADER,LAST,NBROPT,OPTION,RESPON)
C***********************************************************************
* **
* **   PURPOSE: TO PRINT A MENU AND READ RESPONSE
* **
* **
* **
* **   VARIABLE DEFINITIONS
* **   LINES        LINESIZE OF SCREEN
* **   HEADER       TITLE LINE FOR MENU
* **   LAST         LAST LINE OF MENU
* **   NBROPT       NUMBER OF OPTIONS
* **   OPTION       LIST OF OPTIONS
* **                DIMENSIONED OPTION(*)*(*) SO LENGTH
* **                OF CHARACTER STRINGS AND ARRAY SENT BY
* **                CALLING PROGRAM
* **   RESPON       NUMERIC RESPONSE
* **   I            MISCELLANEOUS INDEX
* **   IMAX         NUMBER OF BLANK LINES, TOP AND BOTTOM
* **
* **
* **   OVERALL SPECIFICATIONS
      IMPLICIT REAL (A-Z)
      INTEGER MAXTXT
      PARAMETER (MAXTXT = 50)
* **
* **   CALL SPECIFICATIONS
      CHARACTER OPTION(*)*(MAXTXT),HEADER*(MAXTXT),LAST*(MAXTXT)
      INTEGER NBROPT,RESPON,LINES
* **
* **   LOCAL SPECIFICATIONS
      INTEGER I,IMAX
* **
* **
* **   PRINT BLANK UPPER SCREEN
      IMAX = (LINES-NBROPT-7)/2+1
      IF (IMAX.LT.0) THEN
          WRITE(*,*)'TOO MANY OPTIONS TO FIT SCREEN SIZE'
          STOP
      END IF
5     DO 10 I = 1,IMAX
10    WRITE(*,*)' '
* **
* **   PRINT MENU
      WRITE(*,*)HEADER
      WRITE(*,*)' '

DO 20 I = 1,NBROPT
      WRITE(*,'(1X,I2,2H ,$)') I
      WRITE(*,*)OPTION(I)
20    CONTINUE
```

```
      WRITE(*,*) LAST
* **
* **  BLANK OUT REST OF SCREEN
      DO 25 I = 1,IMAX
25    WRITE(*,*)' '
* **
* **  REQUEST RESPONSE
      WRITE(*,*)' '
      WRITE(*,*)' '
30    WRITE(*,999)
999   FORMAT(' SELECT NUMBER OF OPTION ---> ',$)
* **  RESPONSE SET TO ZERO IN CASE OF CARRIAGE RETURN
      RESPON = 0
      READ (*,'(I2)',END = 40,ERR = 5) RESPON
      IF (RESPON.LT.O.OR.RESPON.GT.NBROPT) THEN
         WRITE(*,*)' OPTION OUT OF RANGE'
         GO TO 30
      END IF
40    RETURN
      END
C***************      END OF SUBROUTINE  MENU      *****************
**********************************************************************

SUBROUTINE QUAD1 (A,KT,RHS,COST,QUAD,INPUT,TOL,TITLE,PFILE,
     *   OBJ,X,RC,DUAL,SLK,IOUT,WS)
C
C         SUBROUTINE QUADPR FOR QUADRATIC PROGRAMMING PROGRAMS
C
C         QUADPR MINIMIZES OR MAXIMIZES   COST*X + X*QUAD*X
C              SUBJECT TO     A*X + KT*'SLACK' = RHS
C                                         X .GE. 0.
C              (KT(I)=-1,0,+1 IF I-TH CONSTRAINT IS .GE.,.EQ.,.LE.)
C              THE OBJECTIVE FUNCTION SHOULD BE CONVEX (CONCAVE)
C              FOR MINIMIZATION (MAXIMIZATION) PROBLEMS.
C              THIS MEANS THE SYMMETRIC MATRIX QUAD+QUAD(TRANSPOSE)
C              SHOULD BE NONNEGATIVE (NONPOSITIVE) DEFINITE
C              FOR MINIMIZATION (MAXIMIZATION) PROBLEMS.
C
C   CALLING SEQUENCE ...
C   CALL QUADPR (A,KT,RHS,COST,QUAD,INPUT,TOL,TITLE,PFILE,
C     *   OBJ,X,RC,DUAL,SLK,IOUT,WS)
C
C   IN WHAT FOLLOWS, MO = NO. OF CONSTRAINTS, NO = NO. OF VARIABLES,
C   DIMENSION SIZES GIVEN ARE THE MINIMUM REQUIRED.
C
C A     --- MO X NO - CONSTRAINT MATRIX
C KT    --- MO-VECTOR OF CONSTRAINT TYPES,  -1,0,+1 MEAN .GE.,.EQ.,.LE.
C           RESPECTIVELY
C RHS   --- MO-VECTOR OF RIGHT-HAND-SIDE VALUES
C COST  --- NO-VECTOR OF LINEAR COSTS
C QUAD  --- NO X NO MATRIX OF QUADRATIC COSTS
```

```
C INPUT   --- FIXED CONSTANTS VECTOR OF LENGTH 21 CONTAINING ...
C ML       1 ROW DIMENSION OF A IN CALLING PROGRAM. MINIMUM IS MO.
C NL       2 ROW DIMENSION OF QUAD IN CALLING PROGRAM. MINIMUM IS NO.
C MO       3 NUMBER OF CONSTRAINTS.
C NO       4 NUMBER OF VARIABLES .
C MINMAX   5 =0 IF OBJECTIVE IS TO BE MINIMIZED,
C            =1 IF OBJECTIVE IS TO BE MAXIMIZED.
C LENWS    6 DIMENSION OF WS IN CALLING PROGRAM. MINIMUM IS
C            2*(MO+NO)**2 + 12*(MO+NO) + 16 IF ANY EQUALITY CONSTRAINTS
C            ARE PRESENT OR  2*(MO+NO)**2 +  8*(MO+NO) + 6
C            IF ALL CONSTRAINTS ARE INEQUALITIES.
C MAXIT    7 PIVOT LIMIT.
C KOBJ     8 COMPUTE OBJECTIVE AT SOLUTION OPTION. =0 NO, =1 YES.
C JIT      9 OUTPUT PROBLEM PARAMETERS OPTION. =0 NO, =1 YES.
C JDATA   10 OUTPUT PROBLEM DATA OPTION. =0 NO,
C            =1 OUTPUT WITH A AND QUAD MATRICES IN DENSE FORM,
C            =2 OUTPUT WITH A AND QUAD MATRIX IN SPARSE FORM.
C JPIVOT  11 OUTPUT PIVOT INFORMATION. =0 NO, =1 YES.
C JSOL    12 OUTPUT SOLUTION REPORT OPTION. =0 NO,
C            =1 OUTPUT BRIEF REPORT, =2 OUTPUT FULL REPORT.
C JOUT    13 OPTION TO PRINT OR FILE OUTPUT.
C            =0 PRINT ALL OUTPUT, =1 PRINT PROBLEM PARAMETERS AND FINAL
C            OUTPUT AND FILE OTHER OUTPUT, =2 FILE ALL OUTPUT.
C JWIDTH  14 MAXIMUM WIDTH OF OUTPUT LINES. A MINIMUM OF 72 AND A
C            MAXIMUM OF 132 WILL BE USED.
C
C TOL     --- TOLERANCE VECTOR OF SIZE 2 CONTAINING...
C TZERO    1 ROUND-OFF OR ZERO TOLERANCE. IF .LE. 0 RESET TO 1.E-7
C TPIV     2 PIVOT TOLERANCE. IF .LE. 0 RESET TO 1.E-6
C
C TITLE   --- TITLE PRINTED IN OUTPUT. TYPE CHARACTER.
C             MAY CONTAIN UP TO 64 CHARACTERS.
C             TRUNCATED TO 64 CHARACTERS IF LONGER.
C PFILE   --- FILE NAME QUADPR WRITES OUTPUT ONTO IF REQUESTED.
C             TYPE CHARACTER. MAY CONTAIN UP TO 64 CHARACTERS.
C             IF FILE CANNOT BE OPENED, A FILE WILL BE CREATED
C             AND A MESSAGE PRINTED. IF THE NAME IS ALL BLANKS,
C             OUTPUT TO BE FILED WILL BE DISCARDED.
C OBJ     --- OBJECTIVE VALUE.
C X       --- NO-VECTOR THAT WILL CONTAIN THE SOLUTION.
C RC      --- NO-VECTOR THAT WILL CONTAIN THE REDUCED COSTS.
C DUAL    --- MO-VECTOR THAT WILL CONTAIN THE DUAL SOLUTION.
C SLK     --- MO-VECTOR THAT WILL CONTAIN THE SLACK VALUES.
C IOUT    --- VECTOR OF SIZE 2, THAT WILL CONTAIN...
C IERR     1 STATUS CODE FROM 1 TO 6.
C            1 - SOLUTION IS OPTIMAL.
C            2 - NO SOLUTION.
C            3 - PIVOT LIMIT REACHED.
C            4 - INVALID QUAD MATRIX.
C            5 - PROBLEM DATA ERROR.
C            6 - ALGORITHM ERROR.
C ITCNT    2 NUMBER OF PIVOTS.
```

```
C
C WS    --- WORK SPACE ARRAY OF SIZE AT LEAST
C            2*(MO+NO)**2 + 12*(MO+NO) + 16 IF ANY EQUALITY CONSTRAINTS
C            ARE PRESENT OR  2*(MO+NO)**2 +  8*(MO+NO) + 6
C            IF ALL CONSTRAINTS ARE INEQUALITIES.
C
      IMPLICIT REAL (A-H,O-Z)

DIMENSION A(1),KT(1),RHS(1),COST(1),QUAD(1),INPUT(1),
     1   TOL(1),X(1),RC(1),DUAL(1),SLK(1),IOUT(1),WS(1)
      CHARACTER*64 TITLE,PFILE
C
      INTEGER  ROW,COL,INDX,MORE,P,P1,PSQ
      COMMON /QPRCBI/ INPUTS(14),IOUTS(2),ROW,COL,INDX,MORE,P,P1,PSQ,
     1   NCALL,LENREQ,IO1,IO2,IO3
      EQUIVALENCE (INPUTS(1),ML), (INPUTS(2),NL), (INPUTS(3),MO),
     1   (INPUTS(4),NO), (INPUTS(5),MINMAX), (INPUTS(6),LENWS),
     2   (INPUTS(7),MAXIT), (INPUTS(8),KOBJ), (INPUTS(9),JIT),
     3   (INPUTS(10),JDATA), (INPUTS(11),JPIVOT), (INPUTS(12),JSOL),
     4   (INPUTS(13),JOUT), (INPUTS(14),JWIDTH),
     5   (IOUTS(1),IERR), (IOUTS(2),ITCNT)
C
      COMMON /QPRCBR/ TOLS(2)
      EQUIVALENCE (TOLS(1),TZERO), (TOLS(2),TPIV)
C
      DOUBLE PRECISION PIVOT
      COMMON /QPRCBD/ PIVOT
C
      CHARACTER*64 TITLES, PFILES
      COMMON /QPRCBC/ TITLES, PFILES
C
C     DATA NCALL / 0 /

NCALL = 0
C
C     OUTPUT UNITS FOR LINE PRINTER (TERMINAL) AND OUTPUT FILE
      DATA  LUPRNT, LUFILE / 6, 92 /
C
C
C     INITIALIZATIONS
C
      IO1 = LUPRNT
      IERR = 0
      ITCNT = 0
      TZERO = TOL(1)
      TPIV = TOL(2)
      NCALL = NCALL + 1
      DO 10 I = 1, 14
          INPUTS(I) = INPUT(I)
   10 CONTINUE
      TITLES =                                                      ,
     *'
```

```
C       L1 = LEN(TITLE)
        L1 = 30

TITLES(1:L1) = TITLE(1:L1)
C
C       INTERNAL TABLEAU IS (MO+NO)*(MO+NO+1) IF ALL INEQUALITIES AND
C       (MO+NO+1)*(MO+NO+2) IF ANY EQUALITIES SINCE 1 MORE ROW IS ADDED.
        IF (MO .LE. 0) GO TO 22
        DO 20 I = 1, MO
           IF (KT(I) .EQ. 0) GO TO 24
     20 CONTINUE
     22 CONTINUE
        MORE = 0
        GO TO 26
     24 CONTINUE
        MORE = 1
     26 CONTINUE
        P = MO + NO + MORE
        P1 = P + 1
        PSQ = P**2
C
C       SET OUTPUT UNITS AND OPEN PRINT FILE IF REQUIRED.
        IF (JOUT .NE. 1 .AND. JOUT .NE. 2) GO TO 80
        PFILES =
       *' '
C       L1 = LEN(PFILE)
        L1 = 30

L2 = 0
        L3 = 0
        DO 30 I = 1, L1
           IF (PFILE(I:I) .EQ. ' ') GO TO 30
           L2 = L2 + 1
           PFILES(L2:L2) = PFILE(I:I)
     30 CONTINUE
        IF (L2 .GT. 0) GO TO 40
C       BLANK FILE NAME, DISCARD OUTPUT TO BE FILED.
        JDATA = 0
        JPIVOT = 0
        IF (JOUT .EQ. 2) GO TO 90
        JIT = 0
        JSOL = 0
        GO TO 50
C       OPEN PRINT FILE
     40 CONTINUE
C        OPEN (LUFILE,FILE=PFILES,STATUS='UNKNOWN',ERR=60)
        OPEN (LUFILE,FILE=PFILES)
        IO3 = LUFILE
        IF (JOUT .EQ. 1) GO TO 50
        IO2 = LUFILE
        GO TO 90
     50 CONTINUE
```

```
      IO2 = LUPRNT
      GO TO 90
C     CANNOT OPEN FILE. MAKE ONE UP.
   60 CONTINUE
      IF (L3 .EQ. 1) GO TO 76
      L3 = 1
      WRITE (IO1,70) NCALL,PFILES(1:L2)
   70 FORMAT ( //// 5X,'QUADPR  CALL',I4
     1                // 1X,'*** UNABLE TO OPEN THE FILE ', A)
      WRITE (PFILES,72) NCALL
C     FORM FILE NAME.
   72 FORMAT ('QDPR',I4.4,'.LIS',52X)
      WRITE (IO1,74) PFILES(1:12)
   74 FORMAT ( / 5X,'OUTPUT WILL BE FILED ON ',A12)
      GO TO 40
C     CANNOT OPEN THIS FILE EITHER.
   76 CONTINUE
      WRITE (IO1,78) LUFILE
   78 FORMAT ( / 5X,'CANNOT OPEN THIS FILE EITHER.  CHECK YOUR FILES ',
     1    'FOR THE ABOVE NAME' / 5X,'AND MAKE SURE LOGICAL UNIT',I4,
     2    ' IS CLOSED.' / )
      IERR = 5
      GO TO 200
   80 CONTINUE
      IO2 = LUPRNT
      IO3 = LUPRNT
   90 CONTINUE
C
C     PARTITION WORKSPACE ARRAY.
      L1 = 1 + 2*(PSQ+P)
      L2 = L1 + 2*P1
      L3 = L2 + 2*P1
      L4 = L3 + P1
      LENREQ = L4 + P1 - 1
C
C     CHECK INPUT DATA PARAMETERS FOR CONSISTENCY
      CALL QDRVER (KT)
C
      IF (IERR .EQ. 5) GO TO 200
C     QUIT IF BAD VALUES (IERR = 5)
C
C     OUTPUT PROBLEM PARAMETERS AND PROBLEM DATA IF REQUESTED.
C     IF (JIT .NE. 0) CALL QRPRT1
C     IF (JDATA .NE. 0) CALL QRPRT2 (A,ML,KT,RHS,COST,QUAD,NL)
C
C     OUTPUT HEADER FOR INTERMEDIATE OUTPUT, IF ANY EXPECTED
C     IF (JPIVOT .NE. 0) CALL QRPRT3
C
C     CONSTRUCT INITIAL TABLEAU FOR QUADRATIC PROGRAMMING.
      CALL QDPREP (A,ML,KT,RHS,COST,QUAD,NL,WS,P)
C
C     PERFORM PRINCIPAL PIVOTING TO FINAL TABLEAU.
```

```
      CALL QDCOMP (WS,WS(L1),WS(L2),WS(L3),WS(L4))
C
C     GET SOLUTION AND OBJECTIVE VALUE IF REQUESTED.
      CALL QDSOLN (KT,COST,QUAD,NL,WS,P,WS(L4),X,RC,DUAL,SLK,
     1   WS(L1),OBJ)
C
C     OUTPUT SOLUTION REPORT IF REQUESTED.
C       IF (JSOL .NE. 0) CALL QRPRT6 (X,RC,DUAL,SLK,OBJ)
C
C     SET EXIT VALUES, IOUT.
  200 CONTINUE
      IOUT(1) = IERR
      IOUT(2) = ITCNT
C
C     CLOSE PRINT FILE IF REQUIRED.
      IF (JOUT .GT. 0) CLOSE (LUFILE,STATUS='KEEP')
C
      RETURN
C
      END
*********************************************************************
      SUBROUTINE QDRVER (KT)
C
C     CHECK INPUT DATA FOR QUADPR
C
      IMPLICIT REAL (A-H,O-Z)
      DIMENSION KT(1)
C
      INTEGER  ROW,COL,INDX,P,P1,PSQ
      COMMON /QPRCBI/ INPUTS(14),IOUTS(2),ROW,COL,INDX,MORE,P,P1,PSQ,
     1   NCALL,LENREQ,IO1,IO2,IO3
      EQUIVALENCE (INPUTS(1),ML),  (INPUTS(2),NL),  (INPUTS(3),MO),
     1   (INPUTS(4),NO),  (INPUTS(5),MINMAX),  (INPUTS(6),LENWS),
     2   (INPUTS(7),MAXIT),  (INPUTS(8),KOBJ),  (INPUTS(9),JIT),
     3   (INPUTS(10),JDATA),  (INPUTS(11),JPIVOT),  (INPUTS(12),JSOL),
     4   (INPUTS(13),JOUT),  (INPUTS(14),JWIDTH),
     5   (IOUTS(1),IERR),  (IOUTS(2),ITCNT)
C
      COMMON /QPRCBR/ TOLS(2)
      EQUIVALENCE (TOLS(1),TZERO),  (TOLS(2),TPIV)
C
      INTEGER ZERONE(4),ZERO12(3)
      LOGICAL ERROR(10)
      DATA ZERONE  / 5,8,9,11 /
      DATA ZERO12  / 10,12,13 /
C
C
      ITITLE = 0
C
C     DEFAULT VALUES
      IF (MAXIT .LE. 0) MAXIT = 1000
```

```
      IF (TZERO .LE. 0.0) TZERO = 1.0E-7
      IF (TPIV .LE. 0.0) TPIV = 1.0E-6
      IF (JWIDTH .LT. 72) JWIDTH = 72
      IF (JWIDTH .GT. 132) JWIDTH = 132
C
      ITITLE = 0
C
C     CHECK KT
      DO 10 I = 1, MO
         IF (IABS(KT(I)) .GT. 1) GO TO 20
   10 CONTINUE
      GO TO 30
   20 CONTINUE
      WRITE (IO1,22) NCALL
   22 FORMAT ( /// 5X,'QUADPR  CALL',I4)
      WRITE (IO1,24) (KT(I),I=1,MO)
   24 FORMAT ( / 1X,'*** ERROR, ILLEGAL VALUES IN KT.  KT CONTAINS'
     1  / (6I12) )
      IERR = 5
      ITITLE = 1
C
C     CHECK INPUT
   30 CONTINUE
      ERROR(1) = (MO .LT. 0 .OR. MO .GT. ML)
      ERROR(2) = (NO .LT. 1 .OR. NO .GT. NL)
      ERROR(3) = (LENWS .LT. LENREQ)
      DO 33 I = 1, 4
         J = ZERONE(I)
         ERROR(I+3) = (INPUTS(J) .NE. 0 .AND. INPUTS(J) .NE. 1)
   33 CONTINUE
      DO 34 I = 1, 3
         J = ZERO12(I)
         ERROR(I+7) = (INPUTS(J) .LT. 0 .OR. INPUTS(J) .GT. 2)
   34 CONTINUE
      DO 35 I = 1, 10
         IF (ERROR(I)) GO TO 38
   35 CONTINUE
      GO TO 50
C
   38 CONTINUE
      IERR = 5
      IF (ITITLE .EQ. 0) WRITE (IO1,22) NCALL
      WRITE (IO1,40) (INPUTS(I),I=1,14)
   40 FORMAT ( / 1X,'*** ERROR, INCONSISTENT DATA IN INPUT.'
     1   '  INPUT CONTAINS' / 5I12 / 5I12 / 4I12 /
     2   / 5X,'THE FOLLOWING ERRORS OCCURRED.' / )
      IF (ERROR(1)) WRITE (IO1,41)
   41 FORMAT (5X,'INPUT(3) NEGATIVE OR EXCEEDS INPUT(1)')
      IF (ERROR(2)) WRITE (IO1,42)
   42 FORMAT (5X,'INPUT(4) NON-POISTIVE OR EXCEEDS INPUT(2)')
      IF (ERROR(3)) WRITE (IO1,43) LENREQ
   43 FORMAT (5X,'INPUT(6) TOO SMALL.  FOR THIS PROBLEM,',
```

```
   1   ' MUST BE AT LEAST',I8)
      DO 45 I = 1, 4
         J = ZERONE(I)
         IF (ERROR(I+3)) WRITE (IO1,46) J
   45 CONTINUE
   46 FORMAT (5X,'INPUT(',I2,') NOT 0 OR 1')
      DO 47 I = 1, 3
         J = ZERO12(I)
         IF (ERROR(I+7)) WRITE (IO1,48) J
   47 CONTINUE
   48 FORMAT (5X,'INPUT(',I2,') NOT 0, 1, OR 2')
C
   50 CONTINUE
      RETURN
      END
C*******************************************************************
      SUBROUTINE QDPREP (A,LDA,KT,RHS,COST,QUAD,LDQ,B,LDB)
C
C     CONSTRUCT THE INITIAL TABLEAU FOR QUADRATIC PROGRAMMING.
C     IT HAS THE FORM
C
C             ..............................
C             .       (T)    .    (T)   .     .
C             . QUAD'+QUAD'  .   -A'    . COST'.
C             .     [1]      .    [2]   . [3]  .
C         B = ..............................
C             .              .          . -RHS'.
C             .     A'       .    0     .      .
C             .     [4]      .    [5]   . [6]  .
C             ..............................
C
C     WHERE A',RHS',COST',QUAD' ARE OBTAINED FROM A,RHS,COST,QUAD BY
C     CONVERTING THE PROBLEM TO MINIMIZATION WITH ALL .GE. CONSTRAINTS.
C
      IMPLICIT REAL (A-H,O-Z)

DOUBLE PRECISION B
      DIMENSION A(LDA,1),KT(1),RHS(1),COST(1),QUAD(LDQ,1),B(LDB,1)
C
      INTEGER ROW,COL,INDX,MORE,P,P1,PSQ
      COMMON /QPRCBI/ INPUTS(14),IOUTS(2),ROW,COL,INDX,MORE,P,P1,PSQ,
   1    NCALL,LENREQ,IO1,IO2,IO3
      EQUIVALENCE (INPUTS(1),ML), (INPUTS(2),NL), (INPUTS(3),MO),
   1    (INPUTS(4),NO), (INPUTS(5),MINMAX), (INPUTS(6),LENWS),
   2    (INPUTS(7),MAXIT), (INPUTS(8),KOBJ), (INPUTS(9),JIT),
   3    (INPUTS(10),JDATA), (INPUTS(11),JPIVOT), (INPUTS(12),JSOL),
   4    (INPUTS(13),JOUT), (INPUTS(14),JWIDTH),
   5    (IOUTS(1),IERR), (IOUTS(2),ITCNT)
C
C
C     FILL LOWER TRIANGLE OF [1] AND [3].
      N1 = NO - 1
      IF (MINMAX .EQ. 1) GO TO 40
```

41

```
C     MIN. PROBLEM
      B(1,1) = 2.0*QUAD(1,1)
      B(1,P1) = COST(1)
      IF (NO .EQ. 1) GO TO 110
      DO 10 K = 2, NO
         B(K,K) = 2.0*QUAD(K,K)
         B(K,P1) = COST(K)
   10 CONTINUE
      DO 30 L = 1, N1
         L1 = L + 1
         DO 20 K = L1, NO
            B(K,L) = QUAD(K,L) + QUAD(L,K)
   20    CONTINUE
   30 CONTINUE
      GO TO 80
C     MAX. PROBLEM
   40 CONTINUE
      B(1,1) = - 2.0*QUAD(1,1)
      B(1,P1) = - COST(1)
      IF (NO .EQ. 1) GO TO 110
      DO 50 K = 2, NO
         B(K,K) = - 2.0*QUAD(K,K)
         B(K,P1) = - COST(K)
   50 CONTINUE
      DO 70 L = 1, N1
         L1 = L + 1
         DO 60 K = L1, NO
            B(K,L) = - QUAD(K,L) - QUAD(L,K)
   60    CONTINUE
   70 CONTINUE
C
C     FILL UPPER TRAINGLE OF [1].
   80 CONTINUE
      DO 100 L = 2, NO
         L1 = L - 1
         DO 90 K = 1, L1
            B(K,L) = B(L,K)
   90    CONTINUE
  100 CONTINUE
C
C     CHECK FOR CASE OF NO CONSTRAINTS.
  110 CONTINUE
      IF (MO .EQ. 0) GO TO 240
C
C     FILL [5].
      N1 = NO + 1
      DO 130 L = N1, P
         DO 120 K = N1, P
            B(K,L) = 0.0
  120    CONTINUE
  130 CONTINUE
C
```

```
C     IF THERE ARE R .EQ. CONSTRAINTS, EXPRESS AS R+1 .GE. CONSTRAINTS,
C     THE LATTER BEING MINUS THE SUM OF THE OTHERS.
      IF (MORE .EQ. 0) GO TO 150
      DO 140 L = 1, NO
          B(P,L) = 0.0
  140 CONTINUE
      B(P,P1) = 0.0
C
C     FILL [4] AND [6].
  150 CONTINUE
      DO 210 I = 1, MO
          K = NO + I
          IF (KT(I) .LT. 0) GO TO 170
          IF (KT(I) .GT. 0) GO TO 190
C         .EQ. CONSTRAINT
          DO 160 L = 1, NO
              B(K,L) = A(I,L)
              B(P,L) = B(P,L) - B(K,L)
  160     CONTINUE
          B(K,P1) = - RHS(I)
          B(P,P1) = B(P,P1) - B(K,P1)
          GO TO 210
C         .GE. CONSTRAINT
  170     CONTINUE
          DO 180 L = 1, NO
              B(K,L) = A(I,L)
  180     CONTINUE
          B(K,P1) = - RHS(I)
          GO TO 210
C         .LE. CONSTRAINT
  190     CONTINUE
          DO 200 L = 1, NO
              B(K,L) = - A(I,L)
  200     CONTINUE
          B(K,P1) = RHS(I)
  210 CONTINUE
C
C     FILL [2].
      DO 230 L = 1, NO
          DO 220 K = N1, P
              B(L,K) = - B(K,L)
  220     CONTINUE
  230 CONTINUE
C
C     FINISHED
  240 CONTINUE
      RETURN
      END
**********************************************************************
      SUBROUTINE QDCOMP (B,TEMP,U,JZ,JW)
C
```

```
C      COMPUTE THE FINAL TABLEAU FOR QUADRATIC PROGRAMMING GIVEN
C      THE INITIAL TABLEAU USING THE METHOD OF PRINCIPAL PIVOTING.
C
       IMPLICIT REAL (A-H,O-Z)

DOUBLE PRECISION  B,TEMP,U
       INTEGER  JZ,JW
       DIMENSION  B(1),TEMP(1),U(1),JZ(1),JW(1)
C
       INTEGER  ROW,COL,INDX,P,P1,PSQ
       COMMON /QPRCBI/ INPUTS(14),IOUTS(2),ROW,COL,INDX,MORE,P,P1,PSQ,
     1    NCALL,LENREQ,IO1,IO2,IO3
       EQUIVALENCE (INPUTS(1),ML), (INPUTS(2),NL), (INPUTS(3),MO),
     1    (INPUTS(4),NO), (INPUTS(5),MINMAX), (INPUTS(6),LENWS),
     2    (INPUTS(7),MAXIT), (INPUTS(8),KOBJ), (INPUTS(9),JIT),
     3    (INPUTS(10),JDATA), (INPUTS(11),JPIVOT), (INPUTS(12),JSOL),
     4    (INPUTS(13),JOUT), (INPUTS(14),JWIDTH),
     5    (IOUTS(1),IERR), (IOUTS(2),ITCNT)
C
       COMMON /QPRCBR/ TOLS(2)
       EQUIVALENCE (TOLS(1),TZERO), (TOLS(2),TPIV)
C
       DOUBLE PRECISION  PIVOT
       COMMON /QPRCBD/ PIVOT
C
       DOUBLE PRECISION  Z,BS,BST
       CHARACTER*48  MSG(4)
C
       DATA MSG / 'ALGORITHM ERROR, INDEX VALUE NON-DECREASING.   ',
     2            'NO SOLUTION, INVALID QUADRATIC COSTS MATRIX.   ',
     3            'NO SOLUTION, INFEASIBLE OR UNBOUNDED PROBLEM.  ',
     4            'ERROR, ITERATION LIMIT REACHED.                '/
C
C
C*****INITIALIZATIONS
       ITCNT = 0
       JFLAG = 0
       INDX = P1
C*****BASIC VARIABLES GET NEGATIVE VALUES.
C*****NONBASIC VARIABLES(JZ) GET POSITIVE VALUES.
       DO 30 I = 1, P
          JW(I) = -I
          JZ(I) = I
   30  CONTINUE
   40  ITEMP = 0
C*****CHECK FOR NONDECREASING INDEX (ALLOW UP TO 5 EQUAL INDEXES FOR
C*****TOLERANCE PURPOSES).
       IJ = PSQ
       DO 50 I = 1, P
          IJ = IJ + 1
          IF (B(IJ) .LT. (-TZERO)) ITEMP = ITEMP + 1
   50  CONTINUE
```

```
      IF (ITEMP .NE. INDX) ICT = 0
      IF (ITEMP .EQ. INDX) ICT = ICT + 1
      IF (ITEMP .GT. INDX .OR. ICT .EQ. 5) GO TO 400
C*****IF THE INDEX IS ZERO YOU ARE DONE.
      IF (ITEMP .EQ. 0) GO TO 300
      INDX = ITEMP
      IJ = PSQ
      DO 60 I = 1, P
         IJ = IJ + 1
         IF (B(IJ) .LT. (-TZERO)) GO TO 70
   60 CONTINUE
   70 IJ = P*(I-1) + I
C*****CHECK FOR NEGATIVE DIAGONAL ELEMENT (NOT ALLOWED IF POS. SEMIDEF.)
      IF (B(IJ) .LT. (-TPIV)) GO TO 410
      IF (B(IJ) .GT. TPIV) GO TO 100
C*****IF POTENTIAL PIVOT ELEMENT IS NEAR ZERO, USE CODE BELOW
C*****TO DETERMINE THE BLOCKING VARIABLE.
      II = I
   80 ROW = 0
      TMMP = 1000000.
      IJ = PSQ
      KJ = P*(II-1)
      DO 90 J = 1, P
         IJ = IJ + 1
         KJ = KJ + 1
         IF (B(IJ) .LT. (-TZERO)) GO TO 90
C********IF ALL COL. ELEMENTS ARE NONNEGATIVE, THEN THE DRIVING VARIABLE
C********IS UNBLOCKED AND THERE IS NO SOLUTION.
         IF (B(KJ) .GE. (-TPIV)) GO TO 90
         Z = -B(IJ) / B(KJ)
         IF (Z .GE. TMMP) GO TO 90
         TMMP = Z
         ROW = J
   90 CONTINUE
      IF (ROW. EQ. 0) GO TO 420
      COL = II
      GO TO 150
C*****COMPUTE Z = -Q(R)/B(R,R), THE INCREASE IN THE DRIVING VARIABLE.
  100 IJ = PSQ + I
      KJ = P*(I-1) + I
      Z = -B(IJ) / B(KJ)
      COL = I
  110 BS = 0.
      ROW = 0
C*****FIND THE NEW BLOCKING VARIABLE, BASED ON WHICH BASIC VARIABLE IS
C*****MOST AFFECTED BY THE CHANGE IN THE DRIVING VARIABLE.
      IJ = (COL-1)*P
      KJ = PSQ
      DO 140 J = 1, P
         IJ = IJ + 1
         KJ = KJ + 1
         BST = B(IJ)*Z + B(KJ)
```

```
              IF (B(KJ) .LT. (-TZERO) .OR. BST .GE. (-TPIV)) GO TO 140
              IF (DABS(B(KJ)) .LT. TZERO .AND. B(IJ) .LT. (-TZERO)) GO TO 120

IF (B(KJ)) 130, 140, 130
       120    ROW = J
              GO TO 150
       130    BST = -BST / B(KJ)
              IF (BST .LE. BS) GO TO 140
              BS = BST
              ROW = J
       140 CONTINUE
           IF (ROW .EQ. 0) GO TO 210
     C*****NONPRINCIPAL PIVOT ON B(S,R).
     C*****AT THIS POINT THE BLOCKING VARIABLE IS B(NS,I).
       150 III = -JW(ROW)
           NFLAG = 1
           GO TO 500
       160 CONTINUE
           IF (ITCNT .GE. MAXIT) GO TO 440
           ITCNT = ITCNT + 1
     C*****ATTEMPT TO PROGRESSIVELY RELAX THE CONVERGENCE PARAMETER

C     TPIV = TPIV + TOLS(2)/50.
     C*****INDICATE THE NUMBER OF ITERATIONS
           WRITE(*,101)'OPTIMIZATION ITERATION       ',ITCNT
       101 FORMAT('+',A50,I5)

JFLAG = 0
     C*****PUT TOLERANCE ON B(I,P1) AFTER A NONPRINCIPAL PIVOT.
           IJ = PSQ + I
           IF (B(IJ) .LT. (-TZERO)) GO TO 170
           GO TO 40
     C*****THE NEW DRIVING VARIABLE IS THE COMPLEMENT OF THE OLD BLOCKING
     C*****VARIABLE
       170 DO 180 JJ = 1, P
              IF (JZ(JJ) .EQ. III) GO TO 190
       180 CONTINUE
     C*****NO COMPLEMENT VARIABLE (NOT ALLOWED IF POS. SEMIDEF.)
           GO TO 410
       190 COL = JJ
     C*****THE DISTINGUISHED VARIABLE IS STILL THE I-TH ROW.
           IJ = P*(COL-1) + I
           IF (B(IJ) .GT. TPIV) GO TO 200
           II = COL
           GO TO 80
       200 KJ = PSQ + I
           Z = -B(KJ) / B(IJ)
           GO TO 110
     C*****PRINCIPAL PIVOT ON B(I,I).
       210 LL = ROW
           ROW = I
           NFLAG = 2
```

```
          GO TO 500
  220 CONTINUE
          IF (JFLAG .EQ. 1) GO TO 290
          JFLAG = 1
C*****MUST REARRANGE THE ROWS AND COLUMNS FOR COMPLEMENTARITY
C*****EXCHANGE ROWS
  230 LLL = 0
          DO 250 I = 1, P
          K = IABS(JW(I))
          IF (K .EQ. I) GO TO 250
          IJ = K
          KJ = I
          DO 240 J = 1, P1
             Z = B(IJ)
             B(IJ) = B(KJ)
             B(KJ) = Z
             IJ = IJ + P
             KJ = KJ + P
  240 CONTINUE
          II = JW(I)
          JW(I) = JW(K)
          JW(K) = II
          LLL = LLL + 1
  250 CONTINUE
          IF (LLL .GE. 2) GO TO 230
C*****EXCHANGE COLUMNS
  260 LLL = 0
          DO 280 J = 1, P
             K = IABS(JZ(J))
             IF (K .EQ. J) GO TO 280
             IJ = P*(K-1)
             KJ = P*(J-1)
             DO 270 I = 1, P
                IJ = IJ + 1
                KJ = KJ + 1
                Z = B(IJ)
                B(IJ) = B(KJ)
                B(KJ) = Z
  270        CONTINUE
             II = JZ(J)
             JZ(J) = JZ(K)
             JZ(K) = II
             LLL = LLL + 1
  280 CONTINUE
          IF (LLL .GE. 2) GO TO 260
  290 ROW = LL
          ITCNT = ITCNT + 1
C*****ATTEMPT TO PROGRESSIVELY RELAX THE CONVERGENCE PARAMETER

C      TPIV = TPIV + TOLS(2)/50.
C*****INDICATE THE NUMBER OF ITERATIONS
          WRITE(*,101)'OPTIMIZATION ITERATION       ',ITCNT
```

```
C     IF (JPIVOT .EQ. 1) CALL QRPRT5
      IF (INDX .GT. 1) GO TO 40
C
C*****NORMAL TERMINATION
  300 IERR = 1
      GO TO 600
C
C*****ERROR TERMINATION
  400 K = 1
      IERR = 6
      GO TO 460
  410 K = 2
      IERR = 4
      GO TO 460
  420 K = 3
      IERR = 2
      GO TO 460
  440 K = 4
      IERR = 3
  460 WRITE (IO1,470) MSG(K),ITCNT
      IF (JOUT .NE. 0) WRITE (IO3,470) MSG(K),ITCNT
  470 FORMAT( / 1X,A48,I6,' PIVOTS PERFORMED.' / )
      GO TO 600
C
C*****PIVOT CODE.
C*****QUADPP USES A NORMAL JORDAN PIVOT.
C*****HOWEVER, WE CAN SAVE MEMORY BY USING THE ELEMENTARY MATRIX.
C*****STORE PIVOT ELEMENT
  500 CONTINUE
      KC = P*(COL-1)
      KJ = KC + ROW
      PIVOT = B(KJ)
      Z = 1.0D0 / PIVOT
C*****STORE ELEMENTARY-VECTOR AND U-VECTOR.
      IJ = ROW
      ISAVE = I
      DO 510 I = 1, P1
         U(I) = B(IJ)
         IJ = IJ + P
  510 CONTINUE
      IJ = KC
      DO 520 I = 1, P
      IJ = IJ + 1
         TEMP(I) = -B(IJ) * Z
  520 CONTINUE
      TEMP(ROW) = -Z - 1.0D0
C*****COMPUTE ALL COLUMNS EXCEPT PIVOT COLUMN.
      IJ = 0
      DO 550 J = 1, P1
         IF (J .NE. COL) GO TO 530
         IJ = IJ + P
```

```
      GO TO 550
530   DO 540 I = 1, P
         IJ = IJ + 1
         B(IJ) = B(IJ) + U(J)*TEMP(I)
540   CONTINUE
550 CONTINUE
C****COMPUTE PIVOT COLUMN.
      IJ = KC
      DO 560 I = 1, P
         IJ = IJ + 1
         B(IJ) = -TEMP(I)
  560 CONTINUE
C****COMPUTE NEW PIVOT ELEMENT.
      B(KJ) = Z
C****KEEP TRACK OF BASIC AND NONBASIC VARIABLES
      K = JW(ROW)
      JW(ROW) = JZ(COL)
      JZ(COL) = K
C     IF (JPIVOT .EQ. 1) CALL QRPRT4
      I = ISAVE
      GO TO (160, 220), NFLAG
C
C****FINISHED
  600 RETURN
      END
**********************************************************************
      SUBROUTINE QDSOLN (KT,COST,QUAD,LDQ,B,LDB,JW,X,RC,DUAL,SLK,
     1    TEMP,OBJ)
C
C     RETURN SOLUTION TO QUADRATIC PROGRAMMING PROBLEM FROM FINAL
C     TABLEAU AND COMPUTE OBJECTIVE VALUE IF REQUESTED.
C     CONVERTING THE PROBLEM TO MINIMIZATION WITH ALL .GE. CONSTRAINTS.
C
      IMPLICIT REAL (A-H,O-Z)

DOUBLE PRECISION  B,TEMP
      DIMENSION  KT(1),COST(1),QUAD(LDQ,1),B(LDB,1),JW(1),X(1),RC(1),
     1    DUAL(1),SLK(1),TEMP(1)
C
      INTEGER  ROW,COL,INDX,MORE,P,P1,PSQ
      COMMON /QPRCBI/ INPUTS(14),IOUTS(2),ROW,COL,INDX,MORE,P,P1,PSQ,
     1    NCALL,LENREQ,IO1,IO2,IO3
      EQUIVALENCE (INPUTS(1),ML),  (INPUTS(2),NL),  (INPUTS(3),MO),
     1    (INPUTS(4),NO),  (INPUTS(5),MINMAX),  (INPUTS(6),LENWS),
     2    (INPUTS(7),MAXIT),  (INPUTS(8),KOBJ),  (INPUTS(9),JIT),
     3    (INPUTS(10),JDATA),  (INPUTS(11),JPIVOT),  (INPUTS(12),JSOL),
     4    (INPUTS(13),JOUT),  (INPUTS(14),JWIDTH),
     5    (IOUTS(1),IERR),  (IOUTS(2),ITCNT)
C
      COMMON /QPRCBR/ TOLS(2)
      EQUIVALENCE (TOLS(1),TZERO), (TOLS(2),TPIV)
```

```
C
      DOUBLE PRECISION DART, BB
C
C
C     GET X, RC, DUAL, SLK
  100 CONTINUE
      KART = MO + 1
      DO 110 J = 1, NO
         X(J) = 0.0
         RC(J) = 0.0
  110 CONTINUE
      DO 120 I = 1, MO
         DUAL(I) = 0.0
         SLK(I) = 0.0
  120 CONTINUE
      DART = 0.0D0
      DO 170 I = 1, P
         BB = B(I,P1)
         IF (DABS(BB) .LT. TZERO) BB = 0.0D0
         J = JW(I)
         IF (J .LT. 0) GO TO 150
         IF (J .GT. NO) GO TO 130
         X(J) = BB
         GO TO 170
  130    CONTINUE
         K = J - NO
         IF (K .EQ. KART) GO TO 140
         DUAL(K) = BB
         GO TO 170
  140    CONTINUE
         DART = BB
         GO TO 170
  150    CONTINUE
         J = -J
         IF (J .GT. NO) GO TO 160
         RC(J) = BB
         GO TO 170
  160    CONTINUE
         K = J - NO
         IF (K .EQ. KART) GO TO 170
         SLK(K) = BB
  170 CONTINUE
C
C     ADJUST DUALS IF ANY EQUALITIES
      IF (MORE .EQ. 0) GO TO 200
      DO 190 I = 1, MO
         IF (KT(I) .NE. 0) GO TO 190
         IF (MINMAX .EQ. 1) GO TO 180
         DUAL(I) = DUAL(I) - DART
         GO TO 190
  180    CONTINUE
         DUAL(I) = DART - DUAL(I)
```

```
  190 CONTINUE
C
C     COMPUTE OBJECTIVE VALUE ONLY IF REQUESTED.
  200 CONTINUE
      IF (KOBJ .EQ. 0) GO TO 250
      OBJ = 0.
      DO 220 I = 1, NO
         TEMP(I) = 0.0D0
         DO 210 J = 1, NO
            TEMP(I) = TEMP(I) + X(J)*QUAD(I,J)
  210    CONTINUE
  220 CONTINUE
      DO 230 J = 1, NO
         OBJ = OBJ + TEMP(J)*X(J)
  230 CONTINUE
      DO 240 J = 1, NO
         OBJ = OBJ + COST(J)*X(J)
  240 CONTINUE
C
C     FINISHED
  250 CONTINUE
      RETURN
      END
C***********************************************************************
C UPDATED December 6, 1988
***********************************************************************
      SUBROUTINE QSET(NUM,MAXWS,ITURN)
***********************************************************************
      INCLUDE 'COMSUC.F'

REAL O(4),S(4),XMAX(ND)
      INTEGER KK(4)

REAL QC(NDID,ND),QRHS(NDID),QTOL(2),QRC(ND),
     &                 QDUAL(NDID),QSLK(NDID),QWS(ISIZEQ),QB(ND)

INTEGER QKT(NDID),INPUT(14),QIOUT(2),NUM,MAXWS
      CHARACTER*30 PFILE

C **** IF THE OPTIMAL PORTFOLIO IS WITHIN TURNOVER LIMIT, RETURN ****
      IF (ITURN .EQ. 1) THEN
      COST = 0.0
      DO 5 I = 1,NUM
         COST = COST + ABS(X(I)-OLDWT(I))
    5 CONTINUE
      TURN = TURN/2.0 * COST
      END IF

DO 10 I = 1,ID
      DO 10 J = 1,NUM
   10    QC(I+NUM,J)=C(J,I)
```

```
      DO 20 I = 1,NUM
      DO 20 J = 1,NUM
      IF(I.EQ.J) THEN
      QC(I,J) = -1.0

IF(ITURN.EQ.1) THEN

C***IF THE OLD WEIGHT EQUALS ZERO
          IF (OLDWT(I) .LT. 0.001) THEN
             QC(I,J) = -1.0
C***IF THE OLD WEIGHT EQUALS THE UPPER BOUND
          ELSE IF (OLDWT(I) .GT. 0.95*BDU(I)) THEN
             QC(I,J) = -1.0
C***IF X(I) IS LESS THAN THE OLD WEIGHT
          ELSE IF (X(I) .LE. OLDWT(I)) THEN
             QC(I,J) = -1.0
C***IF X(I) IS GREATER THAN THE OLD WEIGHT
          ELSE IF (X(I) .GT. OLDWT(I)) THEN
             IF (X(I) .GT. 0.95*BDU(I)) THEN
                QC(I,J) = -1.0
             ELSE
                QC(I,J) = 1.0
             END IF
          END IF

END IF

ELSE
          QC(I,J) = 0.0
      END IF
20    CONTINUE

DO 30 I = 1,NUM+ID
          IF(I.LE.NUM) THEN
             QRHS(I) = -BDU(I)

IF(ITURN.EQ.1) THEN

C***IF THE OLD WEIGHT EQUALS ZERO
          IF (OLDWT(I) .LT. 0.001) THEN
             QRHS(I) = -BDU(I)
C***IF THE OLD WEIGHT EQUALS THE UPEPR BOUND
          ELSE IF (OLDWT(I) .GT. 0.95*BDU(I)) THEN
             QRHS(I) = -BDU(I)
C***IF X(I) IS LESS THAN THE OLD WEIGHT
          ELSE IF (X(I) .LE. OLDWT(I)) THEN
             QRHS(I) = -OLDWT(I)
C***IF X(I) IS GREATER THAN THE OLD WEIGHT
          ELSE IF (X(I) .GT. OLDWT(I)) THEN
             IF (X(I) .GT. 0.95*BDU(I)) THEN
                QRHS(I) = -BDU(I)
             ELSE
```

```
              QRHS(I) = OLDWT(I)
          END IF

END IF
       END IF

ELSE
          QRHS(I) = D(I-NUM)
       END IF
       QKT(I) = -1
30    CONTINUE

INPUT(1)  = ND+ID
      INPUT(2)  = ND
      INPUT(3)  = NUM+ID
      INPUT(4)  = NUM
      INPUT(5)  = 0
      INPUT(6)  = MAXWS
      INPUT(7)  = 0
      INPUT(8)  = 0
      INPUT(9)  = 0
      INPUT(10) = 0
      INPUT(11) = 0
      INPUT(12) = 0
      INPUT(13) = 0
      INPUT(14) = 0

QTOL(1) = 0.0
C E-6
      QTOL(2) = 0.000001
C E-4    QTOL(2) = 0.0001

PFILE = 'TEMP.Q'

IF (ITURN.EQ.1) QRHS(NUM+6) = -TURN
      DO 40 I = 1,NUM
         IF(ITURN.EQ.1) THEN

C***IF THE OLD WEIGHT EQUALS ZERO
         IF (OLDWT(I) .LT. 0.001) THEN
            QC(NUM+6,I) = -1.0
            QRHS(NUM+6) = QRHS(NUM+6) - OLDWT(I)
C***IF THE OLD WEIGHT EQUALS THE UPEPR BOUND
         ELSE IF (OLDWT(I) .GT. 0.95*BDU(I)) THEN
            QC(NUM+6,I) = 1.0
            QRHS(NUM+6) = QRHS(NUM+6) + OLDWT(I)
C***IF X(I) IS LESS THAN THE OLD WEIGHT
         ELSE IF (X(I) .LE. OLDWT(I)) THEN
            QC(NUM+6,I) = 1.0
            QRHS(NUM+6) = QRHS(NUM+6) + OLDWT(I)
C***IF X(I) IS GREATER THAN THE OLD WEIGHT
         ELSE IF (X(I) .GT. OLDWT(I)) THEN
```

```
              IF (X(I) .GT. 0.95*BDU(I)) THEN
                 QC(NUM+6,I) = -1.0
                 QRHS(NUM+6) = QRHS(NUM+6) - OLDWT(I)
              ELSE
                 QC(NUM+6,I) = -1.0
                 QRHS(NUM+6) = QRHS(NUM+6) - OLDWT(I)
              END IF
           END IF
        END IF
40    CONTINUE

WRITE(*,150)ITURN+1
150   FORMAT(1X,T55,I4)

CCCCCCCCCCCCCCCCCCCCC   SECOND PART   CCCCCCCCCCCCCCCCCCCCCCCCCCCCC
C*** CHECK IS THE PERCENTAGE CHANGE IN OBJ FUNCTION
      CHECK = 5.0
      IF(ITURN .EQ. 0 .AND. TURN .GT. 0.0) CHECK = CHECK*2.5
      CHECK = CHECK /100.

SCALE = 10.0
      SCALAST = -10.
      ICOUNT = 0
      DELTA = 1.5
      KK(1) = 1
      KK(2) = 2
      KK(3) = 3
      IBOUND = 0
      OBJMAX = -1000000.
      OBJSTAR = OBJMAX

C ***** LOOP FOR  CORRELATION ********************************

90    CONTINUE

CHANG2 = (SCALE - SCALMAX)/ABS(SCALMAX)
      ICOUNT = ICOUNT + 1

DO 45 I = 1,NUM
         QB(I) = -B(I)*SCALE
45    CONTINUE
C *******   INITIALIZE  ARRAYS     ***********
      DO 46 I = 1, NUM+ID
         QDUAL(I) = 0.0
         QSLK(I) = 0.0
46    CONTINUE
      DO 47 I = 1, NUM
         X(I) = 0.0
         QRC(I) = 0.0
```

```
47      CONTINUE
        DO 48 I = 1,MAXWS
            QWS(I) = 0.0
48      CONTINUE
C ********* DONE INITIALIZING    ************

CALL QUAD1 (QC,QKT,QRHS,QB,A,INPUT,QTOL,TITLE,
     &              PFILE,OBJ,X,QRC,QDUAL,QSLK,QIOUT,QWS)

C **** CALCULATE CORRELATION ********

49      CONTINUE
        INPUT(5) = 1
        IF(QIOUT(1).NE.1) RETURN
        COVAR = 0.
        DO 50 I = 1,NUM
           COVAR = COVAR + X(I)*B(I)/BULLET
50      CONTINUE

XVAR = 0.0
        COST = 0.0
        DO 60 I = 1,NUM
           COST = COST + ABS(X(I)-OLDWT(I))
           DO 70 J = 1,NUM
              XVAR = XVAR + X(I)*X(J)*A(I,J)
70         CONTINUE
60      CONTINUE

OBJLAST = OBJSTAR
        OBJSTAR = COVAR/(XVAR**.5)
C **** DONE WITH CORRELATION CALCULATION
        CHANG1 = (OBJSTAR-OBJMAX)/ABS(OBJMAX)
        WRITE(*,990)ICOUNT,SCALE,OBJSTAR*1000,DELTA*100
990     FORMAT('+',I3,' SCALE=',F7.2,'  OBJ=',F7.2,'   =',F7.2,' %')
991     FORMAT('+',A50)
C ******** TERMINATE IF MOVE IS SMALL ********************
        IF (DELTA .LT. CHECK/5. ) RETURN
        IF (ICOUNT .GT. 6) RETURN
        WRITE(*,*)' CALLING  HESSIAN     ............'
        CALL SUCCESS (NUM)
        CALL QUAD1 (QC,QKT,QRHS,G,H,INPUT,QTOL,TITLE,
     &              PFILE,OBJ,X,QRC,QDUAL,QSLK,QIOUT,QWS)
        IF(QIOUT(1).NE.1) THEN
           DO 75 I = 1,NUM
              X(I) = XMAX(I)
75         CONTINUE
           RETURN
        END IF
C ******* CALCULATE THE CHANGE IN X **********************
        DELTA = 0.0
        DO 80 I = 1,NUM
           DELTA = DELTA + ABS(X(I)-F(I))
```

```
          XMAX(I) = X(I)
80    CONTINUE
      ICOUNT = ICOUNT + 1
      GO TO 49

RETURN
      END
***********************************************************************
C UPDATED:December 6, 1988
C ******* SUBROUTINE SUCCESS *****************************
      SUBROUTINE SUCCESS(NUM)
      INCLUDE 'COMSUC.F'

C ******** CALCULATE VARIANCE AND COVARIANCE ***************
      XVAR = 0.0
      COVAR = 0.0
      BB = BULLET
      DO 10 I = 1, NUM
         F(I) = 0.0
         COVAR = COVAR + B(I)*X(I)/BB
         DO 20 J = 1, NUM
            XVAR = XVAR + X(I) * X(J) * A(I,J)
            F(I) = F(I) + 2.0 * X(J) * A(I,J)
20       CONTINUE
10    CONTINUE

C ******** CALCULATE GRADIENT G( ) AND HESSIAN H( , ) ******
      VAR1 = 1./SQRT(XVAR)
      VAR3 = VAR1*1./XVAR
      VAR5 = VAR2*1./XVAR

DO 30 I = 1, NUM
         G(I) = B(I)/BB*VAR1 - 0.5*COVAR*VAR3*F(I)
         DO 40 J = 1,NUM
            H(I,J) = -0.5*B(I)/BB*VAR3*F(J) - 0.5*B(J)/BB*VAR3*F(I)
     &               -0.5*COVAR*(-1.5*VAR5*F(I)*F(J) + VAR3*2.0*A(I,J))
C ******** ADD -X( )-TRANSPOSE * H( , ) TO THE GRADIENT ****
            G(I) = G(I) - X(J)* H(I,J)
C ******** TAKE 1/2 OF THE HESSIAN TO SEND TO OPTIMIZER ****

H(I,J) = 0.5*H(I,J)
40       CONTINUE
C ******** SET F( ) EQUAL TO X( ) TO SAVE THE OLD X( ) *****
30    CONTINUE

DO 50 I = 1,NUM
         F(I) = X(I)
50    CONTINUE
      RETURN
      END
C ******** END OF SUBROUTINE SUCCESS **********************
```

```
***************************************************************
C *** PARAMETERS ARE USED TO DIMENSION THE COMMON ARRAYS       *
C *** IN EACH SUBROUTINE.                                      *
C ***                                                          *

C ***    ND  = TOTAL NUMBER OF STOCK WEIGHTS BEING COMPUTED.   *
C ***    ID  = THE MAXIMUM NUMBER OF CONSTRAINT EQUATIONS.     *
C ***    N2D = THE DIMENSION ON WORKING AREAS ( 2 * ND )       *
C ***    KEQ = NUMBER OF CONSTRAINTS WHICH WILL BE EQUALITIES  *

C ***    NRT = NUMBER OF RETURNS                               *
C ***    NST = USED FOR STATISTICS                             *

C ***    ISIZEQ = 2 * ( ND*2 + ID )**2 + 8*(ND*2+ID) +6        *
C ***    NDID = ND + ID                                        *

C ***************************************************************
C       LAST UPDATED: November 19, 1988
        IMPLICIT REAL (A-H,O-Z)
        IMPLICIT INTEGER (I-N)
        PARAMETER (KEQ = 0)
C 280
C       PARAMETER (ND =  280, ID = 6 , N2D = 560)
C       PARAMETER (NDID = 286, ISIZEQ = 645246)
C 250
C       PARAMETER (ND =  250, ID = 6 , N2D = 500)
C       PARAMETER (NDID = 256, ISIZEQ = 516126)
C 100
        PARAMETER (ND =  100, ID = 6 , N2D = 200)
        PARAMETER (NDID = 106, ISIZEQ = 86526)

PARAMETER (NRT = 48, NST = 3)
        PARAMETER (LENGTH = 40)
        CHARACTER*(LENGTH) FILEOUT,TITLE,NAME(ND),PORTRETS,GARB,ANSWER,
     &           OLD,LIANAME,LIABIN,STOCKIN,BONDIN,IDC(ND),SIC(99)

COMMON /ARRY/ A(ND,ND),C(ND,ID), H(ND,ND), G(ND), F(ND)
        COMMON /VECT/ B(ND),D(ID),BDL(ND),BDU(ND),X(ND),OLDWT(ND)
        COMMON /RETS/ RET(NRT,ND),ANIM(NRT),PRET(NRT),ISIC(ND),AVE(ND)
        COMMON /TRAC/ COV(NST,NST),STAT(NRT,NST),COREL(NRT,NST)
        COMMON /TRA2/ PRICE(ND),VOL(ND),CUM(ND),VAR(3),LIANAME,TITLE
        COMMON /RTNIN/FILEOUT,LIABIN,STOCKIN,BONDIN,IDC,NAME,SIC
        COMMON /DAT/  NMSAVE,NM,NSIMS,NSTOCKS,NBONDS,NSTAT,NRETS,IDUMMY,
     &           IHOLD
        COMMON /MAX/  STOCKMIN,YIMAX,SMAX,SCALE,BRET,XFACTOR,XBUPPER,
     &        XBLOWER,BULLET,TARGET,TURN,BULL1,TARG1,TURN1,PORTVAL
C END OF COMMON.F
```

APPENDIX IV

"FASTTRACK" PROGRAM FOR ANALYZING
LARGE NUMBERS OF SECURITIES IN A RAPID,
EFFICIENT MANNER TO PROVIDE OPTIMUM
CORRELATION OF ASSET RETURN TO A TIME DEPENDENT
FINANCIAL INDEX. SUBSTANTIAL COMPUTER
MEMORY STORAGE REDUCTION IS ALSO ACHIEVED.

```
C UPDATED July 10, 1989

C       COPYWRITE 1989 NATIONAL INVESTMENT SERVICES OF AMERICA
C ***************************************************************
      PROGRAM FASTRACK
C ***************************************************************

C *************   INCLUDE COMMON BLOCK FILE    ***************
      INCLUDE 'COMMON.F'
C ***************************************************************
C *************   WRITE COPYRIGHT TO SCREEN    ***************
      WRITE(*,*)'                                              '
      WRITE(*,*)'                                              '
      WRITE(*,*)'COPYRIGHT (c) NATIONAL INVESTMENT SERVICES OF AMERICA'
      WRITE(*,*)'                      1988'
      WRITE(*,*)'                                              '
      WRITE(*,*)'is the year that this unpublished work was originally'
      WRITE(*,*)'created.  NATIONAL INVESTMENT SERVICES OF AMERICA'
      WRITE(*,*)'("NISA") owns all rights to this work and intends to'
      WRITE(*,*)'maintain this work confidential so as to maintain this'
      WRITE(*,*)'work as a trade secret.  NISA may also seek to'
      WRITE(*,*)'maintain this work as an unpublished copyright.'
      WRITE(*,*)'In the event of an inadvertent or deliberate'
      WRITE(*,*)'publication NISA intends to enforce its rights'
      WRITE(*,*)'to this work under the copyright laws as a published'
      WRITE(*,*)'works.  Those having access to this work may not copy,'
      WRITE(*,*)'use, or disclose the information in this work unless'
      WRITE(*,*)'expressly authorized by NISA to do so.'
      WRITE(*,*)'                                              '
      WRITE(*,*)'                   CONFIDENTIAL'
      WRITE(*,*)'                                              '
      WRITE(*,*)' PROPERTY OF NATIONAL INVESTMENT SERVICES OF AMERICA'
      WRITE(*,*)'                                              '
      WRITE(*,*)'                 ALL RIGHTS RESERVED'
      WRITE(*,*)'                                              '

WRITE(*,101)'CALLING COPYRIGHT .......    '

CALL COPYRIGHT

C ***************************************************************

C *************   READ FLAG FILE TO FIND OUT WHAT KIND OF RUN *

WRITE(*,101)'CALLING READFLAG ...    '

CALL READFLAG

C ***************************************************************

C *************   SET UP DEFAULT PARAMETERS    ***************

WRITE(*,101)'CALLING DEFAULT  ...    '
```

```
      CALL DEFAULT
C ******************************************************
C ******* THIS IS SPOT MULTI RETURNS TO FOR NEXT RUN *******
5     CONTINUE
C ************ IF IFLAG(1)=1 THEN THIS IS A SINGLE RUN ****

IF (IFLAG(1).EQ.1)    THEN

C         ******************   CALL REDPAST TO READ IN PARAMETERS **
          WRITE(*,101)'CALLING     REDPAST   ...      '
          CALL  REDPAST
C         ******************   CALL MODIFY TO CHANGE PARAMETERS ****
          WRITE(*,101)'CALLING     MODIFY    ...      '
          CALL  MODIFY
C         ******************   IFLAG(1)>=2 THEN MULTIPLE RUN *******
      ELSEIF (IFLAG(1).GE.2)  THEN
          WRITE(*,101)'CALLING     MULTRUN   .......  '
          CALL  MULTRUN
      END IF
C     ******************   CALL SAVDAT TO SAVE   PAST.DAT *****
      WRITE(*,101)'CALLING     SAVDAT    ....     '
      CALL  SAVDAT
C     ************************************************************
C     ******************   CALL CALCPARAM TO CALC PARAMETERS **
      WRITE(*,101)'CALLING     CALCPARAM .        '
      CALL  CALCPARAM
C     ************************************************************
C     **********************   CALL LIABIN TO READ IN RETURNS **
```

```
      WRITE(*,101)'CALLING     LIABIN  .....   '
      CALL LIABIN
C    ***********************     READ IN STOCK RETURN FILE **
      IF(IFLAG(6).EQ.1)THEN
          WRITE(*,101)'CALLING    STOCKIN  ....   '
          CALL STOCKIN
      ELSEIF(IFLAG(6).EQ.2)THEN
          WRITE(*,101)'CALLING    BINSTIN  ....   '
          CALL BINSTIN
      ENDIF
C    ***********************     CALL BONDIN TO READ IN RETURNS **
      WRITE(*,101)'CALLING    BONDIN  .....   '
      CALL BONDIN
C    ****************     CALL HOLDING FOR CURRENT WEIGHTS ****
      WRITE(*,101)'CALLING    HOLDING  ....   '
      CALL HOLDING
C    ****************     CALL SOLVE TO CALCULATE INPUT ARRAYS *
      WRITE(*,101)'CALLING    SOLVE  ........   '
      CALL SOLVE
C    *********************     CALL TO PORTFOLIO OUTPUT   ***************
      WRITE(*,*)
      WRITE(*,101)'CALLING    PORT  ..........   '
      CALL PORT
C    ****************   IF RUN ABORTED GO TO FINISH
      IF (IFLAG(7).EQ.2)    GO TO 100
C    *********************     CALL TO STATISTICAL TRACKING    *********
```

```
      WRITE(*,101)'CALLING      TRACKER   ........     '
      CALL  TRACKER
C     ********************       CALL  TO  TRADING/TURNOVER  ROUTINE  *********
      WRITE(*,101)'CALLING      TRADE     ...........    '
      CALL  TRADE
C     ********************       CALL  TO  INDUSTRY  OUTPUT            *********
      WRITE(*,101)'CALLING      INDUST    ........     '
      CALL  INDUST
C     *****************************************************************
100   WRITE(*,101)'SPANNING     SIMULATION   COMPLETE'
      IF (IFLAG(1).GE.2)   THEN
         WRITE(*,102)'DONE     WITH  RUN  NUMBER           ',ISKIP
C                                                 GOTO  NEXT  SPANNING   RUN
         GO TO 5
      END IF
101   FORMAT('+',A50)
102   FORMAT('+',A50,I7)
      END
C                         END  OF  MAIN  PROGRAM   SPAN1
C     *****************************************************************
C UPDATE  05/04/89
C     *****************************************************************
      SUBROUTINE   TRADE
C     *****************************************************************

INCLUDE  'COMMON.F'

PARAMETER   (MAXBUY = 700)

INTEGER  BUY(MAXBUY),SELL(MAXBUY)
      CHARACTER*1    ABOUND

C                    ******   CALCULATE  NEW  AND  OLD  OBJECTIVE   FUNCTIONS
C                             VALTURN  =  TOTAL  FORCED  TURNOVER
C                             ADJUST  OLD  OBJ  SO  AS  TO  REPLICATE   100%  PORT  WT
```

```
      VNEW   = 0.0
      VOLD   = 0.0
      AVENEW = 0.0
      AVEOLD = 0.0

DO 10 I=1, NSTAT
         RETNEW = 0.0
         RETOLD = 0.0
         DO 20 J=1,NUM
            RETNEW=RETNEW+X(J)*(RET(I,J)-ANIM(I))
            RETOLD=RETOLD+OLDWT(J)*(1./(1.-VALTURN))*(RET(I,J)-ANIM(I))
20       CONTINUE
         VNEW   = VNEW   + RETNEW**2/REAL(NSTAT)
         VOLD   = VOLD   + RETOLD**2/REAL(NSTAT)
         AVENEW = AVENEW + RETNEW/REAL(NSTAT)
         AVEOLD = AVEOLD + RETOLD/REAL(NSTAT)
10    CONTINUE

VNEW = ((VNEW - AVENEW**2)*12)**.5
      VOLD = ((VOLD - AVEOLD**2)*12)**.5

C           ***** DELTA IS THE PERCENTAGE IMPROVEMENT IN VARIANCE ******

DELTA = 0.0
      IF(VOLD.NE.0.0)THEN
         DELTA = (VOLD - VNEW)/VOLD
      ENDIF
      DELTA = DELTA * 100.

IBUY   = 0
      ISELL  = 0
      TURNOV = 0.0
      TOTBU  = 0.0
      TOTSEL = 0.0
      NUMSTK = 0

DO 30 I = 1,NUM
         IF(X(I).GT.0.0001)NUMSTK=NUMSTK+1
         IF((X(I)-OLDWT(I)).GT.0.00001)        THEN
            IBUY = IBUY + 1
            BUY(IBUY)  = I
            TOTBU=TOTBU+X(I)-OLDWT(I)
         ELSEIF((X(I)-OLDWT(I)).LT.-0.00001)   THEN
            ISELL = ISELL +1
            SELL(ISELL)  = I
            TOTSEL=TOTSEL+OLDWT(I)-X(I)
         ENDIF
         TURNOV = TURNOV + ABS(X(I)-OLDWT(I))
30    CONTINUE
C             ******  SORT BASED ON PARTIALS  ********************
C             ******  SORT THE BUYS           ************************
```

```
      DO 40 I = 1,IBUY-1
         DO 50 J = I+1,IBUY
            IF( PART(BUY(J)).LT.PART(BUY(I)))       THEN
               ITEMP = BUY(I)
               BUY(I) = BUY(J)
               BUY(J) = ITEMP
            ENDIF
50       CONTINUE
40    CONTINUE
C              ***      SORT THE SELLS    ******************

DO 60 I = 1,ISELL-1
         DO 70 J = I+1,ISELL
C           TEST = PART(SELL(J)) - PART(SELL(I))
            IF (PART(SELL(J)).GT.PART(SELL(I)))      THEN
               ITEMP = SELL(I)
               SELL(I) = SELL(J)
               SELL(J) = ITEMP
            ENDIF
70       CONTINUE
60    CONTINUE

WRITE(10,*)
      WRITE(10,*)
      WRITE(10,109)'                    TURNOVER       = ',TURNOV*50,'   %'
      WRITE(10,*)
      WRITE(10,109)'              TOTAL   PURCHASE     = ',TOTBU*100.0,'   %'
      WRITE(10,109)'       TOTAL  OPTIONAL   SALES     = ',TOTSEL*100.0,'  %'
      WRITE(10,109)'              TOTAL   FORCED SELLS = ',VALTURN*100.0,' %'
      WRITE(10,*)
      WRITE(10,108)'       # OF  STOCKS  IN PORTFOLIO  = ',NUMSTK
      WRITE(10,108)'                  NUMBER  OF BUYS  = ',IBUY
      WRITE(10,108)'                  NUMBER  OF SELLS = ',ISELL
      WRITE(10,*)
      WRITE(10,109)'VARIANCE     AT   OLD   WEIGHTS    = ',VOLD*100.,'   %'
      WRITE(10,109)'VARIANCE     AT   NEW   WEIGHTS    = ',VNEW*100.,'   %'
      WRITE(10,109)'   OBJ FUNCTION   IMPROVEMENT      = ',DELTA,'  %'
      WRITE(10,*)
      WRITE(10,111)'THIS    YRS PORTFOLIO    VALU = $ ',PORTVAL
      WRITE(10,111)'    1989 EQUIVALENT    VALUE = $ ',PRTVALS
      WRITE(10,*)
      WRITE(10,*)
109   FORMAT(A28,F8.2,A3)
108   FORMAT(A28,I6)
111   FORMAT(A28,F18.2)

C          ************        WRITE  THE  BUYS    ******************

WRITE(10,*)'                           ***   BUY   ***'

WRITE(10,102)('*',K  = 1,78)
```

```
      WRITE(10,*)'     ** WEIGHTS **  SPAN    SIC   SYMBOL',
     &      '   SHARES     PRICE    DAYS    SECURITY'
      WRITE(10,*)'    OLD   NEW   DELTA SENS  CODE  IDC TICK',
     &      '     (00)       ($)     VOL    NAME'
      WRITE(10,102)('*',K   = 1,78)

TOTBUY = 0.0
      DO 80 I = 1,IBUY
          XOLD = OLDWT(BUY(I))*100.
          XNEW = X(BUY(I))*100.
          DELTA = XNEW - XOLD

C                ****************    CALCULATE   THE  ROUND  LOT  PURCHASE    ******

IF(PRICE(BUY(I)).GT.0)THEN
              SHARES  = 0.01*DELTA*PORTVAL/PRICE(BUY(I))
              SHARES  = REAL(NINT(SHARES/100.))
              TOTBUY  = TOTBUY + SHARES*PRICE(BUY(I))*100.0
          ELSE
              SHARES  = 0.0
          ENDIF

C            ** DVOL IS IN DAILY  DOLLAR VOLUME  (000'S)

IF(DVOL(BUY(I)).GT.0)THEN
              DAYSVOL = 100.*SHARES*PRICE(BUY(I))/DVOL(BUY(I))/1000.0
          ELSE
              DAYSVOL = 99.9
          ENDIF
          IF(RHS(BUY(I))-X(BUY(I))       .LT. 0.00001)  THEN
              ABOUND = '*'
          ELSE
              ABOUND = ' '
          END IF

IF (DELTA .GT. 0.01) THEN
              WRITE(10,101)   XOLD,XNEW,DELTA,PART(BUY(I))*1000.,ABOUND,
     &                ISIC(BUY(I)),IDC(BUY(I)),SHARES,
     &                PRICE(BUY(I)),DAYSVOL,NAME(BUY(I))
          END IF
80    CONTINUE
      WRITE(10,'(T27,A12,F14.0)')'TOTAL     BUY $ ',TOTBUY
      WRITE(10,*)
      WRITE(10,*)
C                ************        WRITE  THE SELLS   *******************
      WRITE(10,*)'                              ***   SELL   ***'
```

```
        WRITE(10,102)('*',K     = 1,78)

WRITE(10,*)'      **  WEIGHTS  **   SPAN  SIC  SYMBOL',
     &              '    SHARES    PRICE    DAYS    SECURITY'

WRITE(10,*)'      OLD   NEW   DELTA SENS CODE IDC TICK',
     &              '   (00)          (S)   VOL      NAME'

WRITE(10,102)('*',K     = 1,78)

TOTSELL = 0.0

DO 90 I = 1,ISELL
            XOLD = OLDWT(SELL(I))*100.
            XNEW = X(SELL(I))*100.
            DELTA = XOLD - XNEW
C           ****************         CALCULATE THE ROUND LOT SALE  ******
            SHARES = 0.01*DELTA*PORTVAL/PRICE(SELL(I))
            SHARES = REAL(NINT(SHARES/100.))

TOTSELL = TOTSELL + SHARES*PRICE(SELL(I))*100.0

C           OLD VERSION  DAYSVOL = 100.*SHARES/DVOL(SELL(I))/1000.0

C           ** DVOL IS IN DAILY DOLLAR VOLUME (000'S)

IF(DVOL(SELL(I)).GT.0)THEN
                DAYSVOL = 100.*SHARES*PRICE(SELL(I))/DVOL(SELL(I))/1000.0
            ELSE
                DAYSVOL = 99.9
            ENDIF

IF(RHS(SELL(I))-X(SELL(I))       .LT. 0.00001) THEN
                ABOUND = '*'
            ELSE
                ABOUND = ' '
            END IF

IF (DELTA .GT. 0.01) THEN
                WRITE(10,101)   XOLD,XNEW,-DELTA,PART(SELL(I))*1000,ABOUND,
     &                          ISIC(SELL(I)),IDC(SELL(I)),SHARES,
     &                          PRICE(SELL(I)),DAYSVOL,NAME(SELL(I))
            END IF
90      CONTINUE

IF(NGONE.GT.0)THEN
            WRITE(10,*)
            WRITE(10,*)' LISTING OF THE FORCED SELLS (STKS NOT AVILABLE)'
            WRITE(10,*)
            WRITE(10,*)'     WEIGHT  SOLD       IDCSYMBOL   '
```

8

```
            WRITE(10,*)' -----------     ---------  '
            DO 107 I=1,NGONE
                WRITE(10,106)VAL(I)*100.0,IDCSYM(I)
107        CONTINUE
        ENDIF

WRITE(10,*)
        WRITE(10,'(T27,A12,F14.0)')'TOTAL      SELL  $',TOTSELL
        WRITE(10,'(T27,A12,F14.0)')'NET        BUY  = $',TOTBUY - TOTSELL
        RETURN

101     FORMAT(1X,3F6.2,F6.3,A1,I3,1X,A9,1X,F6.0,1X,F8.3,1X,F4.1,1X,A18)
102     FORMAT(1X,78A1)
106     FORMAT(F9.4,11X,A10)

END

C***************       END OF SUBROUTINE   TRADE       *****************

C  **** THIS SUBROUTINE READS IN STOCK DATA FROM AN UNFORMATTED FILE *****

SUBROUTINE  BINSTIN

C  *******************************************************************
C
C              IFIRST IS FIRST MONTH OF DATA NEEDED FOR MATRIX
C              ILAST  IS LAST MONTH OF SIMULATION
C
        INCLUDE 'COMMON.F'

C                                              READ IN DUMMY STOCK DATA
C                                              THIS IS TO READ PAST

CAPS=XCONS(4)

C              SET UP CAP TO BE REPRESENTATIVE OF TIME PERIOD
C              THE SCALARS ARE REP OF CAPS HISTORYS

IF(NMSAVE.LT.7401)CAP=CAPS*    0.192000
        IF(NMSAVE.GE.7501)CAP=CAPS*    0.153557
        IF(NMSAVE.GE.7601)CAP=CAPS*    0.192555
        IF(NMSAVE.GE.7701)CAP=CAPS*    0.230769
        IF(NMSAVE.GE.7801)CAP=CAPS*    0.246268
        IF(NMSAVE.GE.7901)CAP=CAPS*    0.269348
        IF(NMSAVE.GE.8001)CAP=CAPS*    0.384192
        IF(NMSAVE.GE.8101)CAP=CAPS*    0.384776
        IF(NMSAVE.GE.8201)CAP=CAPS*    0.423789
        IF(NMSAVE.GE.8301)CAP=CAPS*    0.461685
        IF(NMSAVE.GE.8401)CAP=CAPS*    0.615490
        IF(NMSAVE.GE.8501)CAP=CAPS*    0.538418
        IF(NMSAVE.GE.8601)CAP=CAPS*    0.692179
```

```
      IF(NMSAVE.GE.8701)CAP=CAPS*    0.769173
      IF(NMSAVE.GE.8801)CAP=CAPS*    0.846097
      IF(NMSAVE.GE.8901)CAP=CAPS*    1.000000
C     WRITE(*,*)'IN   BOUNDS  AND  MKTCAP = ',MKTCAP

IF (NSTOCKS.GT.0)   THEN

OPEN (9,FILE = STOKFIL,FORM='UFORMATTED',STATUS      = 'OLD')

DO 600 I = 1,IDUMMY
                READ  (9)  (GARB,L  = 1,3)
                READ  (9)  IGARB1,  IGARB2,   IGARB3,   IGARB4
                READ  (9)  XGARB1,  XGARB2,   XGARB3,   XGARB4
                READ  (9)  XGARB1,  XGARB2,   XGARB3,   XGARB4
                READ  (9)  ISTART
                READ  (9)  ISTOP
                DO 610 K = 1,ISTOP-ISTART+1
                    READ  (9)  XGARB
610             CONTINUE
600        CONTINUE
C                                                   READ  IN  STOCK   DATA

NSTK=0

DO 700 I = 1,NSTOCKS
C                                                   READ  IN  LINE  1 (NAME)
783             INEXT=0
                READ  (9,END  = 785)  NAME(I)
                ILEN  = 1
                GARB  = '                                                   '
790             IF (NAME(I)(ILEN:ILEN)    .EQ.  ' ')THEN
                    ILEN  = ILEN+1
                    GO TO 790
                ELSE
                    GARB(1:LENGTH)   = NAME(I)(ILEN:LENGTH)
                END IF
                NAME(I)  = GARB
                WRITE  (*,112)  I,NAME(I)
C                                                   READ  IN  LINE  2 (CUSIP)
                READ (9,END  = 785)  GARB
C                                                   READ  IN  LINE  3 (IDC,TICK)  & TRIM
                READ (9,END  = 785)  GARB
                IDC(I)  = '                 '

ILEN  = 1
791             IF(GARB(ILEN:ILEN).EQ.'     ')  THEN
                    ILEN  = ILEN + 1
                    IF((ILEN+3).GT.LENGTH)   GOTO  793
                    GOTO  791
                ENDIF
```

```
            IEN = 1
            IF(GARB(ILEN+IEN:ILEN+IEN).NE.'        ')THEN
491             IEN = IEN + 1
                GOTO 491
            ENDIF

IDC(I)(1:IEN)   = GARB(ILEN:ILEN+IEN-1)

ILEN = ILEN + IEN + 1
792         IF (GARB(ILEN:ILEN).EQ.'    ') THEN
                ILEN = ILEN + 1
                IF ((ILEN+3).GT.LENGTH)   GOTO 793
                GOTO 792
            ENDIF

IEN = 1
492         IF(GARB(ILEN+IEN:ILEN+IEN).NE.'        ')THEN
                IEN = IEN + 1
                GOTO 492
            ENDIF

IDC(I)(6:6+IEN-1)   = GARB(ILEN:ILEN+IEN-1)

793         CONTINUE
C                                     READ  IN  LINE  4  (SIC)
            READ (9,END= 785) ISIC(I),   IGARB1,   IGARB2,   IGARB3
            IF(ISIC(I).GT.99)    ISIC(I)  = INT (ISIC(I)/100)
C                                     READ  IN  LINE  5  (PRICE,SPREAD)
            READ(9,END  = 785)PRICE(I),SPREAD(I),XGARB1,XGARB2
C                                     READ  IN  LINE  6  (MARKET   CAP,VOL)
            READ(9,END  = 785)XMKTCAP(I),DVOL(I),XGARB1,XGARB2

IF(XMKTCAP(I).LT.CAP)INEXT=1

C                                     READ  IN  LINE  7  (FIRST   RETURN)
            READ (9,END = 785) ISTART
C                                     READ  IN  LINE  8  (LAST   RETURN)
            READ (9,END = 785) ISTOP

C                           TEST  FOR  ENOUGH  RETURNS   TO  SATISFY   NRETS   **

ICHECK  = NM-NRETS-ISTART
            IF(ICHECK.LT.0)    NRETS  = NM - ISTART
            IF(NRETS.LT.NSTAT)   ICHECK  = IFIRST-ISTART

DO 800 J = 1,ICHECK
                READ (9) XGARB
800         CONTINUE

DO 801 J = 1,NRETS-NSTAT
                READ(9)   XGARB
```

```
801         CONTINUE
            DO 810 K = 1,IREAD
                READ (9) RET(K,I)
C                   **** ADJUST OCTOBER 1987 *******************
                IF(K+NM-NSTAT-1.EQ.    94)THEN
                    IF(K.LE.NSTAT)RET(K,I)=RET(K,I)/2.97
                END IF
C
C                   *** IF STOCK NON GOES AWAY DURING SIM PERIOD
C                   *** THEN THE RETURNS TO MONEY MARKET TYPE LEVEL

IF(K.GT.NSTAT.AND.RET(K,I).LT.-1.0)THEN
                    RET(K,I)=0.005
                ENDIF

810         CONTINUE
            DO 1200 J = 1,ISTOP-ILAST
                READ (9) XGARB
1200        CONTINUE
C                           IF INEXT=1(MKTCAP    TOO SMALL)READ   NEXT STOCK
            IF(INEXT.EQ.1)GOTO   783
            NSTK=NSTK+1
700         CONTINUE

NSTOCKS = NSTK
            NUM = NSTOCKS+NBONDS

ENDIF

CLOSE(9)

RETURN

C         ***    IF END OF FILE WAS HIT ON STOCKS - RESET NUM AND CONTINUE ***
785   NSTOCKS = I-1
      NUM = NSTOCKS+NBONDS

CLOSE(9)

RETURN

CLOSE(9)

112   FORMAT('+','STOCK    # ',I5,'  IS ',A40)

END

C ********* END OF SUBROUTINE  BINSTIN  ***************************
C ****************************************************************
```

```
      SUBROUTINE   MULTRUN
C ******************************************************************
      INCLUDE  'COMMON.F'
      CHARACTER*30   XTITL,XFLOUT,XLIBIN,XSTKIN,XBNDIN,MULTIN

IF(INITIAL.EQ.0)THEN
         WRITE(*,*)
         WRITE(*,'(1X,A40,$)')'      ENTER  NAME  OF  MULTI  FILE(i.e.   LTS10)'
         READ(*,'(A30)')MULTIN
         INITIAL   = 1
      ENDIF

OPEN  (13,FILE   = MULTIN   ,STATUS   =  'OLD')

C     IF (INITIAL.EQ.0)THEN
C         ISKIP=0
C         GOTO  30
C     ENDIF

DO 10 I  = 1, ISKIP
         DO 20 J  = 1,18
            READ(13,'(A1)',END     = 99)GARB
 20      CONTINUE
 10   CONTINUE

30   CONTINUE
      READ(13,101,END     = 99)TITLE
      READ(13,101,    END  = 99) FILEOUT
      READ(13,101,    END  = 99) LIAFIL
      READ(13,101,    END  = 99) STOKFIL
      READ(13,101,    END  = 99) BONDFIL
      READ(13,*,    END  = 99) NMSAVE
      READ(13,*,    END  = 99) NSIMS
      READ(13,*,    END  = 99) NSTOCKS
      READ(13,*,    END  = 99) NBONDS
      READ(13,*,    END  = 99) IDUMMY
      READ(13,*,    END  = 99) STOCKMIN
      READ(13,*,    END  = 99) YIMAX
      READ(13,*,    END  = 99) SMAX
      READ(13,*,    END  = 99) NSTAT
      READ(13,*,    END  = 99) NRETS
      READ(13,*,    END  = 99) BULLET
      READ(13,*,    END  = 99) TARGET
      READ(13,*,    END  = 99) TURN

ISKIP  = ISKIP+1

CLOSE(13)

OPEN(13,FILE='PAST.DAT',STATUS='OLD')
      READ(13,*)GARB
```

```
          READ(13,'(A30)')OLDFILE
          CLOSE(13)

RETURN
C                          ****   STOP   DONE WITH MULTI  RUN      **********
99        CLOSE(13)
          WRITE(*,*)'DONE   WITH MULTIPLE   RUN ******************'

STOP

101       FORMAT  (A20)

END

****************          END OF SUBROUTINE    MULTRUN       ****************

C ****** THIS SUBROUTINE   SETS UP VARIABLE   VALUES  ************
          SUBROUTINE   CALCPARAM
C ********************************************************************
          INCLUDE  'COMMON.F'

NM = NMSAVE
          NM = (INT(NM/100)-80)*12+(NM-INT(NM/100)*100)
          IREAD  = NSTAT+NSIMS

IF(NSTOCKS.GT.0)THEN
             XBUPPER  = SMAX
          END IF

NUM = NSTOCKS+NBONDS
          IF(NUM.GT.NMAX)THEN
             WRITE(*,*)'   WARNING  NUM >',NMAX,'  TOO BIG FOR PROGRAM'
             STOP
          ENDIF

ICOL = ID
          KE = KEQ
          KKK = KE
          IA = ND
          ICC = ND
          IH = N2D

IFIRST  = NM-NSTAT
          ILAST   = NM+NSIMS-1

BULL1  = BULLET
          TARG1  = TARGET
          TURN1  = TURN
```

```
      BULLET = BULLET*ABS(BULLET)/1000.
      IF (TURN1.EQ.100.)THEN
         TURN = 0.0
      ELSE
C        XNUM = 0.10
         TURN = .0001 * (100./(TURN1+.01)-100.0/100.01)
C                       A TURN1 OF .2 YIELDS A TURN = .4
      END IF

RETURN

END

C ****** END OF SUBROUTINE   CALCPARAM *********************************

C ****** THIS SUBROUTINE   READS IN FLAG FILE **************************
      SUBROUTINE  READFLAG
C *********************************************************************
      INCLUDE 'COMMON.F'

OPEN(9,FILE='FLAG.NIS')
      DO 100 I=1,10
         READ(9,*)IFLAG(I)
100   CONTINUE
      DO 200 I=1,10
         READ(9,*)XCONS(I)
200   CONTINUE
      DO 300 I=1,10
         READ(9,'(A)')AFLAG(I)
300   CONTINUE

CLOSE(9)

RETURN

END

C ****** END OF SUBROUTINE   READFLAG**********************************

C ******* THIS SUBROUTINE SETS UP DEFAULT PARAMETERS ******************
      SUBROUTINE  DEFAULT
C *********************************************************************
      INCLUDE 'COMMON.F'

C     DEFAULT READ IN OF 24 MONTHS PRIOR = NSTAT, NRESTS FOR B( ) ****

NSTAT  = 24
      NRETS  = 24
      BULLET = 0.0
      TARGET = 1.
      TURN   = 100.
      ITYPE  = 1
```

```
      ICHANGE  = 0
      XBLOWER  = 0.0
      XBUPPER  = 3.0
      SMAX     = XBUPPER
C                              PRTVALS  IS  PORTVAL   IN  1989   DOLLARS
C                              IT  IS  SCALED  IN  SUB.  BOUNDS
      PRTVALS  = XCONS(1)

RETURN

END
C **********  END OF SUBROUTINE  DEFAULT  ****************************

C **********  THIS SUBROUTINE  READS  IN  STOCK  DATA  ******************
      SUBROUTINE  STOCKIN
C **********************************************************************
C              IFIRST  IS  FIRST  MONTH  OF  DATA  NEEDED   FOR  MATRIX
C              ILAST  IS  LAST  MONTH  OF  SIMULATION
C
      INCLUDE  'COMMON.F'
C                                    READ  IN  DUMMY  STOCK  DATA
C                                    THIS  IS  TO  READ  PAST

CAPS=XCONS(4)
C              SET  UP  CAP  TO  BE  REPRESENTATIVE   OF  TIME  PERIOD
C              THE  SCALARS  ARE  REP  OF  CAPS  HISTORYS

IF(NMSAVE.LT.7401)CAP=CAPS*     0.192000
      IF(NMSAVE.GE.7501)CAP=CAPS*     0.153557
      IF(NMSAVE.GE.7601)CAP=CAPS*     0.192555
      IF(NMSAVE.GE.7701)CAP=CAPS*     0.230769
      IF(NMSAVE.GE.7801)CAP=CAPS*     0.246268
      IF(NMSAVE.GE.7901)CAP=CAPS*     0.269348
      IF(NMSAVE.GE.8001)CAP=CAPS*     0.384192
      IF(NMSAVE.GE.8101)CAP=CAPS*     0.384776
      IF(NMSAVE.GE.8201)CAP=CAPS*     0.423789
      IF(NMSAVE.GE.8301)CAP=CAPS*     0.461685
      IF(NMSAVE.GE.8401)CAP=CAPS*     0.615490
      IF(NMSAVE.GE.8501)CAP=CAPS*     0.538418
      IF(NMSAVE.GE.8601)CAP=CAPS*     0.692179
      IF(NMSAVE.GE.8701)CAP=CAPS*     0.769173
      IF(NMSAVE.GE.8801)CAP=CAPS*     0.846097
      IF(NMSAVE.GE.8901)CAP=CAPS*     1.000000

IF(CAP.EQ.0)CAP=200000000.0
```

```
            WRITE(*,*)'IN    BOUNDS   AND   MKTCAP   = ',MKTCAP

IF (NSTOCKS.GT.0)    THEN

OPEN (9,FILE  = STOKFIL,    STATUS  = 'OLD')

DO 600  I = 1,IDUMMY
                    READ (9,111)   (GARB,L  = 1,6)
                    READ (9,*)   ISTART
                    READ (9,*)   ISTOP
                    DO 610  K = 1,ISTOP-ISTART+1
                        READ (9,*)   XGARB
610                 CONTINUE
600             CONTINUE
                                                     READ  IN  STOCK   DATA

NSTK=0
                DO 700  I = 1,NSTOCKS
                                                     READ  IN  LINE   1 (NAME)
783                INEXT=0
                   READ (9,111,END   = 785) NAME(I)
                   ILEN  = 1
                   GARB  = '                                                     '
790                IF (NAME(I)(ILEN:ILEN)    .EQ.  ' ')THEN
                       ILEN  = ILEN+1
                       GO TO 790
                   ELSE
                       GARB(1:LENGTH)    = NAME(I)(ILEN:LENGTH)
                   END IF
                   NAME(I)  = GARB
                   WRITE  (*,112)  I,NAME(I)
                                                     READ  IN  LINE   2 (CUSIP)
                   READ (9,111,END   = 785) GARB
                                                     READ  IN  LINE   3 (IDC,TICK)&   TRIM
                   READ (9,111,END   = 785) GARB
                   IDC(I)  = '                  '

ILEN  = 1
791                IF(GARB(ILEN:ILEN).EQ.'    ') THEN
                       ILEN  = ILEN + 1
                       IF((ILEN+3).GT.LENGTH)    GOTO   793
                       GOTO  791
                   ENDIF

IEN  = 1
491                IF(GARB(ILEN+IEN:ILEN+IEN).NE.'    ')THEN
                       IEN  = IEN + 1
                       GOTO  491
                   ENDIF

IDC(I)(1:IEN)    = GARB(ILEN:ILEN+IEN-1)
```

```
792             ILEN = ILEN + IEN + 1
                IF (GARB(ILEN:ILEN).EQ.'    ') THEN
                    ILEN = ILEN + 1
                    IF ((ILEN+3).GT.LENGTH)    GOTO 793
                    GOTO 792
                ENDIF

IEN = 1
492             IF(GARB(ILEN+IEN:ILEN+IEN).NE.'    ')THEN
                    IEN = IEN + 1
                    GOTO 492
                ENDIF

IDC(I)(6:6+IEN-1)    = GARB(ILEN:ILEN+IEN-1)

793             CONTINUE
C                                               READ IN LINE  4 (SIC)
                READ (9,*,END= 785) ISIC(I)
                IF(ISIC(I).GT.99)    ISIC(I) = INT (ISIC(I)/100)
C                                           READ IN LINE  5  (PRICE,SPREAD)
                READ(9,*,END    = 785)PRICE(I),SPREAD(I)
C                                          READ IN LINE  6 (MARKETCAP,VOL)
                READ(9,*,END    = 785)XMKTCAP(I),DVOL(I)
                IF(XMKTCAP(I).LT.CAP)INEXT=1
C                                           READ IN LINE 7 (FIRST  RETURN)
                READ (9,*,END   = 785)    ISTART
C                                           READ IN LINE 8 (LAST  RETURN)
                READ (9,*,END   = 785)    ISTOP

C                   TEST FOR ENOUGH RETURNS TO SATISFY NRETS    **

ICHECK = NM-NRETS-ISTART
                IF(ICHECK.LT.0)    NRETS = NM - ISTART
                IF(NRETS.LT.NSTAT)    ICHECK = IFIRST-ISTART

DO 800 J = 1,ICHECK
                    READ (9,111)    GARB
800             CONTINUE

DO 801 J = 1,NRETS-NSTAT
                    READ(9,*)GARB
801             CONTINUE

DO 810 K = 1,IREAD
                    READ (9,*)  RET(K,I)
C                       ****  ADJUST  OCTOBER  1987  *******************
                    IF(K+NM-NSTAT-1.EQ.    94)THEN
                        IF(K.LE.NSTAT)RET(K,I)=RET(K,I)/2.97
                    END IF
C                           *** IF STOCK NON GOES AWAY DURING SIM PERIOD
C                           *** THEN THE RETURNS TO MONEY MARKET TYPE LEVEL
```

```
                IF(K.GT.NSTAT.AND.RET(K,I).LT.-1.0)THEN
                    RET(K,I)=0.005
                ENDIF
810             CONTINUE

DO 1200  J = 1,ISTOP-ILAST
                    READ (9,111)   GARB
1200            CONTINUE
C                           IF  INEXT=1(MKTCAP    TOO  SMALL)READ    NEXT  STOCK
            IF(INEXT.EQ.1)GOTO    783
            NSTK=NSTK+1
700         CONTINUE

NSTOCKS  = NSTK
            NUM  = NSTOCKS+NBONDS

ENDIF

CLOSE(9)

RETURN

C ***    IF  END OF  FILE  WAS  HIT  ON  STOCKS    - RESET  NUM  AND  CONTINUE   ***
785   NSTOCKS  = I-1
      NUM = NSTOCKS+NBONDS

CLOSE(9)

RETURN

CLOSE(9)

111  FORMAT  (A40)
 112  FORMAT('+','STOCK      # ',I5,' IS  ',A40)

END

C *********   END  OF  SUBROUTINE    STOCKIN    *****************************

C **********   THIS  SUBROUTINE    READS  IN  BOND  DATA  ********************
      SUBROUTINE    BONDIN
C *************************************************************************

C             IFIRST   IS  FIRST  MONTH  OF  DATA  NEEDED    FOR  MATRIX
C             ILAST   IS  LAST  MONTH  OF  SIMULATION
C
      INCLUDE    'COMMON.F'

C                           READ  IN  BOND  DATA
```

19

```
        IF (NBONDS.GT.0)    THEN
            OPEN  (9,FILE  = BONDFIL,    STATUS  = 'OLD')
            DO  900   I = NSTOCKS+1,NSTOCKS+NBONDS
                READ  (9,111)   NAME(I)
                WRITE  (*,113)   I,NAME(I)
                READ  (9,111)   (GARB,L  = 1,5)
                READ  (9,*)  ISTART
                READ  (9,*)  ISTOP
C                    *****    TEST   ICHECK   FOR   ENOUGH   RETURNS   FOR   BRET   ***
                ICHECK  = NM-NRETS-ISTART
                IF(ICHECK.LT.0)     THEN
                    WRITE(*,*)'BOND       ',I,' DOES  NOT  CONTAIN  ENOUGH  RETS
      &             FOR  NRETS'
                    STOP
                END  IF
                IF(NRETS.LT.NSTAT)    ICHECK  = IFIRST-ISTART

DO  1000  J = 1,ICHECK
                    READ  (9,111)   GARB
1000            CONTINUE

DO  1001  J = 1,NRETS-NSTAT
                    READ(9,*)GARB
1001            CONTINUE

JJ = NRETS-NSTAT

DO  1010  K =1,IREAD
                    READ  (9,*)   RET(K,I)
                    J  = JJ + K
1010            CONTINUE

DO  1300  J = 1,ISTOP-ILAST
                    READ  (9,111)   GARB
1300            CONTINUE

900        CONTINUE

ENDIF

CLOSE(9)

RETURN

111    FORMAT  (A40)
 113    FORMAT('+','BOND        # ',I5,'   IS ',A40)

END
C                                                                  END  OF  SUBROUTINE    BONDIN
C    ******************************************************************

C    ******************************************************************
```

```
      SUBROUTINE   PORT
C   ********************************************************************
      INCLUDE   'COMMON.F'
C                   RESET   THE   RETURNS   TO   ORIGINAL   STATE   **
      DO 1300   J=1,NUM
         DO 1300   I=1,NSTAT
            IF(I+NM-NSTAT-1.EQ.94)RET(I,J)=RET(I,J)*2.97
 1300 CONTINUE

C                   BEGIN   OUTPUT   PROCEDURES   *************

UANIM = 0.0
      DO 129   I = 1,NRETS
         UANIM = UANIM + ANIM(I)/REAL(NRETS)
  129 CONTINUE
      UANIM = UANIM*TARGET

IFLAG(7)=1
      XTOT=0.
      DO 130 I=1,NUM
         XTOT=XTOT+X(I)
         CUM(I) = X(I)
         IF(X(I).LT.   -0.001) THEN
            WRITE(*,*)'   '
            WRITE(*,*)'************   SPANNING   RUN   ABORTED   *****'
            WRITE(*,*)'   WEIGHT   NUMBER   ',I,' = %',X(I)*100.
            WRITE(*,*)'**********************************************'
            IFLAG(7)=2
            RETURN
         END IF
  130 CONTINUE

IF (ABS(XTOT-1.0)   .GT.   0.005) THEN
         WRITE(*,*)'   '
         WRITE(*,*)'************   SPANNING   RUN   ABORTED   ********'
         WRITE(*,*)'   TOTAL   WEIGHT   IN PORTFOLIO   = %',XTOT*100.
         WRITE(*,*)'**********************************************'
         IFLAG(7)=2
         RETURN
      END IF

C                   CALCULATE   THE   PORTFOLIO   RETURNS   **********
C                   FIRST   CALCULATE   RETURNS   FOR   NSTAT   PERIOD   ****

OBJ = 0.0
      AVEDIFF = 0.0
      DO 800   I = 1,NSTAT
         PRET(I) = 0.0
```

```
            DO 900  J = 1,NUM
                PRET(I)    = PRET(I)   + RET(I,J)*X(J)
  900       CONTINUE
            OBJ    = OBJ  + (PRET(I)-ANIM(I))**2/REAL(NSTAT)
            AVEDIFF  = AVEDIFF  + (PRET(I)-ANIM(I))/REAL(NSTAT)
  800   CONTINUE

IF ( OBJ .GT. 0.0)THEN
            OBJ=((OBJ-AVEDIFF**2)*12.)**(0.5)*100
        ELSE
            OBJ=99.9
        ENDIF

C           NOW  CALCULATE   RETURNS  AND  WEIGHTS   IN  SIMULATION   PERIOD   *

DO 801  I=1,NSIMS
            PRET(I+NSTAT)=0.0
            DO 901  J=1,NUM
                PRET(I+NSTAT)    = PRET(I+NSTAT)+CUM(J)*RET(I+NSTAT,J)
  901       CONTINUE
            DO 1001  K = 1,NUM
                CUM(K)   = CUM(K)*(1.+RET(I+NSTAT,K))/(1.+PRET(I+NSTAT))
 1001       CONTINUE
  801   CONTINUE

C                   WRITE  OUT  THE  NEW  WEIGHTS   TO  A  FILE  CALLED   'OLD'

C       OPEN(15,FILE   = 'OLD',   STATUS  = 'OLD')
C       REWIND(15)
C       DO 140  I = 1,NUM
C           WRITE(15,940)    CUM(I)*100
C140    CONTINUE
C940    FORMAT(1X,F15.8)
C       CLOSE(15)

C                   WRITE  OUTPUT   *****************

OPEN(10,FILE=FILEOUT,STATUS='UNKNOWN')
        REWIND(10)

WRITE(10,*)'    NATIONAL   INVESTMENT   SERVICES   SPANNING   TECHNOLOGY'
        WRITE(10,*)'                    SIMULATION   RESULTS'
        WRITE(10,*)
        WRITE(10,*)'                   ',TITLE
        WRITE(10,*)
        WRITE(10,*)'    LIABILITY   STREAM   USED    ',LIANAME
        WRITE(10,*)
        WRITE(10,*)'            START   END   SPAN'
        WRITE(10,*)'NUMBER      WGHT    WGHT  SENSIT  SIC  IDC   TICK',
     &              'SECURITY    NAME'
        WRITE(10,*)
```

```
          XRET=0.0
          DO 131 I=1,NUM
              IF(IFLAG(9).EQ.2.AND.X(I).LT.         0.0001)GOTO    631
              WRITE(10,16)I,X(I)*100,CUM(I)*100,PART(I)*100,
     &                     ISIC(I),IDC(I),NAME(I)
631       XRETI  = AVE(I)   + UANIM
          XRET   = XRET   + X(I)*AVE(I)
131       CONTINUE
16        FORMAT(1X,I4,1X,2F6.3,F7.3,I4,1X,A9,1X,A36)

XRET   = XRET*12.0*100.0

WRITE(10,*)
          WRITE(10,649)   OBJ, XRET
649       FORMAT(1X,'    MINIMUM   STD DEV =',F10.4,'    EXPECTED   RETURN   =',F10.4)
          WRITE(10,*)

RETURN
          END

C                        END OF SUBROUTINE   PORT
C ****************************************************************

C ****************************************************************
          SUBROUTINE   TRACKER
C ****************************************************************
          INCLUDE   'COMMON.F'

C ******     SET AVERAGES   AND COVARIANCES   TO ZERO   ******************
          DO 400  I=1,3
              AVE(I)=0.0
              DO 400 J=1,3
                  CMAT(I,J)=0.0
400       CONTINUE

C ***   SET STAT ARRAY    1 = LIABILITY,   2 = PORTFOLIO,   3 = DIFFERENCES   **
          DO 250 I=1,IREAD
              STAT(I,1)=ANIM(I)
              STAT(I,2)=PRET(I)
              STAT(I,3)=(PRET(I)-ANIM(I))
250       CONTINUE

C *****         GO AROUND   STATISTICS   IF NSIM  < 3
          IF(NSIMS.LT.3)GOTO     318

C *****         CALCULATE   AVERAGES     ********************************
C *****         SET NSIM TO 2 FOR   STATISTICS   IF NSIMS.LT.1    *********

NSIM = NSIMS
          IF(NSIMS.LT.1)   NSIM = 2
```

```
      DO 260 I=NSTAT+1,IREAD
          AVE(1)=AVE(1)+ANIM(I)/REAL(NSIM)
          AVE(2)=AVE(2)+PRET(I)/REAL(NSIM)
          AVE(3)=AVE(3)+(PRET(I)-ANIM(I))/REAL(NSIM)
260   CONTINUE

C *****     CALCULATE  COVARIANCES    **********************************

DO 950 I=1,3
          VAR(I)=0.0
          DO 950 K=NSTAT+1,IREAD
              VAR(I)=VAR(I)+(STAT(K,I)-AVE(I))**2/REAL(NSIM-1)
950   CONTINUE

C ******    CALCULATE  THE COVARIANCE  MATRIX'S  UPPER  OFF  DIAGONAL  ****
      DO 960 I=1,3
          DO 960 J=I,3
              DO 828 K=NSTAT+1,IREAD
                  CMAT(I,J)=CMAT(I,J)+((STAT(K,I)-AVE(I))
     &              *(STAT(K,J)-AVE(J)))
828           CONTINUE
              CMAT(I,J)=CMAT(I,J)/REAL(NSIM-1)
              CMAT(J,I)  = CMAT(I,J)
960   CONTINUE

C *****     CALCULATE  CORRELATIONS   ***************************
      DO 951 I=1,3
          DO 951 J=1,I
              IF(VAR(I).LE.   0.0 .OR. VAR(J).LE.   0.0) GO TO 951
              COREL(I,J)=CMAT(I,J)/(VAR(I)**.5*VAR(J)**.5)
951   CONTINUE
C *****     CALCULATE  CUMULATIVE  RETURNS   ***********************
      PRET(NSTAT)=100
      ANIM(NSTAT)=100
      DO 569 I=NSTAT+1,IREAD
          XX=PRET(I)
          YY=ANIM(I)
          PRET(I)=PRET(I-1)*(1+XX)
          ANIM(I)=ANIM(I-1)*(1+YY)
569   CONTINUE

IF(VAR(1).NE.   0.0)     BETA = CMAT(1,2)/VAR(1)
      ALPHA  = AVE(2)  -  BETA*AVE(1)

SST =    0.0
      SSE =    0.0
      DO 952 I = NSTAT+1,IREAD
          SSE = SSE + (ALPHA+BETA*STAT(I,1)-STAT(I,2))**2
          SST = SST + (STAT(I,2)-AVE(2))**2
```

```
952     CONTINUE

IF(NSIMS.GT.2)   STDERR  = (SSE/REAL(NSIMS-2))**.5
        IF(SST.NE.0.0)   RSQ  =  1 - SSE/SST
C**********************************************************************
C *****      BEGIN  WRITING   THE  TRACKER   OUTPUT    **********************

318     WRITE(10,*)'      TRACKER  OUTPUT  FILE  '
        WRITE(10,*)
        WRITE(10,*)'        MONTH         LIA          PORT         DIF'
        WRITE(10,*)

C *****          WRITE  MONTH,  LIABILITY  RET, PORTFOLIO   RET, DIFFERENCE   ****
        DO  700  I=NSTAT+1,IREAD
            ISTAT   = I-(NSTAT+1)
            WRITE(10,612)ISTAT+NM,(STAT(I,J),J=1,3)
612         FORMAT(1X,3X,I4,3F13.10)
700     CONTINUE

C *****         WRITE  CUMULATIVE    RETURNS         ****************************

WRITE(10,*)
        WRITE(10,886)
886     FORMAT(1X,'CUMMULATIVE     VALUES  OF LIABILITIES   AND ASSETS'/,
       ./,'  MONTH        LIABILTIES           PORTFOLIO',/)

DO  847  I=NSTAT,IREAD
            ISTAT  = I-NSTAT-1
            WRITE(10,328)ISTAT+NM,ANIM(I),PRET(I)
328         FORMAT(1X,I5,7X,F7.3,10X,F7.3)
847     CONTINUE
837     CONTINUE

C *****         WRITE  STATISTICS    BASED  ON  SIMULATIONS    MONTHS    **********

WRITE(10,*)
        WRITE(10,*)'**********            STATISTICAL   SUMMARY         **********'
        WRITE(10,985)NM,NM+NSIMS-1
985     FORMAT(/,'         STATISTICS  BASED  ON  MONTHS   ',I4,'  THROUGH',I4)

C *****         WRITE  ALPHA,BETA,STDERR,CORREL,AND      R-SQUARED    **********

WRITE(10,*)
        WRITE(10,987)'ALPHA',ALPHA,'ANNUAL',ALPHA*1200
        WRITE(10,989)'BETA',BETA
        WRITE(10,988)'STD    ERR',STDERR,STDERR*100
        WRITE(10,989)'CORRELATION',COREL(2,1)
        WRITE(10,988)'R-SQUARED',RSQ,RSQ*100
987     FORMAT(1X,A12,10X,F10.6,A8,F10.2,'       %')
```

```
988     FORMAT(1X,A12,10X,F10.6,8X,F10.2,'        %')
989     FORMAT(1X,A12,10X,F10.6)
C *****         WRITE   AVERAGES   AND  VARIANCES   OF  1-LIAB,   2-PORT,   3-DIFFS   **
        WRITE(10,*)
        WRITE(10,*)
        WRITE(10,*)'ANNUAL      RETURNS:              MEAN               STD  DEV'
        WRITE(10,*)

DO 990 I = 1,3
            AVE(I) = (AVE(I)*12)*100
            VAR(I) = ((VAR(I)*12)**.5)*100
990     CONTINUE

WRITE(10,916)   'LIABILITY',AVE(1),VAR(1)
        WRITE(10,916)   'PORTFOLIO',AVE(2),VAR(2)
        WRITE(10,916)   'DIFFERENCE',AVE(3),VAR(3)
916     FORMAT(1X,3X,A11,9X,F9.2,'      %',10X,F9.2,'     %')
C *****         WRITE   PARAMETERS    FOR  THE  RUN    ***************************
        WRITE(10,*)
        WRITE(10,*)
        WRITE(10,*)'          PARAMETERS    FOR  THIS   RUN  WERE:  '
        WRITE(10,*)
        WRITE(10,101)   TITLE
        WRITE(10,102)   FILEOUT
        WRITE(10,103)   LIAFIL
        WRITE(10,104)   STOKFIL
        WRITE(10,105)   BONDFIL
        WRITE(10,106)   NMSAVE
        WRITE(10,107)   NSIMS
        WRITE(10,108)   NSTOCKS
        WRITE(10,109)   NBONDS
        WRITE(10,110)   IDUMMY
        WRITE(10,111)   STOCKMIN
        WRITE(10,112)   YIMAX
        WRITE(10,113)   SMAX
        WRITE(10,114)   NSTAT
        WRITE(10,115)   NRETS
        WRITE(10,116)   BULL1
        WRITE(10,117)   TARG1
        WRITE(10,118)   TURN1

101     FORMAT(1X,'   1) SPANNING    RUN  TITLE          ', A30)
102     FORMAT(1X,'   2) OUTPUT   FILENAME               ', A30)
103     FORMAT(1X,'   3) LIABILITY    STREAM   FILE      ', A30)
104     FORMAT(1X,'   4) STOCK   RETURN   FILE           ', A30)
105     FORMAT(1X,'   5) BOND  RETURN   FILE             ', A30)
106     FORMAT(1X,'   6) MONTH  SIMULATION    BEGINS     ', I6)
107     FORMAT(1X,'   7) NUMBER   OF  MONTHS    SIMULATED ', I6)
```

```
108    FORMAT(1X,'  8)  NUMBER   OF  STOCKS              ',   I6)
109    FORMAT(1X,'  9)  NUMBER   OF  BONDS               ',   I6)
110    FORMAT(1X,'10)   STOCKS   TO  READ  PAST          ',   I6)
111    FORMAT(1X,'11)   MINIMUM  STOCK  HOLDING       % ',F6.2)
112    FORMAT(1X,'12)   MAXIMUM  INDUSTRY  HOLDING    % ',F6.2)
113    FORMAT(1X,'13)   MAXIMUM  STOCK  HOLDING       % ',F6.2)
114    FORMAT(1X,'14)   NSTAT                            ',   I6)
115    FORMAT(1X,'15)   NRETS                            ',   I6)
116    FORMAT(1X,'16)   BULLET                          ',F6.2)
117    FORMAT(1X,'17)   TARGET                          ',F6.2)
118    FORMAT(1X,'18)   TURNOVER  FACTOR                ',F6.2)

C *****        WRITE   HISTORICAL   DATA  USED   TO  MAKE   RUN     ****************
       WRITE(10,*)
       WRITE(10,*)'    PORTFOLIO   CONSTRUCTED   UPON  THE  FOLLOWING   DATA:'
       WRITE(10,*)
       WRITE(10,*)'       MONTH         LIA          PORT         DIF'
       WRITE(10,*)
       DO 300  I=1,NSTAT
           WRITE(10,612)I+NM-(NSTAT+1),(STAT(I,J),J=1,3)
300    CONTINUE

RETURN

END
C                          END  OF  SUBROUTINE   TRACKER
C ********************************************************************
C ********************************************************************
       SUBROUTINE   INDUST
C ********************************************************************

INCLUDE  'COMMON.F'

SIC(1)   =  'AGRICULTURAL    PRODUCTION-CROPS'
       SIC(2)   =  'AGRICULTURAL    PROD.-LIVESTOCK'
       SIC(7)   =  'AGRICULTURAL    SERVICES'
       SIC(8)   =  'FORESTRY'
       SIC(9)   =  'FISHING   HUNTING   AND  TRAPPING'
       SIC(10)  =  'METAL   MINING'
       SIC(11)  =  'ANTHRACITE    MINING'
       SIC(12)  =  'BITUMINOUS    COAL  &  LIGNITE   MIN.'
       SIC(13)  =  'OIL  &  GAS  EXTRACTION'
       SIC(14)  =  'MIN.  &  QUARRY.  OF  NONMET.  MIN.'
       SIC(15)  =  'BUILD.   CONST.-G.   C.  &  O.  B.'
       SIC(16)  =  'CONST.   OTH  THAN  B.C.-G.C.'
       SIC(17)  =  'CONST.-SPEC.    TRADE  CONT.'
       SIC(20)  =  'FOOD   KINDRED   PRODUCTS'
       SIC(21)  =  'TOBACCO    MANUFACTURERS'
       SIC(22)  =  'TEXTILE    MILL  PRODUCTS'
       SIC(23)  =  'APP.  &  OTH.  FIN.  PROD.  MFFAOSM'
       SIC(24)  =  'LUMBER   &  WOOD  PROD.  EX.  FURN.'
       SIC(25)  =  'FURNITURE    AND  FIXTURES'
```

```
SIC(26)  =  'PAPER     AND  ALLIED    PRODUCTS'
SIC(27)  =  'PRINTING    PUBLISHING    AND  A.P.'
SIC(28)  =  'CHEMICAL    AND  ALLIED    PROD.'
SIC(29)  =  'PETROLEUM    REFIN.  &  REL.  PROD.'
SIC(30)  =  'RUBBER    AND  MISC.    PLAST.  PROD.'
SIC(31)  =  'LEATHER    &  LEATHER    PRODUCTS'
SIC(32)  =  'STONE    CLAY  GLASS  &  CONC.  PROD.'
SIC(33)  =  'PRIMARY    METAL  INDUSTRIES'
SIC(34)  =  'FAB.    METAL    PROD.  EX.  M.&T.E.'
SIC(35)  =  'MACHINERY    EXCEPT    ELECTRICAL'
SIC(36)  =  'ELE.    AND  ELE.    MACH.'
SIC(37)  =  'TRANSPORTATIONS      EQUIPMENT'
SIC(38)  =  'MEAS.    ANAL.  &  CONT.  INST.  ETC.'
SIC(39)  =  'MISC.    MANUFACTURING    IND.'
SIC(40)  =  'RAILROAD    TRANS.'
SIC(41)  =  'LOC.    AND  SUB.    TRANS.  &  HPT'
SIC(42)  =  'MOTOR    FREIGHT    TRANS.  AND  WARE.'
SIC(43)  =  'U.S.    POSTAL    SERVICE'
SIC(44)  =  'WATER    TRANSPORTATION'
SIC(45)  =  'TRANSPORTATION      BY  AIR'
SIC(46)  =  'PIPE    LINES    EX.  NATURAL    GAS'
SIC(47)  =  'TRANSPORTATION      SERVICES'
SIC(48)  =  'COMMUNICATION'
SIC(49)  =  'ELECTRIC    GAS  AND  SANIT.    SERV.'
SIC(50)  =  'WHOLESALE    TRADE-DURABLE    GOODS'
SIC(51)  =  'WHOLESALE    TRADE-NONDUR.    GOODS'
SIC(52)  =  'BUILDING    MAT.  HARD.  GAR.  SUPP.'
SIC(53)  =  'GENERAL    MERCH.    STORES'
SIC(54)  =  'FOOD    STORES'
SIC(55)  =  'AUTOMOTIVE    DEAL  AND  GAS.  SS'
SIC(56)  =  'APPAREL    AND  ACCESS.    STORES'
SIC(57)  =  'HOME    FURN.  AND  EQUIP.    STORES'
SIC(58)  =  'EATING    AND  DRINKING    PLACES'
SIC(59)  =  'MISCELLANEOUS      RETAIL'
SIC(60)  =  'BANKING'
SIC(61)  =  'CRED.    AGEN.  OTH.  THAN  BANKS.'
SIC(62)  =  'SEC.    AND  COMM.  BROK.  DEEXSE'
SIC(63)  =  'INSURANCE    CARRIERS'
SIC(64)  =  'INS.    AGENTS    BROK.  SERV.'
SIC(65)  =  'REAL    ESTATE'
SIC(66)  =  'COMB.    RE  INS.  LOANS  &  LAW  OFF.'
SIC(67)  =  'HOLD.    AND  OTHER    INV.  COMP.'
SIC(70)  =  'HOTELS    ROOM.  HOUSES    CAMP  AOLP'
SIC(72)  =  'PERSONAL    SERVICES'
SIC(73)  =  'BUSINESS    SERVICES'
SIC(75)  =  'AUTO.    REPAIR    SERV.  AND  GAR.'
SIC(76)  =  'MISC.    REPAIR    SERVICES'
SIC(78)  =  'MOTION    PICTURES'
SIC(79)  =  'AMUSE.    AND  REC.  SERV.  EX.  MP'
SIC(80)  =  'HEALTH    SERVICES'
SIC(81)  =  'LEGAL    SERVICES'
SIC(82)  =  'EDUCATIONAL      SERVICES'
```

```
            SIC(83)   = 'SOCIAL    SERVICES'
            SIC(84)   = 'MUSEUM    ART  GALL.  BOT.  Z.G.'
            SIC(86)   = 'NONPROFIT    MEM.  ORGAN.'
            SIC(89)   = 'MISCELLANEOUS    SERVICES'
            SIC(91)   = 'EXEC.  LEG.  &  GOVT  EX.  FIN.'
            SIC(92)   = 'JUSTICE    PUBLIC    SAFETY'
            SIC(93)   = 'PUB.  FIN.  TAX.  &  MON.  POLICY'
            SIC(94)   = 'ADMIN.    OF  HUMAN  RES.  PROGRAMS'
            SIC(95)   = 'ADMIN.    OF  QUAL.  &  HOUS.  PROG.'
            SIC(96)   = 'ADMIN.    OF  ECONOMIC    PROGRAMS'
            SIC(97)   = 'NATIONAL    SEC.  &  INTL  AFFAIRS'
            SIC(99)   = 'NONCLASSIFIABLE    ESTABLISHMENTS'

C           **********   WRITE  OUT  INDUSTRY  HOLDINGS   *********

WRITE(10,*)
            WRITE(10,*)
            WRITE(10,*)'              ***  INDUSTRY  WEIGHTINGS   ***'
            WRITE(10,102)('*',K    = 1,78)
            WRITE(10,*)'    CODE            INDUSTRY                         WEIGHT'
            WRITE(10,102)('*',K    = 1,78)

DO 133 I = 1,99
                CUM(I)  = 0.0
                DO 134 J = 1,NUM
                    IF (ISIC(J).EQ.I)    CUM(I)  = CUM(I)  + X(J)
134             CONTINUE
                IF (CUM(I).GT.  0.001)  THEN
                    WRITE(10,135)    I,SIC(I),CUM(I)*100.
                END  IF
133         CONTINUE

SUMWGHT=0.0
            DO 136 I = 1,NUM
                SUMWGHT   = SUMWGHT   + X(I)
136         CONTINUE

WRITE(10,137)'                          TOTAL    =    ' ,SUMWGHT*100
            ENDFILE(10)
            CLOSE(10)

102         FORMAT(1X,78A1)
135         FORMAT(1X,I5,3X,A30,F10.2,'      %')
137         FORMAT(1X,A38,F10.2,'     %')

RETURN

END

C***************        END  OF  SUBROUTINE    INDUST          *****************

C ********************************************************************
```

```
      SUBROUTINE   LIABIN
C ********************************************************************

INCLUDE  'COMMON.F'

OPEN (9,FILE = LIAFIL,  STATUS  = 'OLD')

READ  (9,111)   LIANAME
      WRITE(*,"('+',A50)")LIANAME
      DO 200  I = 1,5
          READ  (9,111)   GARB
200   CONTINUE

READ  (9,*)  ISTART
      READ  (9,*)  ISTOP

DO 300  I = 1,IFIRST-ISTART
          READ  (9,111)   GARB
300   CONTINUE

DO 400  I = 1,IREAD
          READ  (9,*)  ANIM(I)
400   CONTINUE

CLOSE(9)

RETURN

111   FORMAT  (A40)

END

C ************   END OF SUBROUTINE   LIASUB  ****************************
C  UPDATED  4/18/88
C**********************************************************************
C                SUBROUTINE  TO WRITE  OUT COPYWRITE   WARNING
C**********************************************************************
      SUBROUTINE   COPYRIGHT
C **********************************************************************
      WRITE(*,*)'                                                        '
      WRITE(*,*)'COPYRIGHT      (c) NATIONAL   INVESTMENT   SERVICES   OF AMERICA'
      WRITE(*,*)'                          1988'
      WRITE(*,*)'                                                        '
      WRITE(*,*)'is   the  year  that  this  unpublished   work  was  originally'
      WRITE(*,*)'created.     NATIONAL   INVESTMENT   SERVICES   OF AMERICA'
      WRITE(*,*)'("NISA")    owns  all  rights  to this  work  and  intends   to'
      WRITE(*,*)'maintain    this  work  confidential    so as  to maintain   this'
      WRITE(*,*)'work    as  a trade   secret.    NISA  may  also  seek  to'
      WRITE(*,*)'maintain    this  work  as an  unpublished    copyright.'
      WRITE(*,*)'In   the  event  of  an  inadvertent    or deliberate'
      WRITE(*,*)'publication    NISA  intends   to enforce   its  rights'
      WRITE(*,*)'to   this  work  under  the  copyright    laws  as  a published'
```

```
        WRITE(*,*)'works.    Those having  access to this work  may not copy,'
        WRITE(*,*)'use,    or disclose the information   in this  work unless'
        WRITE(*,*)'expressly    authorized  by NISA to do so.'
        WRITE(*,*)'                                                         '
        WRITE(*,*)'                      CONFIDENTIAL                       '
        WRITE(*,*)'                                                         '
        WRITE(*,*)'  PROPERTY OF NATIONAL INVESTMENT SERVICES OF AMERICA'
        WRITE(*,*)'                                                         '
        WRITE(*,*)'                  ALL RIGHTS RESERVED'
        WRITE(*,*)'                                                         '
        XNS=1.99999999
        DO 198 I=1,30000
            XNS=XNS+1
            XNS=SQRT(XNS)
198     CONTINUE

RETURN

END

C ****************   END OF SUBROUTINE  COPYRIGHT  *******************
C
C              THIS SUBROUTINE IS COMMENTED OUT DUE TO SIZE,SPEED
C
C ******  SUBROUTINE INIT INITIALIZES ALL VARIABLES TO BE 0
C
C ******************************************************************
C       SUBROUTINE INIT
C ******************************************************************
C
C       INCLUDE 'COMMON.F'
C       PARAMETER (NS=ND*ND,N2=ND*ID,N3=NRT*ND,N4=NST*NST,N5=NRT*NST)
C
C             ******   SET REAL NUMBER VECTORS TO 0
C
C       DATA ((A(I,J),I=1,ND),J=1,ND)/NS*0.0/
C       DATA ((C(I,J),I=1,ND),J=1,ID)/N2*0.0/
C       DATA (B(I),I=1,ND)/ND*0.0/
C       DATA (D(I),I=1,ID)/ID*0.0/
C       DATA (BDL(I),I=1,ND)/ND*0.0/
C       DATA (BDU(I),I=1,ND)/ND*0.0/
C       DATA (X(I),I=1,ND)/ND*0.0/
C       DATA (OLDWT(I),I=1,ND)/ND*0.0/
C       DATA ((RET(I,J),I=1,NRT),J=1,ND)/N3*0.0/
C       DATA (ANIM(I),I=1,NRT)/NRT*0.0/
C       DATA (PRET(I),I=1,NRT)/NRT*0.0/
C       DATA (ISIC(I),I=1,ND)/ND*0.0/
C       DATA (AVE(I),I=1,ND)/ND*0.0/
C       DATA ((COV(I,J),I=1,NST),J=1,NST)/N4*0.0/
C       DATA ((STAT(I,J),I=1,NRT),J=1,NST)/N5*0.0/
C       DATA ((COREL(I,J),I=1,NRT),J=1,NST)/N5*0.0/
C       DATA (PRICE(I),I=1,ND)/ND*0.0/
```

```
C       DATA  (VOL(I),I=1,ND)/ND*0.0/
C       DATA  (CUM(I),I=1,ND)/ND*0.0/
C       DATA  (VAR(I),I=1,3)/3*0.0/
C       DATA  (SPREAD(I),I=1,ND)/ND*0.0/
C       DATA  (XMKTCAP(I),I=1,ND)/ND*0.0/
C
C       ********    SET  INTEGER  VECTORS  TO  0
C
C       DATA  (IFLAG(I),I=1,10)/10*0/
C
C       ********    SET  CHARACTER  VECTORS  TO  0
C
C       DATA  (SIC(I),I=1,99)/99*'         '/
C       DATA  (IDC(I),I=1,ND)/ND*'         '/
C       DATA  (NAME(I),I=1,ND)/ND*'         '/
C
C           ******  SET  CHARACTER  VARIABLES  TO  0
C
C       PORTRETS='    '
C       ANSWER='   '
C       GARB='   '
C       FILEOUT='   '
C       LIAFIL='   '
C       STOKFIL='   '
C       BONDFIL='   '
C       LIANAME='   '
C       TITLE='   '
C       OLD='   '
C       HOLD='   '
C
C           ******  SET  INTEGER  VARIABLES  TO  0
C
C       MMM=0
C       MAXWS=0
C       ITURN=0
C       ISKIP=0
C       ICOUNT=0
C       IPORT=0
C       ICOL=0
C       NMSAVE=0
C       NM=0
C       NSIMS=0
C       NSTOCKS=0
C       NBONDS=0
C       NSTAT=0
C       NRETS=0
C       IDUMMY=0
C       ITYPE=0
C       ICHANGE=0
C       NUM=0
C       IREAD=0
C       IFIRST=0
```

```
C       ILAST=0
C       IHOLD=0
C
C            *****    SET  REAL  NUMBER  VARIABLES  TO  0
C
C       STOCKMIN=0.0
C       YIMAX=0.0
C       SMAX=0.0
C       SCALE=0.0
C       BRET=0.0
C       XFACTOR=0.0
C       XBUPPER=0.0
C       XBLOWER=0.0
C       BULLET=0.0
C       TARGET=0.0
C       TURN=0.0
C       BULL1=0.0
C       TARG1=0.0
C       TURN1=0.0
C       PORTVAL=0.0
C
C       RETURN
C
C       END
C
C  *****  END OF SUBROUTINE   INIT  *****************************
***********************************************************************
        SUBROUTINE   MODIFY
***********************************************************************
*  **
*  **    THIS  ROUTINE  MODIFIES  THE  INPUT  DATA  IF  NECESSARY
*  **

INCLUDE   'COMMON.F'

10      WRITE(*,100)('    ',I = 1,5)

*****************    DISPLAY  SELECTED  PARAMETERS      *****
        CALL  DISPLAY
***********************************************************

IRESPON  =  0

WRITE(*,120)
        READ(*,'(I2)')IRESPON

IF(IRESPON.EQ.0)    THEN
            RETURN

ELSE  IF  (IRESPON    .EQ.  1 ) THEN
201         WRITE(*,121)
            READ(*,'(A30)',END   = 201, ERR = 201) TITLE
```

```
            ELSE IF (IRESPON.EQ.2)     THEN
  202            WRITE(*,122)
               READ(*,'(A30)',END    = 202, ERR = 202) FILEOUT

ELSE IF (IRESPON.EQ.3)     THEN
  203            WRITE(*,123)
               READ(*,'(A30)',END    = 203, ERR = 203) LIAFIL

ELSE IF (IRESPON.EQ.4)     THEN
  204            WRITE(*,124)
               READ(*,'(A30)',END    = 204, ERR = 204) STOKFIL

ELSE IF (IRESPON.EQ.5)     THEN
  205            WRITE(*,125)
               READ(*,'(A30)',END    = 205, ERR = 205) BONDFIL

ELSE IF (IRESPON.EQ.6)     THEN
  206            WRITE(*,126)
               READ(*,*,END    = 206, ERR = 206) NMSAVE

ELSE IF (IRESPON.EQ.7)     THEN
  207            WRITE(*,127)
               READ(*,*,END    = 207, ERR = 207) NSIMS

ELSE IF (IRESPON.EQ.8)     THEN
  208            WRITE(*,128)
               READ(*,*,END    = 208, ERR = 208) NSTOCKS

ELSE IF (IRESPON.EQ.9)     THEN
  209            WRITE(*,129)
               READ(*,*,END    = 209, ERR = 209) NBONDS

ELSE IF (IRESPON.EQ.10)    THEN
  210            WRITE(*,130)
               READ(*,*,END    = 210, ERR = 210) IDUMMY

ELSE IF (IRESPON.EQ.11)    THEN
  211            WRITE(*,131)
               READ(*,*,END    = 211, ERR = 211) STOCKMIN

ELSE IF (IRESPON.EQ.12)    THEN
  212            WRITE(*,132)
               READ(*,*,END    = 212, ERR = 212) YIMAX

ELSE IF (IRESPON.EQ.13)    THEN
  213            WRITE(*,133)
               READ(*,*,END    = 213, ERR = 213) SMAX

ELSE IF (IRESPON.EQ.14)    THEN
  214            WRITE(*,134)
               READ(*,*,END    = 214, ERR = 214) NSTAT
```

34

```
            ELSE IF (IRESPON.EQ.15)    THEN
215             WRITE(*,135)
                READ(*,*,END    = 215, ERR = 215) NRETS

ELSE IF (IRESPON.EQ.16)    THEN
216             WRITE(*,136)
                READ(*,*,END    = 216, ERR = 216) BULLET

ELSE IF (IRESPON.EQ.17)    THEN
217             WRITE(*,137)
                READ(*,*,END    = 217, ERR = 217) TARGET

ELSE IF (IRESPON.EQ.18)    THEN
218             WRITE(*,138)
                READ(*,*,END    = 218, ERR = 218) TURN

END IF

GO TO 10

20          RETURN

100         FORMAT('0',A1)
120         FORMAT('0','    ENTER   NUMBER   TO MODIFY  <ENTER>   TO CONTINUE:    ',$)
121         FORMAT('0','    ENTER   SPANNING   RUN TITLE                        ',$)
122         FORMAT('0','    ENTER   FILENAME   FOR OUTPUT                       ',$)
123         FORMAT('0','    ENTER   LIABILITY   STREAM  FILE                    ',$)
124         FORMAT('0','    ENTER   STOCK   RETURN  FILE                        ',$)
125         FORMAT('0','    ENTER   BOND  RETURN  FILE                          ',$)
126         FORMAT('0','    ENTER   MONTH  TO BEGIN  SIMULATION                 ',$)
127         FORMAT('0','    ENTER   NUMBER  OF MONTHS  TO SIMULATE              ',$)
128         FORMAT('0','    ENTER   NUMBER  OF STOCKS                           ',$)
129         FORMAT('0','    ENTER   NUMBER  OF BONDS                            ',$)
130         FORMAT('0','    ENTER   STOCKS  TO READ  PAST                       ',$)
131         FORMAT('0','    ENTER   MINIMUM   TOTAL  STOCK  HOLDING       % ',$)
132         FORMAT('0','    ENTER   MAXIMUM   INDUSTRY  HOLDING           % ',$)
133         FORMAT('0','    ENTER   MAXIMUM   SINGLE  STOCK  HOLDING      % ',$)
134         FORMAT('0','    ENTER   NSTAT                                      ',$)
135         FORMAT('0','    ENTER   NRETS                                      ',$)
136         FORMAT('0','    ENTER   BULLET                                     ',$)
137         FORMAT('0','    ENTER   TARGET                                     ',$)
138         FORMAT('0','    ENTER   TURNOVER    FACTOR                         ',$)
            END

***************** END OF SUBROUTINE   MODIFY    *****************
*****************************************************************
         SUBROUTINE    REDPAST
*****************************************************************
C      TITLE            = TITLE  FOR THIS  RUN
C      FILEOUT          = OUTPUT  FILE
C      LIAFIL           = LIABILITY   RETURNS   FILE
```

```
C       STOKFIL         = STOCK  RETURNS  FILE
C       BONDFIL         = BOND   RETURNS  FILE
C       NMSAVE          = FIRST  MONTH OF SIMULATION
C       NSIMS           = NUMBER OF MONTHS TO SIMULATE
C       NSTOCKS         = NUMBER OF STOCK  TO SEND TO OPTIMIZER
C       NBONDS          = NUMBER OF BONDS  TO SEND TO OPTIMIZER
C       IDUMMY          = NUMBER OF STOCKS TO READ PAST IN STOKFIL
C       STOCKMIN        = MINIMUM HOLDING IN STOCKS
C       YIMAX           = INDUSTRY MAXIMUM HOLDING
C       SMAX            = SECURITY MAXIMUM HOLDING
C       BULLET          = CLIMBING  FACTOR
C       TARGET          = ADJUSTMENT FACTOR FOR TARGET
C       TURN            = TURNOVER  FACTOR
        INCLUDE  'COMMON.F'

PARAMETER  (MAXTXT = 50,LINES = 24)

CHARACTER  HEAD*(MAXTXT),LAST*(MAXTXT),OPTIONS(LINES)*(MAXTXT)
        CHARACTER  *30 PAST
* **
* **       INITIALIZE  READ IN FILE: PAST = 'PAST.DAT'
* **
        WRITE(*,100)('    ',I = 1,5)
        WRITE(*,*)'     READING  PAST DATA........'
        WRITE(*,100)('    ',I = 1,5)

5       OPEN (8,FILE = 'PAST.DAT',  STATUS = 'OLD',  ERR = 10)
        READ(8,101)TITLE
        READ(8,101)FILEOUT
        READ(8,101)LIAFIL
        READ(8,101)STOKFIL
        READ(8,101)BONDFIL
        READ(8,102)NMSAVE
        READ(8,102)NSIMS
        READ(8,102)NSTOCKS
        READ(8,102)NBONDS
        READ(8,102)IDUMMY
        READ(8,103)STOCKMIN
        READ(8,103)YIMAX
        CLOSE  (8)
        RETURN

10      CONTINUE

* **       GIVE OPTION TO READ FROM SCREEN WITHOUT DUMPING OUT OF
* **       PROGRAM OR TO READ FROM DIFFERENT FILE NAME

HEAD = '... WARNING: THE PAST DATA FILE DOES NOT EXIST'
        LAST = '                        ( CTRL-C TO ABORT  )'
        NBROPT = 2
        OPTIONS(1)  = 'INPUT NEW NAME FOR PAST DATA FILE'
        OPTIONS(2)  = 'READ IN NEW DATA FROM SCREEN  '
```

```
20      CALL  MENU  (LINES,HEAD,LAST,NBROPT,OPTIONS,IRESPON)

IF ( IRESPON.EQ.1)    THEN
           WRITE(*,100)('      ',I = 1,5)
           WRITE(*,104)
           READ(*,'(A30)',END    = 20,ERR = 20) PAST
           GO TO 5

ELSE IF (IRESPON.EQ.2)    THEN
           CALL  REDSCRN
           RETURN

END IF

RETURN

100     FORMAT('0',A1)
101     FORMAT(A35)
102     FORMAT(I4)
103     FORMAT(F7.2)
104     FORMAT(' NAME FOR PAST DATA FILE --- ',$)

END

****************     END OF SUBROUTINE    REDPAST    *****************
**********************************************************************
        SUBROUTINE    REDSCRN
**********************************************************************

C       TITLE          = TITLE FOR THIS RUN
C       FILEOUT        = OUTPUT FILE
C       LIAFIL         = LIABILITY RETURNS FILE
C       STOKFIL        = STOCK RETURNS FILE
C       BONDFIL        = BOND RETURNS FILE
C       NMSAVE         = FIRST MONTH OF SIMULATION
C       NSIMS          = NUMBER OF MONTHS TO SIMULATE
C       NSTOCKS        = NUMBER OF STOCK TO SEND TO OPTIMIZER
C       NBONDS         = NUMBER OF BONDS TO SEND TO OPTIMIZER
C       IDUMMY         = NUMBER OF STOCKS TO READ PAST IN STOKFIL
C       STOCKMIN       = MINIMUM HOLDING IN STOCKS
C       YIMAX          = INDUSTRY MAXIMUM HOLDING

INCLUDE  'COMMON.F'

* **       DEFAULT NAMES FOR STOCK AND BOND FILES
* **          STOCKS.PRN      &    BONDS.PRN

WRITE(*,113)('      ',I = 1,12)
113     FORMAT('0',A1)
```

```
1       WRITE(*,101)
101     FORMAT('  1) ENTER  TITLE  FOR  SPANNING  RUN       - ',$)
        READ(*,'(A30)',END   = 1,ERR = 1) TITLE
        WRITE(*,*)

2       WRITE(*,102)
102     FORMAT('  2) ENTER  OUTPUT  FILE  NAME              - ',$)
        READ(*,'(A30)',END   = 2,ERR = 2) FILEOUT
        WRITE(*,*)

3       WRITE(*,103)
103     FORMAT('  3) ENTER  LIABILITY  RETURNS  FILE  NAME  - ',$)
        READ(*,'(A30)',END   = 3,ERR = 3) LIAFIL
        WRITE(*,*)

4       WRITE(*,104)
104     FORMAT('  4) ENTER  STOCK  RETURNS  FILE  NAME      - ',$)
        READ(*,'(A30)',END   = 4,ERR = 4) STOKFIL
        IF (STOKFIL.EQ.'    ')STOKFIL  = 'STOCKS.PRN'
        WRITE(*,*)

5       WRITE(*,105)
105     FORMAT('  5) ENTER  BOND  RETURNS  FILE  NAME       - ',$)
        READ(*,'(A30)',END   = 5,ERR = 5) BONDFIL
        IF (BONDFIL.EQ.'    ')BONDFIL  = 'BONDS.PRN'
        WRITE(*,*)

6       WRITE(*,*)'  6) ENTER  YEAR  AND  MONTH  TO  BEGIN      '
        WRITE(*,106)
106     FORMAT('      SIMULATION   (e.g.  FEB  1987  = 8702)  - ',$)
        READ(*,*,END   = 6,ERR = 6) NMSAVE
        WRITE(*,*)

7       WRITE(*,107)
107     FORMAT('  7) ENTER  NUMBER  OF  MONTHS  TO  SIMULATE  - ',$)
        READ(*,*,END   = 7,ERR  = 7) NSIMS
        WRITE(*,*)

8       WRITE(*,108)
108     FORMAT('  8) ENTER  NUMBER  OF  STOCKS  TO  USE     - ',$)
        READ(*,*,END   = 8,ERR = 8) NSTOCKS
        WRITE(*,*)

9       WRITE(*,109)
109     FORMAT('  9) ENTER  NUMBER  OF  BONDS  TO  USE      - ',$)
        READ(*,*,END   = 9,ERR = 9) NBONDS
        WRITE(*,*)

10      WRITE(*,110)
110     FORMAT('10)  ENTER  NUMBER  OF  STOCKS  READ  PAST  - ',$)
        READ(*,*,END   =10,ERR = 10) IDUMMY
```

```
            WRITE(*,*)

11          WRITE(*,111)
111         FORMAT('11)   ENTER MINIMUM STOCK HOLDING      - % ',$)
            READ(*,*,END  = 11,ERR = 11) STOCKMIN
            WRITE(*,*)

12          WRITE(*,112)
112         FORMAT('12)   ENTER MAXIMUM INDUSTRY HOLDING   - % ' ,$)
            READ(*,*,END  = 12,ERR = 12) YIMAX
            WRITE(*,*)

RETURN

100         FORMAT(A35)

END
*****************        END OF SUBROUTINE    REDSCRN    *****************

**************************************************************************
            SUBROUTINE    DISPLAY
**************************************************************************
*  **
*  **    THIS ROUTINE DISPLAYS SELECTED PARAMETERS FOR SPANNING RUN
*  **

INCLUDE 'COMMON.F'

WRITE(*,*)'********   CURRENTLY   SELECTED   PARAMETERS   ********'
            WRITE(*,100)
            WRITE(*,101)    TITLE
            WRITE(*,102)    FILEOUT
            WRITE(*,103)    LIAFIL
            WRITE(*,104)    STOKFIL
            WRITE(*,105)    BONDFIL
            WRITE(*,106)    NMSAVE
            WRITE(*,107)    NSIMS
            WRITE(*,108)    NSTOCKS
            WRITE(*,109)    NBONDS
            WRITE(*,110)    IDUMMY
            WRITE(*,111)    STOCKMIN
            WRITE(*,112)    YIMAX
            WRITE(*,113)    SMAX
            WRITE(*,114)    NSTAT
            WRITE(*,115)    NRETS
            WRITE(*,116)    BULLET
            WRITE(*,117)    TARGET
            WRITE(*,118)    TURN

RETURN

100         FORMAT('0',A1)
```

```
101     FORMAT(1X,'   1) SPANNING   RUN TITLE                ', A30)
102     FORMAT(1X,'   2) OUTPUT   FILENAME                   ', A30)
103     FORMAT(1X,'   3) LIABILITY   STREAM   FILE           ', A30)
104     FORMAT(1X,'   4) STOCK   RETURN   FILE               ', A30)
105     FORMAT(1X,'   5) BOND   RETURN   FILE                ', A30)
106     FORMAT(1X,'   6) MONTH   TO BEGIN   SIMULATION       ',  I6)
107     FORMAT(1X,'   7) NUMBER   OF MONTHS   TO SIMULATE    ',  I6)
108     FORMAT(1X,'   8) NUMBER   OF STOCKS                  ',  I6)
109     FORMAT(1X,'   9) NUMBER   OF BONDS                   ',  I6)
110     FORMAT(1X,'10)   STOCKS   TO READ   PAST             ',  I6)
111     FORMAT(1X,'11)   MINIMUM   STOCK   HOLDING         % ',F6.2)
112     FORMAT(1X,'12)   MAXIMUM   INDUSTRY   HOLDING      % ',F6.2)
113     FORMAT(1X,'13)   MAXIMUM   SINGLE   STOCK   HOLDING % ',F6.2)
114     FORMAT(1X,'14)   NSTAT                                ',  I6)
115     FORMAT(1X,'15)   NRETS                                ',  I6)
116     FORMAT(1X,'16)   BULLET                               ',F6.2)
117     FORMAT(1X,'17)   TARGET                               ',F6.2)
118     FORMAT(1X,'18)   TURNOVER   FACTOR                    ',F6.2)
        END
*****************           END OF SUBROUTINE   DISPLAY     *****************

**********************************************************************
        SUBROUTINE   SAVDAT
**********************************************************************
*  **
*  **    THIS ROUTINE   SAVE THE FILE FOR LATER   USE
*  **

INCLUDE   'COMMON.F'

C       WRITE(*,100)('     ',I = 1,7)
        WRITE(*,104)'      SAVING   DATA   TO FILE:   PAST.DAT   .......'
C       WRITE(*,100)('     ',I = 1,5)

OPEN(8,FILE   = 'PAST.DAT',STATUS     = 'OLD')
        WRITE(8,101)TITLE
        WRITE(8,101)FILEOUT
        WRITE(8,101)LIAFIL
        WRITE(8,101)STOKFIL
        WRITE(8,101)BONDFIL
        WRITE(8,102)NMSAVE
        WRITE(8,102)NSIMS
        WRITE(8,102)NSTOCKS
        WRITE(8,102)NBONDS
        WRITE(8,102)IDUMMY
        WRITE(8,103)STOCKMIN
        WRITE(8,103)YIMAX
        CLOSE   (8)

RETURN

100     FORMAT('0',A1)
```

```
      101   FORMAT(A35)
      102   FORMAT(I4)
      103   FORMAT(F7.2)
      104   FORMAT('+',A50)

END

*****************      END OF SUBROUTINE    SAVDAT     *****************

C***********************************************************************
        SUBROUTINE  MENU  (LINES,HEADER,LAST,NBROPT,OPTION,RESPON)
C***********************************************************************

*  **
*  **    PURPOSE:  TO PRINT A MENU AND READ RESPONSE
*  **
*  **
*  **
*  **    VARIABLE   DEFINITIONS
*  **    LINES           LINESIZE  OF SCREEN
*  **    HEADER          TITLE  LINE  FOR MENU
*  **    LAST            LAST  LINE  OF MENU
*  **    NBROPT          NUMBER  OF OPTIONS
*  **    OPTION          LIST  OF OPTIONS
*  **                    DIMENSIONED   OPTION(*)*(*)   SO LENGTH
*  **                    OF CHARACTER   STRINGS  AND  ARRAY  SENT  BY
*  **                    CALLING  PROGRAM
*  **    RESPON          NUMERIC  RESPONSE
*  **    I               MISCELLANEOUS   INDEX
*  **    IMAX            NUMBER  OF BLANK  LINES,  TOP AND BOTTOM
*  **
*  **
*  **    OVERALL   SPECIFICATIONS
        IMPLICIT  REAL  (A-Z)
        INTEGER   MAXTXT
        PARAMETER   (MAXTXT  = 50)
*  **
*  **    CALL  SPECIFICATIONS
        CHARACTER   OPTION(*)*(MAXTXT),HEADER*(MAXTXT),LAST*(MAXTXT)
        INTEGER   NBROPT,RESPON,LINES
*  **
*  **    LOCAL  SPECIFICATIONS
        INTEGER   I,IMAX
*  **
*  **
*  **    PRINT  BLANK  UPPER  SCREEN
        IMAX  = (LINES-NBROPT-7)/2+1
        IF (IMAX.LT.0)   THEN
            WRITE(*,*)'TOO    MANY  OPTIONS  TO FIT SCREEN  SIZE'
            STOP
        END IF
    5   DO 10 I = 1,IMAX
```

```
10      WRITE(*,*)' '
* **
* **    PRINT MENU
        WRITE(*,*)HEADER
        WRITE(*,*)' '

DO 20 I = 1,NBROPT
        WRITE(*,'(1X,I2,2H     ,$)') I
        WRITE(*,*)OPTION(I)
20      CONTINUE

WRITE(*,*)   LAST
* **
* **    BLANK OUT REST OF SCREEN
        DO 25 I = 1,IMAX
25      WRITE(*,*)' '
* **
* **    REQUEST RESPONSE
        WRITE(*,*)' '
        WRITE(*,*)' '
30      WRITE(*,999)
999     FORMAT(' SELECT NUMBER OF OPTION ---> ',$)
* **    RESPONSE SET TO ZERO IN CASE OF CARRIAGE RETURN
        RESPON = 0
        READ (*,'(I2)',END = 40,ERR = 5) RESPON
        IF (RESPON.LT.0.OR.RESPON.GT.NBROPT)   THEN
            WRITE(*,*)' OPTION OUT OF RANGE'
            GO TO 30
        END IF
40      RETURN
        END
C****************   END OF SUBROUTINE   MENU         *****************

C *******   SET UP PROBLEM FOR OPTIMIZER   ******************************
        SUBROUTINE SOLVE
C ***********************************************************************
        INCLUDE 'COMMON.F'

WRITE(*,"('+',A50)")'IN    SOLVE ...'
C *******   SET THE MAXIMUM SIZE FOR THE OPTIMIZER   ******************

DELSTAR  = 0.005
            DELSTAR  = DELSTAR/1000000.
            DISTMAX  = 0.40

C *******   ISOLVE COUNTS THE NUMBER OF RUNS, ICOUNT THE ITERATIONS   ***
        ISOLVE = ISOLVE + 1
        ICOUNT = 0
        ITEST  = 0

C *******   CALL BOUNDS TO SET INDUSTRY AND SECURITY BOUNDS   ***********
```

```
      CALL  BOUNDS

C ********  CALL  COVAR:INITIALIZE    LI(I),   CALC  AVERAGES,    CALC  COVARS    ***
C ********    IFLAG(5)=1    FOR  FULL   COVARIANCE,    IFLAG(5)=2    FOR  OUTLIER   REMOVAL
      IF(IFLAG(5).EQ.1)THEN
          CALL  COVAR
      ELSEIF(IFLAG(5).EQ.2)THEN
          CALL  COVAI
      ENDIF
C ********   IF  A  STARTING   POINT  IS  NEEDED,   CALL   STARTPT   ***************
      CALL  STARTPT

C ********    CALL  CALCOBJ   TO  CALCULATE   OBJECTIVE   FUNCTION   AT  START   ****
      CALL  CALCOBJ
      OBJLAST  =  OBJ

C **********************************************************************
C ********  CYCLE  BACK  TO  THIS  POINT  IF  NOT  AT  OPTIMAL   ****************
C **********************************************************************

999   CONTINUE

C ********    CALL  PARTIAL    *******************************************
      CALL  PARTIAL
C ********    CALL  MOVE_X  TO  MOVE  FROM  CURRENT  TO  NEXT  POINT    **********
      CALL  MOVE_X
C ********    CALL  CALCOBJ   TO  CALCULATE   OBJECTIVE   FUNCTION   VALUE    *****
      CALL  CALCOBJ

ICOUNT  =  ICOUNT  +  1
      DELTA   =  100.
      OBJ1    =  OBJ  *  1000.
      IF  (OBJLAST  .NE.  0.0)  THEN
          DELTA  =  -100.*(OBJ-OBJLAST)/ABS(1+OBJLAST)
      END  IF

WRITE(*,"('+',12X,2I5,A15,F10.5,A15,E10.5)")
     &       ISOLVE,ICOUNT,'OBJ      = ',OBJ1,'DELTA(%)      = ',DELTA

IF  (DELTA  .LE.  DELSTAR)   THEN

IF  (ICOUNT  .EQ.  ICNT+1)   THEN
              ITEST  =  ITEST  +  1
          ELSE
              ITEST  =  0
          END  IF

ICNT  =  ICOUNT

IF  (DELTA  .LT.  0.0)  THEN
          DISTMAX  =  DISTMAX  *  0.4
```

```
            NBEST = NBLST
            DO 10 I = 1, NUM
               X(I) = XO(I)
10       CONTINUE
         END IF

IF(ITEST .GT. 20 .OR. DISTMAX .LT. 0.00005) THEN
            CALL PARTIAL
            IF (DISTMAX .LT. 0.00005) WRITE(*,*)
     &      '**********   TERMINAL  STEP  SIZE  ************'
            RETURN
         ENDIF

GO TO 999
      END IF

DO 20 I = 1, NUM
            XO(I) = X(I)
20       CONTINUE
         OBJLAST = OBJ
         NBLST = NBEST
         GO TO 999

RETURN

END
C *******   END OF SOLVE  *********************************************
C *******************      BOUNDS  CALCULATION  SUBROUTINE   *****************
         SUBROUTINE  BOUNDS
C **********************************************************************

INCLUDE 'COMMON.F'

DAYSVOL=XCONS(2)
         PCNT=XCONS(3)

WRITE(*,"('+',A50)")'IN        BOUNDS...'

C              SET  UP  PORTVAL  TO  BE  REPRESENTATIVE   OF  TIME  PERIOD
C              THE  SCALARS  ARE  REP  OF  S&P  ANNUAL  DOLLAR  TRADING  VOLUME
         IF(NMSAVE.LT.7401)PORTVAL=PRTVALS*      0.040000
         IF(NMSAVE.GE.7501)PORTVAL=PRTVALS*      0.046557
         IF(NMSAVE.GE.7601)PORTVAL=PRTVALS*      0.085555
         IF(NMSAVE.GE.7701)PORTVAL=PRTVALS*      0.082769
         IF(NMSAVE.GE.7801)PORTVAL=PRTVALS*      0.102268
         IF(NMSAVE.GE.7901)PORTVAL=PRTVALS*      0.125348
         IF(NMSAVE.GE.8001)PORTVAL=PRTVALS*      0.155192
         IF(NMSAVE.GE.8101)PORTVAL=PRTVALS*      0.273776
         IF(NMSAVE.GE.8201)PORTVAL=PRTVALS*      0.232789
         IF(NMSAVE.GE.8301)PORTVAL=PRTVALS*      0.406685
```

```
      IF(NMSAVE.GE.8401)PORTVAL=PRTVALS*      0.559490
      IF(NMSAVE.GE.8501)PORTVAL=PRTVALS*      0.573418
      IF(NMSAVE.GE.8601)PORTVAL=PRTVALS*      0.773179
      IF(NMSAVE.GE.8701)PORTVAL=PRTVALS*      1.005173
      IF(NMSAVE.GE.8801)PORTVAL=PRTVALS*      1.212097
      IF(NMSAVE.GE.8901)PORTVAL=PRTVALS*      1.000000

IF(PORTVAL.EQ.0)PORTVAL=100000000.0

C     WRITE(*,*)'IN   BOUNDS  AND  PORTVAL  = ',PORTVAL
C     WRITE(*,*)

C ********  PCNT - PARAMETER   FOR  MAX  HOLDING   IN  A  COMPANY:   4%  ********
C ********  DAYSVOL - PARAMETER   FOR  MAX  #  TRADING   DAYS  IN  A STOCK  *****

DO 10 I = 1, NUM

C                        SET  UP  RHS  VECTOR

C ********  RHS(I)  IS THE  RIGHT  HAND  SIDE  CONSTRAINT   VECTOR  ***********
      RHS(I)  = 0.0

C ********  SET RHSMIN   EQUAL  TO SMALLEST:   UPPER  BOUND,  TRADING  VOLUME,
C ********  PERCENT   OF  THE  COMPANY                **********************
      RHSMAX  = XBUPPER/100.

C********************************************************************
C********************************************************************

IF (DVOL(I)   .GT.  0.) THEN
        IF (DAYSVOL*1000.*DVOL(I)/PORTVAL     .LT.  RHSMAX)  THEN
          RHSMAX = DAYSVOL*1000.*DVOL(I)/PORTVAL
        END IF
      END IF

IF (XMKTCAP(I)   .GT.  0.) THEN
        IF ((PCNT/100.)*1000.*XMKTCAP(I)/PORTVAL     .LT.  RHSMAX)  THEN
          RHSMAX = (PCNT/100.)*1000.*XMKTCAP(I)/PORTVAL
        END IF
      END IF
C ********  SET THE  MINIMUM   INVESTED   IN A STOCK  BY USING  PORTVAL  ******
      IF ( PORTVAL   .GT.  1.0E+9)  THEN
        RHSMIN = 0.0005
      ELSE IF ( PORTVAL   .LT.  1.0E+8)  THEN
        RHSMIN = 0.005
      ELSE
        RHSMIN = 0.0055  - (5.0E-12)*PORTVAL
      END IF
      IF (RHSMAX   .LT. RHSMIN)  RHSMAX = 0.0
CC*******************************************************************
```

```
              RHS(I)  = RHSMAX
           DO 20 J = 1, ID
              CONS(J,I)  = 0.0

C ********   (1) = SUM OF THE WEIGHTS  EQUALS  1.0 ********************
              IF (J .EQ. 1) CONS(J,I)  = 1.0

C ********   (2) = SUM OF SIC CODES  48,49  LT INDUSTRY  BOUND  **********
              IF (J .EQ. 2) THEN
                 IF( ISIC(I)  .EQ. 48 .OR.  ISIC(I)  .EQ. 49)CONS(J,I)  = 1.0
              END IF

C ********   (3) = SUM OF SIC CODES  60,63,67  LT INDUSTRY  BOUND  *******
              IF (J .EQ. 3) THEN
                 IF( ISIC(I)  .EQ. 60 .OR.  ISIC(I)  .EQ. 63 .OR.  ISIC(I)
     &              .EQ. 67) CONS(J,I)  = 1.0
              END IF

20        CONTINUE

10     CONTINUE

C *******  SET RIGHT HAND SIDE FOR CONSTRAINTS  AND SET TYPES *********
        RHS(NUM+1)  = 1.000
        RHS(NUM+2)  = YIMAX / 100.
        RHS(NUM+3)  = YIMAX /100.

C                        SET UP XLHS VECTOR

IF(IFLAG(2).EQ.1)THEN
           DO 30 I=1,NUM
              XLHS(I)=OLDWT(I)
 30        CONTINUE
        ELSEIF(IFLAG(2).EQ.2)THEN
           DO 40 I=1,NUM
              XLHS(I)=0.0
 40        CONTINUE
        ENDIF

RETURN

END
C                                                  END OF SUBROUTINE  BOUNDS
C     ****************************************************************

C **********FULL  COVARIANCE  CALCULATION  SUBROUTINE  ******************
        SUBROUTINE  COVAR
C     ****************************************************************
```

```
      INCLUDE  'COMMON.F'

WRITE(*,"('+',A50)")'IN     COVAR  ...'
C                  NUM = NSTOCKS+NBONDS
C *******  INITIALIZE   LI(I),  CALC  AVE(I),  CALC  COV(I)  ***************
      UANIM  = 0.0
      VARANIM = 0.0

DO 10 I = 1, NUM
C            *******  INITIALIZE   LI(I)  VECTOR  *****************
         LI(I)  = I

AVE(I) = 0.0
         COV(I) = 0.0

DO 20 J = 1, NSTAT
            IF (I .EQ. 1) THEN
               UANIM   = UANIM   + ANIM(J)*TARGET
               VARANIM = VARANIM + ANIM(J)*TARGET*ANIM(J)*TARGET
            END IF
            IF (RET(J,I)  .LT. -1.0)  RHS(I) = 0.0
            AVE(I) = AVE(I) + RET(J,I)
            COV(I) = COV(I) + RET(J,I)*ANIM(J)*TARGET
20       CONTINUE
         IF (I .EQ. 1) THEN
            UANIM   = UANIM  / REAL(NSTAT)
            VARANIM = VARANIM/REAL(NSTAT)    - UANIM*UANIM
         END IF
         AVE(I) = AVE(I) / REAL(NSTAT)
         COV(I) = COV(I) / REAL(NSTAT)   - AVE(I) * UANIM
10    CONTINUE

RETURN

END
C                                                    END OF SUBROUTINE  COVAR
C *****************************************************************
C *******  CALCULATE  STARTING  POINT  ***********************************
      SUBROUTINE  STARTPT
C *****************************************************************
C *******  THIS SUBROUTINE  CALCULATES   A STARTING  POINT.
C *******  THE STARTING  POINT IS THEN USED FOR PARTIAL

INCLUDE  'COMMON.F'

WRITE(*,"('+',A50)")'IN     STARTPT  ...'

C *******  SET THE SLACK IN EACH CONSTRAINT  *************************
      DO 10 I = 1, ID
         SLK(I) = RHS(NUM+I)
10    CONTINUE
```

```
C ******* FIRST SORT THE COVARIANCES  *******************************
      DO 20 I = 1, NUM
        X(I)  = XLHS(I)
        XO(I) = XLHS(I)
        DO 25 K = 1, ID
          IF(CONS(K,I)    .EQ.  1.0)SLK(K)=SLK(K)-X(I)
25      CONTINUE
        DO 30 J = I+1, NUM
          IF (COV(LI(J))   .GT.  COV(LI(I)))   THEN
            LITEMP = LI(I)
            LI(I)  = LI(J)
            LI(J)  = LITEMP
          END IF
30      CONTINUE

20    CONTINUE

NBEST = 0

C          ********  NOW FILL THE X() VECTOR AND SWITCH THE LI() VECTOR

DO 40 J = 1, NUM
C ******* FILL  X(I)  IF NOT CONSTRAINED  *******************************

SLKMAX = RHS(LI(J))-XLHS(LI(J))
C ******* FIND THE TIGHTEST CONSTRAINT  *******************************
        DO 50 K = 1, ID
          IF (CONS(K,LI(J))   .EQ.  1.0)  THEN
            IF (SLK(K)   .LT.  SLKMAX)  THEN
              SLKMAX = SLK(K)
            END IF
          END IF
50      CONTINUE

C ******* SET THE VARIABLE  = TO THE MOST SLACK AVAILABLE  ************
        IF (SLKMAX   .LT.  0.00001)   GO TO 40
C ******* NOW REDUCE THE SLACK IN EACH CONSTRAINT  ******************
        DO 60 K = 1, ID
          IF (CONS(K,LI(J))   .EQ.  1.0)  THEN
            SLK(K)  = SLK(K)  - SLKMAX
          END IF
60      CONTINUE

NBEST    = NBEST + 1
        LITEMP   = LI(NBEST)
        LI(NBEST) = LI(J)
        LI(J)    = LITEMP

X(LI(NBEST))   = SLKMAX + X(LI(NBEST))
        XO(LI(NBEST))  = SLKMAX + X(LI(NBEST))

IF (SLK(1)   .LE.  0.00001)   RETURN
```

```
40      CONTINUE

RETURN
        END
C ********  END OF STARTPT  *********************************
C ********  CALCULATE  OBJECTIVE  FUNCTION  VALUE  ************************
        SUBROUTINE   CALCOBJ
C ***********************************************************************
C ********  THIS  SUBROUTINE  CALCULATES  OBJECTIVE  FUNCTION  VALUE  *******
        INCLUDE  'COMMON.F'

WRITE(*,"('+',A12)")'IN      CALCOBJ   ...'

PAVE    = 0.0
        VARPORT = 0.0
        COVPORT = 0.0

C ********                    FOR  MOVING  QUARTERLY  CALCULATIONS
        IF (IFLAG(4)  .EQ.  2) THEN
        DO 5 I = 3, NSTAT
           PRET(I)  = 0.0

DO 6 J = 1, NUM
              IF (X(J)  .GT.  0.0) THEN
                 PRET(I)  = PRET(I)  +
     &           X(J)*((1+RET(I,J))*(1+RET(I-1,J))*(1+RET(I-2,J))-1.)
              END IF
6          CONTINUE

PRET(I)  = PRET(I)  -
     &           ((1+ANIM(I))*(1+ANIM(I-1))*(1+ANIM(I-2))-1.)*TARGET
           PAVE    = PAVE    + PRET(I)/REAL(NSTAT-2)
           VARPORT = VARPORT + PRET(I)**2

5       CONTINUE

OBJ  = VARPORT  / REAL(NSTAT-2)   - PAVE**2  - PAVE*BULLET
        OBJS = OBJ
        END IF
C ********                              END IF FOR MOVING  QUARTERLY

C ********                              FOR MONTHLY  RETURNS
        IF (IFLAG(4)  .EQ.  1) THEN
        DO 10 I = 1, NSTAT
           PRET(I)  = 0.0

DO 20 J = 1, NUM
              IF (X(J)  .GT.  0.0) THEN
                 PRET(I)  = PRET(I)  + X(J)  * RET(I,J)
              END IF
20         CONTINUE
```

```
      PRET(I)  = PRET(I)   - ANIM(I)*TARGET
      PAVE   = PAVE  + PRET(I)/REAL(NSTAT)
      VARPORT  = VARPORT  + PRET(I)**2

10    CONTINUE

OBJ = VARPORT  / REAL(NSTAT)   - PAVE**2   - PAVE*BULLET
      OBJS  = OBJ
      END IF
C ********                          END IF FOR MONTHLY

C                   IF TURNOVER  IS A FACTOR  ADD IN ITS COST
      IF(TURN.GT.0)THEN
         DO 30 I = 1, NUM
            OBJ = OBJ + TURN*(  ((X(I)-OLDWT(I))**2    +1.0E-7)  **.5)
30       CONTINUE
      ENDIF

RETURN
      END
C ********  END OF CALCOBJ  **********************************

C ********  CALCULATE  PARTIAL  DERIVATIVES  ***************************
      SUBROUTINE   PARTIAL
C ****************************************************************
C ********  THIS SUBROUTINE  CALCULATES  PARTIALS  AT A POINT  **********
      INCLUDE  'COMMON.F'
      PARAMETER  ( EPS = 0.000001)

WRITE(*,"('+',A12)")'IN      PARTIAL   ...'
C ********  PARTIAL   W.R.T.  Xi = SUMj (Xj * COVi,j)).   BUT THIS =
C ********  COV(i,P)   WHERE   P IS THE PORTFOLIO  RETURN.
C ********  ==> CALCULATE  PORTFOLIO  RETURN - THEN CALC COVARIANCES

DO 10 I = 1, ID
         SLK(I)  = RHS(NUM+I)
         RC(I)   = -9999.
10    CONTINUE

IF (OBJ2 - OBJ .LE. 0.0001*EPS)   NTEST = -1

IF (NTEST .LE. 0) THEN
         NUMB = NUM
      ELSE
         NUMB = INT(1.1*REAL(NBEST))
         IF (NUMB .GT. NUM) NUMB = NUM
         IF (NTEST .GT. 8) NTEST = -1
      END IF

NTEST = NTEST + 1
```

```
      DO 20 I = 1, NUMB
         IF (X(LI(I))    .GT.  0.0) THEN
            DO 30 K = 1, ID
               IF (CONS(K,LI(I))    .EQ. 1.0) SLK(K) = SLK(K)  - X(LI(I))
30          CONTINUE
         END IF

PART(LI(I))    = 0.0
         RAVE = 0.0
C *******                                      IF MOVING  QUARTERLY  RETURNS
         IF (IFLAG(4)   .EQ.  2) THEN

DO 35 J = 3,NSTAT
         XRET=(1+RET(J,LI(I)))*(1+RET(J-1,LI(I)))*(1+RET(J-2,LI(I)))-1.
         XRET  = XRET-((1+ANIM(J))*(1+ANIM(J-1))*(1+ANIM(J-2))-1)*TARGET
         PART(LI(I))    = PART(LI(I))    + XRET*PRET(J)
         RAVE  = RAVE  + XRET/REAL(NSTAT-2)
35       CONTINUE

PART(LI(I))=2*(PART(LI(I))/REAL(NSTAT-2)-RAVE*PAVE)-RAVE*BULLET

END IF
C *******                                      END MOVING  QUARTERLY

C *******                                      IF MONTHLY  RETURNS
         IF (IFLAG(4)   .EQ.  1) THEN
         DO 40 J = 1,NSTAT
         PART(LI(I))=PART(LI(I))+(RET(J,LI(I))-ANIM(J)*TARGET)*PRET(J)
         RAVE  = RAVE  + (RET(J,LI(I))-ANIM(J)*TARGET)/REAL(NSTAT)
40       CONTINUE

PART(LI(I))=2.0*(PART(LI(I))/REAL(NSTAT)-RAVE*PAVE)-RAVE*BULLET

END IF
C *******                                      END MONTHLY
C                  IF TURNOVER   IS A FACTOR  ADD IN A COST
*******************
         IF(TURN  .GT.  0.0) THEN
            PARTURN  = TURN*(X(LI(I))-OLDWT(LI(I)))/
     &      ((X(LI(I))-OLDWT(LI(I)))**2+1.0E-7)**.5
            IF (OLDWT(LI(I))    .EQ. 0.0) PARTURN  = TURN
            PART(LI(I))    = PART(LI(I))    + PARTURN
         ENDIF
C              FIND WORST  PARTIAL  FOR A POSITIVE  WEIGHT  STOCK
************
         DO 50 K = 1, ID
            IF ( X(LI(I))    .GT.  EPS ) THEN
               IF(CONS(K,LI(I)).EQ.1.0.AND.PART(LI(I)).GT.RC(K))
     &            RC(K)=PART(LI(I))
            END IF
```

```
50         CONTINUE
20      CONTINUE

C *******   NOW  SORT  THE  PARTIALS  WITH  ZERO  WEIGHTS  *******************
        NBEST = 0
        DO 60 I = 1, NUMB

IBEST = 0
            DO 70 K = 1, ID
                IF (CONS(K,LI(I))    .EQ. 1.0 .AND.  SLK(K)   .LT. 100.*EPS)THEN
                    IF(PART(LI(I))   .GT.  RC(K))  IBEST = 1
                END IF
70          CONTINUE

IF (IBEST .EQ. 0) THEN
                NBEST    = NBEST + 1
                LITEMP   = LI(NBEST)
                LI(NBEST) = LI(I)
                LI(I)    = LITEMP
            END IF

60      CONTINUE

C *******   IF THIS IS A FULL PARTIAL  --> DO A FULL SORT  **************
C *********   HEAP  SORT  FOUND  ON  PAGE  233  OF  NUMERICAL   RECIPIES   ******
C       IF ( NTEST .EQ. 0) THEN
        WRITE(*,"('+',A12)")'IN      SORT_P  ...'
        LHEAP = NBEST/2 + 1
        IR = NBEST
110     CONTINUE
            IF(LHEAP.GT.1)THEN
                LHEAP = LHEAP - 1
                INDXT = LI(LHEAP)
                Q=PART(INDXT)
            ELSE
                INDXT = LI(IR)
                Q=PART(INDXT)
                LI(IR) = LI(1)
                IR = IR - 1
                IF(IR.EQ.1)   THEN
                    LI(1) = INDXT
                    GOTO 111
                ENDIF
            ENDIF
            IHEAP = LHEAP
            JHEAP = LHEAP + LHEAP
120         IF(JHEAP.LE.IR)THEN
                IF(JHEAP.LT.IR)THEN
                    IF(PART(LI(JHEAP)).LT.PART(LI(JHEAP+1)))JHEAP=JHEAP+1
                ENDIF
                IF(Q.LT.PART(LI(JHEAP)))THEN
```

```
                    LI(IHEAP)=LI(JHEAP)
                    IHEAP=JHEAP
                    JHEAP=JHEAP+JHEAP
                ELSE
                    JHEAP=IR+1
                ENDIF
                GOTO120
            ENDIF
            LI(IHEAP)=INDXT
         GOTO 110
111      CONTINUE
C        END IF
C ****************************************************************
         OBJ2 = OBJ
         RETURN
         END
C *******   END OF PARTIAL   **************************************
C *******   MOVE TO A NEW POINT BASED ON PARTIALS   ***************
         SUBROUTINE   MOVE_X
C ****************************************************************
C *******   THIS SUBROUTINE MOVES FROM CURRENT POINT TO NEW POINT  *****

INCLUDE 'COMMON.F'
         PARAMETER ( EPS = 0.000001)
         WRITE(*,"('+',A12)")'IN     MOVE_X  ...'

DISTMAX = DISTMAX * 1.05
         IF (DISTMAX .GT. 0.4) DISTMAX = 0.4
         DISTXI = 0.15 * DISTMAX

NMOVES = 0
         TOTDIST = DISTMAX
         PMAX = -9999.
C *******   BEGIN THE MOVE BY MOVING OUT OF WORST INTO BEST  ***********
         DO 10 I = 1, NBEST
            IF (RHS(LI(I))-X(LI(I))    .LT. EPS) GO TO 10
            IB = NBEST+1

5           IB = IB - 1
            IF ( IB .LE. I) GO TO 10

IF (PART(LI(IB))   .LE. PART(LI(I)))   GO TO 10

C *******   TEST PROXIMITY TO RHS AND TOTAL MOVEMENT  ******************
            IF (X(LI(IB))-XLHS(LI(IB))     .LT. EPS) GO TO 5
            IF (ABS(XO(LI(IB))-X(LI(IB)))    .GT. 0.5*DISTXI)   GO TO 5

C *******   TEST FOR CONSTRAINT PROXIMITY  *****************************
            SLKMAX = 1.0
            DO 20 K = 2, ID
               IF (CONS(K,LI(I)).EQ.1.0   .AND. CONS(K,LI(IB)).EQ.0.0)   THEN
                  IF (SLK(K).LT.EPS) GO TO 5
```

```
              IF (SLK(K).LT.SLKMAX   ) SLKMAX  = SLK(K)
           END IF
20      CONTINUE

C *****  FIND LARGEST MOVE POSSIBLE   ******************************
        DIST = DISTXI
        IF (DIST .LT. 0) WRITE(*,*)'1'

DP = (PART(LI(IB))    - PART(LI(I)))*10.
        IF (DP .LT. DIST) DIST = DP

IF (SLKMAX   .LT. DIST) DIST = SLKMAX

IF (X(LI(IB))-XLHS(LI(IB)).LT.DIST)DIST=X(LI(IB))-XLHS(LI(IB))

IF (RHS(LI(I))-X(LI(I)).LT.DIST)DIST=RHS(LI(I))-X(LI(I))
C *******         IF THE RUN CONSIDERS  TURNOVER  PREVENT  SWINGING  ******
        IF (TURN .GT. 0.0) THEN
           IF (XO(LI(I))   .LT. OLDWT(LI(I))   .AND.
     &   OLDWT(LI(I))-X(LI(I))       .LT. DIST  )DIST=OLDWT(LI(I))-X(LI(I))

IF (XO(LI(IB))   .GT. OLDWT(LI(IB))  .AND.
     &   X(LI(IB))-OLDWT(LI(IB))     .LT. DIST  )DIST=X(LI(IB))-OLDWT(LI(IB))

END IF

IF (DIST .LT. 0.0001*EPS)  GO TO 5

IF (DP .LT. 0.1*PMAX)  GO TO 5

IF (DP .GT. PMAX) PMAX = DP

C *******  CHANGE THE X VECTOR AND THE CONSTRAINTS  ******************
        X(LI(IB)) = X(LI(IB))  - DIST
        X(LI(I))  = X(LI(I))   + DIST

DO 30 K = 1, ID
           IF (CONS(K,LI(IB))    .EQ. 1.0 ) SLK(K) = SLK(K) + DIST
           IF (CONS(K,LI(I))     .EQ. 1.0 ) SLK(K) = SLK(K) - DIST
           IF (SLK(K)    .LT. EPS) SLK(K) = 0.0
30      CONTINUE

C *******  TEST FOR TOTAL MOVE EXCEEDING  DISTMAX  ********************
        NMOVES = NMOVES + 1
        TOTDIST = TOTDIST - DIST
        IF (TOTDIST  .LT. 0.0 .OR. NMOVES .GE. 15) GO TO 99

C *******  IF THE WORST VARIABLE  STILL HAS SLACK, REDUCE IT **********
        IF (ABS(XO(LI(I))-X(LI(I)))   .LT. 0.5*DISTXI  ) GO TO 5

10      CONTINUE
```

```
99      CONTINUE

DO 50 I = 1, NBEST

IF (RHS(LI(I))-X(LI(I))      .LT. EPS) X(LI(I))    = RHS(LI(I))
            IF (X(LI(I))-XLHS(LI(I)).LT.0.01*EPS)X(LI(I))=XLHS(LI(I))

50      CONTINUE

RETURN
        END
C *******   END OF MOVE_X   *******************************************
C **********OUTLIER   REMOVAL  COVARIANCE   CALCULATION   SUBROUTINE  *******
        SUBROUTINE   COVAI
C *********************************************************************

INCLUDE  'COMMON.F'

WRITE(*,"('+',A50)")'IN      COVAI  ...'
C                 NUM  = NSTOCKS+NBONDS
C *******   INITIALIZE   LI(I),   CALC  AVE(I),   CALC  COV(I)   ****************
        /
        OPEN(13,FILE='TEMP.PRN',STATUS='UNKNOWN')

DO 10 I = 1, NUM

LI(I)   = I
            UANIM   = 0.0
            VARANIM = 0.0
            AVE(I)  = 0.0
            COV(I)  = 0.0

DO 40 K = 1, NSTAT
                DO 50 L = 1, NSTAT
                    DO 20 J = 1, NSTAT
                        IF (RET(J,I)   .LT. -1.0) RHS(I)  = 0.0
                        IF(J.EQ.K.OR.J.EQ.L)GOTO    20
                        UANIM   = UANIM  + ANIM(J)*TARGET
                        VARANIM = VARANIM + ANIM(J)*TARGET*ANIM(J)*TARGET
                        AVE(I)  = AVE(I)  + RET(J,I)
                        COV(I)  = COV(I)  + RET(J,I)*ANIM(J)*TARGET
20                  CONTINUE

UANIM   = UANIM  / (REAL(NSTAT)-2.)
                    VARANIM = VARANIM/(REAL(NSTAT)-2.)        - UANIM*UANIM

AVE(I)  = AVE(I)  / (REAL(NSTAT)-2.)
                    COV(I)  = COV(I)  / (REAL(NSTAT)-2.)     - AVE(I)  * UANIM
C                       CREATE   VECTOR   OF COVARIANCES
                    VCOV(I,K)=COV(I)
                    WRITE(*,*)'  K L HELD OUT AND COV(I)',K,L,COV(I)
```

```
              WRITE(13,*)I,COV(I)
50        CONTINUE
40     CONTINUE
10   CONTINUE
     CLOSE(13)
     RETURN

END
C                                            END OF SUBROUTINE   COVAI
C **********************************************************************
  **********************************************************************
       SUBROUTINE   HOLDING
  **********************************************************************

INCLUDE  'COMMON.F'

CHARACTER*9    SYMBL
       CHARACTER*30   GARB2,WTFILE

C                       RESET  OLD  WEIGHTS  TO  0

DO 234  I=1,NUM
          OLDWT(I)=0.0
234    CONTINUE

C           ******IF  THIS  IS  A  SINGLE  RUN  READ  WEIGHT  FILE  SPECIFIED

IF(IFLAG(1).EQ.1)THEN
999       WRITE(*,*)'   ENTER  FILENAME  CONTAINING  PORT.  WTS
       &   (i.e.  \WGT\AOSUP.WGT)'
          READ(*,'(A30)')WTFILE
          OPEN  (11,FILE  = WTFILE,STATUS   = 'OLD',ERR=999)
          READ(11,*,   END  = 888)SYMBL,VALUE
          WRITE(*,*)'                                                   '
          WRITE(*,*)'   SPAN.WGT  CONTAINS  PORTFOLIO  # ',VALUE
          WRITE(*,*)'                                                   '
          READ(11,*,END   = 888)GARB
          I = 0

DO 888  L = 1,500
             READ(11,*,   END  = 888)SYMBL,VALUE
             I = I + 1
             IDCSYM(I)   = SYMBL
             VAL(I)   = VALUE
888       CONTINUE

NIDC  = I
          ICASH = 0
          PORTVAL  = 0.

DO 10  I=1,NIDC
```

```
                    PORTVAL  =  PORTVAL  + VAL(I)
                    IF (IDCSYM(I)   .EQ.  'CASH')THEN
                        ICASH  = 1
                        TEMP   = VAL(I)
                        VAL(I) = VAL(1)
                        VAL(1) = TEMP
                        GARB   = IDCSYM(I)
                        IDCSYM(I) = IDCSYM(1)
                        IDCSYM(1) = GARB
                    ENDIF
10              CONTINUE
                PRTVALS=PORTVAL

IF (ICASH  .EQ.  0) THEN
                    WRITE(*,*)'NO   CASH  INCLUDED....PROGRAM    STOPPING'
                    STOP
                ENDIF

IDCTEST = 0
                NCOUNT  = 0
                DO 20 I = 2,NIDC
                    ITEST = 0
                    DO 30 J = 1,NUM
                        IF(IDC(J)(1:4)   .EQ.  IDCSYM(I))   THEN
                            ITEST = 1
                            NCOUNT = NCOUNT+1
                            OLDWT(J) = VAL(I)  / PORTVAL
                        ENDIF
30                  CONTINUE
                    IF (ITEST  .EQ.  0) THEN
                        IDCTEST = 1
                        WRITE(*,*)IDCSYM(I),':SYMBL     NOT  INCL  IN  RET  FILE'
                    ENDIF
20              CONTINUE

IF (IDCTEST.EQ.1)    THEN
                    WRITE(*,*)NIDC-NCOUNT-1,'SYMLS     NT FOUND.PROG   CONTINUING'
                ENDIF
                CLOSE(11)
C       *******************   IF MULTI  RUN  (STD)  READ  WTS  FRO  LST  RUN *****

ELSEIF(IFLAG(1).EQ.2)THEN
C           IF(ISKIP.GT.1)THEN
            IF(ISKIP.GE.1)THEN
                OPEN(11,FILE  = OLDFILE,STATUS   = 'OLD')
101             READ(11,102)GARB2
102             FORMAT(A25)
                IF(GARB2.EQ.'           TOTAL   FORCED   SELLS')THEN
                    READ(11,105)GARB2
                    READ(11,103)IOLDST
C                   WRITE(*,*)'   NUMBER  OF  OLDSTK  WTS ',IOLDST
103                 FORMAT(27X,I7)
```

```
105         FORMAT(A)
            GOTO 104
      ELSE
            GOTO 101
      ENDIF
104   REWIND(11)
      DO 90 I=1,10
          READ(11,'(A1)')GARB
90    CONTINUE
      DO 109 I=1,NMAX
          VAL(I)=0.0
          IDCSYM(I)='    '
109   CONTINUE
      NCOUNT=0
      DO 91 I=1,NMAX
          READ(11,92)ITEMP,TEMP1,VAL(ITEMP),TEMP2,ITEMP2,
     &                IDCSYM(ITEMP)
          IF(TEMP1.GT.0.0001)THEN
              NCOUNT=NCOUNT+1
              VAL(NCOUNT)=VAL(ITEMP)/100.0
              IDCSYM(NCOUNT)=IDCSYM(ITEMP)
              IF(NCOUNT.EQ.IOLDST)GOTO       93
          ENDIF
92        FORMAT(I5,F7.3,F6.3,F7.3,I4,1X,A5)
91    CONTINUE
93    CLOSE(11)

IDCTEST = 0
      NCOUNT  = 0
      VALTURN = 0.0
      OLDTOT=0.0

DO 21 I = 1,IOLDST
          ITEST = 0
          DO 31 J = 1,NUM
              IF(IDC(J)(1:4)   .EQ. IDCSYM(I))  THEN
                  ITEST = 1
                  OLDWT(J) = VAL(I)
                  OLDTOT=OLDTOT+OLDWT(J)
C                 WRITE(*,*)'  SYMBOL  FOUND  ',IDCSYM(I),OLDWT(J)
              ENDIF
31        CONTINUE
          IF (ITEST.EQ.0)   THEN
              IDCTEST = 1
              VALTURN=VALTURN+VAL(I)
              OLDTOT=OLDTOT+VAL(I)
C             WRITE(*,*)'  SYMBOL  NOT FOUND',IDCSYM(I),VAL(I)
              NCOUNT = NCOUNT+1
C                     FILL TOP OF IDCSYM()&VAL  TO PRINT OUT IN TRADE
              IDCSYM(NCOUNT)=IDCSYM(I)
              VAL(NCOUNT)=VAL(I)
C             WRITE(*,*)IDCSYM(I),':SYMBL    NOT INCL IN RET FILE'
```

```
              ENDIF
21       CONTINUE

IF(OLDTOT.LT..99)THEN
             WRITE(*,*)'    WARNING  OLDWTS  TOTAL  < .99, CONTINUING   '
             WRITE(*,*)'    OLDTOT  = ',OLDTOT
         ELSEIF(OLDTOT.GT.1.01)THEN
             WRITE(*,*)'    WARNING  OLDWTS  TOTAL  > 1.01, CONTINUING   '
             WRITE(*,*)'    OLDTOT  = ',OLDTOT
         ENDIF

NGONE=NCOUNT
         IF (IDCTEST.EQ.1)    THEN
             WRITE(*,*)'   A TOTAL  OF ',VALTURN*100.0,    ' % OF PORT SOLD'
             WRITE(*,*)NGONE,'SYMLS    NOT FOUND, PROGRAM CONTINUING'
         ENDIF
C                                    IF THE 1ST TIME THROUGHT  SET OLDWT()=0
       ELSEIF(ISKIP.EQ.1)THEN
           DO 98 I=1,NUM
              OLDWT(I)=0.0
 98        CONTINUE
       ENDIF

C                   ********   IF MULTI RUN (&OLD) READ WTS FRO OLD.
       ELSEIF(IFLAG(1).EQ.3)THEN
C          OPEN(21,FILE  = 'OLD',STATUS  = 'OLD')
           DO 94 I = 1,NUM
C              READ(21,*)OLDWT(I)
C              IF (TURN.EQ.   0.0)OLDWT(I)=0.0
C                  THIS  NEXT  LINE  ADDED  4/18/89
               OLDWT(I)=0.0
C              OLDWT(I)   = OLDWT(I)/100.
 94        CONTINUE
C          CLOSE(21)
       ENDIF

RETURN

END

C ****************       END OF SUBROUTINE    HOLDING        **************
```

APPENDIX V

REINVESTMENT OF AVAILABLE CASH
BEGINNING FROM CURRENT
PORTFOLIO HOLDINGS

IMPROVED SYTEM ANALYSIS: RE-INVEST DIVIDEND FLOWS
SIMULATION RESULTS

EXAMPLE RUN

LIABILITY STREAM USED:    EXAMPLE LIABILITY

| NUMBER | START WGHT | END WGHT | SPAN SENSIT | SIC | IDC | TICK | SECURITY NAME |
|---|---|---|---|---|---|---|---|
| 45  | 3.475 | 3.475 | 1.024 | 27 | GEN  | GTE  | GTE CORP  COM |
| 62  | 1.693 | 1.693 | 1.088 | 48 | SBCA | SBC  | SOUTHWESTERN BELL CORP  COM |
| 74  | 2.196 | 2.196 | 1.194 | 37 | BA   | BA   | BOEING CO  COM |
| 82  | 3.508 | 3.508 | 1.021 | 20 | K    | K    | KELLOGG CO  COM |
| 136 | 0.031 | 0.031 | 1.052 | 56 | LINT | LTD  | LIMITED INC  COM |
| 194 | 0.041 | 0.041 | 1.038 | 34 | MAS  | MAS  | MASCO CORP  COM |
| 231 | 1.475 | 1.475 | 0.702 | 67 | FBG1 | ONE  | BANC ONE CORP  COM |
| 243 | 2.680 | 2.680 | 1.295 | 29 | PZL  | PZL  | PENNZOIL CO  COM |
| 252 | 2.410 | 2.410 | 0.883 | 49 | DTE  | DTE  | DETROIT EDISON CO  COM |
| 260 | 1.204 | 1.204 | 0.926 | 49 | BGE  | BGE  | BALTIMORE GAS & ELEC CO  COM |
| 261 | 2.835 | 2.835 | 1.069 | 61 | FUN  | FTU  | FIRST UN CORP  COM  NASD BK INS |
| 262 | 0.529 | 0.529 | 1.276 | 29 | ASH  | ASH  | ASHLAND OIL INC  COM |
| 263 | 1.546 | 1.546 | 1.030 | 26 | W    | W    | WESTVACO CORP  COM |
| 264 | 1.399 | 1.399 | 0.973 | 49 | WPC  | WEC  | WISCONSIN ENERGY CORP  COM |
| 265 | 1.558 | 1.558 | 0.773 | 60 | AHN  | AHM  | AHMANSON H F & CO  COM |
| 266 | 2.761 | 2.761 | 1.043 | 12 | PEL  | PEL  | PANHANDLE EASTN CORP  COM |
| 267 | 2.690 | 2.690 | 0.887 | 49 | IPC  | IPC  | ILLINOIS POWER CO  COM |
| 268 | 2.726 | 2.726 | 0.831 | 67 | NES  | NES  | NEW ENGLAND ELEC SYS  COM |
| 269 | 0.563 | 0.563 | 0.957 | 49 | TSG  | TEP  | TUCSON ELEC PWR CO  COM |
| 270 | 1.142 | 1.142 | 1.068 | 7  | IFLH | IFL  | IMC FERTILIZER GROUP INC  COM |
| 271 | 1.187 | 1.187 | 1.070 | 75 | AGNC | AGNC | AGENCY RENT A CAR  COM  NASD INDL |
| 272 | 0.819 | 0.819 | 0.897 | 49 | ATA  | ATG  | ATLANTA GAS LT CO  COM |
| 273 | 2.698 | 2.698 | 1.082 | 30 | BDG  | BDG  | BANDAG INC  COM |
| 274 | 0.451 | 0.451 | 1.349 | 32 | BALL | BLL  | BALL CORP  COM |
| 275 | 2.909 | 2.909 | 0.882 | 49 | BSE  | BSE  | BOSTON EDISON CO  COM |
| 276 | 1.155 | 1.155 | 0.909 | 67 | CALH | CAL  | CALFED INC  COM |
| 277 | 1.700 | 1.700 | 1.058 | 73 | CMCS | CMCS | COMCAST CORP  CL A  NASD INDL |
| 278 | 2.093 | 2.093 | 1.678 | 35 | LANS | COMS | 3COM CORP  COM  NASD INDL |
| 279 | 1.190 | 1.190 | 1.131 | 67 | FPA  | FPA  | FIRST PA CORP  COM |
| 280 | 3.346 | 3.346 | 0.754 | 67 | HCP  | HCP  | HEALTH CARE PPTY INVS INC  COM REIT |
| 281 | 2.418 | 2.418 | 1.036 | 8  | IPT  | IPT  | IP TIMBERLAND LTD  DEP UNIT CL A |
| 282 | 2.442 | 2.442 | 1.044 | 27 | HJH  | JH   | HARLAND JOHN H CO  COM |
| 283 | 0.182 | 0.182 | 0.935 | 49 | KAN  | KAN  | KANSAS PWR & LT CO  COM |
| 284 | 2.694 | 2.694 | 0.896 | 65 | KOG  | KOG  | KOGER PPTYS INC  COM           REI |
| 285 | 0.535 | 0.535 | 1.152 | 20 | LNE  | LNCE | LANCE INC  COM  NASD INDL |
| 286 | 3.172 | 3.172 | 0.885 | 52 | LCI  | LOW  | LOWES COS INC  COM |
| 287 | 3.207 | 3.207 | 0.895 | 45 | SAR1 | LUV  | SOUTHWEST AIRLS CO  COM |
| 288 | 3.000 | 3.000 | 0.967 | 67 | MTRV | MT   | MEDITRUST  SH BEN INT |
| 289 | 1.238 | 1.238 | 0.904 | 49 | IPS  | MWE  | MIDWEST ENERGY CO  COM |
| 290 | 3.005 | 3.005 | 1.184 | 36 | NPK  | NPK  | NATIONAL PRESTO INDS INC  COM |
| 291 | 2.755 | 2.755 | 0.994 | 67 | RCPA | RCP  | ROCKEFELLER CTR PPTYS INC  COM REIT |
| 292 | 0.846 | 0.846 | 1.181 | 23 | RML  | RML  | RUSSELL CORP  COM |
| 293 | 1.158 | 1.158 | 1.157 | 38 | SEFC | SEED | DEKALB GENETICS CORP CL B NASD INDL |
| 294 | 1.256 | 1.256 | 0.889 | 49 | SIG  | SIG  | SOUTHERN IND GAS & ELEC CO  COM |

```
295  2.372 2.372  1.035  73 SMED SMED SHARED MED SYS CORP      COM  NASD INDL
296  1.889 1.889  1.086  38 MFS  STR  QUESTAR CORP   COM
297  2.299 2.299  1.353   1 TEJN TRC  TEJON RANCH CO DEL   COM
298  3.629 3.629  1.138  80 USHC USHC U S HEALTHCARE INC   COM  NASD INDL
299  3.406 3.406  1.061  38 USSC USS  UNITED STATES SURGICAL CORP   COM
300  1.375 1.375  0.947  49 WGL  WGL  WASHINGTON GAS LT CO   COM
301  1.844 1.844  0.995  67 WRE  WRE  WASHINGTON REAL ESTATE INVT TR   SH
302  1.262 1.262  0.930  49 MFR5 MCN  MCN CORP   COM
```

MINIMUM STD DEV =   18.8463   EXPECTED RETURN =   17.6218

TRACKER OUTPUT FILE

MONTH      LIA       PORT       DIF

CUMMULATIVE VALUES OF LIABILITIES AND ASSETS

MONTH    LIABILTIES     PORTFOLIO

115      -0.005        0.049

********    STATISTICAL SUMMARY   ********

STATISTICS BASED ON MONTHS  116 THROUGH 115

| | | | |
|---|---|---|---|
| ALPHA | 0.000000 | ANNUAL | 0.00 % |
| BETA | 0.000000 | | |
| STD ERR | 0.000000 | | 0.00 % |
| CORRELATION | 0.000000 | | |
| R-SQUARED | 0.000000 | | 0.00 % |

ANNUAL RETURNS:       MEAN        STD DEV

LIABILITY       0.00 %      0.00 %
   PORTFOLIO       0.00 %      0.00 %
   DIFFERENCE     0.00 %      0.00 %

PARAMETERS FOR THIS RUN WERE:

```
 1) SPANNING RUN TITLE        AOS 7/28/89 RUN
 2) OUTPUT FILENAME           temp.nlb
 3) LIABILITY STREAM FILE     \LIR\AOS725.LIR
 4) STOCK RETURN FILE         \RET\AOSUP.RET
 5) BOND RETURN FILE          \RET\BONDS.PRN
 6) WEIGHT FILE               \WGT\159.WGT
 7) MONTH SIMULATION BEGINS      8908
 8) NUMBER OF MONTHS SIMULATED      0
 9) NUMBER OF STOCKS             302
10) NUMBER OF BONDS                0
11) MINIMUM STOCK HOLDING    % 100.00
12) MAXIMUM INDUSTRY HOLDING %  19.00
```

13) MAXIMUM STOCK HOLDING   %        3.00
14) NSTAT                           24
15) NRETS                           24
16) BULLET                           0.00
17) TARGET                           2.00
18) TURNOVER FACTOR                  4.00
19) MAX DAYS VOLUME                  2.00
20) PORTFOLIO VAL (89 MM)           26.00
21) MAX % STK MKT CAP                3.00
22) MIN MKT CAP (89 MM)           2500.00
23) MAX MKT CAP (89 MM)        1000000.00
24) SINGLE                           1
25) 1 WAY BUY                        1
26) SPAN                             1
27) MONTHLY                          1
28) FULL COVARIANCE                  1
29) FORMATTED FILES                  1
30) STATUS IS OK                     1
31) +WTS OUTPUT ONLY                 2
32) STOCKS TO SCREEN                 1

PORTFOLIO CONSTRUCTED UPON THE FOLLOWING DATA:

| MONTH | LIA | PORT | DIF |
|---|---|---|---|
| 92 | -0.0235312600 | 0.0048044603 | 0.0283357203 |
| 93 | -0.0556954108 | -0.0405714661 | 0.0151239447 |
| 94 | 0.0943555534 | -0.1450983137 | -0.2394538671 |
| 95 | 0.0001456921 | -0.0072849635 | -0.0074306554 |
| 96 | 0.0178604499 | 0.0324543230 | 0.0145938732 |
| 97 | 0.0754733980 | 0.0913652703 | 0.0158918723 |
| 98 | 0.0176621992 | 0.0246764552 | 0.0070142560 |
| 99 | -0.0450356193 | -0.0050582327 | 0.0399773866 |
| 100 | -0.0287487004 | -0.0243650582 | 0.0043836422 |
| 101 | -0.0128774298 | 0.0054894658 | 0.0183668956 |
| 102 | 0.0561982282 | 0.0558000170 | -0.0003982112 |
| 103 | -0.0344604515 | -0.0200813692 | 0.0143790822 |
| 104 | -0.0011062390 | 0.0000485850 | 0.0011548240 |
| 105 | 0.0447797514 | 0.0430007204 | -0.0017790310 |
| 106 | 0.0371330716 | 0.0263595097 | -0.0107735619 |
| 107 | -0.0318946689 | -0.0176053215 | 0.0142893475 |
| 108 | 0.0158855300 | 0.0229464527 | 0.0070609227 |
| 109 | 0.0271665901 | 0.0407870896 | 0.0136204995 |
| 110 | -0.0267152898 | 0.0007467365 | 0.0274620261 |
| 111 | 0.0109503297 | 0.0284809042 | 0.0175305754 |
| 112 | 0.0262673292 | 0.0394087993 | 0.0131414700 |
| 113 | 0.0461410806 | 0.0458422191 | -0.0002988614 |
| 114 | 0.0783677101 | 0.0054350942 | -0.0729326159 |
| 115 | -0.0048000002 | 0.0486113280 | 0.0534113273 |

TURNOVER =      0.91  %

TOTAL PURCHASE =    1.83  %

```
             TOTAL OPTIONAL SALES =    0.00 %
              TOTAL FORCED SELLS =    0.00 %

# OF STOCKS IN PORTFOLIO =    52
                 NUMBER OF BUYS =    14
                NUMBER OF SELLS =     0

VARIANCE AT  OLD  WEIGHTS =   18.63 %
      VARIANCE AT  NEW  WEIGHTS =   18.85 %
       OBJ FUNCTION IMPROVEMENT =   -1.15 %

THIS YRS PORTFOLIO VALU = $      28062494.00
         1989 EQUIVALENT VALUE = $      28062494.00

***    BUY    ***
 ********************************************************************
   **  WEIGHTS  **  SPAN  SIC  SYMBOL   SHARES   PRICE  DAYS   SECURITY
   OLD  NEW  DELTA SENS CODE  IDC TICK   (00)    ($)    VOL     NAME
 ********************************************************************
   2.88 2.91 0.03 8.821  49 BSE  BSE      4.    17.000  0.0 BOSTON EDISON CO
   2.39 2.41 0.02 8.828  49 DTE  DTE      2.    21.125  0.0 DETROIT EDISON CO
   1.57 2.69 1.12 8.873  49 IPC  IPC    189.    16.625 00.0 ILLINOIS POWER CO
   0.00 0.04 0.0410.377  34 MAS  MAS      4.    30.125  0.0 MASCO CORP   COM
   2.74 2.76 0.0210.431  12 PEL  PEL      2.    27.750  0.0 PANHANDLE EASTN CO
   0.00 0.03 0.0310.521  56 LINT LTD      3.    34.875  0.0 LIMITED INC  COM
   1.66 1.70 0.0410.579  73 CMCS CMCS     4.    25.625  0.0 COMCAST CORP CL A
   1.13 1.14 0.0210.676   7 IFLH IFL      1.    35.125  0.0 IMC FERTILIZER GRO
   1.39 1.89 0.5010.860  38 MFS  STR     37.    37.500  0.3 QUESTAR CORP COM
                          TOTAL BUY $       512213.

***   SELL   ***
 ********************************************************************
   **  WEIGHTS  **  SPAN  SIC  SYMBOL   SHARES   PRICE  DAYS   SECURITY
   OLD  NEW  DELTA SENS CODE  IDC TICK   (00)    ($)    VOL     NAME
 ********************************************************************

TOTAL SELL $         00.
                         NET BUY  = $      512213.

***  INDUSTRY WEIGHTINGS ***
 ********************************************************************
      CODE          INDUSTRY              WEIGHT
 ********************************************************************
        1    AGRICULTURAL PRODUCTION-CROPS    2.30 %
        7    AGRICULTURAL SERVICES            1.14 %
        8    FORESTRY                         2.42 %
       12    BITUMINOUS COAL & LIGNITE MIN.   2.76 %
       20    FOOD KINDRED PRODUCTS            4.04 %
       23    APP. & OTH. FIN. PROD. MFFAOSM   0.85 %
       26    PAPER AND ALLIED PRODUCTS        1.55 %
       27    PRINTING PUBLISHING AND A.P.     5.92 %
```

| | | |
|---|---|---|
| 29 | PETROLEUM REFIN. & REL. PROD. | 3.21 % |
| 30 | RUBBER AND MISC. PLAST. PROD. | 2.70 % |
| 32 | STONE CLAY GLASS & CONC. PROD. | 0.45 % |
| 35 | MACHINERY EXCEPT ELECTRICAL | 2.09 % |
| 36 | ELE. AND ELE. MACH. | 3.00 % |
| 37 | TRANSPORTATIONS EQUIPMENT | 2.20 % |
| 38 | MEAS. ANAL. & CONT. INST. ETC. | 6.45 % |
| 45 | TRANSPORTATION BY AIR | 3.21 % |
| 48 | COMMUNICATION | 1.69 % |
| 49 | ELECTRIC GAS AND SANIT. SERV. | 17.31 % |
| 52 | BUILDING MAT. HARD. GAR. SUPP. | 3.17 % |
| 60 | BANKING | 1.56 % |
| 61 | CRED. AGEN. OTH. THAN BANKS. | 2.83 % |
| 65 | REAL ESTATE | 2.69 % |
| 67 | HOLD. AND OTHER INV. COMP. | 17.49 % |
| 73 | BUSINESS SERVICES | 4.07 % |
| 75 | AUTO. REPAIR SERV. AND GAR. | 1.19 % |
| 80 | HEALTH SERVICES | 3.63 % |
| | TOTAL = | 99.99 % |

APPENDIX VI

EXAMPLE ILLUSTRATING DISTINCTIONS BETWEEN
CURRENT SYSTEM AND PRIOR ART

To illustrate the current system's approach to solving an appropriate problem, a simple example is outlined to point out distinctions and improvements over prior art. The example problem objective function is to find the minimum variance portfolio relative to a standard financial target. The constraints are that the sum of the security weights must be 1.0 and the lower bound of 0.0 on each security. This example will illustrate the extraction of a search direction and outline the optimization process.

Beginning with a series of eight returns for three securities, $x1$, $x2$, and $x3$, the average returns are calculated for each security. The eight returns represent monthly total returns less the return on a standard financial target for each of the securities in this simple example.

Net Security Returns After Subtracting Target Returns

| Period | x1 | x2 | x3 |
|---|---|---|---|
| 1 | 0.8 | 0.7 | 0.4 |
| 2 | 0.7 | 0.8 | 0.7 |
| 3 | 0.6 | 0.1 | 0.2 |
| 4 | 0.4 | 0.6 | 0.6 |
| 5 | 0.1 | 0.3 | 0.8 |
| 6 | 0.2 | 0.4 | 0.5 |
| 7 | 0.5 | 0.5 | 0.1 |
| 8 | 0.3 | 0.2 | 0.3 |
| Average | x1 | x2 | x3 |
|  | 0.45 | 0.45 | 0.45 |

Prior methods have required the calculation of a covariance matrix from the return series. Here the covariance matrix is calculated to illustrate the advantage of the current system. The covariance cells evaluated by the standard definition and the cells in the matrix are filled. These calculations produce the following array:

Covariance Matrix

|    | x1     | x2     | x3     |
|----|--------|--------|--------|
| x1 | 0.0525 | 0.0275 | -.0162 |
| x2 | 0.0275 | 0.0525 | 0.0188 |
| x3 | -.0162 | 0.0188 | 0.0525 |

The prior methodology calculates the partial derivative by summing the weights times the entries in each row and multiplying the total by 2. The partial derivative can be calculated for x2 at the current point in the following manner:

$$\text{Partial}(x2) = 2 * (0.3*0.0275 + 0.5*0.0525 + 0.2*0.0188)$$
$$= \underline{0.0765}$$

The current system calculates the partial derivative by finding the portfolio returns at the current weights for the 8 periods and then finding the covariance of x2 with the portfolio. The return in period(1) on the portfolio is:

$$\text{Portfolio return}(1) = 0.3*0.8 + 0.5*0.7 + 0.2*0.4$$
$$= \underline{0.67}$$

The other returns for periods 2 though 7 are calculated for the portfolio. Then covariance between x2 and the portfolio is simply calculated in the standard way. The result is the partial derivative of x2:

$$\text{Covariance (portfolio, x2)} = 0.0765$$

This result is identically the same as extracting the partial derivative from the full covariance matrix. However, fewer calculations are required and less computer memory is needed to obtain the partial derivatives. Mathematically, the results prove to be exactly the same.

Once the partial derivatives have been extracted for each of the variables, it is a simple matter to search for a better solution using the partials to indicate a direction which improves the objective function. The simple process of letting the partial derivatives guide a search, recalculating the partials at the new solution, and searching again, leads quickly to an optimal solution. The search proceeds downhill until the objective function can no longer improve. This is the optimal solution.

In summary, the current system requires fewer calculations to determine an optimal point and therefore can solves problems in much less time. The current system also requires much less computer memory and therefore can solve much larger problem. By analyzing more securities at once, a better solution can be achieved.

What is claimed is:

1. A computer for managing a pension plan's portfolio of assets, comprising:
   computer hardware means for ascertaining a standard actuarial index in terms of characteristic future cash payments discounted to present value based on a range for at least one of discount rate values and wage inflation values;
   computer hardware means for ascertaining the past behavior of current pension plan liabilities projected backwards in time;
   computer hardware means for determining a particular portfolio of equity stocks having an optimized combination of risk and financial return for tracking said standard actuarial index;
   said computer hardware means for determining a particular portfolio of equity stocks having:
   (a) means for performing computer programming commands for selecting a starting portfolio of equity stocks;
   (b) means for performing computer programming commands for making a plurality of incremental changes in weight percentages of at least some of said starting portfolio of equity stocks;
   (c) means for performing computer programming commands for determining a correlation of the past behavior of said pension plan liabilities with said financial return of said incrementally changed portfolio of equity stocks over the same time period as said past pension plan liabilities; and
   (d) means for performing computer programming commands for reaccessing (b) and (c) until reaching said particular portfolio of assets having said optimized correlation with said standard index.

2. Apparatus for providing an optimal portfolio of equity stocks for insurance plan management, said apparatus comprising:
   computer means and memory means coupled to said computer means for storing information for use by said computer means;
   said computer means having:
   (a) means for ascertaining a standard actuarial index in terms of characteristic future cash payments discounted to present value based on a range for at least one of discount rate values and wage inflation values;
   (b) means for ascertaining the past behavior of current pension plan liabilities projected backwards in time;
   (c) means for determining a particular portfolio of equity stocks having an optimized combination of risk and financial return for tracking said standard actuarial index including:
     (1) means for selecting a starting portfolio of equity stocks;
     (2) means for making a plurality of incremental changes in weight percentages of at least some of said starting portfolio of equity stocks;
     (3) means for determining a correlation of the past behavior of said insurance plan liabilities with said financial return of said incrementally changed portfolio of equity stocks over the same time period as said past insurance plan liabilities; and
     (4) means for reaccessing (2) and (3) until reaching said particular portfolio of assets having said optimized correlation with said standard index.

3. Apparatus for providing an optimal portfolio of equity stocks for pension plan management, said apparatus comprising:
   computer means for performing electrical signal processing and memory means coupled to said computer means for storing information for use by said computer means;
   said computer means being programmed to generate electrical signals including:
   (a) electrical signals characteristic of a standard actuarial index in terms of characteristic future cash payments discounted to present value based on a range for at least one of discount rate values and wage inflation values;
   (b) electrical signals characteristic of the past behavior of current pension plan liabilities projected backwards in time;
   (c) electrical signals characteristic of a particular portfolio of equity stocks having an optimized combination of risk and financial return for tracking said standard actuarial index by electrical computer control command means having:
     (1) means for selecting a starting portfolio of equity stocks;
     (2) means for making a plurality of incremental changes in weight percentages of at least some of said starting portfolio of equity stocks;
     (3) means for determining a correlation of the past behavior of said pension plan liabilities with said financial return of said incrementally changed portfolio of equity stocks over the same time period as said past pension plan liabilities; and
     (4) means for reaccessing (2) and (3) until reaching said particular portfolio of assets having said optimized correlation with said standard index, resulting in a set of electrical signals characteristic of said portfolio of assets.

4. A computer for managing an insurance plan's portfolio of assets, comprising:
   computer hardware means for ascertaining a standard actuarial index in terms of characteristic future cash payments discounted to present value based on a range for at least one of discount rate values and wage inflation values;
   computer hardware means for ascertaining the past behavior of current insurance plan liabilities projected backwards in time;
   computer hardware means for determining a particular portfolio of equity stocks having an optimized combination of risk and financial return for tracking said standard actuarial index;
   said computer hardware means for determining a particular portfolio of equity stocks by accessing electronic signal processing components having:
   (a) means for performing computer programming commands for selecting a starting portfolio of equity stocks with said commands implemented through electronic signals in said computer hardware means;
   (b) means for performing computer programming commands for making a plurality of incremental changes in weight percentages of at least some of said starting portfolio of equity stocks;
   (c) means for performing computer programming commands for determining a correlation of the past behavior of said insurance plan liabilities with said financial return of said incrementally changed portfolio of equity stocks over the same time period as said past insurance plan liabilities; and
   (d) means for performing computer programming commands for reaccessing (b) and (c) until reaching said particular portfolio of assets having said optimized correlation with said standard index.

5. A computer for managing a pension plan's portfolio of assets, comprising:

computer hardware means for numeric processing of electrical signals;

said numeric processing being performed by manipulation and recognition of said electrical signals having two voltage levels characteristic of binary computer processing;

said numeric processing of said electrical signals performed by said computer hardware means having:
(a) means for operating on input data ascertaining a standard actuarial index in terms of characteristic future cash payments discounted to present value based on a range for at least one of discount rate values and wage inflation values;
(b) means for ascertaining by use of input data the past behavior of current pension plan liabilities projected backwards in time;
(c) means for determining a particular portfolio of equity stocks having an optimized combination of risk and financial return for tracking said standard actuarial index by carrying out a computer program comprised of generating said electrical signals in said computer hardware means arising from:
(1) means for performing computer programming commands for selecting a starting portfolio of equity stocks;
(2) means for performing computer programming commands for making a plurality of incremental changes in weight percentages of at least some of said starting portfolio of equity stocks;
(3) means for performing computer programming commands for determining a correlation of the past behavior of said pension plan liabilities with said financial return of said incrementally changed portfolio of equity stocks over the same time period as said past pension plan liabilities; and
(4) means for performing computer programming commands for reaccessing (2) and (3) until reaching said particular portfolio of assets having said optimized correlation with said standard index.

6. A computer for managing an insurance plan's portfolio of assets, comprising:

computer hardware means for numeric processing;

said numeric processing being performed by manipulation and recognition of electrical signals having two voltage levels associated with binary signal processing;

said numeric processing performed by said computer hardware means having:
(a) means for generating said electrical signals to ascertain a standard actuarial index in terms of characteristic future cash payments discounted to present value based on a range for at least one of discount rate values and wage inflation values;
(b) means for generating said electrical signals to ascertain the past behavior of current insurance plan liabilities projected backwards in time;
(c) means for generating said electrical signals to determine a particular portfolio of equity stocks having an optimized combination of risk and financial return for tracking said standard actuarial index having:
(1) means for performing computer programming commands for selecting a starting portfolio of equity stocks, said commands thereby causing generation of said electrical signals in said computer hardware means;
(2) means for performing computer programming commands for making a plurality of incremental changes in weight percentages of at least some of said starting portfolio of equity stocks;
(3) means for performing computer programming commands for determining a correlation of the past behavior of said insurance plan liabilities with said financial return of said incrementally changed portfolio of equity stocks over the same time period as said past insurance plan liabilities; and
(4) means for performing computer programming commands for reaccessing (2) and (3) until reaching said particular portfolio of assets having said optimized correlation with said standard index thereby generating electrical output signals characteristic of said particular portfolio of assets.

7. A computer for managing a pension plan's portfolio of assets, comprising:

computer hardware means capable of numeric processing;

said computer hardware means including a read only memory and a random access memory;

said numeric processing involving accessing said read only memory and said random access memory, said numeric processing performed by said computer hardware means having:
(a) means for processing electrical signals in said computer hardware means to ascertain a standard actuarial index in terms of characteristic future cash payments discounted to present value based on a range for at least one of discount rate values and wage inflation values;
(b) means for processing electrical signals in said computer hardware means to ascertain the past behavior of current pension plan liabilities projected backwards in time;
(c) means for processing electrical signals in said computer hardware means to determine a particular portfolio of equity stocks having an optimized combination of risk and financial return for tracking said standard actuarial index having:
(1) means for performing computer programming commands for selecting a starting portfolio of equity stocks;
(2) means for performing computer programming commands for making a plurality of incremental changes in weight percentages of at least some of said starting portfolio of equity stocks;
(3) means for performing computer programming commands for determining a correlation of the past behavior of said pension plan liabilities with said financial return of said incrementally changed portfolio of equity stocks over the same time period as said past pension plan liabilities; and
(4) means for performing computer programming commands for reaccessing (2) and (3) until reaching said particular portfolio of assets having said optimized correlation with said standard index thereby generating said electrical signals characteristic of said particular portfolio.

8. A computer for managing an insurance plan's portfolio of assets, comprising:

computer hardware means for performing numeric processing;

said computer hardware means including a read only memory and a random access memory and further comprising:

(a) means for processing input data electronically to ascertain a standard actuarial index in terms of characteristic future cash payments discounted to present value based on a range for at least one of discount rate values and wage inflation values;
(b) means for processing input data electronically to ascertain the past behavior of current insurance plan liabilities projected backwards in time;
(c) means for processing data electronically to determine a particular portfolio of equity stocks having an optimized combination of risk and financial return for tracking said standard actuarial index;
(d) means for processing data electronically to determine said particular portfolio of equity stocks having:
  (1) means for performing computer programming commands for selecting a starting portfolio of equity stocks;
  (2) means for performing computer programming commands for making a plurality of incremental changes in weight percentages of at least some of said starting portfolio of equity stocks;
  (3) means for performing computer programming commands for determining a correlation of the past behavior of said insurance plan liabilities with said financial return of said incrementally changed portfolio of equity stocks over the same time period as said past insurance plan liabilities; and
  (4) means for performing computer programming commands for reaccessing (2) and (3) until reaching said particular portfolio of assets having said optimized correlation with said standard index.

9. Apparatus for producing a portfolio of equity stocks for pension plan management, said apparatus comprising:
first computer means for converting analog information to electronic signals;
second computer means for manipulating said electronic signals;
memory means for storing said electronic signals coupled to said second computer means for manipulating said electronic signals;
said second computer means manipulating said electronic signals at least partly in response to:
  (a) means for performing computer programming commands for ascertaining a standard actuarial index in terms of characteristic future cash payments discounted to present value based on a range for at least one of discount rate values and wage inflation values;
  (b) means for performing computer programming commands for ascertaining the past behavior of current pension plan liabilities projected backwards in time;
  (c) means for performing computer programming commands for determining a particular portfolio of equity stocks having an optimized combination of risk and financial return for tracking said standard actuarial index having:
    (1) means for selecting a starting portfolio of equity stocks;
    (2) means for making a plurality of incremental changes in weight percentages of at least some of said starting portfolio of equity stocks;
    (3) means for determining a correlation of the past behavior of said pension plan liabilities with said financial return of said incrementally changed portfolio of equity stocks over the same time period as said past pension plan liabilities; and
    (4) means for reaccessing (2) and (3) until reaching said particular portfolio of assets having said optimized correlation with said standard index.

10. Apparatus for producing a portfolio of equity stocks for insurance plan management, said apparatus comprising:
first computer means for converting analog information to electronic signals;
second computer means for manipulating said electronic signals;
memory means for storing said electronic signals coupled to said second computer means for manipulating said electronic signals;
said second computer means manipulating said electronic signals at least partly in response to carrying out a program generating electrical signals from:
  (a) means for performing computer programming commands for ascertaining a standard actuarial index in terms of characteristic future cash payments discounted to present value based on a range for at least one of discount rate values and wage inflation values;
  (b) means for performing computer programming commands for ascertaining the past behavior of current pension plan liabilities projected backwards in time;
  (c) means for performing computer programming commands for determining a particular portfolio of equity stocks having an optimized combination of risk and financial return for tracking said standard actuarial index having:
    (1) means for selecting a starting portfolio of equity stocks;
    (2) means for making a plurality of incremental changes in weight percentages of at least some of said starting portfolio of equity stocks;
    (3) means for determining a correlation of the past behavior of said insurance plan liabilities with said financial return of said incrementally changed portfolio of equity stocks over the same time period as said past insurance plan liabilities; and
    (4) means for reaccessing (2) and (3) until reaching said particular portfolio of assets having said optimized correlation with said standard index, said portfolio of assets characterized by electrical signals in said computer hardware means.

11. Apparatus for producing a portfolio of equity stocks for pension plan management, wherein said apparatus provides an electrical output signal subsequent to processing an electrical input signal, said apparatus comprising:
electrical processing means for processing the electrical input signal;
memory means for storing information relating to the electrical input signal being coupled to said processing means;
said processing of the electrical input signal by said electrical processing means being controlled in part by:
  (a) means for performing computer programming commands generating electrical signals in said apparatus by ascertaining and storing in said memory means a standard actuarial index in terms of characteristic future cash payments discounted to present value based on a range for at least one of discount rate values and wage inflation values;
  (b) means for performing computer programming commands generating electrical signals in said apparatus by ascertaining the past behavior of current pension plan liabilities projected backwards in time;
(c) means for performing computer programming commands generating electrical signals in said apparatus by determining a particular portfolio of equity stocks having an optimized combination of risk and financial return for tracking said standard actuarial index having:
  (1) means for selecting a starting portfolio of equity stocks and storing electrical signals relating to said equity stocks in said memory means;
  (2) means for making a plurality of incremental changes in weight percentages of at least some of said starting portfolio of equity stocks;
  (3) means for determining a correlation of the past behavior of said pension plan liabilities with said financial return of said incrementally changed portfolio of equity stocks over the same time period as said past pension plan liabilities;
  (4) means for reaccessing (2) and (3) until reaching said particular portfolio of assets having said optimized correlation with said standard index; and
  (5) means for converting information relating to said portfolio of stocks to said electrical output signal in said memory means.

* * * * *